(12) United States Patent
Ikeda

(10) Patent No.: US 10,379,626 B2
(45) Date of Patent: Aug. 13, 2019

(54) PORTABLE COMPUTING DEVICE

(71) Applicant: Hiroyuki Ikeda, Tokyo (JP)

(72) Inventor: Hiroyuki Ikeda, Tokyo (JP)

(\*) Notice: Subject to any disclaimer, the term of this patent is extended or adjusted under 35 U.S.C. 154(b) by 0 days.

(21) Appl. No.: 14/406,989

(22) PCT Filed: Mar. 8, 2013

(86) PCT No.: PCT/JP2013/056515
§ 371 (c)(1),
(2) Date: May 18, 2015

(87) PCT Pub. No.: WO2013/187093
PCT Pub. Date: Dec. 19, 2013

(65) Prior Publication Data
US 2015/0253870 A1 Sep. 10, 2015

(30) Foreign Application Priority Data

Jun. 14, 2012 (JP) ................. 2012-134469
Nov. 15, 2012 (JP) ................. 2012-251358
Feb. 27, 2013 (JP) ................. 2013-037675

(51) Int. Cl.
*G06F 3/023* (2006.01)
*G06F 3/041* (2006.01)
(Continued)

(52) U.S. Cl.
CPC .......... *G06F 3/0236* (2013.01); *G06F 3/0233* (2013.01); *G06F 3/03547* (2013.01);
(Continued)

(58) Field of Classification Search
CPC ............... G06F 3/0233; G06F 3/04886; G06F 3/04812; G06F 3/0236; G06F 3/03547;
(Continued)

(56) References Cited

U.S. PATENT DOCUMENTS 4,984,152 A 1/1991 Muller
5,850,212 A 12/1998 Nishibori
(Continued)

FOREIGN PATENT DOCUMENTS

CN 1620641 A 5/2005
JP H11194870 A 7/1999
(Continued)

OTHER PUBLICATIONS

Office Action from the Chinese Patent Office mailed Jul. 26, 2016 in related application CN 201380031095.7, and machine translation thereof, as well as Search Report.
(Continued)

*Primary Examiner* — Vinh T Lam
(74) *Attorney, Agent, or Firm* — J-Tek Law PLLC; Jeffrey D. Tekanic; Scott T. Wakeman

(57) ABSTRACT

A portable computing device includes a touch screen associated with a display, and a controller that causes a keyboard image and at least one command graphic to be displayed on the display. The command graphic contains a direction-specifying area for selecting a direction of movement of a cursor that is movable within the keyboard image and a selection input area. Touch position information concerning whether the direction-specifying area or the selection input area has been touched is generated by the controller. When the direction-specifying area is touched, the cursor is moved in one or more discrete key image units in a direction of movement indicated by a portion of direction-specifying area that was touched, and when the selection input area is touched, the character of the character key image that the cursor is currently superimposed upon is displayed on the character display field.

34 Claims, 79 Drawing Sheets

(51) Int. Cl.
*G06F 3/0488* (2013.01)
*G06F 3/0354* (2013.01)
*G06F 3/0481* (2013.01)

(52) U.S. Cl.
CPC ........ *G06F 3/0416* (2013.01); *G06F 3/04812* (2013.01); *G06F 3/04883* (2013.01); *G06F 3/04886* (2013.01); *G06F 2203/04808* (2013.01); *H04M 2250/22* (2013.01); *H04M 2250/70* (2013.01)

(58) Field of Classification Search
CPC ............... G06F 3/0416; G06F 3/04883; G06F 2203/04808; H04M 2250/22; H04M 2250/70
USPC .................................................. 345/158–173
See application file for complete search history.

(56) References Cited

U.S. PATENT DOCUMENTS

| | | | |
|---|---|---|---|
| 7,487,147 B2 * | 2/2009 | Bates | G06F 3/0236 |
| 7,856,603 B2 * | 12/2010 | Molgaard | G06F 1/1613 |
| | | | 345/156 |
| 8,065,624 B2 | 11/2011 | Morin et al. | |
| 8,116,824 B2 | 2/2012 | Choi | |
| 8,335,993 B1 * | 12/2012 | Tan | G06F 3/04886 |
| | | | 715/773 |
| 8,384,683 B2 * | 2/2013 | Luo | G06F 1/1626 |
| | | | 345/158 |
| 8,552,987 B2 * | 10/2013 | Kuroume | G06F 3/04886 |
| | | | 345/173 |
| 8,698,764 B1 | 4/2014 | Karakotsios et al. | |
| 8,854,323 B2 | 10/2014 | Harada et al. | |
| 2001/0040551 A1 * | 11/2001 | Yates | G06F 1/1626 |
| | | | 345/156 |
| 2003/0234766 A1 * | 12/2003 | Hildebrand | G06F 1/1626 |
| | | | 345/168 |
| 2004/0021696 A1 * | 2/2004 | Molgaard | G06F 1/1613 |
| | | | 715/810 |
| 2004/0108994 A1 * | 6/2004 | Kato | G06F 3/0236 |
| | | | 345/171 |
| 2004/0257341 A1 | 12/2004 | Bear et al. | |
| 2005/0162402 A1 | 7/2005 | Watanachote | |
| 2006/0220902 A1 | 10/2006 | Takahashi et al. | |
| 2006/0238517 A1 | 10/2006 | King et al. | |
| 2006/0257839 A1 | 11/2006 | Miyaji et al. | |
| 2007/0046647 A1 | 3/2007 | Ohta | |
| 2007/0152979 A1 | 7/2007 | Jobs et al. | |
| 2007/0216658 A1 * | 9/2007 | Rainisto | G06F 3/04886 |
| | | | 345/173 |
| 2007/0245269 A1 | 10/2007 | Kim et al. | |
| 2008/0122796 A1 * | 5/2008 | Jobs | G06F 3/0488 |
| | | | 345/173 |
| 2008/0288878 A1 | 11/2008 | Hayashi et al. | |
| 2009/0100129 A1 | 4/2009 | Vigil et al. | |
| 2009/0113299 A1 * | 4/2009 | Chung | G06F 3/018 |
| | | | 715/702 |
| 2009/0155750 A1 * | 6/2009 | Abe | G06F 3/04883 |
| | | | 434/169 |
| 2009/0179854 A1 | 7/2009 | Weber et al. | |
| 2009/0213081 A1 | 8/2009 | Case, Jr. | |
| 2009/0219246 A1 | 9/2009 | Suzuki | |
| 2009/0259962 A1 * | 10/2009 | Beale | G06F 3/0233 |
| | | | 715/773 |
| 2009/0313571 A1 * | 12/2009 | Horodezky | G06F 9/454 |
| | | | 715/780 |
| 2010/0005387 A1 | 1/2010 | Toki | |
| 2010/0038151 A1 * | 2/2010 | Chen | G06F 3/0416 |
| | | | 178/18.03 |
| 2010/0064238 A1 | 3/2010 | Ludwig | |
| 2010/0103127 A1 | 4/2010 | Park et al. | |
| 2010/0185971 A1 * | 7/2010 | Ito | G06F 3/0236 |
| | | | 715/773 |
| 2010/0225599 A1 | 9/2010 | Danielsson et al. | |
| 2010/0281431 A1 | 11/2010 | Kano et al. | |
| 2010/0287480 A1 | 11/2010 | Hicks et al. | |
| 2010/0293460 A1 * | 11/2010 | Budelli | G06F 3/04842 |
| | | | 715/702 |
| 2010/0295780 A1 * | 11/2010 | Vaisanen | G06F 3/0488 |
| | | | 345/157 |
| 2010/0325572 A1 | 12/2010 | Morris et al. | |
| 2011/0018828 A1 * | 1/2011 | Wu | G06F 3/04883 |
| | | | 345/173 |
| 2011/0035664 A1 * | 2/2011 | Cho | G06F 3/04886 |
| | | | 715/702 |
| 2011/0173558 A1 * | 7/2011 | Yeh | G06F 3/018 |
| | | | 715/773 |
| 2011/0191709 A1 | 8/2011 | Lu et al. | |
| 2011/0285631 A1 | 11/2011 | Imamura et al. | |
| 2011/0298743 A1 | 12/2011 | Machida et al. | |
| 2012/0044175 A1 * | 2/2012 | Cho | G06F 3/018 |
| | | | 345/173 |
| 2012/0078614 A1 | 3/2012 | Galor et al. | |
| 2012/0098743 A1 | 4/2012 | Lai et al. | |
| 2012/0131451 A1 * | 5/2012 | Abe | G06F 3/0488 |
| | | | 715/260 |
| 2012/0268388 A1 * | 10/2012 | Razzaghi | G06F 3/0236 |
| | | | 345/173 |
| 2012/0306929 A1 * | 12/2012 | Chalkov | G06F 3/0488 |
| | | | 345/666 |
| 2012/0326980 A1 | 12/2012 | Sonsino | |
| 2012/0326984 A1 * | 12/2012 | Ghassabian | G06F 3/0236 |
| | | | 345/168 |
| 2013/0024820 A1 | 1/2013 | Kirkpatrick | |
| 2013/0050098 A1 | 2/2013 | Ide | |
| 2013/0076595 A1 | 3/2013 | Sirpal et al. | |
| 2013/0113717 A1 | 5/2013 | Eerd et al. | |
| 2013/0113720 A1 * | 5/2013 | Van Eerd | G06F 3/04883 |
| | | | 345/173 |
| 2013/0174079 A1 | 7/2013 | Morley et al. | |
| 2013/0191773 A1 * | 7/2013 | Edwards | G06F 17/276 |
| | | | 715/780 |
| 2013/0249832 A1 | 9/2013 | Nakamura | G06F 17/276 |
| | | | 345/173 |
| 2013/0307781 A1 * | 11/2013 | Ghassabian | G06F 3/0487 |
| | | | 345/168 |
| 2013/0307790 A1 * | 11/2013 | Konttori | G06F 3/0488 |
| | | | 345/173 |
| 2014/0109016 A1 | 4/2014 | Ouyang et al. | |
| 2015/0026627 A1 | 1/2015 | Ikeda | |
| 2015/0074578 A1 * | 3/2015 | Liang | G06F 3/0488 |
| | | | 715/770 |
| 2015/0231491 A1 | 8/2015 | Hwang et al. | |
| 2016/0291923 A1 | 10/2016 | Sirpal et al. | |

FOREIGN PATENT DOCUMENTS

| | | |
|---|---|---|
| JP | 2001282427 A | 10/2001 |
| JP | 2003058305 A | 2/2003 |
| JP | 2004355606 A | 12/2004 |
| JP | 2006209418 A | 8/2006 |
| JP | 2006260028 A | 9/2006 |
| JP | 2007148589 A | 6/2007 |
| JP | 2007293407 A | 11/2007 |
| JP | 2007293849 A | 11/2007 |
| JP | 2010086064 A | 4/2010 |
| JP | 2011080791 A | 4/2011 |
| JP | 2011146891 A | 7/2011 |
| JP | 2011248411 A | 12/2011 |
| WO | 03056784 A2 | 7/2003 |
| WO | 2007060773 A1 | 5/2007 |
| WO | 2008152679 A1 | 12/2008 |
| WO | 2009087992 A1 | 7/2009 |
| WO | 2010092993 A1 | 8/2010 |
| WO | 2011131989 A1 | 10/2011 |

(56) References Cited

FOREIGN PATENT DOCUMENTS

WO      2011145276 A1    11/2011
WO      2013099362 A1    7/2013

OTHER PUBLICATIONS

English translation of International Preliminary Report on Patentability for parent application No. PCT/JP2013/056515.
English translation of International Search Report for parent application No. PCT/JP2013/056515.
Final Office Action dated Apr. 5, 2017 in related U.S. Appl. No. 14/369,607 and examined claims 1, 2, 4-8, 12 and 14-23.
Office Action dated Oct. 27, 2016 in related U.S. Appl. No. 14/369,607 and examined claims 1, 2 and 4-15.
Office Action dated Mar. 27, 2018 in related U.S. Appl. No. 14/369,607 and examined claims 1, 2 and 4-8, 12, 14-24.
Communication from the European Patent Office dated Jan. 18, 2019 in related EP application No. 12 862 871.6, Including examined claims 1-7.
Office Action dated Dec. 28, 2018 in related U.S. Appl. No. 14/369,607 and examined claims 1, 2 and 4-8, 12, 14-25.
Office Action dated Nov. 3, 2017 in related U.S. Appl. No. 14/369,607 and examined claims 1, 2 and 4-8, 12, 14-23.
Search Report from the European Patent Office dated Aug. 5, 2015 in related EP application No. 12 862 871.6, Including European Search Opinion, European Search Report, and examined claims 1-8.

\* cited by examiner

Fig.8
(a)
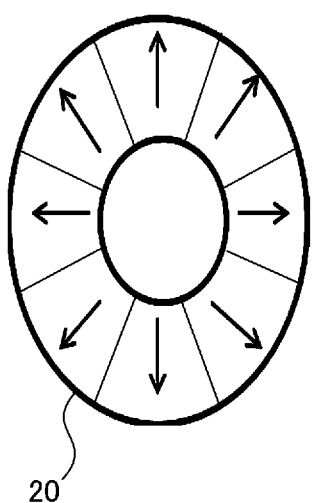
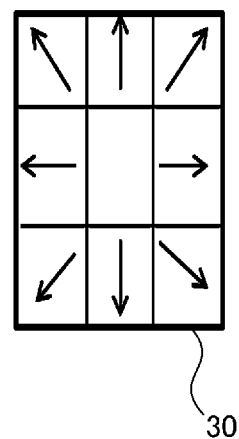
(b)
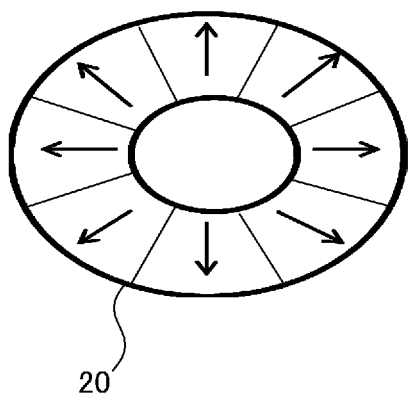
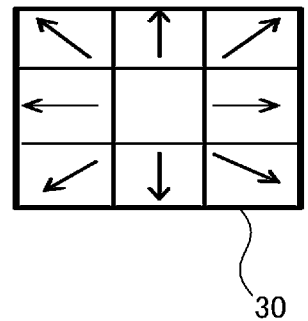

Fig.9
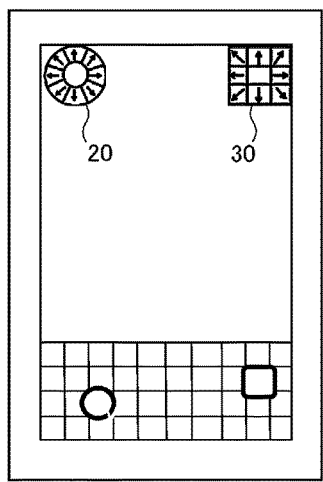
(a)
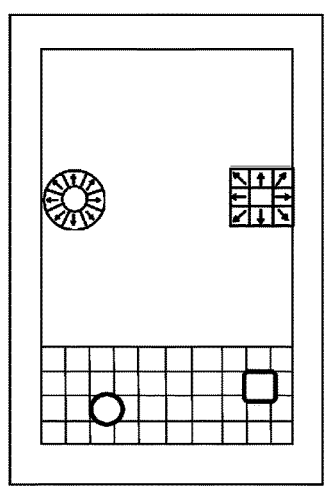
(b)
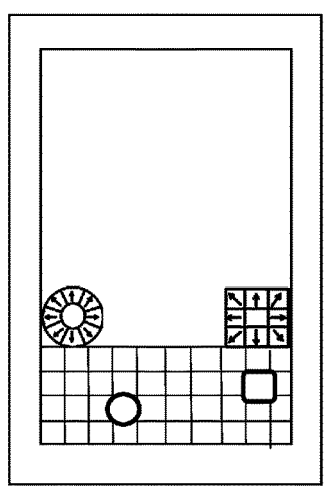
(c)
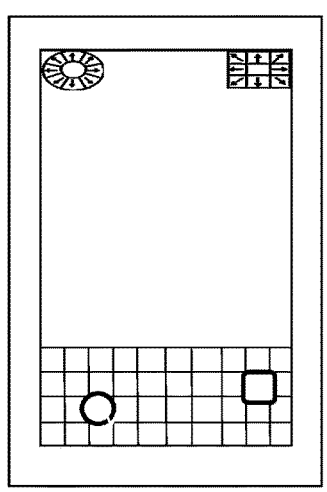
(d)
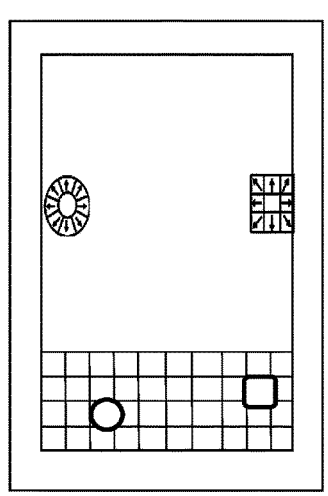
(e)
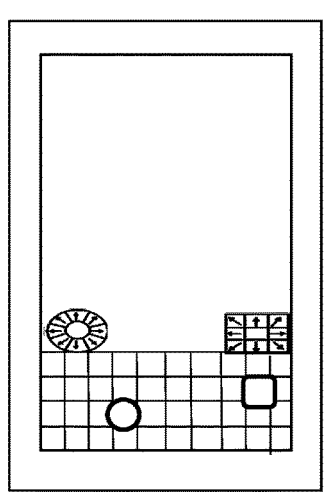
(f)

Fig.10
(a) 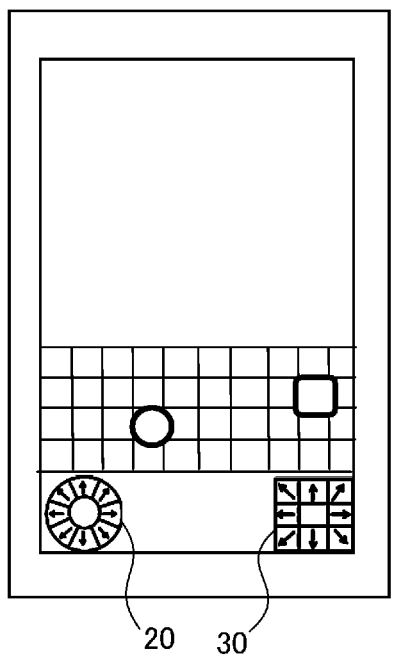
(b) 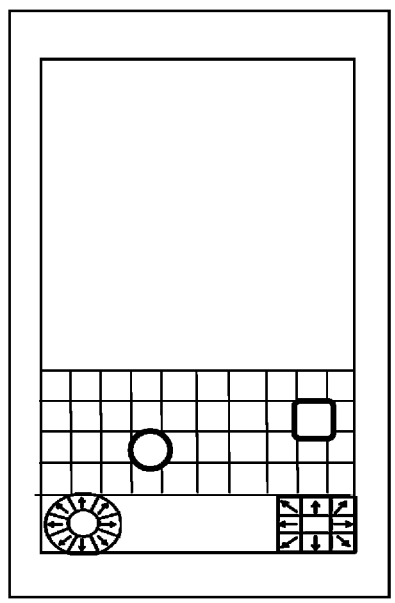
(c) 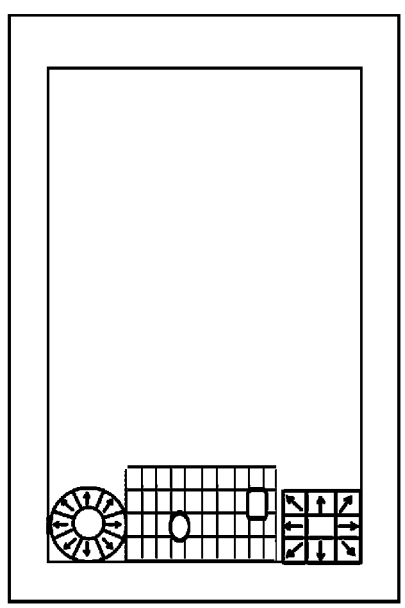
(d) 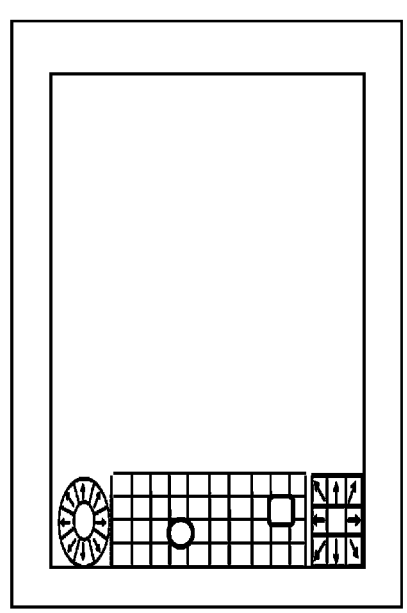

Fig.23
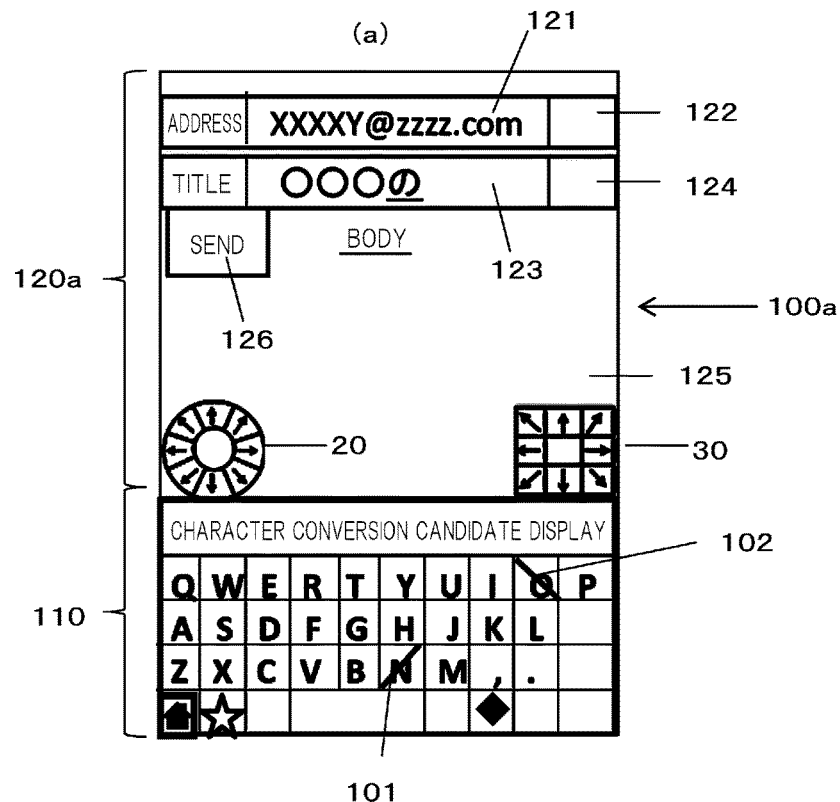
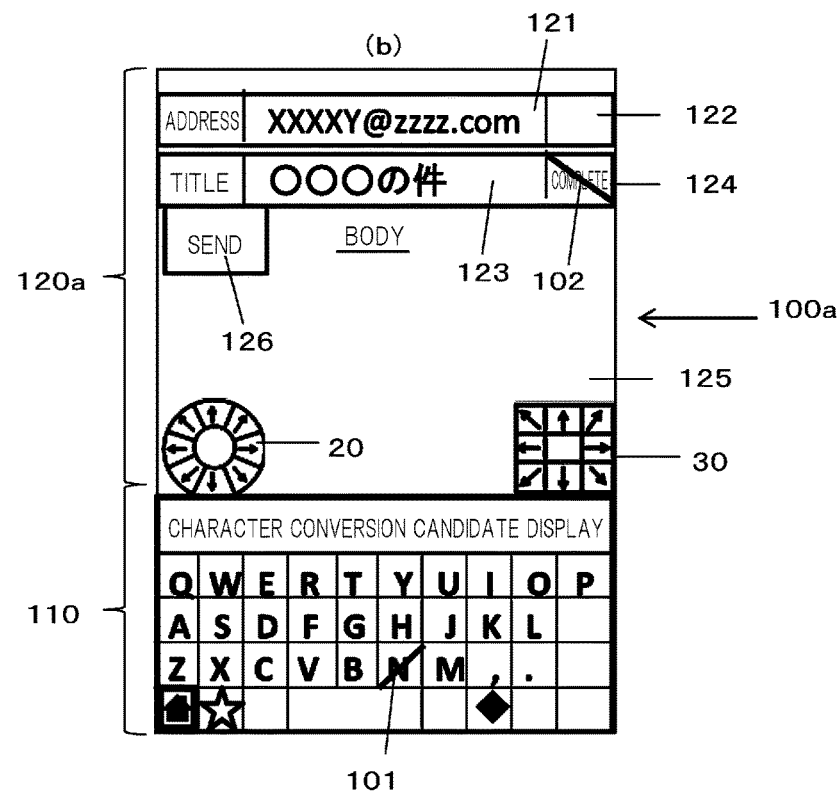

Fig.24
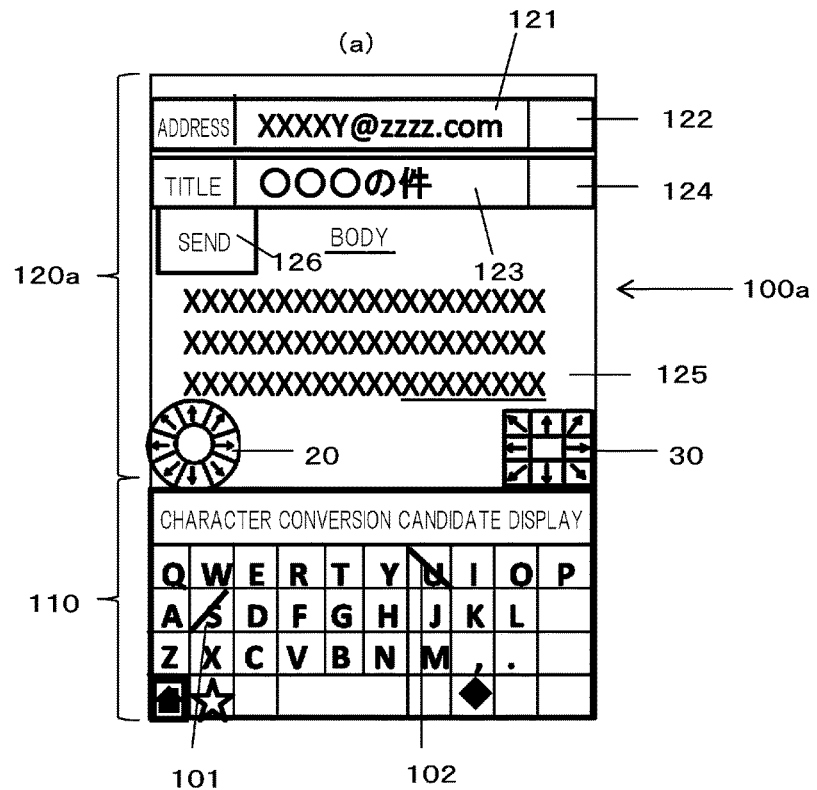
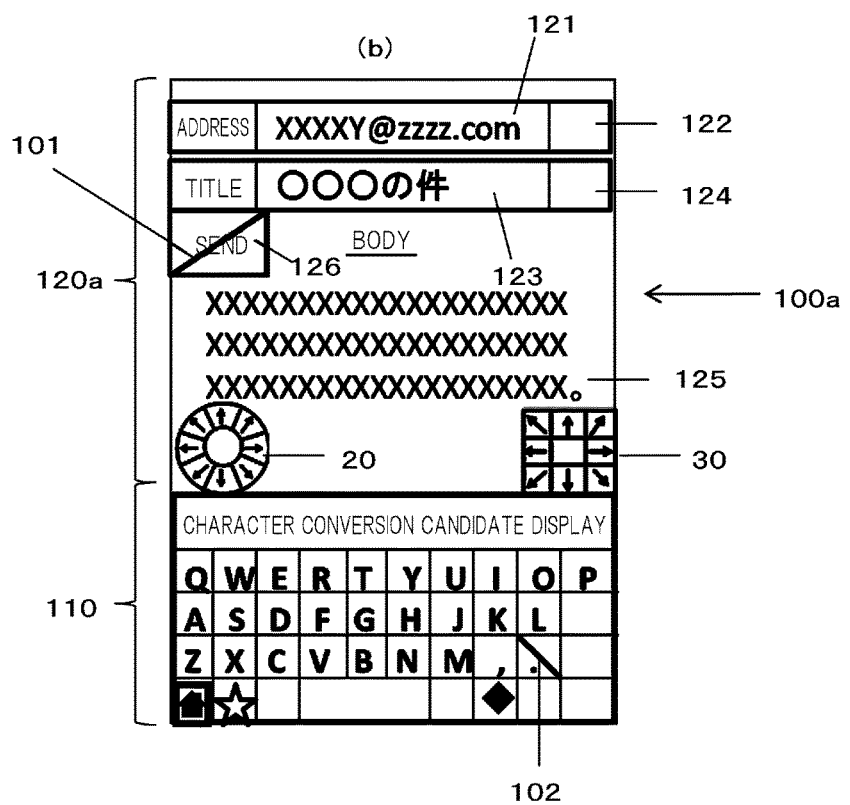

Fig.29
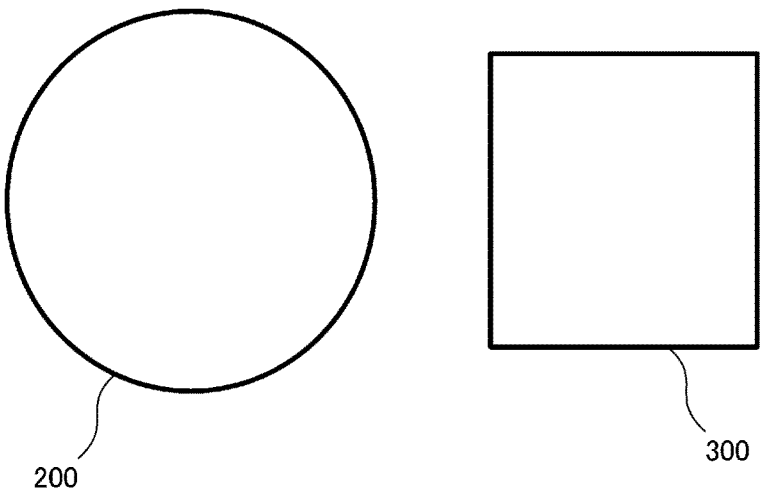
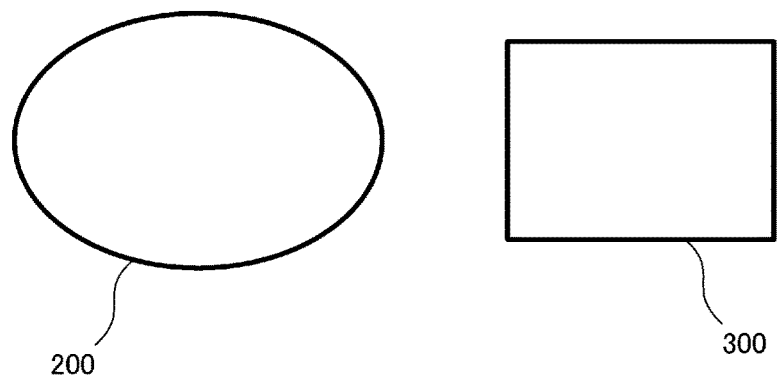
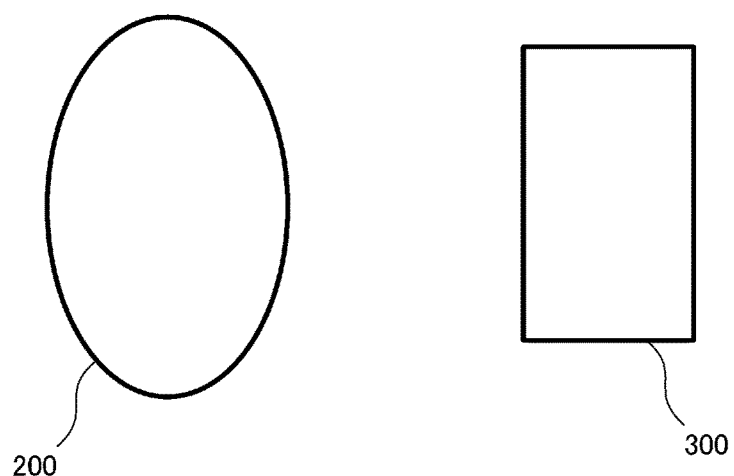

| CHARACTER CONVERSION CANDIDATE DISPLAY | | | | | | | | | | | |
|---|---|---|---|---|---|---|---|---|---|---|---|
| F1 | F2 | F3 | F4 | F5 | F6 | F7 | F8 | F9 | F10 | | |
| 1 | 2 | 3 | 4 | 5 | 6 | 7 | 8 | 9 | 0 | | |
| Q | W | E | R | T | Y | U | I | O | P | @ | |
| A | S | D | F | G | H | J | K | L | ; | : | |
| Z | X | C | V | B | N | M | , | . | / | ↑ | |
| 🏠 | ☆ | | | | | ◆ | | ← | ↓ | → | |

(b)

| CHARACTER CONVERSION CANDIDATE DISPLAY | | | | | | | | | | |
|---|---|---|---|---|---|---|---|---|---|---|
| 1 | 2 | 3 | 4 | 5 | 6 | 7 | 8 | 9 | 0 | |
| Q | W | E | R | T | Y | U | I | O | P | @ |
| A | S | D | F | G | H | J | K | L | ; | : |
| Z | X | C | V | B | N | M | , | . | / | |
| 🏠 | ☆ | | | | | ◆ | | | | |

(c)

| CHARACTER CONVERSION CANDIDATE DISPLAY | | | | | | | | | | |
|---|---|---|---|---|---|---|---|---|---|---|
| 1 | 2 | 3 | 4 | 5 | 6 | 7 | 8 | 9 | 0 | |
| Q | W | E | R | T | Y | U | I | O | P | @ |
| A | S | D | F | G | H | J | K | L | ; | : |
| Z | X | C | V | B | N | M | , | . | / | |
| 🏠 | ☆ | | | | | ◆ | | | | |

(d)

| CHARACTER CONVERSION CANDIDATE DISPLAY | | | | | | | | | | |
|---|---|---|---|---|---|---|---|---|---|---|
| | 1 | 2 | 3 | 4 | 5 | 6 | 7 | 8 | 9 | 0 |
| Q | W | E | R | T | Y | U | I | O | P | @ |
| A | S | D | F | G | H | J | K | L | ; | : |
| Z | X | C | V | B | N | M | , | . | / | |
| 🏠 | ☆ | | | | | ◆ | | | | |

(e)

| CHARACTER CONVERSION CANDIDATE DISPLAY | | | | | | | | | |
|---|---|---|---|---|---|---|---|---|---|
| 1 | 2 | 3 | 4 | 5 | 6 | 7 | 8 | 9 | 0 |
| Q | W | E | R | T | Y | U | I | O | P | |
| A | S | D | F | G | H | J | K | L | | |
| Z | X | C | V | B | N | M | , | . | |
| 🏠 | ☆ | | | | | ◆ | | | |

| CHARACTER CONVERSION CANDIDATE DISPLAY | | | | | | | | | |
|---|---|---|---|---|---|---|---|---|---|
| Q | W | E | R | T | Y | U | I | O | P | @ |
| A | S | D | F | G | H | J | K | L | ; | : |
| Z | X | C | V | B | N | M | , | . | / | |
| 🏠 | ☆ | | | | | | ◆ | | | |

(b)

| CHARACTER CONVERSION CANDIDATE DISPLAY | | | | | | | | | |
|---|---|---|---|---|---|---|---|---|---|
| Q | W | E | R | T | Y | U | I | O | P | @ |
| A | S | D | F | G | H | J | K | L | ; | : |
| Z | X | C | V | B | N | M | , | . | / | |
| 🏠 | ☆ | | | | | | ◆ | | | |

(c)

| CHARACTER CONVERSION CANDIDATE DISPLAY | | | | | | | | | |
|---|---|---|---|---|---|---|---|---|---|
| Q | W | E | R | T | Y | U | I | O | P | @ |
| A | S | D | F | G | H | J | K | L | ; | : |
| Z | X | C | V | B | N | M | , | . | / | |
| 🏠 | ☆ | | | | | | ◆ | | | |

(d)

| CHARACTER CONVERSION CANDIDATE DISPLAY | | | | | | | |
|---|---|---|---|---|---|---|---|
| Q | W | E | R | T | Y | U | I | O | P |
| A | S | D | F | G | H | J | K | L | |
| Z | X | C | V | B | N | M | , | . | |
| 🏠 | ☆ | | | | | ◆ | | | |

(e)

| CHARACTER CONVERSION CANDIDATE DISPLAY | | | | | | | |
|---|---|---|---|---|---|---|---|
| Q | W | E | R | T | Y | U | I | O | P |
| A | S | D | F | G | H | J | K | L | |
| | Z | X | C | V | B | N | M | |
| 🏠 | ☆ | | | | | ◆ | | |

| CHARACTER CONVERSION CANDIDATE DISPLAY | | | | | | | | | MRC | M- | M+ | C·CE |
|---|---|---|---|---|---|---|---|---|---|---|---|---|
| Q | W | E | R | T | Y | U | I | O | P | @ | 1 | 2 | 3 | × |
| A | S | D | F | G | H | J | K | L | ; | : | 4 | 5 | 6 | ÷ |
| Z | X | C | V | B | N | M | , | . | / | | 7 | 8 | 9 | − |
| ⬆ | ☆ | | | | | | ◆ | | | | . | 0 | = | + |

(b)

| CHARACTER CONVERSION CANDIDATE DISPLAY | | | | | | | | | MRC | M- | M+ | C·CE |
|---|---|---|---|---|---|---|---|---|---|---|---|---|
| Q | W | E | R | T | Y | U | I | O | P | @ | 1 | 2 | 3 | × |
| A | S | D | F | G | H | J | K | L | ; | : | 4 | 5 | 6 | ÷ |
| Z | X | C | V | B | N | M | , | . | / | | 7 | 8 | 9 | − |
| ⬆ | ☆ | | | | | | ◆ | | | | . | 0 | = | + |

(c)

| CHARACTER CONVERSION CANDIDATE DISPLAY | | | | | | | | | MRC | M- | M+ | C·CE |
|---|---|---|---|---|---|---|---|---|---|---|---|---|
| Q | W | E | R | T | Y | U | I | O | P | @ | 1 | 2 | 3 | × |
| A | S | D | F | G | H | J | K | L | ; | : | 4 | 5 | 6 | ÷ |
| Z | X | C | V | B | N | M | , | . | / | | 7 | 8 | 9 | − |
| ⬆ | ☆ | | | | | | ◆ | | | | . | 0 | = | + |

Fig.33
(a) 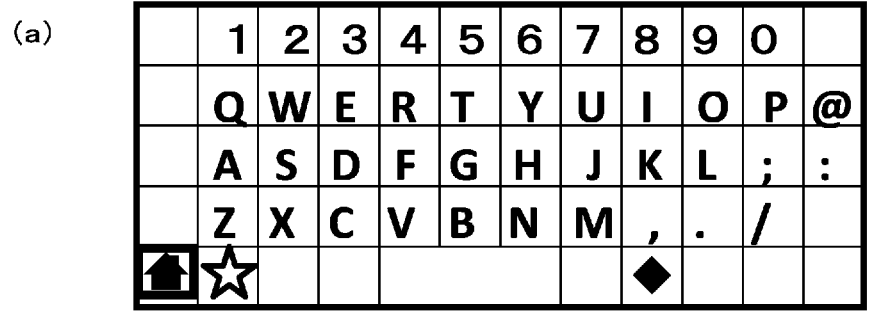
(b) 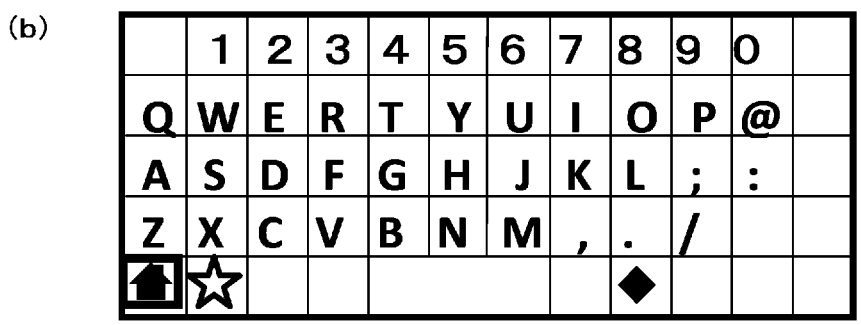
(c) 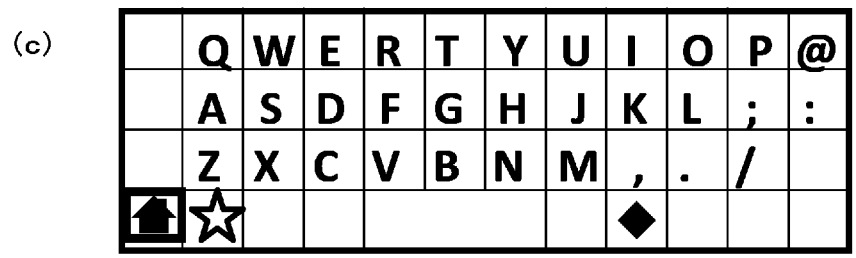
(d) 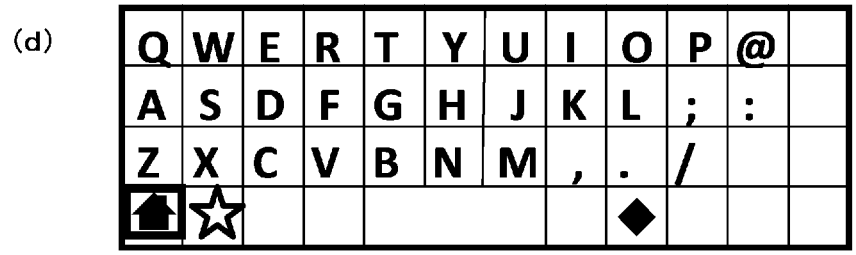

Fig.34
(a) 
(b) 
(c) 
(d) 

| Q | W | E | R | T | Y | U | I | O | P | @ | 1 | 2 | 3 | × |
|---|---|---|---|---|---|---|---|---|---|---|---|---|---|---|
| A | S | D | F | G | H | J | K | L | ; | : |   | 4 | 5 | 6 | ÷ |
| Z | X | C | V | B | N | M | , | . | / |   | 7 | 8 | 9 | − |
| ⬆ | ☆ |   |   |   |   |   | ◆ |   |   |   | . | 0 | = | + |

(b)

| Q | W | E | R | T | Y | U | I | O | P | @ |   | 1 | 2 | 3 | × |
|---|---|---|---|---|---|---|---|---|---|---|---|---|---|---|---|
| A | S | D | F | G | H | J | K | L | ; | : |   | 4 | 5 | 6 | ÷ |
| Z | X | C | V | B | N | M | , | . | / |   |   | 7 | 8 | 9 | − |
| ⬆ | ☆ |   |   |   |   |   | ◆ |   |   |   |   | . | 0 | = | + |

(c)

| Q | W | E | R | T | Y | U | I | O | P | @ | 1 | 2 | 3 | × |
|---|---|---|---|---|---|---|---|---|---|---|---|---|---|---|
| A | S | D | F | G | H | J | K | L | ; | : | 4 | 5 | 6 | ÷ |
| Z | X | C | V | B | N | M | , | . | / | 7 | 8 | 9 | − |
| ⬆ | ☆ |   |   |   |   | ◆ |   |   | . | 0 | = | + |

| | F1 | F2 | F3 | F4 | F5 | F6 | F7 | F8 | F9 | F10 | MRC | M- | M+ | C·CE |
|---|---|---|---|---|---|---|---|---|---|---|---|---|---|---|
| | Q | W | E | R | T | Y | U | I | O | P | @ | 1 | 2 | 3 | × |
| | A | S | D | F | G | H | J | K | L | ; | : | 4 | 5 | 6 | ÷ |
| | Z | X | C | V | B | N | M | , | . | / | | 7 | 8 | 9 | − |
| 🏠 | ☆ | | | | | | | ◆ | | | . | 0 | = | + |

(b)

| | F1 | F2 | F3 | F4 | F5 | F6 | F7 | F8 | F9 | F10 | MRC | M- | M+ | C·CE |
|---|---|---|---|---|---|---|---|---|---|---|---|---|---|---|
| Q | W | E | R | T | Y | U | I | O | P | @ | | 1 | 2 | 3 | × |
| A | S | D | F | G | H | J | K | L | ; | : | | 4 | 5 | 6 | ÷ |
| Z | X | C | V | B | N | M | , | . | / | | | 7 | 8 | 9 | − |
| 🏠 | ☆ | | | | | | | ◆ | | | . | 0 | = | + |

(c)

| | F1 | F2 | F3 | F4 | F5 | F6 | F7 | F8 | F9 | F10 | MRC | M- | M+ | C·CE |
|---|---|---|---|---|---|---|---|---|---|---|---|---|---|---|
| Q | W | E | R | T | Y | U | I | O | P | @ | 1 | 2 | 3 | × |
| A | S | D | F | G | H | J | K | L | ; | : | 4 | 5 | 6 | ÷ |
| Z | X | C | V | B | N | M | , | . | / | | 7 | 8 | 9 | − |
| 🏠 | ☆ | | | | | | ◆ | | | . | 0 | = | + |

| CHARACTER CONVERSION CANDIDATE DISPLAY | | | | | | | | | | |
|---|---|---|---|---|---|---|---|---|---|---|
| 1 | 2 | 3 | 4 | 5 | 6 | 7 | 8 | 9 | 0 | |
| あ | か | さ | た | な | は | ま | や | ら | わ | |
| い | き | し | ち | に | ひ | み | | り | を | |
| う | く | す | つ | ぬ | ふ | む | ゆ | る | ん | |
| ☆ | え | け | せ | て | ね | へ | め | | れ | |
| ⬆ | お | こ | そ | と | の | ほ | も | よ | ろ | |

(b)

| CHARACTER CONVERSION CANDIDATE DISPLAY | | | | | | | | | | | | | |
|---|---|---|---|---|---|---|---|---|---|---|---|---|---|
| あ | か | さ | た | な | は | ま | や | ら | わ | | MRC | M- | M+ | C·CE |
| い | き | し | ち | に | ひ | み | | り | を | | 1 | 2 | 3 | × |
| う | く | す | つ | ぬ | ふ | む | ゆ | る | ん | | 4 | 5 | 6 | ÷ |
| ☆ | え | け | せ | て | ね | へ | め | | れ | | 7 | 8 | 9 | − |
| ⬆ | お | こ | そ | と | の | ほ | も | よ | ろ | | . | 0 | = | + |

Fig.53
(a)
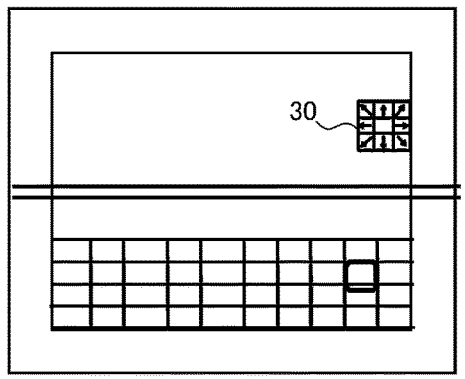
(b)
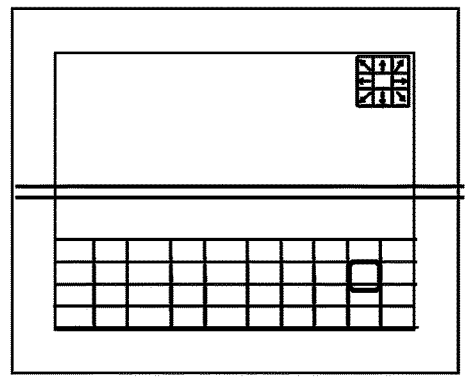
(c)
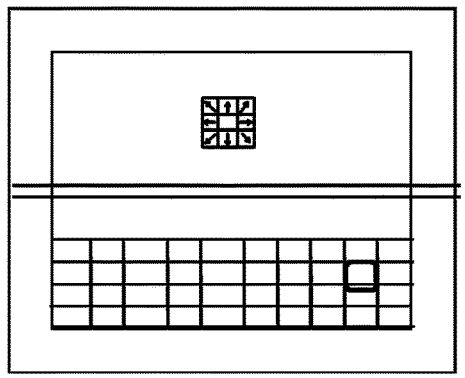
(d)
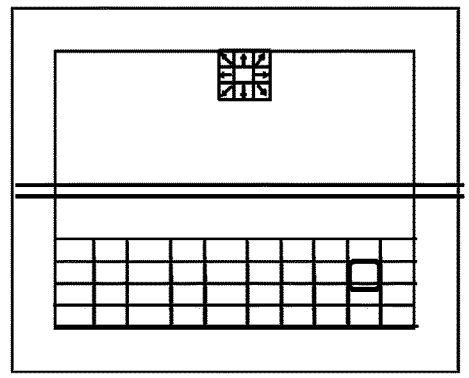
(e)
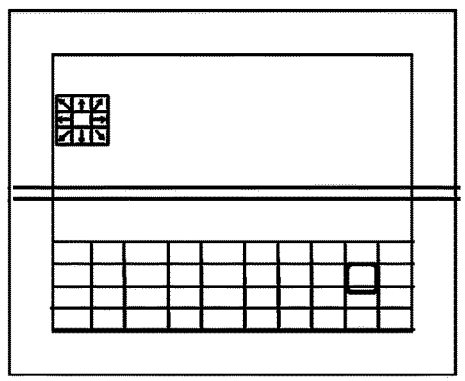
(f)
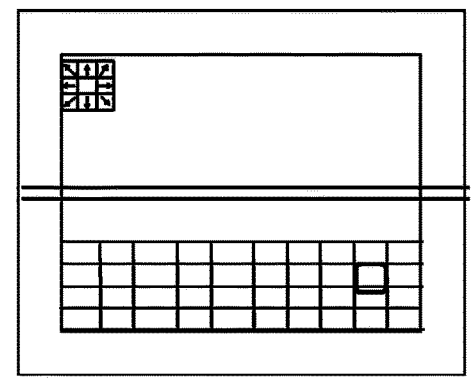

Fig.55
(a)
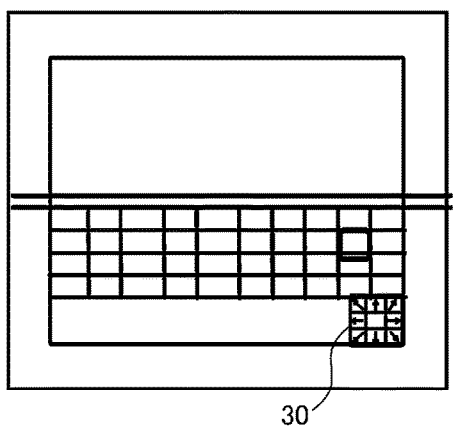
30
(b)
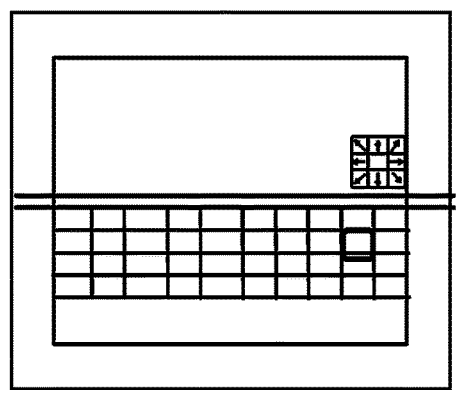
(c)
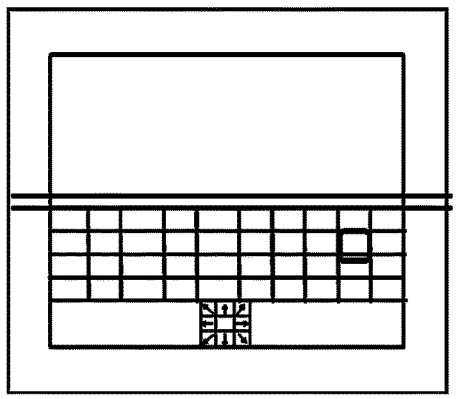
(d)
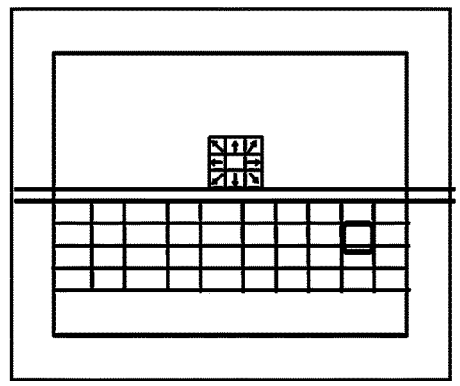
(e)
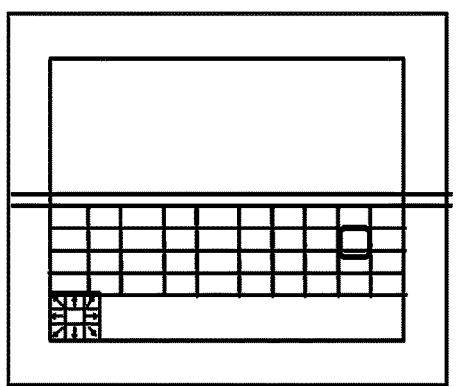
(f)
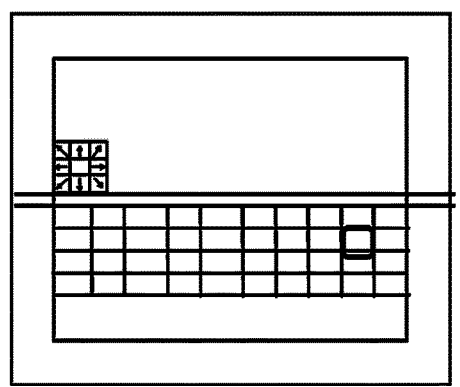

Fig.56
(a)
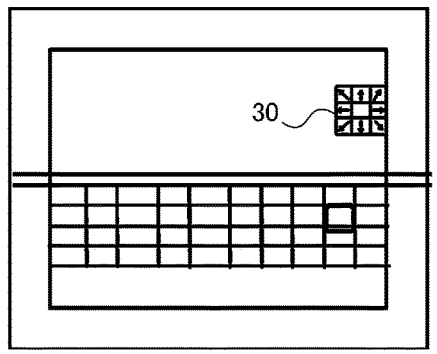
(b)
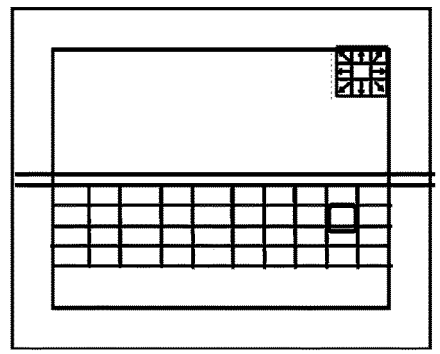
(c)
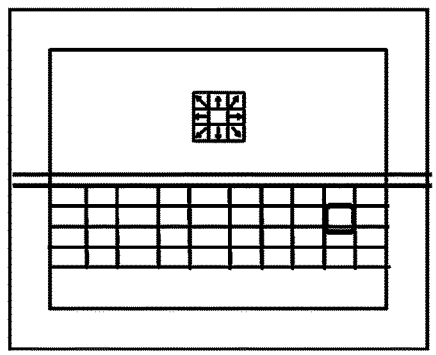
(d)
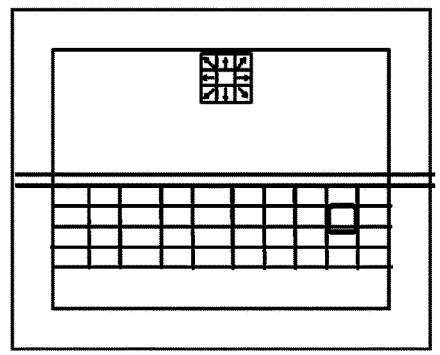
(e)
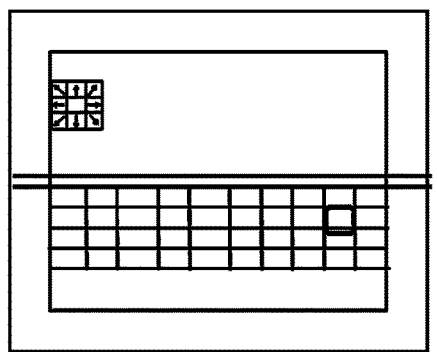
(f)
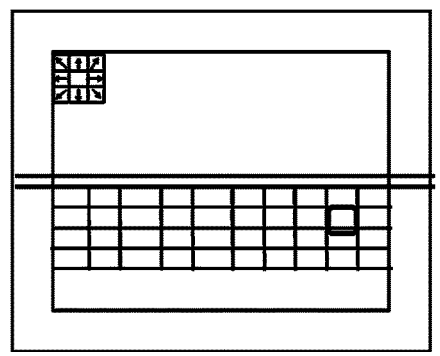

Fig.57
(a)
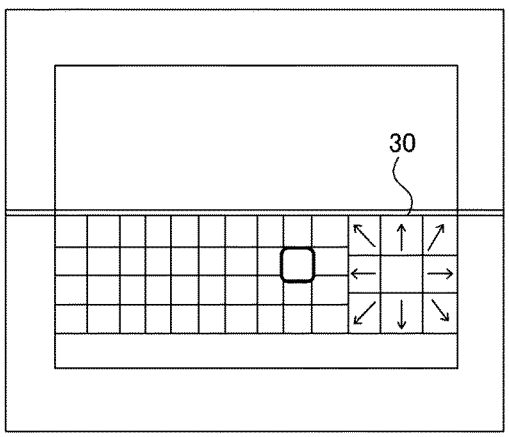
(b)
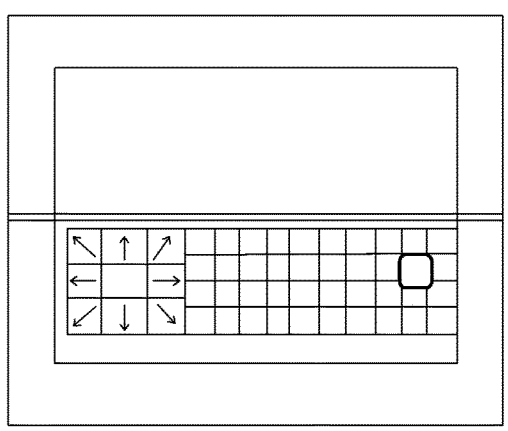
(c)
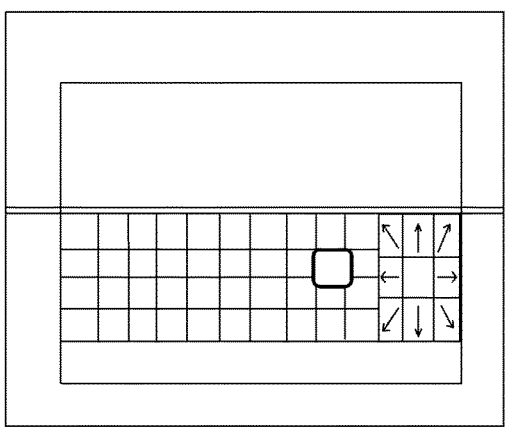
(d)
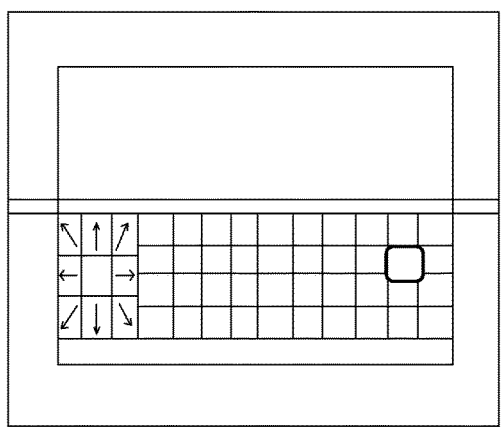

Fig.58
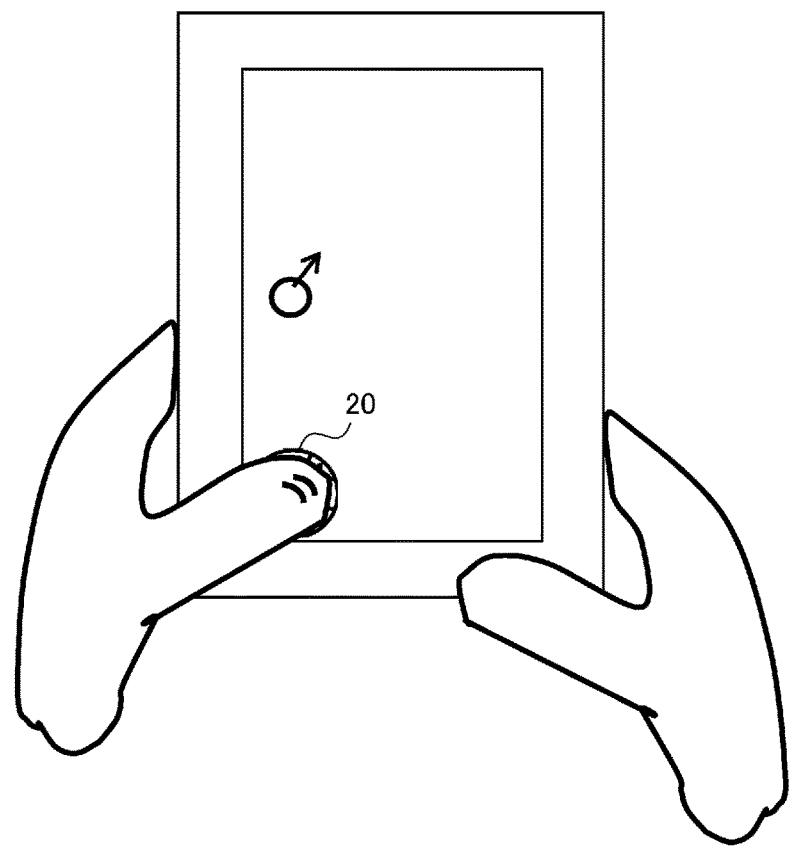
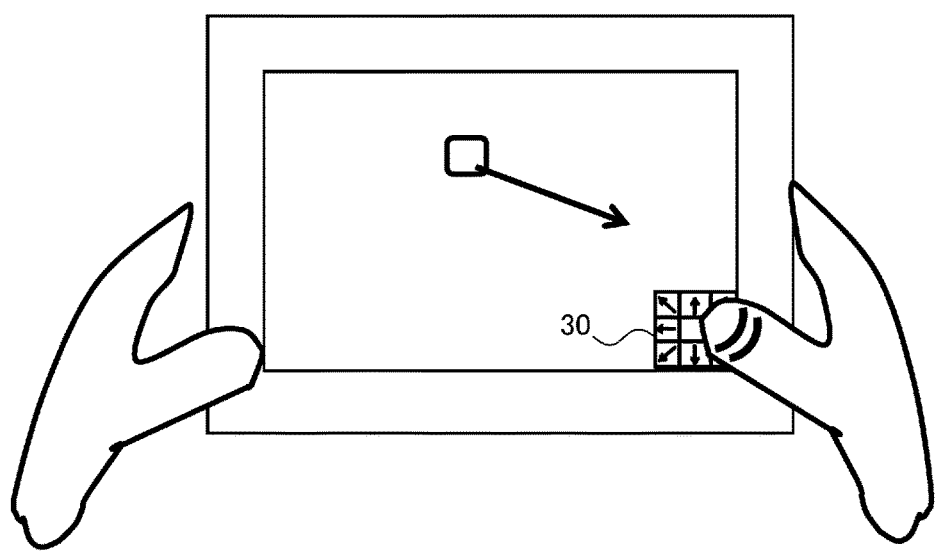

Fig.59
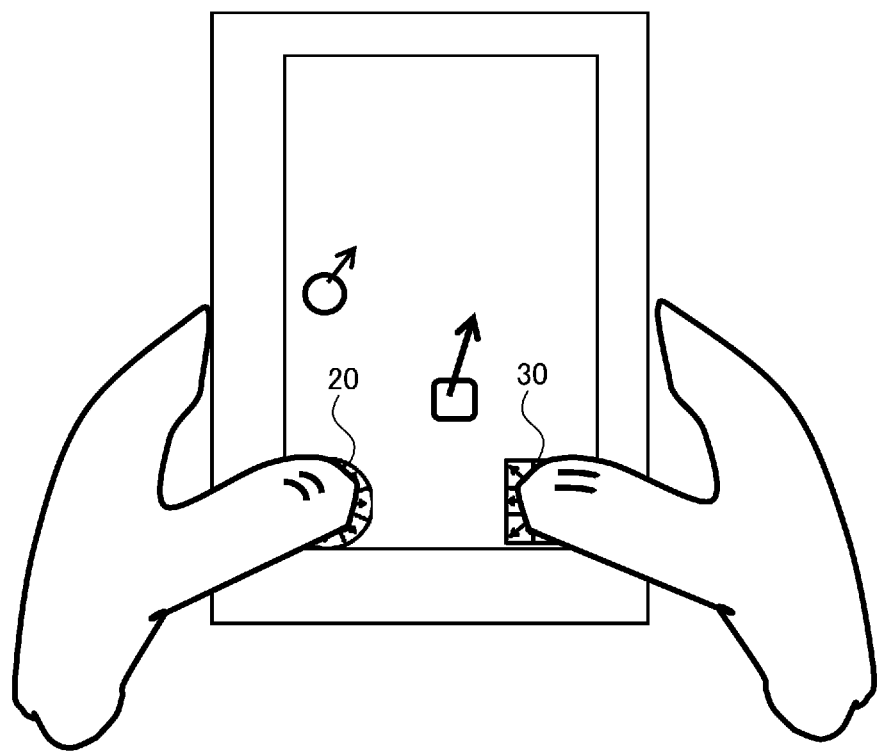
(a)
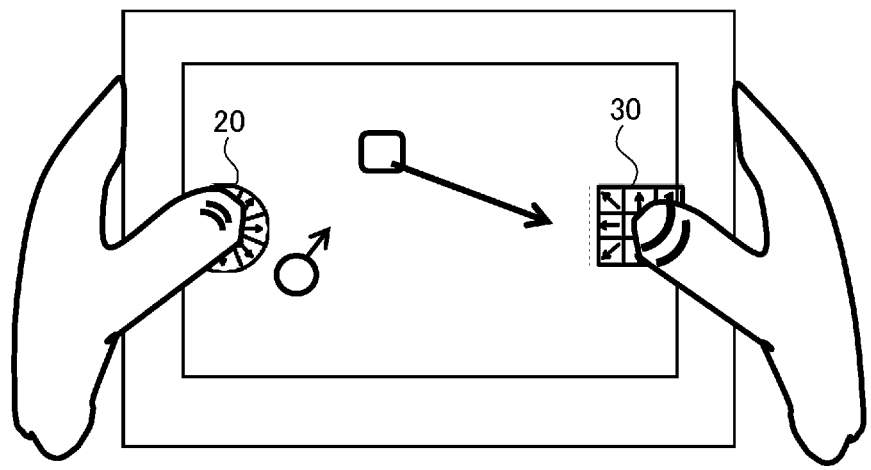
(b)

Fig.79
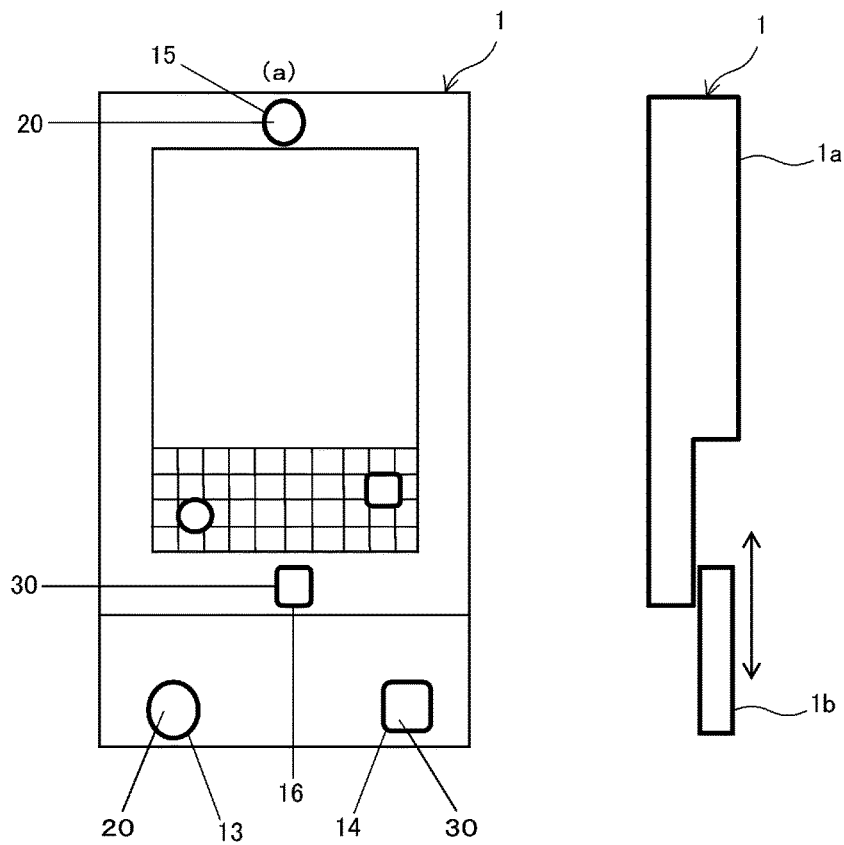
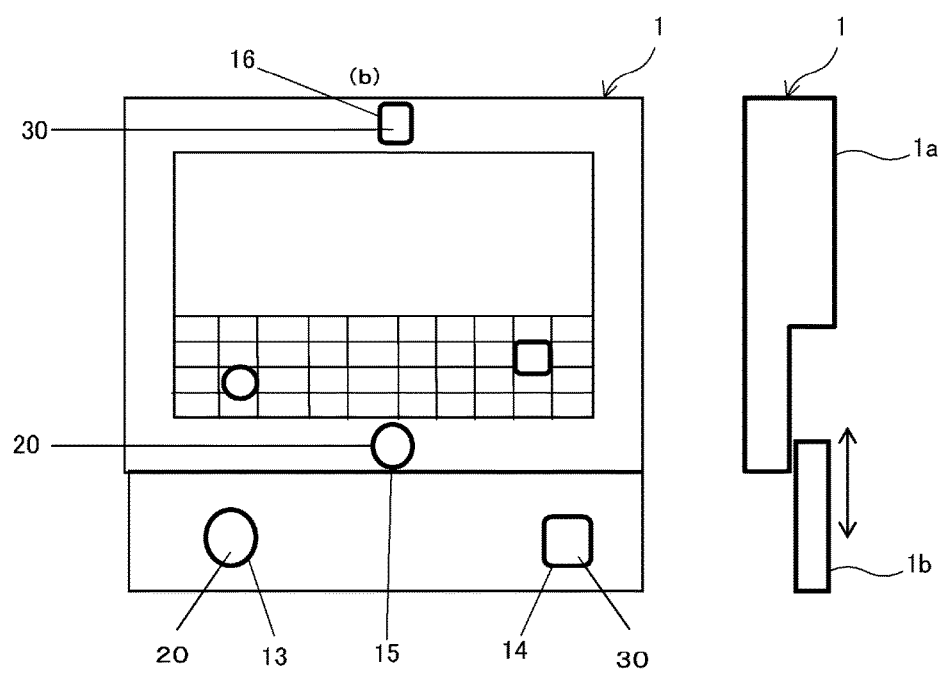

Fig.81
(a)
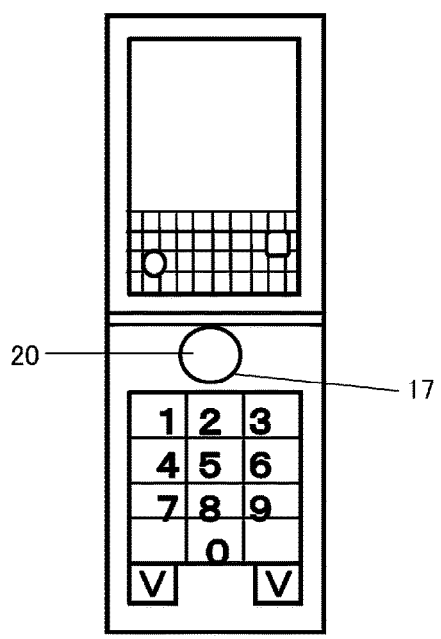
(b)
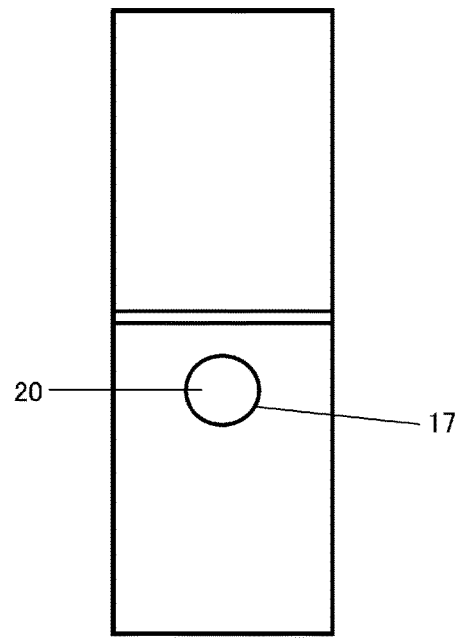
(c)
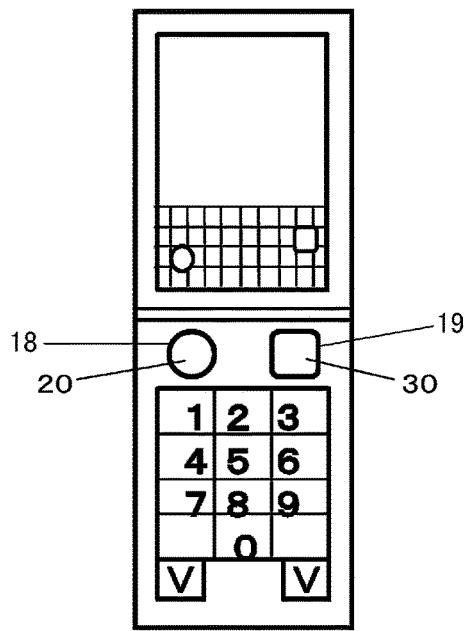
(d)
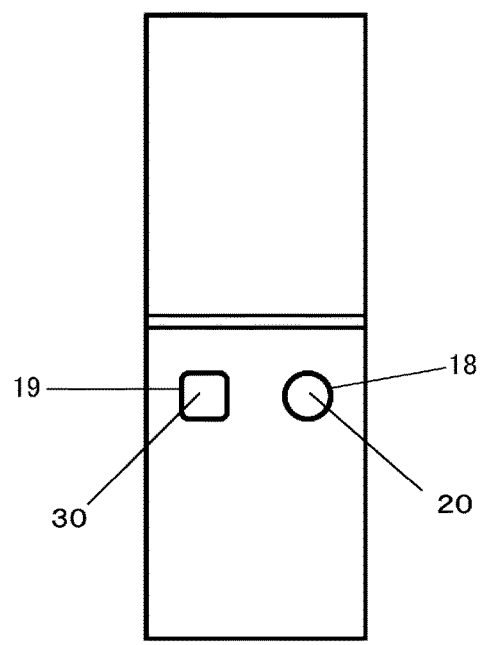

PORTABLE COMPUTING DEVICE

CROSS-REFERENCE

This application is the U.S. National Stage of International Application No. PCT/JP2013/056515 filed on Mar. 8, 2013, which claims priority to Japanese patent application no. 2012-134469 filed on Jun. 14, 2012, Japanese patent application no. 2012-251358 filed on Nov. 15, 2012, and Japanese patent application no. 2013-037675 filed on Feb. 27, 2013.

TECHNICAL FIELD

The present invention relates to a portable computing device having a character input function, such as a mobile phone, a smartphone, a personal digital assistant (a PDA), or a tablet computer.

BACKGROUND ART

Many users of portable computing devices such as a mobile phone, for example, hold the mobile phone with one hand, and input characters by manipulating buttons specifying cursor movements and character input buttons using the thumb of the hand holding the mobile phone (see Patent Document 1, for example).

PRIOR ART DOCUMENT

Patent Document

Patent Document 1: Japanese Patent Application Publication No. 2003-58305

SUMMARY OF THE INVENTION

However, since the buttons specifying cursor movements and the character input buttons are provided in predetermined positions on the mobile phone and the positions of the buttons cannot be modified, the buttons may be difficult to manipulate, especially for those with large or small hands and fingers. Furthermore, since these mechanical buttons are provided on the periphery of a display screen or the like, it is difficult to achieve a reduction in the size of the mobile phone.

The present invention has been devised based on these circumstances, and an object thereof is to provide a portable computing device that can be reduced in size while achieving an improvement in user-friendliness during a character input operation.

A first invention for achieving the object described above is a portable computing device having a character input function, in which a character input screen having a keyboard image that includes a plurality of character key images is displayed on a screen of touch screen-equipped display means, and character input is performed using the character key images on the keyboard image, including: command graphic display control means that controls the display of a command graphic for specifying the direction of movement of a cursor displayed on the character input screen and for specifying the selection of a key image currently indicated by the cursor on the keyboard image, the command graphic being displayed in a predetermined display region on the screen of the display means; storage means that stores command graphic display region information for displaying the command graphic in the predetermined display region on the screen of the display means; position detection means that detects a position that was touched when a touch operation is performed on the screen of the display means, and that outputs touch position information indicating this detected touch position; manipulation determining means that determines, when the touch position information is transmitted from the position detection means, whether or not a first operation that specifies the direction of movement of the cursor has been performed with respect to the command graphic and whether or not a second operation that specifies the selection of the key image indicated by the cursor on the keyboard image has been performed with respect to the command graphic based on the touch position information and the command graphic display region information stored in the storage means, and that outputs a signal indicating that the operation has been performed on the command graphic when it is determined that each said operation has been performed with respect to the command graphic; cursor display control means that controls the movement of the cursor across the character input screen such that, when the signal indicating that the first operation has been performed on the command graphic is transmitted from the manipulation determining means, the cursor is moved in the direction specified by the first operation; and input control means that controls the input of a character(s) such that, when the signal indicating that the second operation has been performed on the command graphic is transmitted from the manipulation determining means and the cursor is currently indicating a character key image, the character associated with said character key image is input.

Here, for example, an operation to flick or drag the command graphic may be employed as the first operation, and an operation to tap the command graphic may be employed as the second operation. Further, when the command graphic includes one or a plurality of movement direction specifying portions for specifying the direction of movement of the cursor, and a selection specifying portion for specifying the selection of the key image currently indicated by the cursor on the keyboard image, a manipulation that touches one of the movement direction specifying portions of the command graphic may be employed as the first operation, while a manipulation that touches the selection specifying portion of the command graphic may be employed as the second operation. Note that a flick operation is an operation to strike the touch screen in a swiping motion using a finger, a drag operation is an operation to trace a finger across the touch screen, and a tapping operation is an operation to strike the screen gently with a finger.

In the portable computing device according to the first invention, the cursor is displayed on the character input screen, and the command graphic for specifying the direction of movement of the cursor and specifying the selection of the key image currently indicated by the cursor on the keyboard image is displayed on the screen of the display means. Hence, the command graphic can be displayed anywhere on the screen of the display means, and therefore the command graphic can be disposed in a position enabling easy operation by a user. As a result, an improvement in user-friendliness during the character input operation can be achieved. Furthermore, mechanical specifying buttons used in conventional mobile phones to operate a cursor need not be provided on the periphery of the display screen, and therefore the portable computing device can be reduced in size.

Further, in the portable computing device according to the first invention, when a modification of a display position, size, or shape with regard to the display region of the command graphic is specified using a predetermined setup screen, the command graphic display control means can modify the display region of the command graphic on the screen of the display means in accordance with specified content. As a result, the user can modify the display region of the command graphic to a position enabling easy operation or to a shape and a size enabling easy operation whenever he/she wants.

Furthermore, in the portable computing device according to the first invention, when the touch position information is transmitted from the position detection means, the manipulation determining means can determine, based on the touch position information and the command graphic display region information stored in the storage means, whether or not a manipulation that drags the command graphic has been performed after the command graphic has been pressed and held for at least a fixed time period, and after it has been determined that the manipulation that drags the command graphic after the command graphic has been pressed and held for at least the fixed time period has been performed, can output a signal indicating that the manipulation that drags the command graphic in a predetermined direction has been performed on the command graphic after the pressing and holding manipulation with regard to the command graphic, and when the signal indicating that the drag manipulation has been performed in the predetermined direction with regard to the command graphic after the pressing and holding manipulation has been transmitted from the manipulation determining means, the command graphic display control means can control the display position of the command graphic on the screen of the display means such that the display position of the command graphic moves in the predetermined direction. As a result, the user can easily modify the display position of the command graphic at any time.

Furthermore, in the portable computing device according to the first invention, when the touch position information is transmitted from the position detection means, the manipulation determining means can determine whether or not a pinch-in operation or a pinch-out operation has been performed on the command graphic based on the touch position information and the command graphic display region information stored in the storage means, when it determines that the pinch-in operation has been performed on the command graphic, the manipulation determining means outputs a signal indicating that the pinch-in operation has been performed on the command graphic, and when it determines that the pinch-out operation has been performed on the command graphic, the manipulation determining means outputs a signal indicating that the pinch-out operation has been performed on the command graphic, and when the signal indicating that the pinch-in operation has been performed on the command graphic is transmitted from the manipulation determining means, the command graphic display control means can reduce the size of the command graphic on the screen of the display means, and when the signal indicating that the pinch-out operation has been performed on the command graphic is transmitted from the manipulation determining means, the command graphic display control means can increase the size of the command graphic on the screen of the display means. As a result, the user can easily modify the size of the display region of the command graphic at any time. Note that the pinch-in operation is an operation in which the screen is pressed by two fingers and the spacing between the two fingers is narrowed, while the pinch-out operation is an operation in which the screen is pressed by two fingers and the spacing between the two fingers is widened.

Furthermore, in the portable computing device according to the first invention, the keyboard image preferably includes a plurality of function key images, and when the signal indicating that the second operation has been performed on the command graphic is transmitted from the manipulation determining means and the cursor is currently indicating a function key image, the input control means preferably executes a process for implementing the function assigned to said function key image. As a result, the user can quickly select a desired function key image by operating the command graphic using the thumb or the like of his/her hand.

Furthermore, in the portable computing device according to the first invention, when a user directly touches a function key image on the keyboard image with a finger, the input control means may execute a process for implementing the function assigned to said function key image. As a result, the user can issue an instruction for implementing a function assigned to a function key using both a method of selecting the function key with the cursor and a method of selecting the function key via the touch screen.

Furthermore, in the portable computing device according to the first invention, when the user directly touches a character key image on the keyboard image with a finger, the input control means may control the input of the character associated with the touched character key image. As a result, the user can input a character using both a character input method employing the cursor and a character input method performed via the touch screen.

In addition, in the portable computing device according to the first invention, the cursor display control means may move the cursor in key image units when controlling movement of the cursor across the keyboard image. Hence, the user can easily and accurately perform an operation to move the cursor across the keyboard image to the location of a desired key image, and as a result, operation errors can be reduced.

Moreover, in the portable computing device according to the first invention, touch screen-equipped small display means may be provided on a rear surface of the portable computing device separately to the display means, and the command graphic may be displayed in a predetermined display region on a screen of the small display means; the command graphic control means may perform control that displays the command graphic in the predetermined display region on the screen of the small display means; command graphic display region information for displaying the command graphic in the predetermined display region on the screen of the small display means may be stored in the storage means; the position detection means may detect a touch position when a touch operation is performed on the screen of the small display means, and output touch position information indicating the detected touch position. Hence, the user can operate the cursor using not only the command graphic displayed by the display means on the front side of the portable computing device, but also the command graphic displayed by the small display means on the rear side, and as a result, an improvement in user-friendliness can be achieved.

Furthermore, in the portable computing device according to the first invention, a substantially central position of the keyboard image may be set as a reference position of the cursor, and when the input of characters is being performed, the cursor display control means may return the cursor to the reference position after determining that the command graphic has not been operated for a predetermined fixed time period or that a predetermined operation has been performed on the command graphic. As a result, the cursor can be returned to the reference position either when no operation is performed on the command graphic for a preset fixed time or when an operation to return the cursor to the reference position is performed using the command graphic. According to the first invention, therefore, the user can locate the position of the cursor easily and quickly by returning the cursor to the reference position. Moreover, the distance of movement of the cursor from the reference position to a desired key image can be shortened, and therefore character input can be performed efficiently.

Further, a second invention for achieving the object described above is a portable computing device having a character input function, in which a character input screen having a keyboard image that includes a plurality of character key images is displayed on a screen of touch screen-equipped display means, and character input is performed using the character key images on the keyboard image, including: command graphic display control means that controls the display of a first command graphic for specifying the direction of movement of a first cursor displayed on the character input screen and for specifying the selection of a key image currently indicated by the first cursor on the keyboard image, the first command graphic being displayed in a predetermined display region on the screen of the display means, and a second command graphic for specifying the direction of movement of a second cursor displayed on the character input screen and for specifying the selection of a key image currently indicated by the second cursor on the keyboard image, the second command graphic being displayed in a predetermined display region on the screen of the display means; storage means that stores first command graphic display region information for displaying the first command graphic in the predetermined display region on the screen of the display means, and second command graphic display region information for displaying the second command graphic in the predetermined display region on the screen of the display means; position detection means that detects a position that was touched when a touch operation is performed on the screen of the display means, and that outputs touch position information indicating this detected touch position; manipulation determining means that determines, when the touch position information is transmitted from the position detection means, whether or not a first operation that specifies the direction of movement of the first cursor has been performed with respect to the first command graphic, whether or not a second operation that specifies the selection of the key image indicated by the first cursor on the keyboard image has been performed with regard to the first command graphic, whether or not a third operation that specifies the direction of movement of the second cursor has been performed with regard to the second command graphic, and whether or not a fourth operation that specifies the selection of the key image indicated by the second cursor on the keyboard image has been performed with regard to the second command graphic based on the touch position information and the command graphic display region information stored in the storage means, and that outputs a signal indicating that the operation(s) has (have) been performed on the command graphic(s) when it is determined that each said operation has been performed with regard to the first command graphic or the second command graphic; cursor display control means that controls the movement of the first cursor across the character input screen such that, when the signal indicating that the first operation has been performed on the first command graphic is transmitted from the manipulation determining means, the first cursor is moved in the direction specified by the first operation, and that controls the movement of the second cursor across the character input screen such that, when the signal indicating that the third operation has been performed on the second command graphic is transmitted from the manipulation determining means, the second cursor is moved in the direction specified by the third operation; and input control means that controls the input of (a) character(s) such that, when the signal indicating that the second operation has been performed on the first command graphic is transmitted from the manipulation determining means and the first cursor is currently indicating a character key image, the character associated with said character key image is input, and when the signal indicating that the fourth operation has been performed on the second command graphic is transmitted from the manipulation determining means and the second cursor is currently indicating a character key image, the character associated with said character key image is input.

Here, for example, an operation to flick or drag the first command graphic may be employed as the first operation, an operation to tap the first command graphic may be employed as the second operation, an operation to flick or drag the second command graphic may be employed as the third operation, and an operation to tap the second command graphic may be employed as the fourth operation. Further, when the first command graphic includes one or a plurality of movement direction specifying portions for specifying the direction of movement of the first cursor and a selection specifying portion for specifying the selection of the key image currently indicated by the first cursor on the keyboard image, and the second command graphic includes one or a plurality of movement direction specifying portions for specifying the direction of movement of the second cursor and a selection specifying portion for specifying the selection of the key image currently indicated by the second cursor on the keyboard image, a manipulation that touches one of the movement direction specifying portions of the first command graphic may be employed as the first operation, a manipulation that touches the selection specifying portion of the first command graphic may be employed as the second operation, a manipulation that touches one of the movement direction specifying portions of the second command graphic may be employed as the third operation, and a manipulation that touches the selection specifying portion of the second command graphic may be employed as the fourth operation.

In the portable computing device according to the second invention, the first cursor and the second cursor are displayed on the character input screen, while the first command graphic for specifying the movement direction of the first cursor and for specifying the selection of the key image currently indicated by the first cursor on the keyboard image and the second command graphic for specifying the movement direction of the second cursor and for specifying the selection of the key image currently indicated by the second cursor on the keyboard image are displayed on the screen of the display means. Hence, the first command graphic and second command graphic can be displayed anywhere on the screen of the display means, and therefore the first command graphic and second command graphic can be disposed in positions enabling easy operation by the user. As a result, an improvement in user-friendliness during the character input operation can be achieved. Furthermore, mechanical specifying buttons used in conventional mobile phones to operate a cursor need not be provided on the periphery of the display screen, and therefore the portable computing device can be reduced in size.

Furthermore, when the first command graphic and the second command graphic are displayed in predetermined regions on the screen of the display means in the vicinity of the respective edge portions of the portable computing device, the user grips the edge portion of the portable computing device near the display region of the first command graphic and the edge portion of the portable computing device near the display region of the second command graphic with each hand during character input, and therefore the portable computing device can be stably held in both hands. Further, the user can operate the first command graphic and the second command graphic using the respective thumbs or the like of his/her hands while holding the portable computing device with both hands in the manner described above, and therefore an input operation can be performed quickly and accurately.

Moreover, in the portable computing device according to the second invention, when a modification of a display position, size, or shape with regard to the display region of the first command graphic or the display region of the second command graphic is specified using a predetermined setup screen, the command graphic display control means can modify the display region of the corresponding command graphic on the screen of the display means in accordance with the specified content. As a result, the user can modify the display region of the first command graphic and the display region of the second command graphic to positions enabling easy operation or to shapes and sizes enabling easy operation whenever he/she wants.

Moreover, in the portable computing device according to the second invention, when the touch position information is transmitted from the position detection means, the manipulation determining means can determine, based on the touch position information and the command graphic display region information stored in the storage means, whether or not a manipulation that drags the first command graphic or the second command graphic has been performed after the command graphic has been pressed and held for at least a fixed time period, and after it has been determined that the manipulation that drags the first command graphic or the second command graphic has been performed after the command graphic has been pressed and held for at least the fixed time period, can output a signal indicating that the manipulation that drags the command graphic in a predetermined direction has been performed after the pressing and holding manipulation with regard to the command graphic, and when the signal indicating that the drag manipulation has been performed in the predetermined direction with regard to the first command graphic or the second command graphic after the pressing and holding manipulation has been transmitted from the manipulation determining means, the command graphic display control means can control the display position of the command graphic on the screen of the display means such that the display position of the command graphic moves in the predetermined direction. As a result, the user can easily modify the display positions of the respective command graphics at any time.

Moreover, in the portable computing device according to the second invention, when the touch position information is transmitted from the position detection means, the manipulation determining means can determine whether or not a pinch-in operation or a pinch-out operation has been performed on the first command graphic or the second command graphic based on the touch position information and the command graphic display region information stored in the storage means, when it determines that the pinch-in operation has been performed on the first command graphic or the second command graphic, the manipulation determining means can output a signal indicating that the pinch-in operation has been performed on the command graphic, and when it determines that the pinch-out operation has been performed on the first command graphic or the second command graphic, the manipulation determining means can output a signal indicating that the pinch-out operation has been performed on the command graphic, and when the signal indicating that the pinch-in operation has been performed on the first command graphic or the second command graphic is transmitted from the manipulation determining means, the command graphic display control means can reduce the size of the command graphic on the screen of the display means, and when the signal indicating that the pinch-out operation has been performed on the first command graphic or the second command graphic is transmitted from the manipulation determining means, the command graphic display control means can increase the size of the command graphic on the screen of the display means. As a result, the user can easily modify the sizes of the respective display regions of the first command graphic and the second command graphic at any time.

Furthermore, in the portable computing device according to the second invention, the keyboard image preferably includes a plurality of function key images, and when the signal indicating that the second operation has been performed on the first command graphic is transmitted from the manipulation determining means and the first cursor is currently indicating a function key image, the input control means preferably executes a process for implementing the function assigned to said function key image, and when the signal indicating that the fourth operation has been performed on the second command graphic is transmitted from the manipulation determining means and the second cursor is currently indicating a function key image, the input control means preferably executes a process for implementing the function assigned to said function key image. As a result, the user can quickly select a desired function key image by operating the first command graphic and the second command graphic using the respective thumbs or the like of his/her hands while holding the portable computing device with both hands.

Furthermore, in the portable computing device according to the second invention, when a user directly touches a function key image on the keyboard image with a finger, the input control means may execute a process for implementing the function assigned to said function key image. As a result, the user can issue an instruction to realize a function assigned to a function key using both a method of selecting the function key with the cursor and a method of selecting the function key via the touch screen.

Furthermore, in the portable computing device according to the second invention, when the user directly touches a character key image on the keyboard image with a finger, the input control means may control the input of the character associated with the touched character key image. As a result, the user can input a character using both a character input method employing the cursor and a character input method performed via the touch screen.

Further, in the portable computing device according to the second invention, the first cursor and the second cursor preferably differ from each other in terms of at least one element selected from shape, color, and lines and designs drawn inside the cursors. As a result, the user can easily determine the command graphic, from among the first command graphic and the second command graphic, to which the respective cursors displayed on the character input screen correspond based on the differing element.

Furthermore, in the portable computing device according to the second invention, the cursor display control means may move the first cursor and the second cursor in key image units when controlling movement of the cursors across the keyboard image. Hence, the user can easily and accurately perform an operation to move the respective cursors across the keyboard image to the locations of desired key images, and as a result, operation errors can be reduced.

Moreover, in the portable computing device according to the second invention, touch screen-equipped small display means may be provided on a rear surface of the portable computing device separately to the display means, and the first command graphic and the second command graphic are respectively displayed in predetermined display regions on (a) screen(s) of the small display means; the command graphic control means may perform control that displays the first command graphic and the second command graphic in the respective predetermined display regions on the screen(s) of the small display means; first command graphic display region information for displaying the first command graphic in the predetermined display region on the screen(s) of the small display means and second command graphic display region information for displaying the second command graphic in the predetermined display region on the screen(s) of the small display means may be stored in the storage means; and the position detection means may detect (a) position(s) that was (were) touched when (a) touch operation(s) is (are) performed on the screen(s) of the small display means, and output touch position information indicating the detected touch position(s). Hence, the user can operate the first cursor and the second cursor using not only the first command graphic and the second command graphic displayed by the display means on the front side of the portable computing device, but also using the first command graphic and the second command graphic displayed by the small display means on the rear side, and as a result, an improvement in user-friendliness can be achieved.

Moreover, in the portable computing device according to the second invention, substantially central positions of respective keyboard images obtained by dividing the keyboard image into two in a left-right direction may be set as respective reference positions of the cursors, and when the input of characters is being performed, the cursor display control means can return the first cursor to one of the reference positions after determining that the first command graphic has not been operated for a predetermined fixed time period or that a predetermined operation has been performed on the first command graphic and/or the second command graphic, and can return the second cursor to the other reference position after determining that the second command graphic has not been operated for a predetermined fixed time period or that the predetermined operation has been performed on the first command graphic and/or the second command graphic. Therefore, when no operation is performed on the first command graphic or the second command graphic for a preset fixed time period or an operation to return the cursors to their respective reference positions is performed using the command graphics, the cursors can be returned to their reference positions. Hence, according to the second invention, the user can easily and quickly locate the positions of the respective cursors by returning the cursors to their respective reference positions. Further, the distances of movement of the respective cursors from the reference positions to desired key images can be shortened, and as a result, character input can be performed efficiently.

Furthermore, in the portable computing device according to the first invention or the portable computing device according to the second invention, keyboard image display control means that controls the display of the keyboard image, which is displayed in a predetermined display region on the screen of the display means, may be further included; keyboard display region information for displaying the keyboard image in the predetermined display region on the screen of the display means may be stored in the storage means; when the touch position information is transmitted from the position detection means, the manipulation determining means may determine, based on the touch position information and the keyboard image display region information stored in the storage means, whether or not a manipulation that drags the keyboard image has been performed after the keyboard image has been pressed and held for at least a fixed time, and may output a signal indicating that the manipulation that drags the keyboard image in a predetermined direction has been performed on the keyboard image following the press and hold operation after it has been determined that the manipulation that drags the keyboard image has been performed after the keyboard image has been pressed and held for at least the fixed time; and when the signal indicating that the manipulation that drags the keyboard image in the predetermined direction has been performed on the keyboard image after the press and hold operation has been transmitted from the manipulation determining means, the keyboard image display control means may control the display position of the keyboard image on the screen of the display means such that the display position of the keyboard image moves in the predetermined direction. As a result, the user can easily modify the display position of the keyboard image on the screen of the display means at any time using a combination of a press and hold operation applied for at least a fixed time period and a drag operation.

Moreover, in the portable computing device according to the first invention or the portable computing device according to the second invention, when the touch position information is transmitted from the position detection means, the manipulation determining means may determine whether or not a pinch-in operation or a pinch-out operation has been performed on the keyboard image based on the touch position information and the keyboard image display region information stored in the storage means, when it determines that the pinch-in operation has been performed on the keyboard image, the manipulation determining means may output a signal indicating that the pinch-in operation has been performed on the keyboard image, and when it determines that the pinch-out operation has been performed on the keyboard image, the manipulation determining means may output a signal indicating that the pinch-out operation has been performed on the keyboard image; and when the signal indicating that the pinch-in operation has been performed on the keyboard image is transmitted from the manipulation determining means, the keyboard image display control means may reduce the size of the keyboard image on the screen of the display means, and when the signal indicating that the pinch-out operation has been performed on the keyboard image is transmitted from the manipulation determining means, the keyboard image display control means may increase the size of the keyboard image on the screen of the display means. As a result, the user can easily modify the size of the display region of the keyboard image at any time.

With the portable computing device according to the present invention, the cursor(s) is (are) displayed on the character input screen, while the command graphic(s) for specifying the direction of movement of the cursor and for specifying the selection of the character key image currently indicated by the cursor(s) on the keyboard image is (are) displayed on the screen of the display means. Hence, the command graphic(s) can be displayed anywhere on the screen of the display means, and therefore the command graphic(s) can be disposed in (a) position(s) enabling easy manipulation by the user. As a result, an improvement in user-friendliness during the character input operation can be achieved. Furthermore, mechanical specifying buttons used in conventional mobile phones for manipulating a cursor need not be provided on the periphery of the display screen, and therefore the portable computing device can be reduced in size.

BRIEF DESCRIPTION OF THE DRAWINGS

FIGS. 8(a) and (b) are views showing examples of display shapes of the first command graphic and the second command graphic.

FIGS. 9(a)-(f) are views showing examples of display positions of the first command graphic and the second command graphic.

FIGS. 10(a)-(d) are views showing examples of preset display positions of the first command graphic and the second command graphic.

FIGS. 23(a) and (b) are views for illustrating operating procedures executed on the email send/create screen when creating an email.

FIGS. 24(a) and (b) are views for illustrating operating procedures executed on the email send/create screen when creating an email.

FIGS. 29(a)-(c) are views for illustrating examples of a first command graphic and a second command graphic according to the second embodiment.

FIGS. 30(a)-(e) are views showing examples of QWERTY layout keyboard images displayed when a kanji hiragana input mode is selected.

FIGS. 31(a)-(e) are views showing example of QWERTY layout keyboard images displayed when the kanji hiragana input mode is selected.

FIGS. 32(a)-(c) are views showing examples of QWERTY layout keyboard images displayed when the kanji hiragana input mode is selected.

FIGS. 33(a)-(d) are views showing examples of QWERTY layout keyboard images displayed when a half-width alphanumeric character input mode is selected.

FIGS. 34(a)-(d) are views showing examples of QWERTY layout keyboard images displayed when the half-width alphanumeric character input mode is selected.

FIGS. 35(a)-(c) are views showing examples of QWERTY layout keyboard images displayed when the half-width alphanumeric character input mode is selected.

FIGS. 36(a)-(c) are views showing examples of QWERTY layout keyboard images displayed when the half-width alphanumeric character input mode is selected.

FIGS. 37(a) and (b) are views showing examples of 50-character hiragana layout keyboard images.

FIGS. 53(a)-(f) are views showing examples of display positions of the second command graphic in a clamshell type horizontal portable computing device when only the second command graphic is displayed on the screen.

FIGS. 55(a)-(f) are views showing examples of display positions of the second command graphic in a clamshell type horizontal portable computing device when only the second command graphic is displayed on the screen.

FIGS. 56(a)-(f) are views showing examples of display positions of the second command graphic in a clamshell type horizontal portable computing device when only the second command graphic is displayed on the screen.

FIGS. 57 (a)-(d) are views showing examples of display positions of the second command graphic in a clamshell type horizontal portable computing device when only the second command graphic is displayed on the screen.

FIGS. 58(a) and (b) are views showing examples of manipulations performed on the two command graphics functioning as cursor operating buttons when the character input screen is not displayed on a screen of display means.

FIGS. 59(a) and (b) are views showing examples of manipulations performed on the two command graphics functioning as cursor operating buttons when the character input screen is not displayed on a screen of display means.

FIGS. 60(a) and (b) are views showing examples of keyboard images included on a telephone number input screen when the telephone number input screen is used as the character input screen.

FIGS. 61(a)-(e) are views showing examples of Spanish language layout keyboard images.

FIGS. 62(a)-(e) are views showing examples of French language layout keyboard images.

FIGS. 63 (a)-(e) are views showing examples of Korean language layout keyboard images.

FIGS. 79(a) and (b) are views showing another example of a portable computing device in which a part of the rear portion of the portable computing device slides in the up-down direction.

FIGS. 81(a)-(d) are views showing an example of a command graphic when a clamshell mobile phone is used as the portable computing device according to the present invention.

DETAILED DESCRIPTION

First Embodiment

Figure 1:
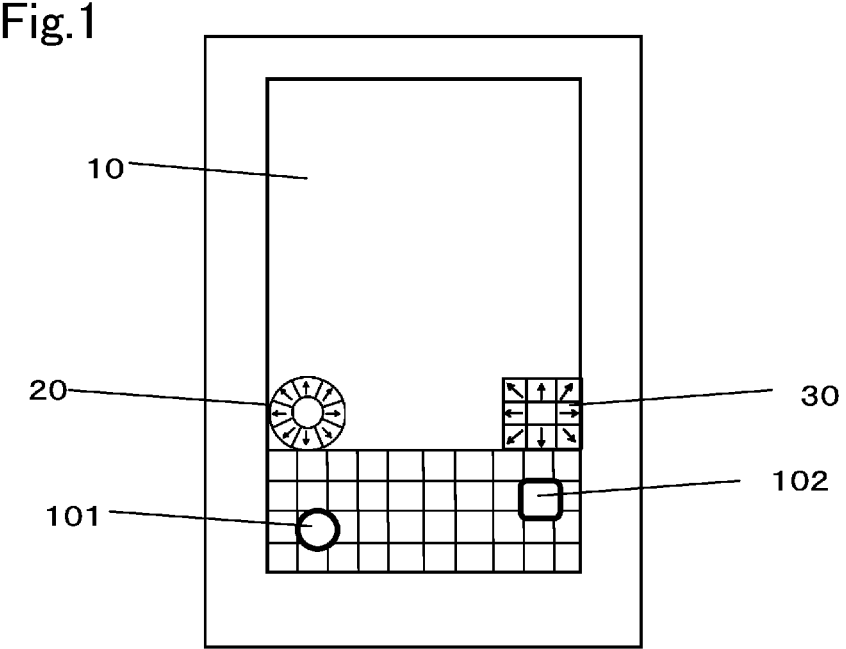
FIG. 1 is a schematic front view showing a portable computing device, which is a first embodiment of the present invention.
Figure 2:
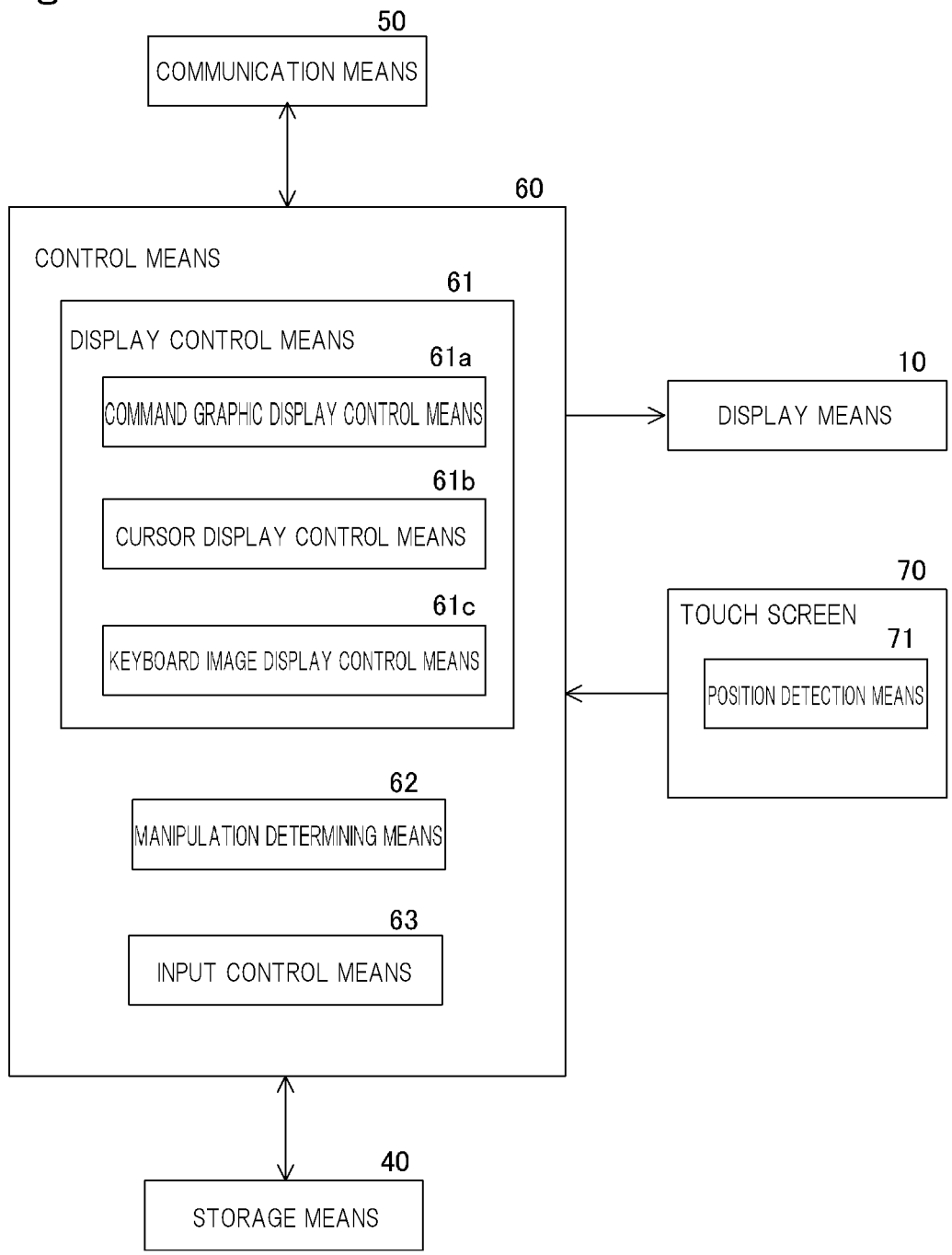
FIG. 2 is a schematic block diagram of the portable computing device.

Embodiments for carrying out the invention according to the present application will be described below with reference to the drawings. FIG. 1 is a schematic front view showing a portable computing device, which is a first embodiment of the present invention, and FIG. 2 is a schematic block diagram of this portable computing device.

The portable computing device of the first embodiment is a tablet computer capable of carrying and managing various types of information. The portable computing device has various functions, such as a communication function for exchanging information with the outside while being connected to the Internet, and a character input function for inputting characters. As shown in FIGS. 1 and 2, the portable computing device includes display means 10, a plurality of operating buttons (not shown), storage means 40, communication means 50, control means 60, and a touch screen 70. Further, the portable computing device is formed in a substantially rectangular shape as viewed from the front. The control means 60 may include a controller having a non-transitory computer readable memory medium that stores instructions and a microprocessor configured to read the instructions stored in the non-transitory computer readable memory medium and to execute the instructions in order to control operation of the portable computing device, wherein the instructions, when executed, cause the microprocessor to perform the functions described herein.

The plurality of operating buttons include various buttons such as an ON/OFF button. The ON/OFF button is used to switch ON and OFF a power supply of the portable computing device, and is provided on a side surface of the portable computing device, for example.

The display means 10 is provided on a front surface side of the portable computing device. A liquid crystal display device is used as the display means 10, and the touch screen 70 is provided on a screen of the display means 10. The touch screen 70 is provided with position detection means 71 for detecting the touch position when a touch operation is performed on the screen of the display means 10 and for outputting touch position information indicating the detected touch position to the control means 60. Further, various screens such as a home screen, an application screen, and a character input screen are displayed on the screen of the display means 10. The home screen is displayed when the power supply of the portable computing device is switched ON. Icons of respective application programs are displayed on the application screen, and a desired application program corresponding to one of the icons can be launched by gently striking, or in other words tapping, the icon with a finger.

Figure 3:
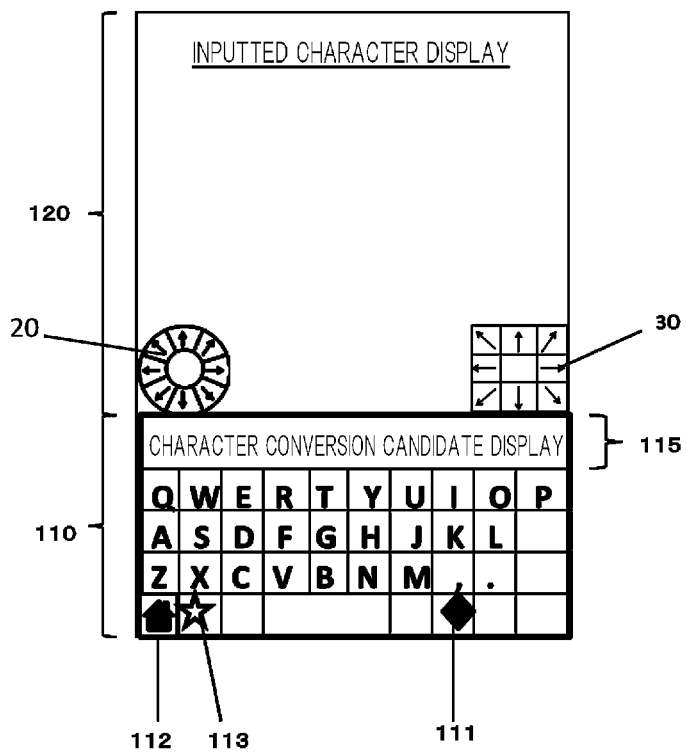
FIG. 3 is a view showing an example of a character input screen.

The character input screen includes a keyboard image. A user can input characters using key images on the keyboard image. FIG. 3 is a view showing an example of the character input screen. As shown in FIG. 3, a character input screen 100 includes a keyboard image 110 and an inputted character display screen 120. Examples of the inputted character display screen 120 include a search screen and an email create/send screen. Further examples of the inputted character display screen 120 include screens generated by Office® software such as Microsoft® Word™, Microsoft Excel®, Microsoft PowerPoint®, Microsoft Outlook®, Microsoft Word for Mac™, Microsoft Excel for Mac™, Microsoft PowerPoint for Mac™, Microsoft Outlook for Mac™, as well as by Google Docs™. The keyboard image 110 is provided with a plurality of character key images associated with respective characters (including symbols), and a plurality of function key images to which specific functions are assigned. The character key images, the function key images, etc. will be collectively referred to as key images. Note that hereafter, the "character key images" will be referred to simply as "character keys", and the "function key images" will be referred to simply as "function keys". Further, the "key images" will be referred to simply as "keys".

Figure 4:
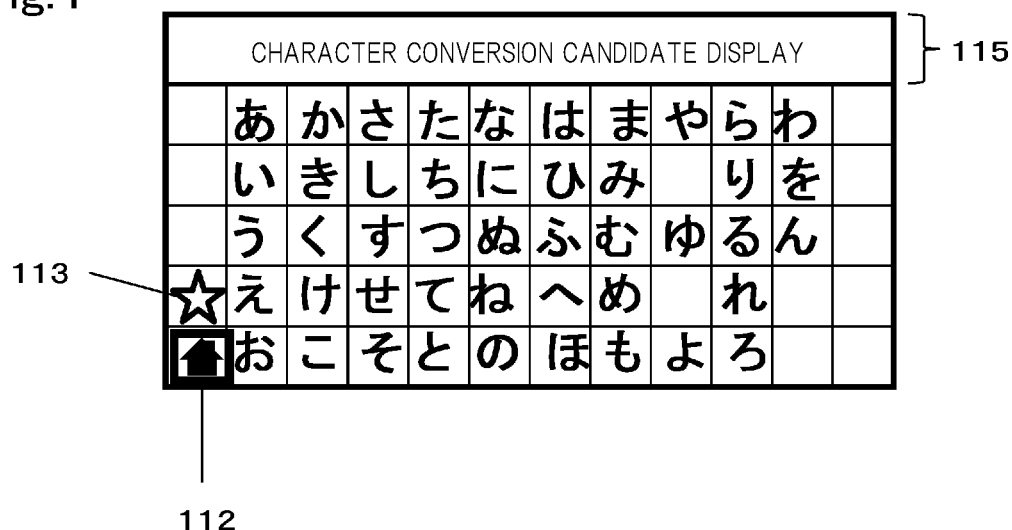
FIG. 4 is a view showing an example of a 50-character hiragana layout keyboard image.

A QWERTY layout is employed on the keyboard image 110 shown in FIG. 3 as the character key layout. Further, the function keys include a character input mode switch key 111, a home key 112, a keyboard switch key 113, a space key, an Enter key, a Shift key, etc. The character input mode switch key 111 is for switching between a kanji hiragana input mode and a half-width alphanumeric character input mode. The home key 112 is for instructing to exit the character input screen 100 and to display a home screen. The keyboard switch key 113 is for switching between the QWERTY layout keyboard image shown in FIG. 3 and a 50-character hiragana layout keyboard image. When the kanji hiragana input mode is selected on the QWERTY layout keyboard image, Japanese can be input using Roman letters. Here, FIG. 4 shows an example of the 50-character hiragana layout keyboard image. The 50-character hiragana layout keyboard image is a keyboard image used exclusively to input kanji hiragana, and the home key 112 and the keyboard switch key 113 are likewise provided thereon. Furthermore, as shown in FIGS. 3 and 4, when the kanji hiragana input mode is selected on the QWERTY layout keyboard image or the 50-character hiragana layout keyboard image is displayed as the keyboard image, a character conversion candidate display portion 115 for displaying conversion candidates of inputted characters is displayed in an upper portion of the keyboard image. Note that the space key, the Enter key, the Shift key, etc. have been omitted from the keyboard images shown in FIGS. 3 and 4. These keys are likewise omitted from drawings showing other types of keyboard images to be described below.

In this embodiment, as described above, the keyboard switch key 113 is used to switch between the QWERTY layout keyboard image and the 50-character hiragana layout keyboard image. Instead of the 50-character hiragana layout keyboard image, however, a simplified hiragana layout keyboard image having keys respectively corresponding to the Japanese characters "あ", "か", "さ", "た", "な", "は", "ま", "や", "ら", and "わ", which is employed on a mobile phone or the like, for example, may be employed so that the keyboard switch key 113 is used to switch between the QWERTY layout keyboard image and the simplified hiragana layout keyboard image. Moreover, in this embodiment, the character input mode switch key 111 is used to switch between the kanji hiragana input mode and the half-width alphanumeric character input mode, but another input mode such as a half-width numeric character input mode, for example, may be added to the input modes so that the character input mode switch key 111 is used to switch between the plurality of input modes.

Note that in this embodiment, it is assumed that the character input screen 100 is displayed in a vertical orientation on the screen of the display means 10 such that the user inputs characters while the portable computing device is vertically oriented.

Further, when the character input screen 100 is displayed on the screen of the display means 10, a first command graphic 20 and a second command graphic 30 are displayed on the screen. The first command graphic 20 and the second command graphic 30 are respectively displayed in predetermined regions on the screen of the display means 10. More specifically, as shown in FIGS. 1 and 3, the first command graphic 20 and the second command graphic 30 are displayed side by side from left to right on the upper side of the keyboard image 110 such that the first command graphic 20 is displayed in the lower left end portion of the inputted character display screen 120 and the second command graphic 30 is displayed in the lower right end portion of the inputted character display screen 120. In this embodiment, two cursors (a first cursor 101 and a second cursor 102) are displayed on the character input screen 100. The first cursor 101 is manipulated using the first command graphic 20, and the second cursor 102 is manipulated using the second command graphic 30. The first cursor 101 and the second cursor 102 are used mainly to select particular keys on the keyboard image 110. In other words, the first command graphic 20 is for specifying the direction of movement of the first cursor 101 and for specifying the selection of the key currently indicated by the first cursor 101 on the keyboard image 110, while the second command graphic 30 is for specifying the direction of movement of the second cursor 102 and for specifying the selection of the key currently indicated by the second cursor 102 on the keyboard image 110.

Figure 5:
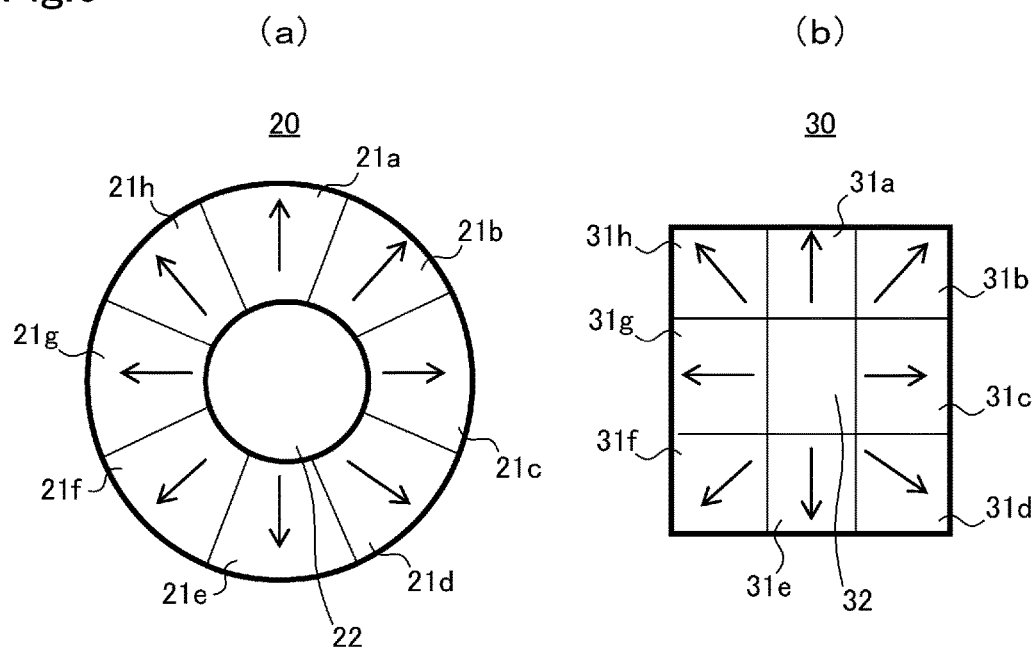
FIGS. 5(a) and (b) are views for illustrating a first command graphic and a second command graphic.

FIG. 5 is a view illustrating the first command graphic 20 and the second command graphic 30. As shown in FIG. 5, the first command graphic 20 includes eight movement direction specifying portions 21*a*, 21*b*, . . . , 21*h*, and a selection specifying portion 22 provided in the center of the movement direction specifying portions 21*a*, 21*b*, . . . , 21*h*. The eight movement direction specifying portions 21*a*, 21*b*, . . . , 21*h* form an annular shape as a whole. The respective movement direction specifying portions 21*a*, 21*b*, . . . , 21*h* are for specifying the directions of movement of the first cursor 101 displayed on the character input screen 100. Here, the corresponding movement directions of the respective movement direction specifying portions 21*a*, 21*b*, . . . , 21*h* are displayed using arrows. For example, when the user taps the movement direction specifying portion 21*a*, the first cursor 101 moves across the character input screen 100 in the upward direction, and when the user taps the movement direction specifying portion 21*e*, the first cursor 101 moves across the character input screen 100 in the downward direction. Further, when the user taps the movement direction specifying portion 21*c*, the first cursor 101 moves across the character input screen 100 in the rightward direction, and when the user taps the movement direction specifying portion 21*g*, the first cursor 101 moves across the character input screen 100 in the leftward direction. Furthermore, the first cursor 101 moves in the rightward diagonally upward direction across the character input screen 100 when the user taps the movement direction specifying portion 21*b*, in the rightward diagonally downward direction across the character input screen 100 when the user taps the movement direction specifying portion 21*d*, in the leftward diagonally downward direction across the character input screen 100 when the user taps the movement direction specifying portion 21*f*, and in the leftward diagonally upward direction across the character input screen 100 when the user taps the movement direction specifying portion 21*h*. Furthermore, the selection specifying portion 22 is mainly for specifying the selection of the key (a character key or a function key) currently indicated by the first cursor 101 on the keyboard image 110. The selection specifying portion 22 can also be used to select a key on the inputted character display screen 120.

Further, as shown in FIG. 5, the second command graphic 30 includes eight movement direction specifying portions 31*a*, 31*b*, . . . , 31*h*, and a selection specifying portion 32 provided in the center of the movement direction specifying portions 31*a*, 31*b*, . . . , 31*h*. The eight movement direction specifying portions 31*a*, 31*b*, . . . , 31*h* form a square annular shape as a whole. The respective movement direction specifying portions 31*a*, 31*b*, . . . , 31*h* are for specifying the directions of movement of the second cursor 102 displayed on the character input screen 100. Here, the corresponding movement directions of the respective movement direction specifying portions 31*a*, 31*b*, . . . , 31*h* are displayed using arrows. For example, when the user taps the movement direction specifying portion 31*a*, the second cursor 102 moves across the character input screen 100 in the upward direction, and when the user taps the movement direction specifying portion 31*e*, the second cursor 102 moves across the character input screen 100 in the downward direction. Further, when the user taps the movement direction specifying portion 31*c*, the second cursor 102 moves in the rightward direction across the character input screen 100, and when the user taps the movement direction specifying portion 31*g*, the second cursor 102 moves in the leftward direction across the character input screen 100. Furthermore, the second cursor 102 moves in the rightward diagonally upward direction across the character input screen 100 when the user taps the movement direction specifying portion 31*b*, in the rightward diagonally downward direction across the character input screen 100 when the user taps the movement direction specifying portion 31*d*, in the leftward diagonally downward direction across the character input screen 100 when the user taps the movement direction specifying portion 31*f*, and in the leftward diagonally upward direction across the character input screen 100 when the user taps the movement direction specifying portion 31*h*. Furthermore, the selection specifying portion 32 is mainly for specifying the selection of the key (a character key or a function key) currently indicated by the second cursor 102 on the keyboard image 110. The selection specifying portion 32 can also be used to select a key on the inputted character display screen 120. Note that in this embodiment, the first command graphic 20 and the second command graphic 30 are formed in different shapes, but the first command graphic 20 and the second command graphic 30 may be formed in identical shapes.

Furthermore, when performing a character input in the first embodiment, the first cursor 101 may be moved (returned) to a reference position of the cursor when the first command graphic 20 is not operated for a predetermined fixed time period (referred to hereinafter as an inoperative time period) or a predetermined operation is performed on the first command graphic 20 and/or the second command graphic 30, and the second cursor 102 may be moved (returned) to a reference position of the cursor when the second command graphic 30 is not operated for the predetermined fixed time period (the inoperative time period) or the predetermined operation is performed on the first command graphic 20 and/or the second command graphic 30.

This cursor return control is performed by the control means 60. Here, the reference positions of the cursors are substantially the central positions of the respective keyboard images obtained by dividing the keyboard image into two in the left-right direction, or in other words substantially the central positions of divided keyboard images obtained by dividing the keyboard image 110 into a left side keyboard image and a right side keyboard image. In the case of the QWERTY layout keyboard image 110 shown in FIG. 3, for example, the vicinity of the "D" key image on the left side keyboard image obtained after dividing the keyboard image 110 into two substantially equal parts serves as the reference position of the first cursor 101, and the vicinity of the "K" key image on the right side keyboard image obtained after dividing the keyboard image 110 into two substantially equal parts serves as the reference position of the second cursor 102. In general, the keyboard image does not have to be divided into two equal parts, as described above, and may be divided as desired. Specifically, in the first embodiment, the following operation is defined as the operation to return the cursors to their reference positions. In other words, the first cursor 101 and the second cursor 102 are moved to their respective reference positions by tapping any one of the movement direction specifying portions 21*a*, 21*b*, . . . , 21*h* and any one of the movement direction specifying portions 31*a*, 31*b*, . . . , 31*h* simultaneously three times in succession. Moreover, by tapping one of the movement direction specifying portions 31*a*, 31*b*, . . . , 31*h* twice in succession while holding down one of the movement direction specifying portions 21*a*, 21*b*, . . . , 21*h*, the first cursor 101 is moved to its reference position, and by tapping one of the movement direction specifying portions 21*a*, 21*b*, . . . , 21*h* twice in succession while holding down one of the movement direction specifying portions 31*a*, 31*b*, . . . , 31*h*, the second cursor 102 is moved to its reference position. Note that the operation for returning the cursors to their reference positions according to the present invention is not limited to the operations described above, and any operation performed using the first command graphic 20 and/or the second command graphic 30 may be employed.

By manipulating the respective movement direction specifying portions 21*a*, 21*b*, . . . , 21*h*, 31*a*, 31*b*, . . . , 31*h*, the corresponding cursors can be moved freely across the entire character input screen 100 rather than only within the region of the character input screen 100 in which the keyboard image 110 is displayed. In other words, the first cursor 101 and the second cursor 102 can be moved in a manner similar to the way a mouse cursor is moved in a typical mouse operation. Therefore, when an email create/send screen is displayed as the inputted character display screen 120, for example, a send button on the email create/send screen can be selected using the first cursor 101 or the second cursor 102 by moving the cursor to the location of the send button. Hence, when the character input screen 100 is displayed on the screen of the display means 10, the first command graphic 20 and the second command graphic 30 serve as cursor manipulation buttons.

Figure 6:
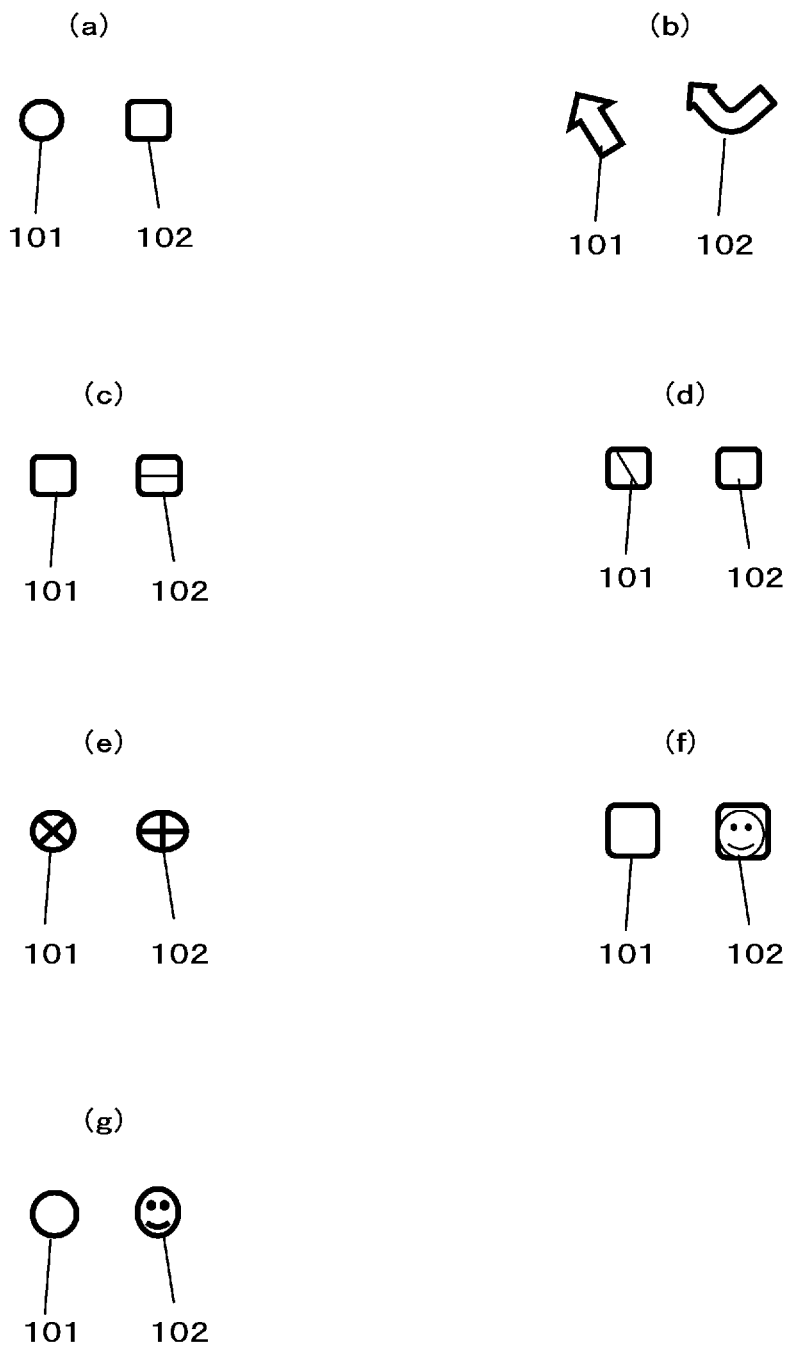
FIGS. 6(a)-(g) are views showing examples of display modes of two cursors.

In this embodiment, the first cursor 101 and the second cursor 102 are displayed on the character input screen 100, and therefore, to ensure that the user can easily differentiate between the two cursors 101, 102, the first cursor 101 and the second cursor 102 are displayed in display modes that differ from each other in terms of at least one element selected from shape, color, and lines and designs drawn inside the cursors. FIG. 6 is a view showing examples of display modes of the two cursors 101, 102. For example, in the example shown in FIG. 6(*a*), the first cursor 101 is displayed in a circular shape and the second cursor 102 is displayed in a square shape. In the example shown in FIG. 6(b), the first cursor 101 is displayed in the shape of a straight line arrow oriented in the upper leftward direction, and the second cursor 102 is displayed in the shape of a curved line arrow oriented in the downward direction and then in the upward direction. Further, in the example shown in FIG. 6(c), the first cursor 101 is displayed in a square shape, and the second cursor 102 is displayed in a square shape with a horizontal line drawn through it. In the example shown in FIG. 6(d), the first cursor 101 is displayed in a square shape with a diagonal line drawn through it, and the second cursor 102 is displayed in a square shape. In the example shown in FIG. 6(e), the first cursor 101 is displayed in an elliptical shape with an X drawn therein, and the second cursor 102 is displayed in an elliptical shape with a cross drawn therein. Furthermore, in the example shown in FIG. 6(f), the first cursor 101 is displayed in a square shape, and the second cursor 102 is displayed in a square shape with a design drawn therein. In an example shown in FIG. 6(g), the first cursor 101 is displayed in a circular shape, and the second cursor 102 is displayed in a circular shape with a design drawn therein. In this embodiment, the first cursor 101 is displayed in a circular shape and the second cursor 102 is displayed in a square shape, as shown in FIG. 6A.

Note that a plurality of display modes of the first cursor 101 and the second cursor 102 may be set in advance in the portable computing device of this embodiment so that the user can select desired display modes for the first cursor 101 and the second cursor 102, respectively.

Figure 7:
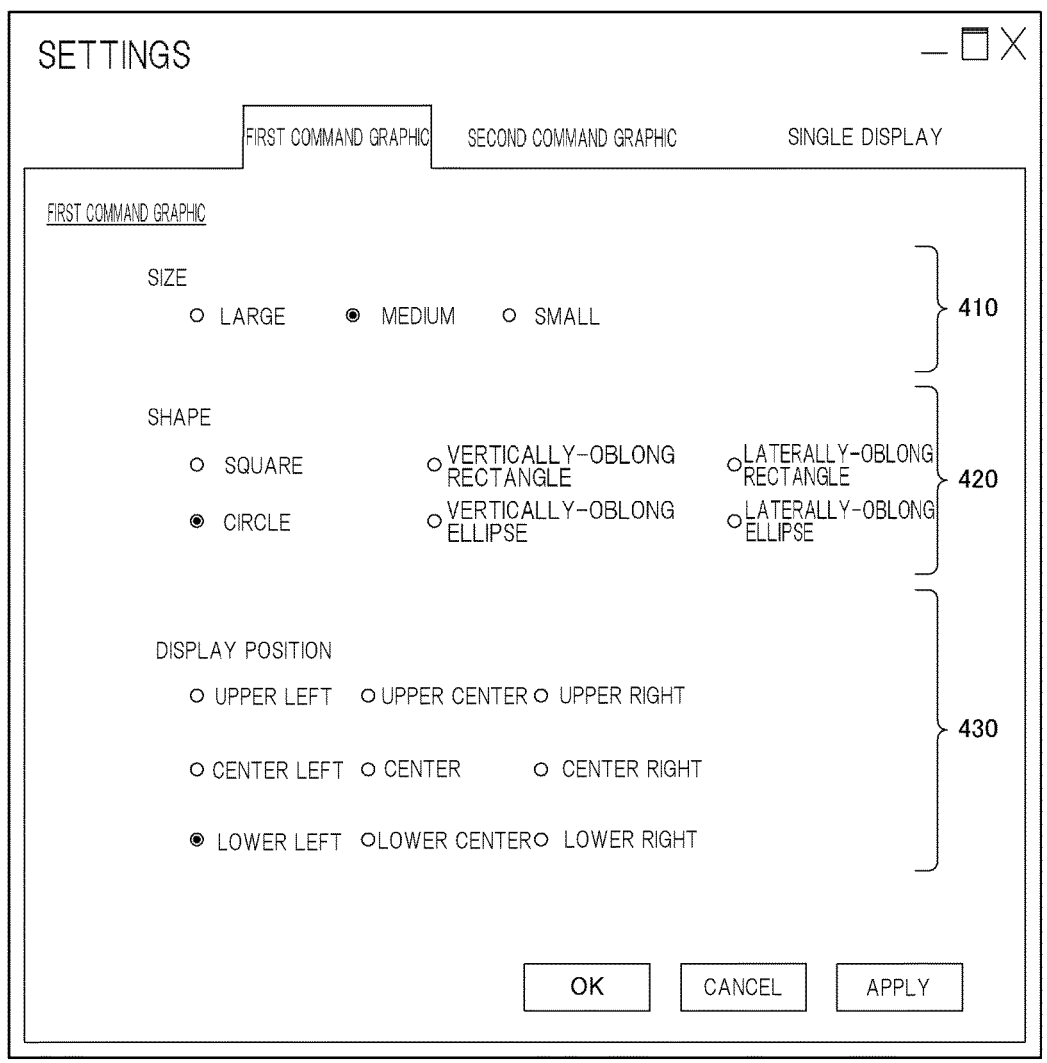
FIG. 7 is a view showing an example of a setup screen relating to the first command graphic.

In this embodiment, the display modes and display positions of the respective display regions of the first command graphic 20 and the second command graphic 30 can be modified using a predetermined setup screen. FIG. 7 is a view showing an example of a setup screen relating to the first command graphic 20. The setup screen 400 shown in FIG. 7 is provided with a size selection portion 410 for selecting the size of the first command graphic 20, a shape selection portion 420 for selecting the shape of the first command graphic 20, and a position selection portion 430 for selecting the display position of the first command graphic 20. Here, three sizes, namely "large", "medium", and "small", are provided as sizes that can be selected in the size selection portion 410. Six shapes, namely "square", "vertically-oblong rectangle", "laterally-oblong rectangle", "circle", "vertically-oblong ellipse", and "laterally-oblong ellipse", are provided as shapes that can be selected in the shape selection portion 420. Further, a total of nine positions including "upper left", "upper center", and "upper right" are provided as positions that can be selected in the position selection portion 430. The user can modify the size of the first command graphic 20 by selecting the desired size in the size selection portion 410, and can modify the shape of the first command graphic 20 by selecting the desired shape in the shape selection portion 420. The user can also modify the display position of the first command graphic 20 by selecting the desired position in the position selection portion 430. A similar setup screen to the setup screen 400 shown in FIG. 7 is provided for the second command graphic 30. Note that information indicating the size, etc. of the first command graphic 20 or the second command graphic 30, which are set using a setup screen such as that shown in FIG. 7, is stored in the storage means 40, to be described below.

Hence, in this embodiment, the sizes and shapes of the respective command graphics 20, 30 can be modified using the predetermined setup screen. As a result, female, male, adult, and child users can select the command graphics 20, 30 in sizes corresponding to the size of their fingers. Further, when the respective command graphics 20, 30 are displayed in positions where a horizontal or vertical gap between the images is limited or the like, the command graphics 20, 30 can be selected in shapes corresponding to the positions. FIG. 8 is a view showing examples of display shapes of the first command graphic 20 and the second command graphic 30. In the example shown in FIG. 8(a), the first command graphic 20 is displayed in the shape of a vertically-oblong ellipse, and the second command graphic 30 is displayed in the shape of a vertically-oblong rectangle. In the example shown in FIG. 8(b), the first command graphic 20 is displayed in the shape of a laterally-oblong ellipse, and the second command graphic 30 is displayed in the shape of a laterally-oblong rectangle.

Furthermore, in this embodiment, the display positions of the first command graphic 20 and the second command graphic 30 can be modified using the predetermined setup screen. As a result, the user can modify the respective display positions of the first command graphic 20 and the second command graphic 30 to positions where the command graphics 20, 30 can be easily manipulated. FIG. 9 is a view showing examples of the display positions of the first command graphic 20 and the second command graphic 30. In the example shown in FIG. 9(a), the first command graphic 20 and the second command graphic 30 are displayed in the left side upper portion and the right side upper portion of the inputted character display screen 120, respectively. In the example shown in FIG. 9(b), the first command graphic 20 and the second command graphic 30 are displayed in the left side central portion and the right side central portion of the inputted character display screen 120, respectively. In the example shown in FIG. 9(c), the first command graphic 20 and the second command graphic 30 are displayed in the left side lower portion and the right side lower portion of the inputted character display screen 120, respectively. Further, in the example shown in FIG. 9(d), in the case that laterally-oblong shapes have been selected as the respective shapes of the first command graphic 20 and the second command graphic 30, the first command graphic 20 and the second command graphic 30 are displayed in the left side upper portion and the right side upper portion of the inputted character display screen 120, respectively. In the example shown in FIG. 9(e), in the case that vertically-oblong shapes have been selected as the respective shapes of the first command graphic 20 and the second command graphic 30, the first command graphic 20 and the second command graphic 30 are displayed in the left side central portion and the right side central portion of the inputted character display screen 120, respectively. In the example shown in FIG. 9(f), in the case that laterally-oblong shapes have been selected as the respective shapes of the first command graphic 20 and the second command graphic 30, the first command graphic 20 and the second command graphic 30 are displayed in the left side lower portion and the right side lower portion of the inputted character display screen 120, respectively.

Note that a plurality of display modes of the first command graphic 20 and the second command graphic 30 may be set in advance so that the user can select the display modes of the first command graphic 20 and the second command graphic 30 from the preset display modes. Further, a plurality of display positions in which the first command graphic 20 and the second command graphic 30 are displayed on the screen of the display means 10 may be set in advance in conjunction with the display position of the keyboard image 110 so that the user can select the desired display positions from the preset display positions. FIG. 10 shows examples of preset display positions of the first command graphic 20 and the second command graphic 30.

Figure 11:
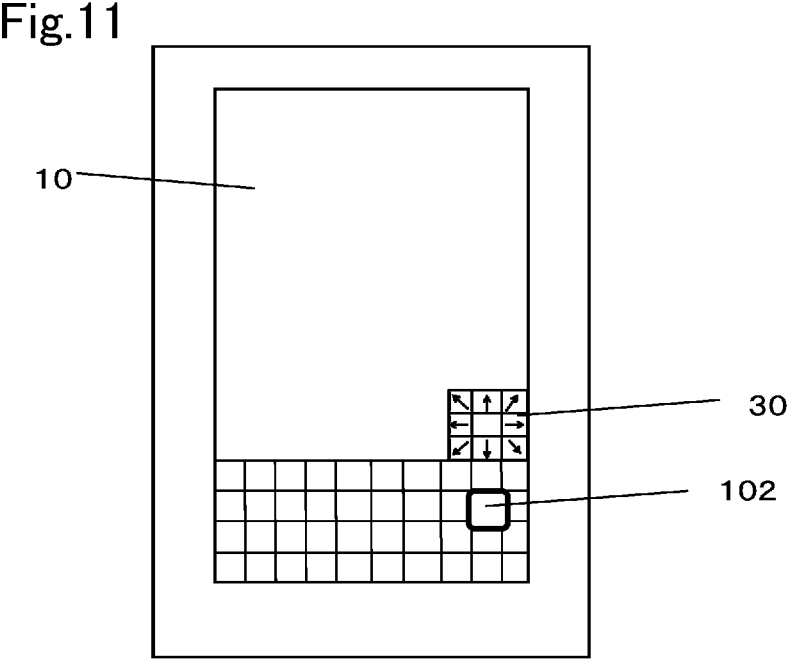
FIG. 11 is a schematic front view of the portable computing device displaying only the second command graphic on a screen.
Figure 12:
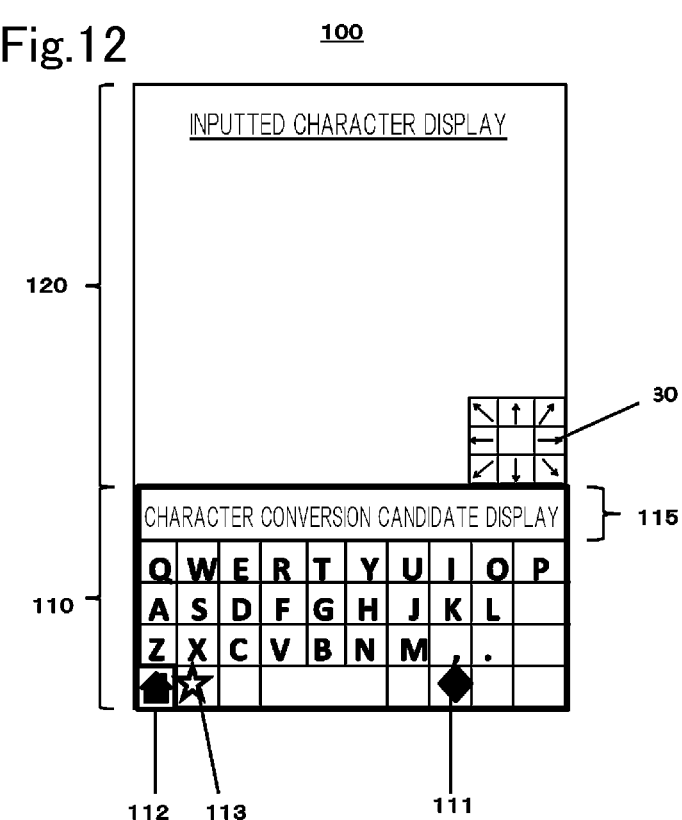
FIG. 12 is a view showing an example of a character input screen when only the second command graphic is displayed on the screen.
Figure 13:
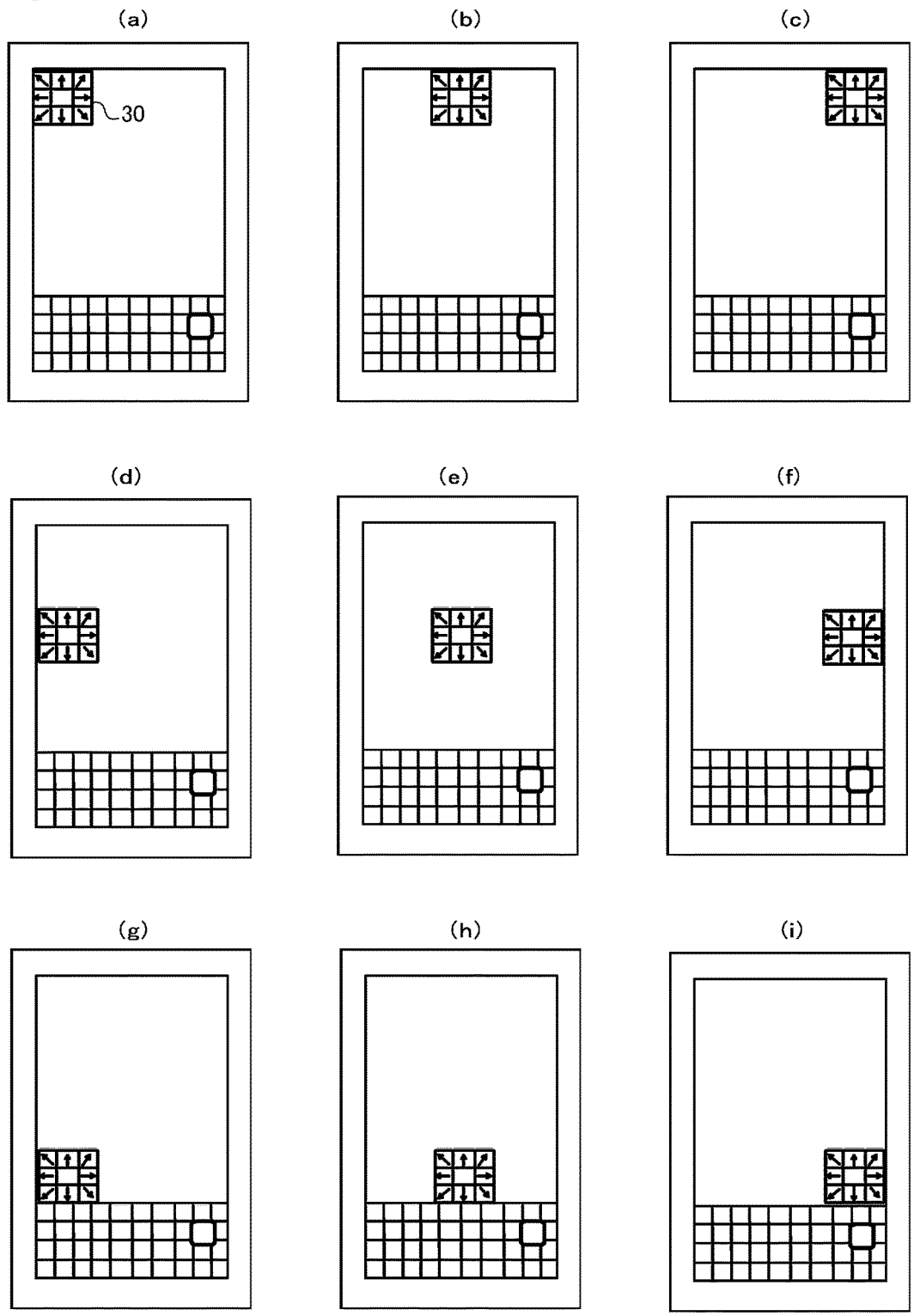
FIGS. 13(a)-(i) are views showing examples of display positions of the second command graphic when only the second command graphic is displayed on the screen.
Figure 14:
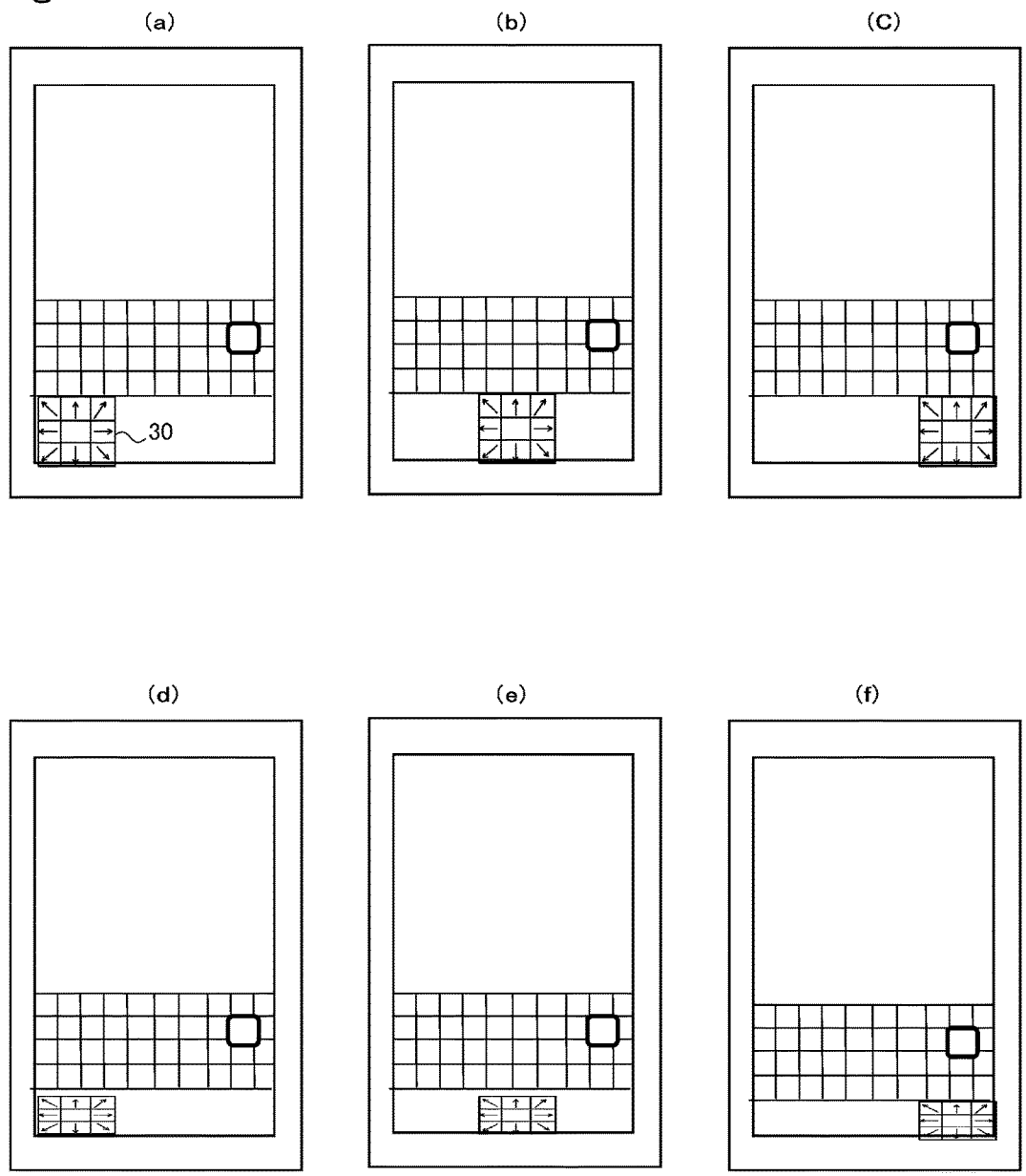
FIGS. 14(a)-(f) are views showing examples of display positions of the second command graphic when only the second command graphic is displayed on the screen.
Figure 15:
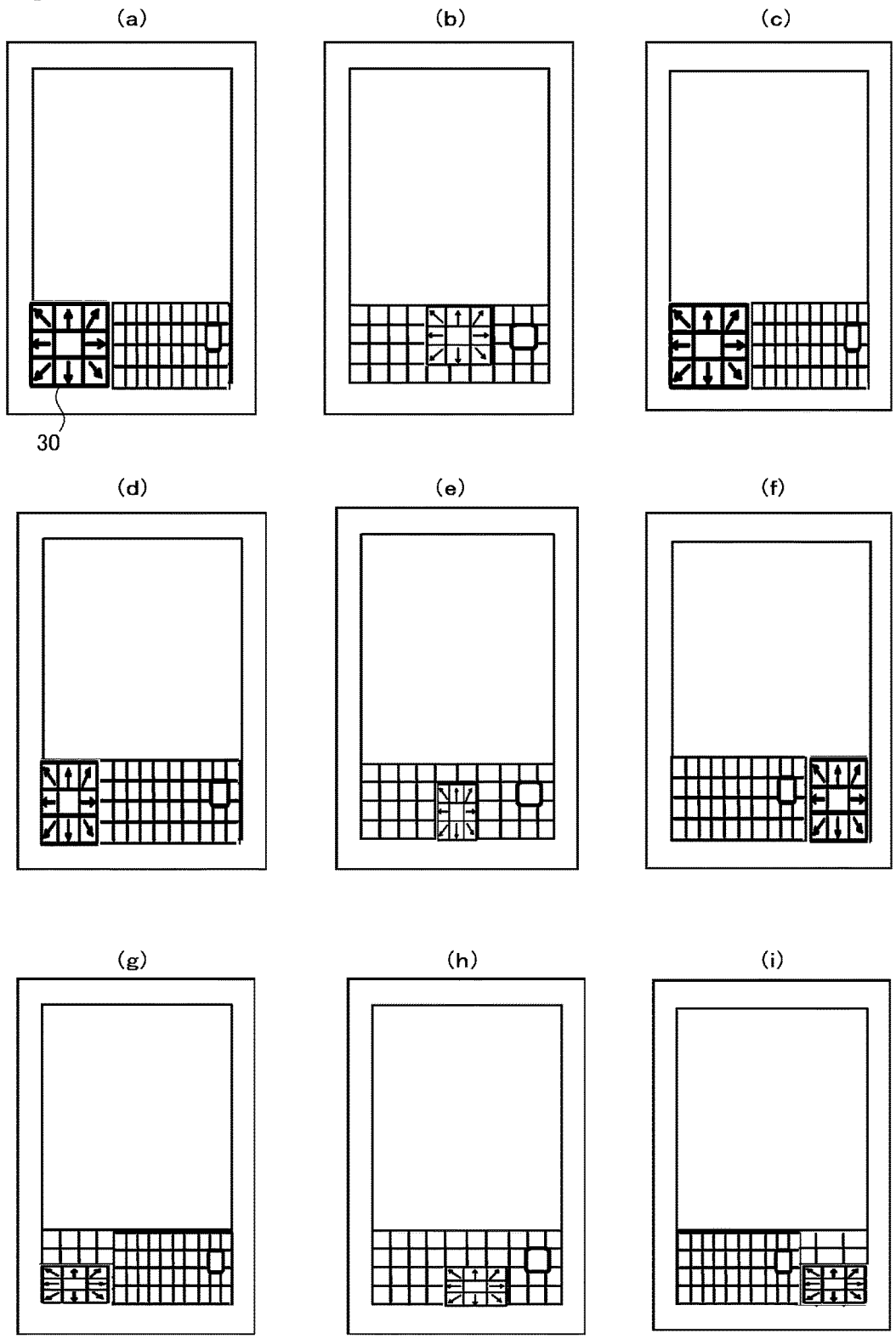
FIGS. 15(a)-(i) are views showing examples of display positions of the second command graphic when only the second command graphic is displayed on the screen.

Furthermore, in this embodiment, by selecting a single display of a command graphic on the predetermined setup screen, one of the first command graphic 20 and the second command graphic 30 can be displayed on the screen of the display means 10. When only one of the first command graphic 20 and the second command graphic 30 is displayed on the screen of the display means 10, only the cursor that corresponds to the displayed command graphic, from among the two cursors 101, 102, is displayed. FIG. 11 is a schematic front view of a mobile phone displaying only the second command graphic 30 on the screen, and FIG. 12 is a view showing an example of the character input screen when only the second command graphic 30 is displayed on the screen. Further, FIGS. 13, 14, and 15 show examples of display positions of the second command graphic 30 when only the second command graphic 30 is displayed on the screen.

Moreover, in this embodiment, the predetermined setup screen described above may be used to set the operation for moving the first cursor 101 and the second cursor 102 to their respective reference positions, to set the respective reference positions of the cursors, to set the inoperative time period, and to set to switch between enabling and disabling the function for returning the cursors to their respective reference positions. Note that in this case, information relating to the respective reference positions of the cursors, etc., which are set using the setup screen, is stored in the storage means 40.

The storage means 40 stores an OS, various application programs, etc. The storage means 40 is also used as a working memory. The storage means 40 stores, for example, keyboard display region information (including position information, shape information, size information, color information, etc.) used to display the keyboard image 110 in a predetermined display region on the screen of the display means 10, first command graphic display region information (including position information, shape information, size information, color information, etc.) used to display the eight movement direction specifying portions 21a, 21b, . . . , 21h and the selection specifying portion 22 of the first command graphic 20 in a predetermined display region on the screen of the display means 10, second command graphic display region information (including position information, shape information, size information, color information, etc.) used to display the eight movement direction specifying portions 31a, 31b, . . . , 31h and the selection specifying portion 32 of the second command graphic 30 in a predetermined display region on the screen of the display means 10, cursor display region information (including position information, shape information, size information, color/pattern information, etc.) relating respectively to the first cursor 101 and the second cursor 102 and used to display the cursors in predetermined display positions (display regions) on the screen of the display means 10, information (including reference position information, inoperative time information, etc.) relating to the function for returning the cursors to their respective reference positions, etc. Further, the communication means 50 is used to exchange information with the outside.

The control means 60 performs overall control of respective parts of the portable computing device. Of the control performed by the control means 60, control content relating to character input will be described mainly hereafter. As shown in FIG. 2, the control means 60 includes display control means 61, manipulation determining means 62, and input control means 63.

The display control means 61 creates various screens and images, such as the home screen, the application screen, the character input screen 100, the first command graphic 20 and second command graphic 30, and the first cursor 101 and second cursor 102, and displays the created screens and images on the screen of the display means 10. When the keyboard image 110, the respective command graphics 20, 30, and the respective cursors 101, 102 are displayed on the screen of the display means 10, the display control means 61 stores the display region information relating to the keyboard image 110, the respective command graphics 20, 30, and the respective cursors 101, 102 (the keyboard display region information, the first command graphic display region information, the second command graphic display region information, and the display region information relating to the respective cursors) in the storage means 40 in order to manage the information. Further, the display control means 61 includes command graphic display control means 61a, cursor display control means 61b, and keyboard image display control means 61c. The command graphic display control means 61a controls the display of the first command graphic 20 and the second command graphic 30. The cursor display control means 61b controls the display of the respective cursors 101, 102 and, as will be described below, controls the movement of the respective cursors 101, 102 based on signals from the manipulation determining means 62. The keyboard image display control means 61c controls the display of the keyboard image 110. Further, when an instruction to modify the display position, the size, the shape, or the like is issued with regard to the display region of the first command graphic 20 or the display region of the second command graphic 30 using the predetermined setup screen, the command graphic display control means 61a modifies the display region of the corresponding command graphic on the screen of the display means 10 in accordance with the content of the instruction. The command graphic display control means 61a also performs control to switch between displaying the two command graphics 20, 30 and displaying one of the command graphics in accordance with content set using the predetermined setup screen. Note that when an instruction is issued to modify the display region of the keyboard image 110, the respective command graphics 20, 30, and the respective cursors 101, 102, the display control means 61 rewrites the display region information stored in the storage means 40 to the modified content.

When the touch position information is output from the position detection means 71 of the touch screen 70, the manipulation determining means 62 determines the content of the touch operation performed on the touch screen 70 by the user. More specifically, for example, when the touch position information is transmitted from the position detection means 71 of the touch screen 70, the manipulation determining means 62 determines, based on the command graphic display region information (the first command graphic display region information and second command graphic display region information) stored in the storage means 40 whether or not a first operation for specifying the direction of movement of the first cursor has been performed on the first command graphic 20, whether or not a second operation for specifying the selection of the key image indicated by the first cursor on the keyboard image has been performed on the first command graphic 20, whether or not a third operation for specifying the direction of movement of the second cursor has been performed on the second command graphic 30, and whether or not a fourth operation for specifying the selection of the key image indicated by the second cursor on the keyboard image has been performed on the second command graphic 30. Here, the first operation is performed by touching (tapping or pressing and holding, for example) the respective movement direction specifying portions 21a, 21b, ..., 21h of the first command graphic 20, the second operation is performed by touching (tapping, for example) the selection specifying portion 22 of the first command graphic 20, the third operation is performed by touching (tapping or pressing and holding, for example) the respective movement direction specifying portions 31a, 31b, ..., 31h of the second command graphic 30, and the fourth operation is performed by touching (tapping, for example) the selection specifying portion 32 of the second command graphic 30. After determining that the first operation has been performed in relation to the first command graphic 20, the manipulation determining means 62 outputs a signal indicating that the first operation has been performed on the first command graphic 20 to the cursor display control means 61b for the duration of the first operation, and after determining that the third operation has been performed in relation to the second command graphic 30, the manipulation determining means 62 outputs a signal indicating that the third operation has been performed on the second command graphic 30 to the cursor display control means 61b for the duration of the third operation. Meanwhile, after determining that the second operation has been performed in relation to the first command graphic 20, the manipulation determining means 62 outputs a signal indicating that the second operation has been performed on the first command graphic 20 to the input control means 63, and after determining that the fourth operation has been performed in relation to the second command graphic 30, the manipulation determining means 62 outputs a signal indicating that the fourth operation has been performed on the second command graphic 30 to the input control means 63. Furthermore, having determined that a position indicated by the touch position information is not included within the display regions of the respective specification portions of the command graphics 20, 30, the manipulation determining means 62 determines whether or not the position indicated by the touch position information corresponds to the respective keys on the keyboard image 110. After determining that the position indicated by the touch position information corresponds to a key, the manipulation determining means 62 determines that the key has been manipulated (tapped), and therefore outputs a signal indicating that the key has been manipulated to the input control means 63.

When the signal indicating that the first operation has been performed on the first command graphic 20 is transmitted from the manipulation determining means 62, the cursor display control means 61b controls the movement of the first cursor 101 across the character input screen so that the first cursor 101 moves in the movement direction specified by the movement direction specifying portion subjected to the first operation for as long as the signal is transmitted; when the signal indicating that the third operation has been performed on the second command graphic 30 is transmitted from the manipulation determining means 62, the cursor display control means 61b controls the movement of the second cursor 102 across the character input screen so that the second cursor 102 moves in the movement direction specified by the movement direction specifying portion subjected to the third operation for as long as the signal is transmitted. Hence, when the user taps the desired movement direction specifying portion, for example, the corresponding cursor moves a short distance in the direction specified by the movement direction specifying portion, and when the user presses and holds the desired movement direction specifying portion, the corresponding cursor moves continuously in the direction specified by the movement direction specifying portion for the duration of the press and hold operation. Moreover, when, during character input, it is determined based on a signal from the manipulation determining means 62 that the operation to return the cursors to their respective reference positions has been performed using the first command graphic 20 and/or the second command graphic 30, or that no operations have been performed on the respective command graphics for a preset fixed time period, the cursor display control means 61b controls the movement of the corresponding cursor so that the cursor returns to its reference position. Furthermore, when the user modifies the display modes of the first command graphic 20 and the second command graphic 30 using the predetermined setup screen, the command graphic display control means 61a modifies the display modes of the first command graphic 20 and the second command graphic 30 in accordance with the content of the modification, and displays the modified command graphics 20, 30 on the screen of the display means 10; when the user modifies the display positions of the first command graphic 20 and the second command graphic 30 using the predetermined setup screen, the command graphic display control means 61a modifies the display modes of the first command graphic 20 and the second command graphic 30 in accordance with the content of the modification, and displays the modified command graphics 20, 30 on the screen of the display means 10. Further, when the user selects a single display of the second command graphic 30 alone, for example, using the predetermined setup screen, the command graphic display control means 61a ensures that the first command graphic 20 and the first cursor 101 are not displayed on the screen of the display means 10.

According to this embodiment, movement of the cursors across the keyboard image 110 may be set such that the cursors can move freely (a free movement setting), or such that each individual key forms a single movement range and the cursors move in key units (a key unit movement setting). For example, the free movement setting and the key unit movement setting may be selected using a similar setup screen to the setup screen shown in FIG. 7. Alternatively, the free movement setting and the key unit movement setting may be switched alternately every time a specific key is tapped. Note that information indicating which of the free movement setting and the key unit movement setting is currently enabled is stored in the storage means 40. When the movement direction specifying portions 21a, 21b, ..., 21h or the movement direction specifying portions 31a, 31b, ..., 31h are manipulated while the key unit movement setting is enabled, the cursor display control means 61b controls the movement of the corresponding cursor so that the cursor moves by a key unit in the direction of movement specified by the manipulated movement direction specifying portion. Hence, when the user taps a desired movement direction specifying portion on the first command graphic or the second command graphic, for example, the cursor corresponding to the command graphic moves to the location of the adjacent key in the direction of movement specified by the movement direction specifying portion, and when the user presses and holds a desired movement direction specifying portion on the first command graphic or the second command graphic, the cursor corresponding to the command graphic moves continuously in key units in the direction of movement specified by the movement direction specifying portion for the duration of the press and hold operation. By selecting the key unit movement setting, the user can accurately and easily perform manipulations for moving the respective cursors 101, 102 to the locations of desired keys on the keyboard image 110, and as a result, manipulation errors can be reduced. Note that when the manipulation for returning the cursors to their respective reference positions is performed using the first command graphic 20 and/or the second command graphic 30 or no manipulations are performed on the respective command graphics for the preset fixed time period while the key unit movement setting is enabled, in the case of the QWERTY layout keyboard image 110 shown in FIG. 3, the first cursor can be returned to the position of the "D" key image, for example, and the second cursor can be returned to the position of the "K" key image, for example.

Figure 16:
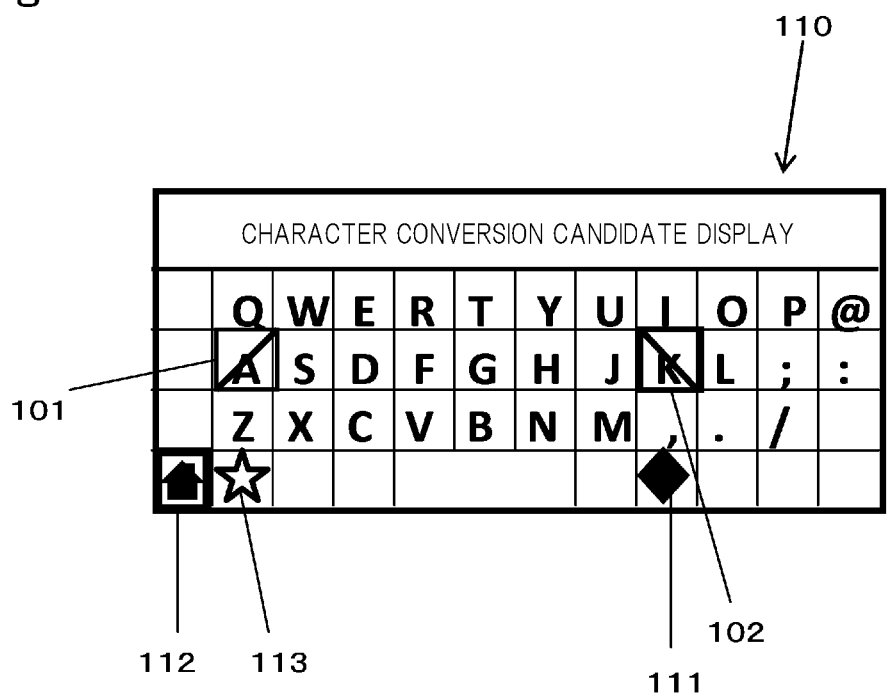
FIG. 16 is a view showing an example of display modes of a first cursor and a second cursor when the first cursor and the second cursor are moved across the keyboard image in key units.

Also note that when the key unit movement setting is enabled, the first cursor 101 and the second cursor 102 are preferably displayed in modes that differ from each other in terms of at least one element selected from the color and the lines and designs drawn inside the cursors, rather than being displayed in different shapes. FIG. 16 is a view showing an example of the display modes of the first cursor 101 and the second cursor 102 when the first cursor 101 and the second cursor 102 are moved across the keyboard image 110 in key units. In the example shown in FIG. 16, the first cursor 101 is displayed as a square having a diagonal line drawn through the square from an upper right corner to a lower left corner, and the second cursor 102 is displayed as a square having a diagonal line drawn through the square from an upper left corner to a lower right corner. By displaying the first cursor 101 and the second cursor 102 in modes that differ from each other in terms of at least one element selected from the color and the lines and designs drawn inside the cursors in this manner, the user can easily differentiate between the first cursor 101 and the second cursor 102 even when the key unit movement setting is enabled.

The input control means 63 controls the character input and performs processing corresponding to various commands when the character input screen 100 is displayed on the screen of the display means 10. More specifically, when a signal indicating that the second operation has been performed on the first command graphic 20 is transmitted from the manipulation determining means 62, in case the first cursor 101 is currently indicating a character key, the input control means 63 performs control to input the character associated with that character key; on the other hand, in case the first cursor 101 is currently indicating a function key, the input control means 63 executes a process for implementing the function assigned to that function key. Further, when a signal indicating that the fourth operation has been performed on the second command graphic 30 is transmitted to the input control means 63 from the manipulation determining means 62 and the second cursor 102 is currently indicating a character key, the input control means 63 performs control to input the character associated with that character key. When the second cursor 102 is currently indicating a function key, on the other hand, the input control means 63 executes a process for implementing the function assigned to that function key.

Furthermore, when the user directly touches a key on the keyboard image 110 with a finger and a signal indicating that the touched key has been manipulated is transmitted from the manipulation determining means 62, in case the touched key is a character key, the input control means 63 performs control to input the character associated with that character key, and in case the touched key is a function key, the input control means 63 executes a process for implementing the function assigned to that function key. Hence, when the touch screen 70 is provided on the screen of the display means 10, characters can be input using both a character input method employing the first cursor 101 and second cursor 102 and a character input method performed via the touch screen 70. Moreover, instructions for implementing the functions assigned to the function keys can be issued using both a function key selection method employing the first cursor 101 and second cursor 102 and a function key selection method performed via the touch screen 70.

Incidentally, in this embodiment, when the kanji hiragana input mode is selected on the QWERTY layout keyboard image, a plurality of manipulations are set as operations for converting and confirming inputted characters. One of these manipulations is similar to a normal operation. That is, when the space key on the keyboard image 110 is selected after selecting the kanji hiragana input mode, the input control means 63 converts pending inputted characters displayed on a predetermined line of the inputted character display screen 120, and displays the converted characters in the character conversion candidate display portion 115. When the Enter key is then selected, the pending inputted characters are confirmed as the characters displayed in the character conversion candidate display portion 115. Here, the space key and the Enter key may be selected using the first cursor 101 or the second cursor 102, or by directly touching the touch screen 70 with a finger. Furthermore, in this embodiment, the input control means 63 performs inputted character conversion likewise when the second operation and the fourth operation are performed simultaneously, or in other words when the selection specifying portion 22 of the first command graphic 20 and the selection specifying portion 32 of the second command graphic 30 are tapped once simultaneously. More specifically, the input control means 63 performs inputted character conversion after determining that the signal indicating that the second operation has been performed on the first command graphic 20 and the signal indicating that the fourth operation has been performed on the second command graphic 30 have been transmitted simultaneously from the manipulation determining means 62. By repeating this manipulation at short intervals, the user can switch the converted characters successively. Moreover, in this embodiment, the input control means 63 confirms converted inputted characters when the selection specifying portion of one of the first command graphic 20 and the second command graphic 30 is tapped twice in succession (when the second operation or the fourth operation is performed twice in succession), or when the selection specifying portion 22 of the first command graphic 20 and the selection specifying portion 32 of the second command graphic 30 are tapped simultaneously twice in succession (when the second operation and the fourth operation are performed simultaneously twice in succession). More specifically, the input control means 63 confirms the converted inputted characters after determining that the signal indicating that the second operation has been performed on the first command graphic 20 or the signal indicating that the fourth operation has been performed on the second command graphic 30 has been transmitted twice in succession from the manipulation determining means 62, or that the signal indicating that the second operation has been performed on the first command graphic 20 and the signal indicating that the fourth operation has been performed on the second command graphic 30 have been transmitted simultaneously from the manipulation determining means 62 twice in succession. Furthermore, in this embodiment, a similar plurality of operations are set as the operations for converting and confirming inputted characters likewise when the 50-character hiragana layout keyboard image is displayed as the keyboard image.

Note that the operations for converting and confirming inputted characters are not limited to the operations described above. For example, the input control means 63 may convert inputted characters when the selection specifying portion of one of the first command graphic 20 and the second command graphic 30 is tapped twice in succession, and confirm the converted inputted characters when the selection specifying portion 22 of the first command graphic 20 and the selection specifying portion 32 of the second command graphic 30 are tapped once simultaneously. Further, various commands can typically be set in accordance with combinations in which of the first command graphic 20 and the second command graphic 30 are tapped, etc. For example, an operation in which one of the movement direction specifying portions 21a, 21b, . . . , 21h and one of the movement direction specifying portions 31a, 31b, . . . , 31h are tapped simultaneously three times in succession, as described above, serves as a manipulation for specifying a command to move the first cursor 101 and the second cursor 102 to the respective reference positions.

Moreover, when the home key 112 of the keyboard image 110 is selected, even midway through an input operation, the input control means 63 outputs a signal indicating that the home screen is to be displayed to the display control means 61. The display control means 61, upon receipt of this signal, displays the home screen on the screen of the display means 10 in place of the character input screen 100.

Figure 17:
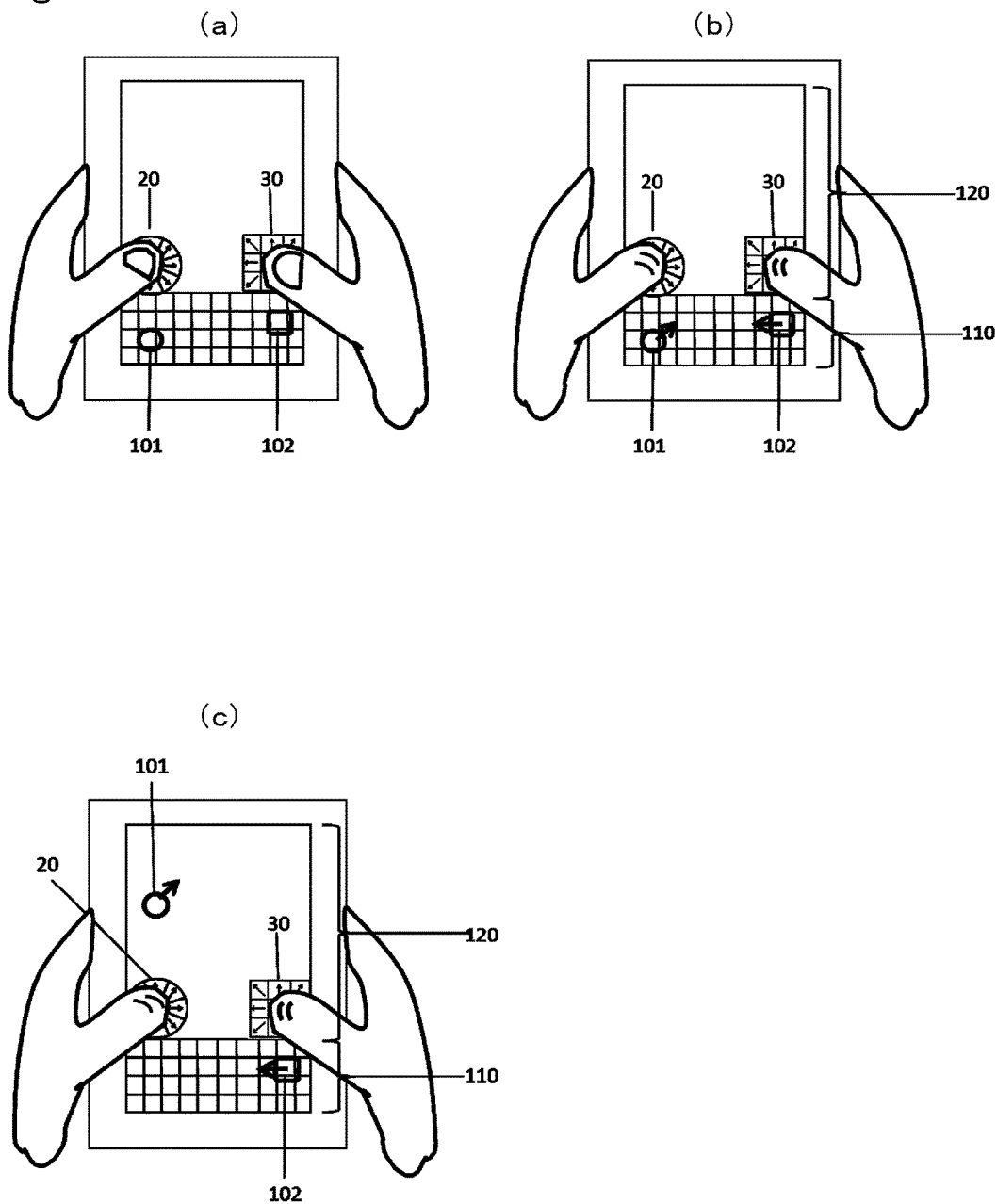
FIGS. 17(a)-(c) are views for illustrating a method of holding the portable computing device according to the first embodiment and manipulating the two command graphics during a character input operation.

Next, a method of holding the portable computing device according to the first embodiment and operating the two command graphics 20, 30 during a character input operation will be described. FIG. 17 is a view illustrating a method of holding the portable computing device according to the first embodiment and manipulating the two command graphics 20, 30 during a character input operation.

When inputting characters, as shown in FIG. 17(*a*), the user supports the left side surface or the rear surface of the portable computing device using the fingers of the left hand other than the thumb, places the thumb of the left hand over the first command graphic 20, supports the right side surface or the rear surface of the portable computing device using the fingers of the right hand other than the thumb, and places the thumb of the right hand over the second command graphic 30. Hence, because a peripheral portion of the position of the portable computing device where the first command graphic 20 is provided and a peripheral portion of the position of the portable computing device where the second command graphic 30 is provided are supported by the respective hands, it can be stably held with both hands. Furthermore, the respective command graphics 20, 30 are manipulated by the thumbs placed thereon. In other words, as shown in FIGS. 17(*b*) and 17(*c*), the user moves the first cursor 101 by manipulating (tapping or pressing and holding) the respective movement direction specifying portions of the first command graphic 20 using the thumb of the left hand while holding the portable computing device in both hands. Further, the user moves the second cursor 102 by manipulating (tapping or pressing and holding) the respective movement direction specifying portions of the second command graphic 30 using the thumb of the right hand. By manipulating the first command graphic 20 and the second command graphic 30 with both hands in this manner, the desired character keys and function keys can be selected quickly and accurately, and as a result, an input operation can be performed quickly and accurately. Here, as shown in FIG. 17(*c*), the respective cursors 101, 102 can be moved, not only within the display region of the keyboard image 110, but also within the display region of the inputted character display screen 120. Note that when the cursors 101, 102 are moved from the keyboard image 110 to the inputted character display screen 120, the shapes of the cursors may be automatically modified to shapes such as arrows. Likewise in this case, the first cursor 101 and the second cursor 102 are preferably modified to different shapes, different colors, or the like so that the first cursor 101 and the second cursor 102 can be differentiated from each other.

Methods of holding the portable computing device and manipulating the two command graphics 20, 30 during a character input operation are not limited to the method described above. For example, the user may hold the portable computing device in a comfortable manner and operate the respective command graphics 20, 30 using the thumbs, index fingers, etc. Alternatively, the user may manipulate one of the command graphics using the thumb on one hand while holding the portable computing device with both hands so as to input characters using only the cursor corresponding to the manipulated command graphic.

Figure 18:
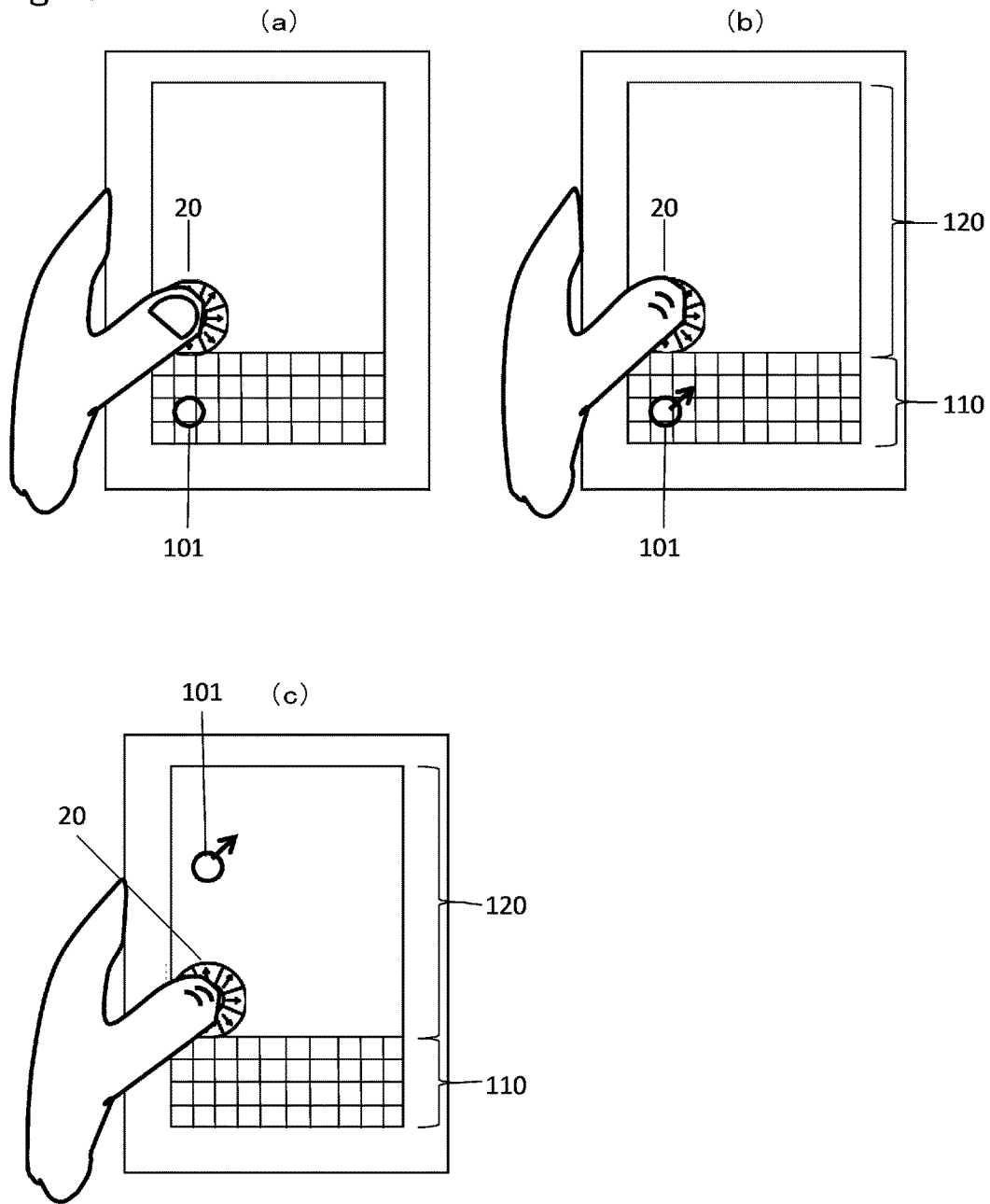
FIGS. 18(a)-(c) are views for illustrating a method of holding the portable computing device and manipulating the first command graphic when only the first command graphic is displayed.
Figure 19:
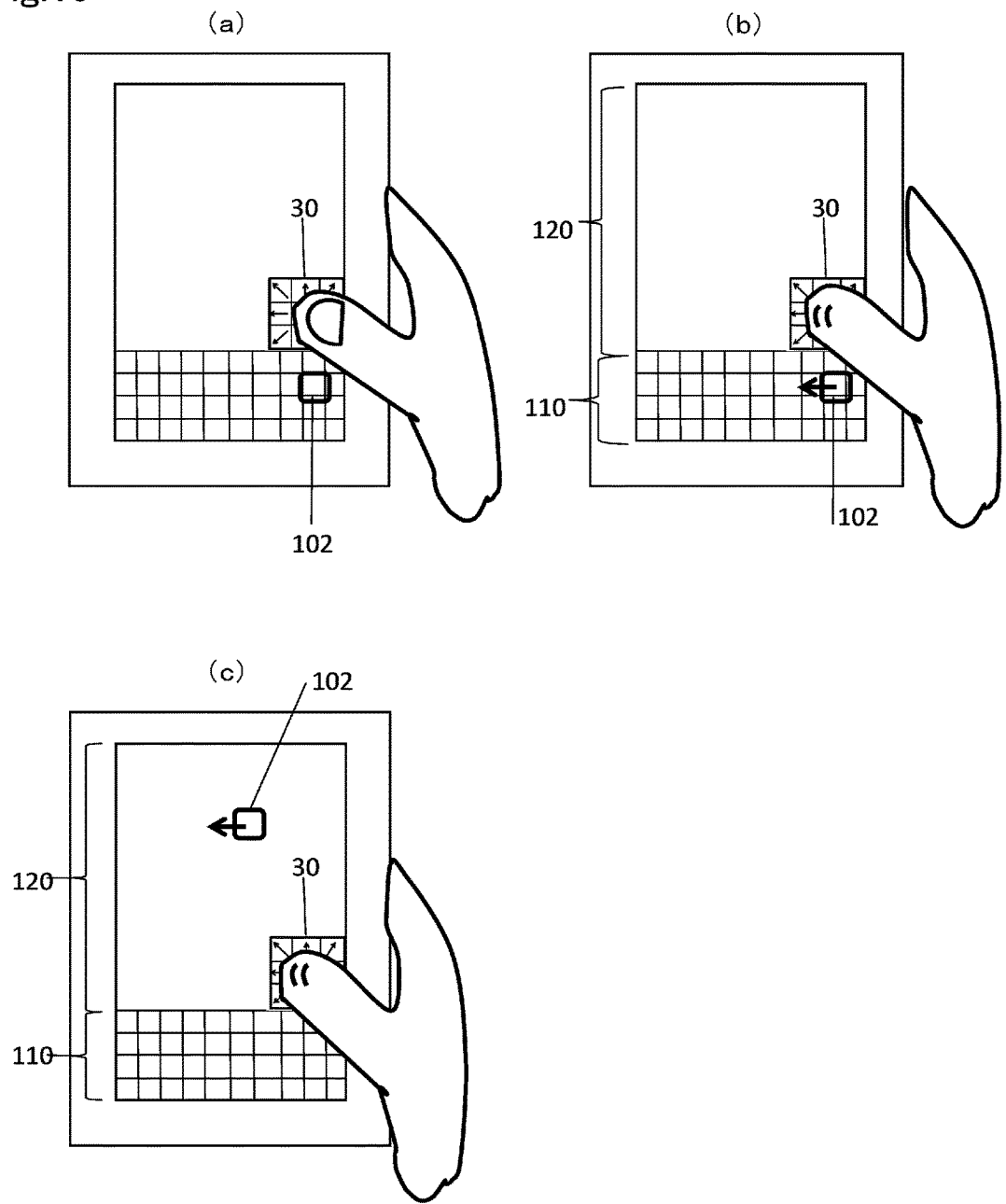
FIGS. 19(a)-(c) are views for illustrating a method of holding the portable computing device and manipulating the second command graphic when only the second command graphic is displayed.

Next, a method of holding the portable computing device and manipulating a command graphic when only one command graphic is displayed will be described. FIG. 18 is a view illustrating a method of holding the portable computing device and manipulating the first command graphic 20 when only the first command graphic 20 is displayed, and FIG. 19 is a view illustrating a method of holding the portable computing device and manipulating the second command graphic 30 when only the second command graphic 30 is displayed.

On the portable computing device shown in FIG. 18, the first command graphic 20 is displayed in the lower left end portion of the inputted character display screen 120. In this case, as shown in FIG. 18(*a*), the user supports the left side surface or the rear surface of the portable computing device with the fingers of the left hand other than the thumb, and places the thumb of the left hand over the first command graphic 20. Thus, the first command graphic 20 is manipulated by the thumb placed thereon. In other words, as shown in FIGS. 18(*b*) and 18(*c*), the user moves the first cursor 101 by manipulating (tapping or pressing and holding) the respective movement direction specifying portions of the first command graphic 20 using the thumb of the left hand. Further, on the portable computing device shown in FIG. 19, the second command graphic 30 is displayed in a lower right end portion of the inputted character display screen 120. In this case, as shown in FIG. 19(*a*), the user supports the right side surface or the rear surface of the portable computing device with the fingers of the right hand other than the thumb, and places the thumb of the right hand over the second command graphic 30. Thus, the second command graphic 30 is manipulated by the thumb placed thereon. In other words, as shown in FIGS. 19(*b*) and 19(*c*), the user moves the second cursor 102 by manipulating (tapping or pressing and holding) the respective movement direction specifying portions of the second command graphic 30 using the thumb of the right hand.

Figure 20:
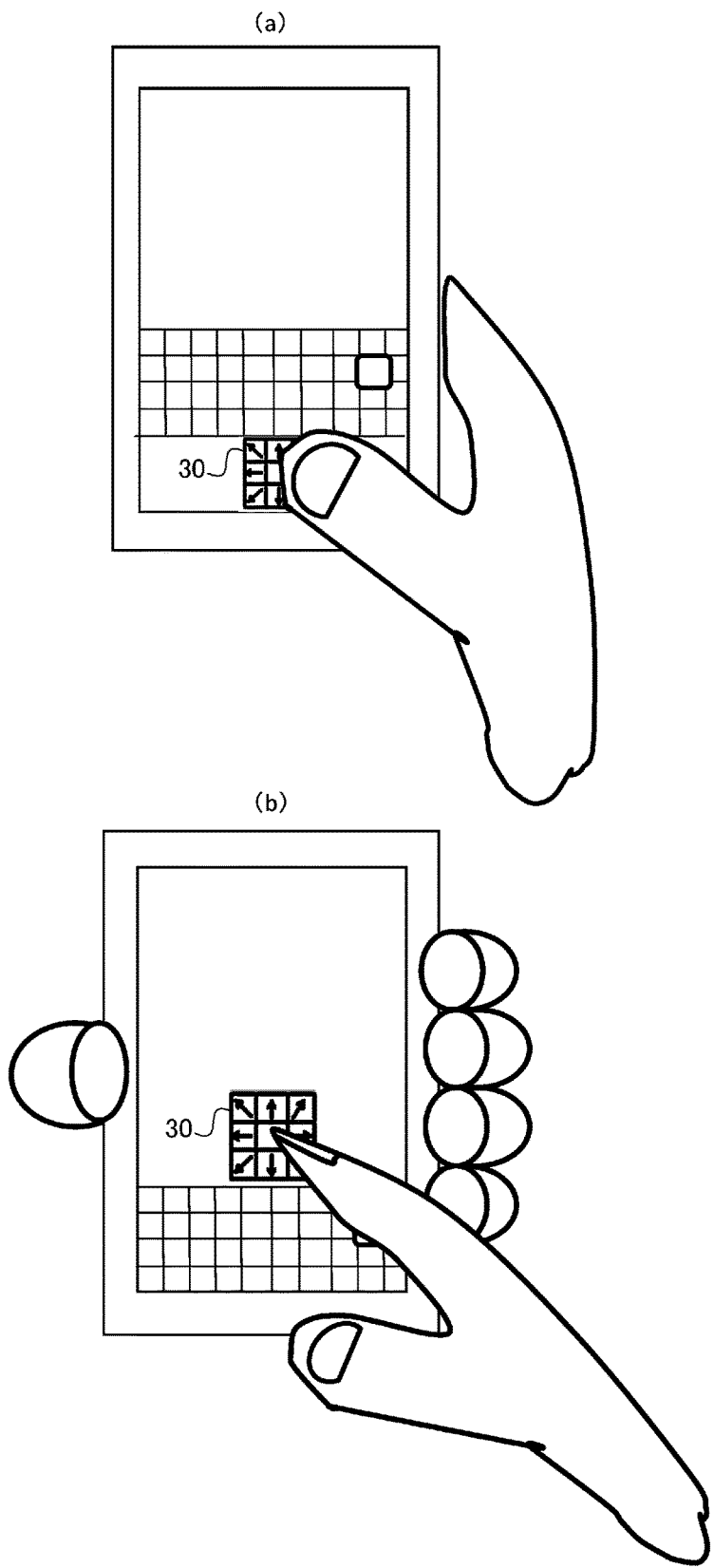
FIGS. 20(a) and (b) are views showing another example of a method of holding the portable computing device and manipulating the command graphics.

Note that methods of holding the portable computing device and manipulating the command graphic during a character input operation when only one command graphic is displayed are not limited to the method described above. FIG. 20 show other examples of methods of holding the portable computing device and manipulating the command graphic. On each of the portable computing devices shown in FIGS. 20(a) and 20(b), the second command graphic 30 is disposed on a center line of the inputted character display screen 120. When the portable computing device is small, as shown in FIG. 20(a), the user can manipulate the second command graphic 30 using the thumb of the right hand, for example, similarly to the example shown in FIG. 19. Alternatively, as shown in FIG. 20(b), the user may hold the portable computing device in the left hand and manipulate the second command graphic 30 using the index finger of the right hand.

Figure 21:
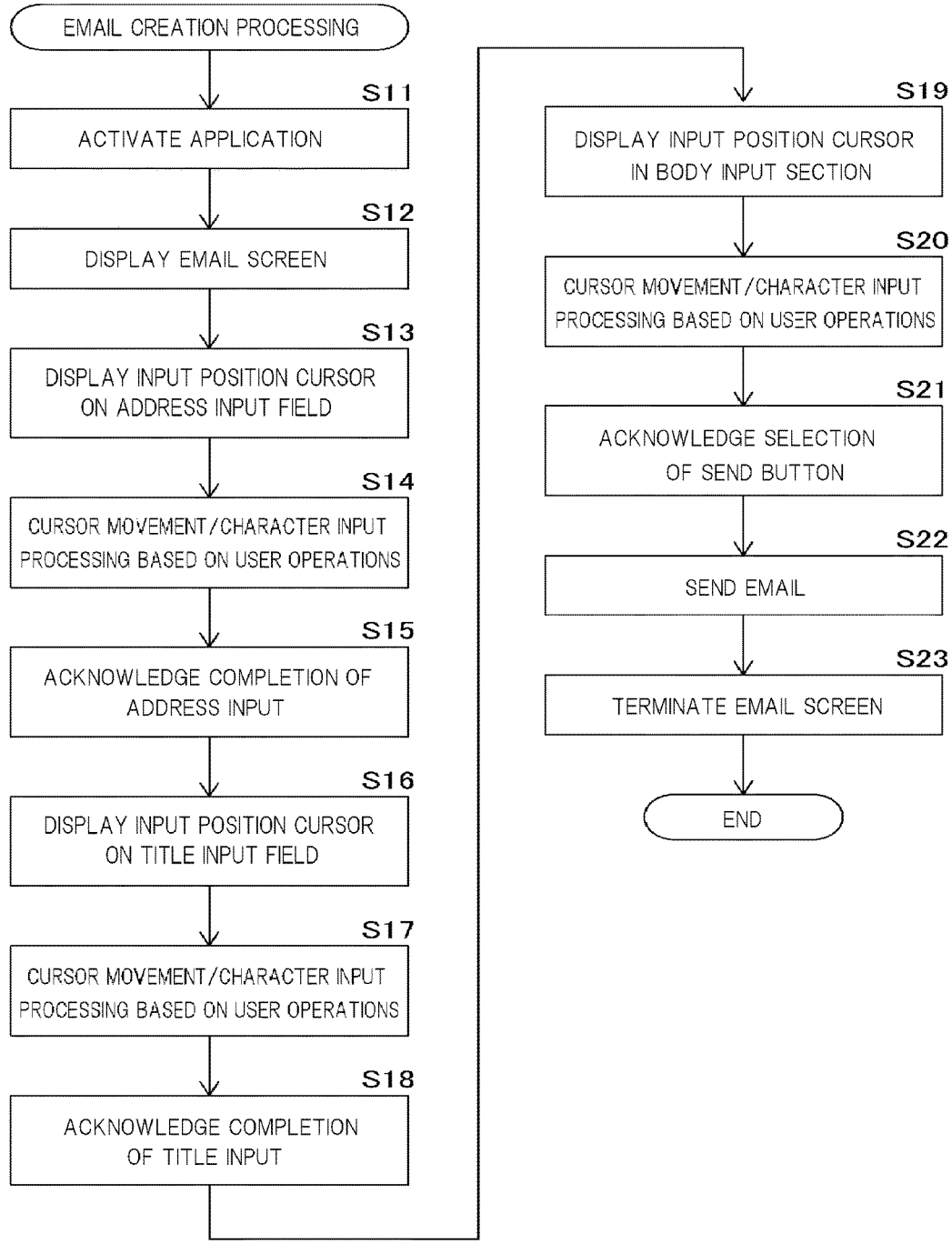
FIG. 21 is a flowchart for illustrating process procedures executed to create an email.
Figure 22:
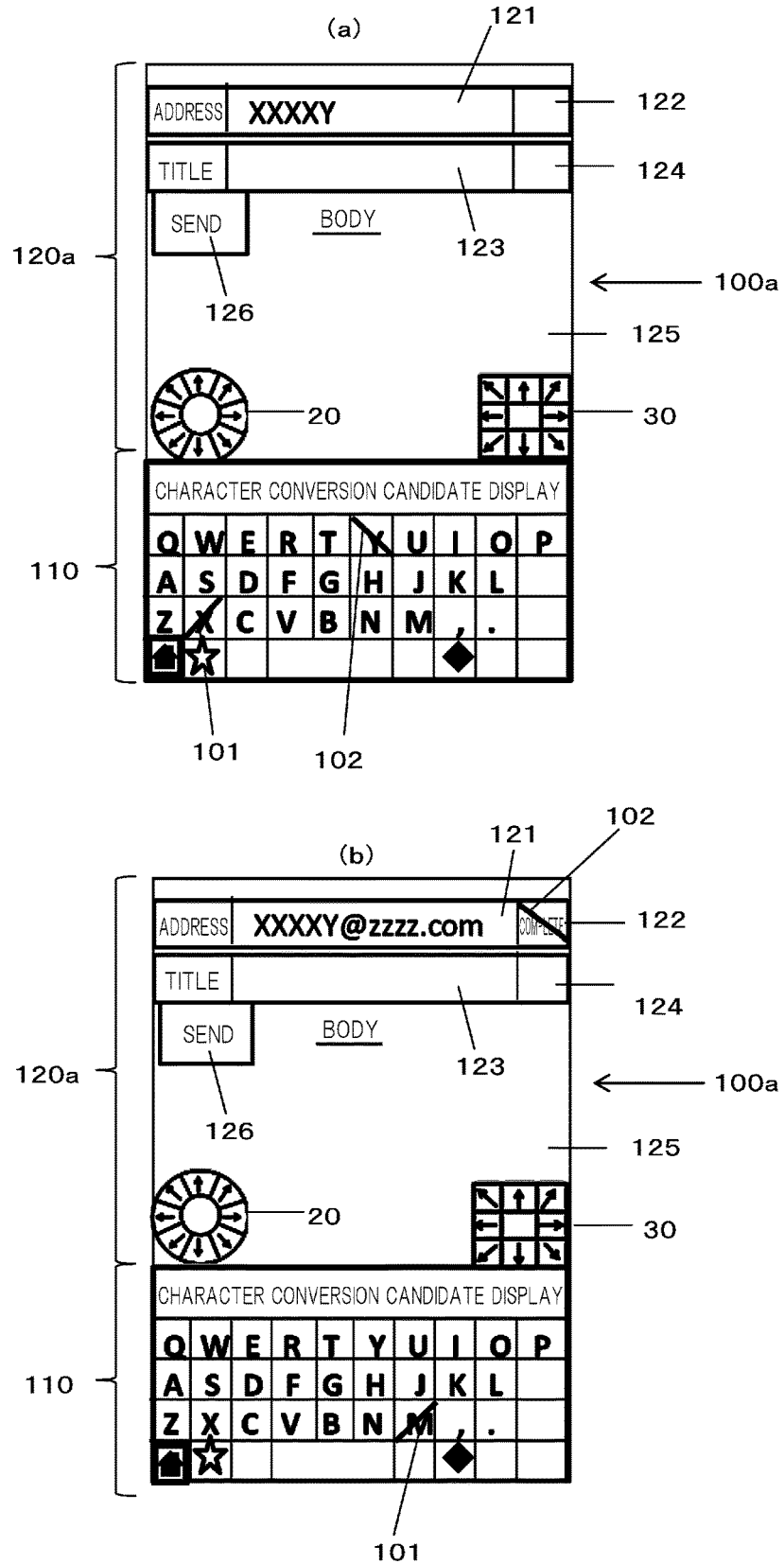
FIGS. 22(a) and (b) are views for illustrating operating procedures executed on an email send/create screen when creating an email.

Next, processing procedures executed when the user performs a character input by manipulating the first command graphic 20 and the second command graphic 30 will be described. Here, processing procedures executed to create an email will be described as a specific example. FIG. 21 is a flowchart illustrating processing procedures executed to create an email. FIGS. 22 to 24 are views illustrating manipulating procedures executed on the email send/create screen when creating an email.

First, the user selects the icon of an email application program on the application screen. Upon receipt of a signal indicating that the icon has been selected, the control means 60 activates the application program (S11). At this time, the display control means 61 of the control means 60 displays an email send/create screen 100a such as that shown in FIG. 22A, the first command graphic 20 and second command graphic 30, and the first cursor 101 and second cursor 102 on the screen of the display means 10 (S12). Here, the first command graphic 20 and the second command graphic 30 are displayed in the lower left end portion and the lower right end portion of the inputted character display screen, respectively. Further, at this time, the display control means 61 stores and manages the display region information relating to the keyboard image 110, the respective command graphics 20, 30, and the respective cursors 101, 102 in the storage means 40.

The email send/create screen 100a includes the keyboard image 110 and a message creation display screen 120a serving as the inputted character display screen. The message creation display screen 120a includes an address input field 121, an address input completion button 122, a title input field 123, a title input completion button 124, a body input section 125, and a send button 126. The address input field 121 is a field in which to input an email address of the recipient that the email will be sent to. The address input completion button 122 is a button for specifying that the input into the address input field 121 has been completed. The title input field 123 is a field in which to input the title of the email. The title input completion button 124 is a button for specifying that input into the title input field 123 has been completed. The body input section 125 is a section in which to input the body of the email. The send button 126 is a button for specifying that the email is to be transmitted. Note that in FIGS. 22 to 24, the address input completion button 122 is provided in the vicinity of the address input field 121, and the title input completion button 124 is provided in the vicinity of the title input field 123, but the respective completion buttons 122, 124 may be provided on the keyboard image 110, for example.

When the email send/create screen 100a is displayed on the screen of the display means 10 in this manner, the display control means 61 displays an input position cursor (not shown) on the address input field 121 (S13). The input position cursor indicates the field in which characters can be input and a character input position. As shown in FIG. 22(a), the user inputs the email address into the address input field 121 by manipulating the respective specifying portions of the command graphics 20, 30. To input the character "a", for example, the user manipulates the movement direction specifying portions of the first command graphic 20 so as to move the first cursor 101 to the location of the character key associated with the character "a" on the keyboard image, and then taps the selection specifying portion 22 of the first command graphic 20. At this time, the control means 60 performs cursor movement/character input processing in accordance with the content of the operation performed by the user on the command graphics 20, 30 (S14). In other words, the display control means 61 controls the movement of the first cursor 101 and the second cursor 102 based on a signal indicating that the first operation has been performed on the first command graphic 20 and a signal indicating that the third operation has been performed on the second command graphic 30, transmitted thereto from the manipulation determining means 62, and the input control means 63 controls character input, etc. based on a signal indicating that the second operation has been performed on the first command graphic 20 and a signal indicating that the fourth operation has been performed on the second command graphic 30, transmitted thereto from the manipulation determining means 62. After completing input into the address input field 121, the user selects the address input completion button 122 by moving the second cursor 102, for example, to the location of the address input completion button 122 and tapping the selection specifying portion 32 of the second command graphic 30, as shown in FIG. 22(b). When the second cursor 102 specifies the address input completion button 122, the input control means 63 receives a signal indicating that the fourth operation has been performed on the second command graphic 30 from the manipulation determining means 62, and having acknowledged that address input is complete (S15), displays the input position cursor on the title input field 123 (S16). As a result, the field in which characters can be input is switched from the address input field 121 to the title input field 123.

Next, as shown in FIG. 23(a), the user inputs a title onto the title input field 123 by manipulating the respective specifying portions of the command graphics 20, 30. At this time, the control means 60 performs cursor movement/character input processing in accordance with the content of the manipulation performed by the user on the command graphics 20, 30 (S17). After completing input onto the title input field 123, the user selects the title input completion button 124 by moving the second cursor 102, for example, to the location of the title input completion button 124 and tapping the selection specifying portion 32 of the second command graphic 30, as shown in FIG. 23(b). When the second cursor 102 specifies the title input completion button 124, the input control means 63 receives s signal indicating that the fourth operation has been performed on the second command graphic 30 from the manipulation determining means 62, and having acknowledged that the title input has been completed (S18), displays the input position cursor in the body input section 125 (S19). As a result, the field in which characters can be input is switched from the title input field 123 to the body input section 125.

Next, as shown in FIG. 24(a), the user inputs the body of the email into the body input section 125 by manipulating the respective specifying portions of the command graphics 20, 30. At this time, the control means 60 performs cursor movement/character input processing in accordance with the content of the manipulations performed by the user on the command graphics 20, 30 (S20). After completing the input into the body input section 125, the user selects the send button 126 by moving the first cursor 101, for example, to the location of the send button 126 and tapping the selection specifying portion 22 of the first command graphic 20, as shown in FIG. 24(b). When the first cursor 101 specifies the send button 126, the input control means 63 receives a signal indicating that the second operation has been performed on the first command graphic 20 from the manipulation determining means 62, and having acknowledged that the send button has been selected (S21), performs the processing to send the email (S22). The input control means 63 then terminates the email send/create screen 100a (S23) and displays a predetermined screen other than the character input screen. At this time, the command graphics 20, 30 and the cursors 101, 102 are also terminated.

Figure 25:
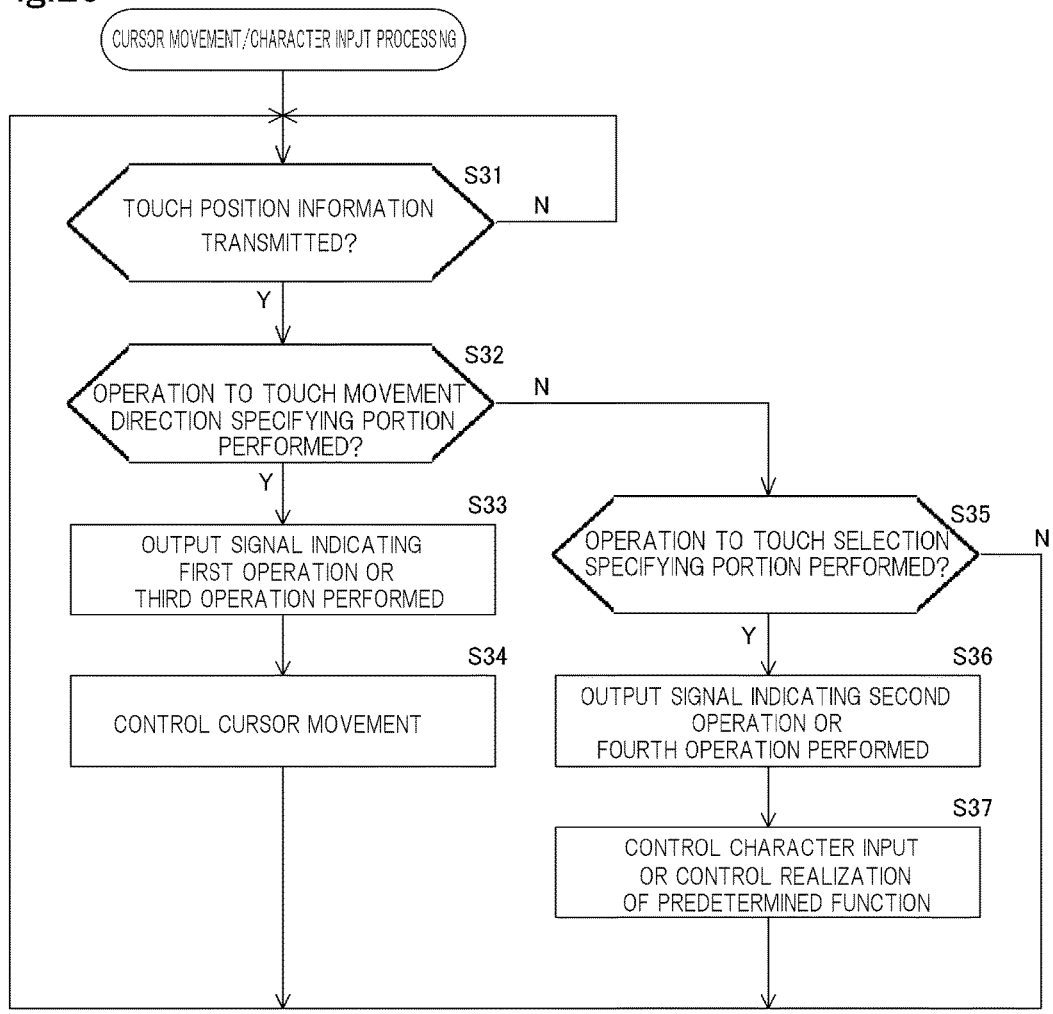
FIG. 25 is a flowchart for illustrating procedures executed by a control means during cursor movement/character input processing.

Next, procedures executed by the control means 60 during cursor movement/character input processing will be described. FIG. 25 is a flowchart illustrating the procedures executed by the control means 60 during the cursor movement/character input processing. Here, a case in which the user performs character input by manipulating the first command graphic 20 and the second command graphic 30 will be considered.

First, the manipulation determining means 62 determines whether or not the touch position information has been transmitted thereto from the position detection means 71 of the touch screen 70 (S31). After determining that the touch position information has not been transmitted, the manipulation determining means 62 determines whether or not a fixed time period (the inoperative time period) has elapsed following the most recent manipulation of the first command graphic 20, and whether or not a fixed time period (the inoperative time period) has elapsed following the most recent manipulation of the second command graphic 30. After determining that the fixed time period (the inoperative time period) has elapsed following the most recent manipulation of the command graphic, the manipulation determining means 62 outputs a signal indicating this to the cursor display control means 61b, whereupon the cursor display control means 61b returns the corresponding cursor to its reference position based on this signal. The processing then advances to step S31. On the other hand, after determining in the processing of step S31 that the touch position information has been transmitted thereto, the manipulation determining means 62 determines, based on the command graphic display region information stored in the storage means 40, whether or not a touch operation has been performed on a movement direction specifying portion of the first command graphic 20 or on a movement direction specifying portion of the second command graphic 30 (S32).

After determining that a touch operation has been performed on a movement direction specifying portion of the first command graphic 20, the manipulation determining means 62 outputs a signal indicating that the first operation has been performed on the first command graphic 20 to the cursor display control means 61b for the duration of the operation, and after determining that a touch operation has been performed on a movement direction specifying portion of the second command graphic 30, the manipulation determining means 62 outputs a signal indicating that the third operation has been performed on the second command graphic 30 to the cursor display control means 61b for the duration of the operation (S33). The cursor display control means 61b controls movement of the first cursor 101 or the second cursor 102 based on these signals (S34). More specifically, when the signal indicating that the first operation has been performed on the first command graphic 20 is transmitted thereto, the cursor display control means 61b controls the movement of the first cursor 101 across the character input screen 100 so that the first cursor 101 moves in the movement direction specified by the movement direction specifying portion subjected to the first operation for as long as the signal is transmitted. Similarly, when the signal indicating that the third operation has been performed on the second command graphic 30 is transmitted thereto, the cursor display control means 61b controls the movement of the second cursor 102 across the character input screen 100 so that the second cursor 102 moves in the movement direction specified by the movement direction specifying portion subjected to the third operation for as long as the signal is transmitted. Furthermore, after determining based on a signal from the manipulation determining means 62 that the operation for returning the cursors to their respective reference positions has been performed using the command graphics 20, 30, the cursor display control means 61b returns the corresponding cursor to its reference position.

When, on the other hand, the determination made during the processing of step S32 is negative, the manipulation determining means 62 determines whether or not a touch operation has been performed on the selection specifying portion 22 of the first command graphic 20 or on the selection specifying portion 32 of the second command graphic 30 (S35). After determining that a touch operation has been performed on the selection specifying portion 22 of the first command graphic 20, the manipulation determining means 62 outputs a signal indicating that the second operation has been performed on the first command graphic 20 to the input control means 63, and after determining that a touch operation has been performed on the selection specifying portion 32 of the second command graphic 30, the manipulation determining means 62 outputs a signal indicating that the fourth operation has been performed on the second command graphic 30 to the input control means 63 (S36). The input control means 63 then controls character input and executes a process for implementing predetermined functions based on these signals (S37).

More specifically, when the signal indicating that the second operation has been performed on the first command graphic 20 is transmitted from the manipulation determining means 62 and the first cursor 101 is currently indicating a character key, the input control means 63 displays the character associated with the character key in the position currently indicated by the input position cursor; when the signal indicating that the fourth operation has been performed on the second command graphic 30 is transmitted and the second cursor 102 is currently indicating a character key, the input control means 63 displays the character associated with the character key in the position currently indicated by the input position cursor.

Further, when the signal indicating that the second operation has been performed on the first command graphic 20 is transmitted from the manipulation determining means 62 and the first cursor 101 is currently indicating a function key, the input control means 63 executes a process for implementing the function assigned to that function key; when the signal indicating that the fourth operation has been performed on the second command graphic 30 is transmitted and the second cursor 102 is currently indicating a function key, the input control means 63 executes a process for implementing the function assigned to that function key. For example, when the function key is the space key and (a) pending inputted character(s) is (are) located in the position indicated by the input position cursor, the input control means 63 converts the pending inputted character(s) and displays the converted character(s) in the character conversion candidate display portion 115. Here, the pending inputted character(s) is (are) underlined, for example. Furthermore, when the function key is the Enter key and a pending inputted character(s) is (are) located in the position indicated by the input position cursor, the input control means 63 confirms the pending inputted character(s) as the character(s) displayed in the character conversion candidate display portion 115.

Moreover, when the signal indicating that the second operation has been performed on the first command graphic 20 and the signal indicating that the fourth operation has been performed on the second command graphic 30 are transmitted from the manipulation determining means 62 simultaneously and (a) pending inputted character(s) is (are) located in the position indicated by the input position cursor, the input control means 63 converts the pending inputted character(s) and displays the converted character(s) in the character conversion candidate display portion 115. Further, when the signal indicating that the second operation has been performed on the first command graphic 20 or the signal indicating that the fourth operation has been performed on the second command graphic 30 is transmitted from the manipulation determining means 62 twice in succession, or when the signal indicating that the second operation has been performed on the first command graphic 20 and the signal indicating that the fourth operation has been performed on the second command graphic 30 are transmitted from the manipulation determining means 62 simultaneously twice in succession, and (a) pending inputted character(s) is (are) located in the position indicated by the input position cursor, the input control means 63 confirms the pending inputted character(s) as the character(s) displayed in the character conversion candidate display portion 115.

In the portable computing device according to the first embodiment, the first cursor and the second cursor are displayed on the character input screen, while the first command graphic for specifying the movement direction of the first cursor, etc. and the second command graphic for specifying the movement direction of the second cursor, etc. are respectively displayed on the screen of the display means. The first command graphic and the second command graphic can be displayed anywhere on the screen of the display means. More specifically, when an instruction to modify the display position, size or shape with regard to the display region of the first command graphic or the display region of the second command graphic is issued, the command graphic display control means modifies the display region of the corresponding command graphic on the screen of the display means in accordance with the content of the instruction. Hence, the user can modify the display region of the first command graphic and the display region of the second command graphic to positions, sizes, and shapes facilitating operation thereof whenever he/she wants, and as a result, the character input operation can be improved in user-friendliness. Furthermore, in this embodiment, because mechanical specifying buttons used in conventional mobile phones to operate a cursor need not be provided on the periphery of the display screen, the portable computing device can be reduced in size.

Moreover, in the portable computing device according to the first embodiment, when the first command graphic and the second command graphic are displayed in the predetermined regions on the screen of the display means in the vicinity of respective edge portions of the portable computing device, the user grips the edge portion of the portable computing device near the display region of the first command graphic and the edge portion of the portable computing device near the display region of the second command graphic with each hand during character input, and therefore the portable computing device can be stably held in both hands. Further, the user can manipulate the respective specifying portions of the first command graphic and the respective specifying portions of the second command graphic using the respective thumbs or the like of his/her hands while holding the portable computing device with both hands in the manner described above, and therefore an input operation can be performed quickly and accurately. The user can also select a desired function key image quickly by operating the respective specifying portions of the first command graphic and the respective specifying portions of the second command graphic using the respective thumbs or the like of his/her hands while holding the portable computing device with both hands.

Further, in the portable computing device according to the first embodiment, the first cursor and the second cursor differ from each other in terms of at least one element selected from the shape, the color, and the lines and designs drawn inside the cursors. Hence, the user can easily determine the command graphics, from among the first command graphic and the second command graphic, to which the cursors displayed on the character input screen respectively correspond, based on these differing elements.

Moreover, in the portable computing device according to the first embodiment, the cursor display control means can move the first cursor and the second cursor in key units when controlling movement of the cursors across the keyboard image. Hence, the user can easily and accurately perform manipulations to move the respective cursors across the keyboard image to the locations of desired keys, and as a result, manipulation errors can be reduced.

Furthermore, in the portable computing device according to the first embodiment, when a manipulation is performed to return the cursors to their respective reference positions using the respective command graphics or when no manipulations are performed on the first command graphic or the second command graphic for a preset fixed time period, the corresponding cursor can be returned to its reference position. In the first embodiment, therefore, the user can locate the positions of the respective cursors easily and quickly by returning the cursors to their respective reference positions. Moreover, the distances of the movement of the respective cursors from the reference positions to desired key images can be shortened, and therefore character input can be performed efficiently.

Figure 26:
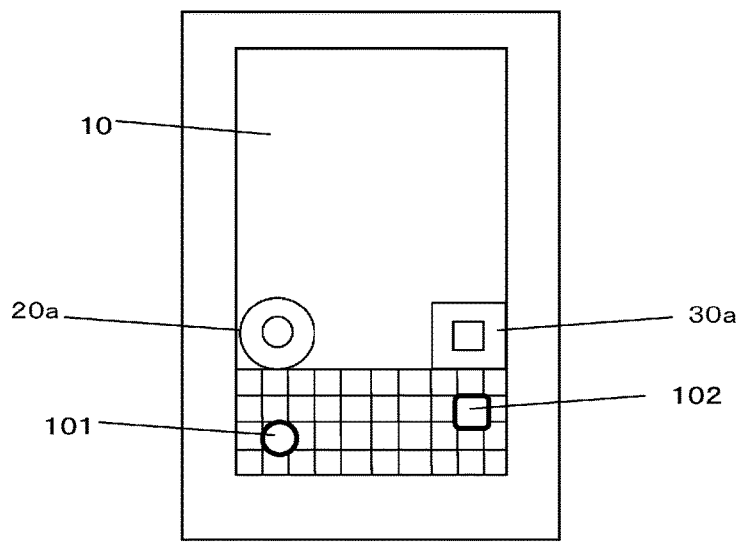
FIG. 26 is a schematic front view showing a portable computing device, which is a modified example of the first embodiment.
Figure 27:
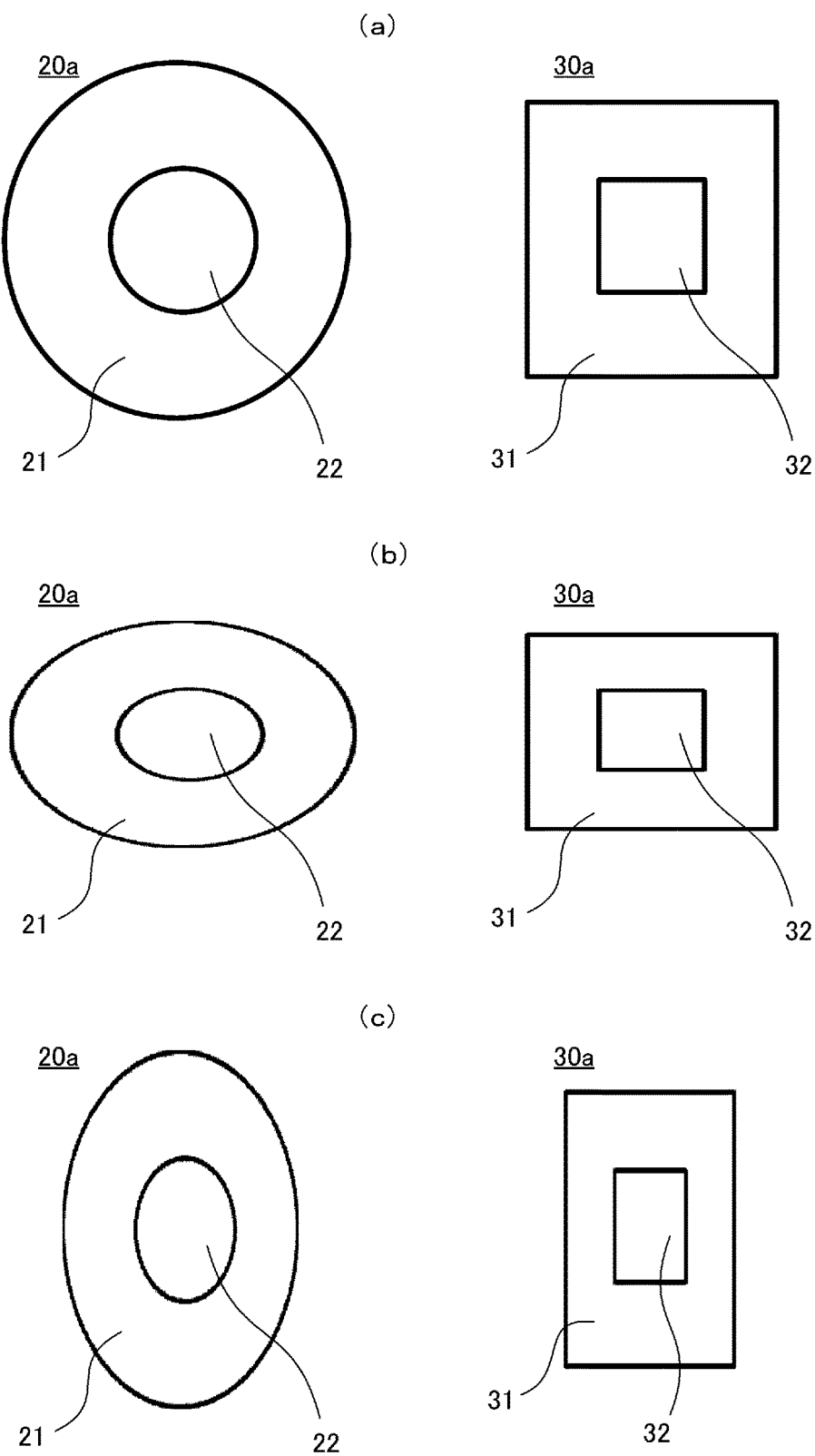
FIGS. 27(a)-(c) are views for illustrating examples of a first command graphic and a second command graphic according to the modified example.

Incidentally, in the first embodiment, a case in which the first command graphic and the second command graphic each include eight movement direction specifying portions and a selection specifying portion provided in the center of the movement direction specifying portions was described, but the first command graphic and the second command graphic may each include a single annular movement direction specifying portion and a selection specifying portion provided in the center of the movement direction specifying portion. FIG. 26 is a schematic front view showing a portable computing device according to a modified example of the first embodiment, and FIG. 27 is a view illustrating examples of a first command graphic 20a and a second command graphic 30a according to the modified example. In this modified example, as shown in FIGS. 26 and 27(a), the first command graphic 20a includes a circular ring-shaped movement direction specifying portion 21 and the selection specifying portion 22 provided in the center of the movement direction specifying portion 21, while the second command graphic 30a includes a square ring-shaped movement direction specifying portion 31 and the selection specifying portion 32 provided in the center of the movement direction specifying portion 31. In other words, the movement direction specifying portion 21 of the first command graphic 20a according to the modified example is obtained by eliminating the divisions between the eight movement direction specifying portions of the first command graphic 20 according to the first embodiment, and the movement direction specifying portion 31 of the second command graphic 30a according to the modified example is obtained by eliminating the divisions between the eight movement direction specifying portions of the second command graphic 30 according to the first embodiment. The selection specifying portions 22, 32 according to the modified example have identical roles to the first embodiment.

Note that the overall shapes of the first command graphic 20a and the second command graphic 30a are not limited to circles, squares, or the like. For example, the overall shapes of the first command graphic 20a and the second command graphic 30a may be set as a laterally-oblong ellipse and a laterally-oblong rectangle, as shown in FIG. 27(b), or as a vertically-oblong ellipse and a vertically-oblong rectangle, as shown in FIG. 27(c).

In this case, the control means controls the movement of the respective cursors as follows. The storage means stores first command graphic display region information (including position information, shape information, size information, color information, etc.) for displaying the movement direction specifying portion 21 and the selection specifying portion 22 of the first command graphic 20a in a predetermined display region on the screen of the display means 10, and second command graphic display region information (including position information, shape information, size information, color information, etc.) for displaying the movement direction specifying portion 31 and the selection specifying portion 32 of the second command graphic 30a in a predetermined display region on the screen of the display means 10. When the touch position information is transmitted to the manipulation determining means of the control means from the position detection means of the touch screen, the manipulation determining means determines, based on the command graphic display region information (the first command graphic display region information and second command graphic display region information) stored in the storage means, whether or not the first operation for specifying the movement direction of the first cursor 101 has been performed on the first command graphic 20a, and whether or not the third operation for specifying the movement direction of the second cursor 102 has been performed on the second command graphic 30a. Here, the first operation is performed by touching (tapping or pressing and holding, for example) the movement direction specifying portion 21 of the first command graphic 20a, and the third operation is performed by touching (tapping or pressing and holding, for example) the movement direction specifying portion 31 of the second command graphic 30a. After determining that the first operation has been performed on the first command graphic 20a, the manipulation determining means outputs a signal indicating that the first operation has been performed on the first command graphic 20a and a signal specifying a direction heading from a center position of the first command graphic 20a toward the touched position (i.e. the direction specified by the first operation) to the cursor display control means for the duration of the first operation, and after determining that the third operation has been performed on the second command graphic 30a, the manipulation determining means outputs a signal indicating that the third operation has been performed on the second command graphic 30a and a signal specifying a direction heading from a center position of the second command graphic 30a toward the touched position (i.e. the direction specified by the third operation) to the cursor display control means for the duration of the third operation. When the signal indicating that the first operation has been performed on the first command graphic 20a is transmitted from the manipulation determining means, the cursor display control means controls movement of the first cursor 101 across the character input screen so that the first cursor 101 moves in the direction indicated by the movement direction specifying signal transmitted together with the signal indicating that the first operation has been performed for as long as the signal is transmitted; when the signal indicating that the third operation has been performed on the second command graphic 30a is transmitted from the manipulation determining means, the cursor display control means controls movement of the second cursor 102 across the character input screen so that the second cursor 102 moves in the direction indicated by the movement direction specifying signal transmitted together with the signal indicating that the third operation has been performed for as long as the signal is transmitted. Note that likewise when the command graphics according to this modified example are used, the cursors can be returned to their respective reference positions by manipulating the respective command graphics in a similar manner to the command graphics of the first embodiment described above, for example.

In this modified example, when the user taps the movement direction specifying portion of the first command graphic, for example, in a desired position, the first cursor moves across the character input screen in parallel with a direction heading from the center position of the first command graphic toward the tapped position. Similarly, when the user taps the movement direction specifying portion of the second command graphic in a desired position, the second cursor moves across the character input screen in parallel with a direction heading from the center position of the second command graphic toward the tapped position. Hence, in the portable computing device according to the modified example, because the movement directions of the respective cursors are not limited to eight directions, in comparison with the first embodiment described above, the user can move the cursors in a desired direction more exactly.

Second Embodiment

Figure 28:
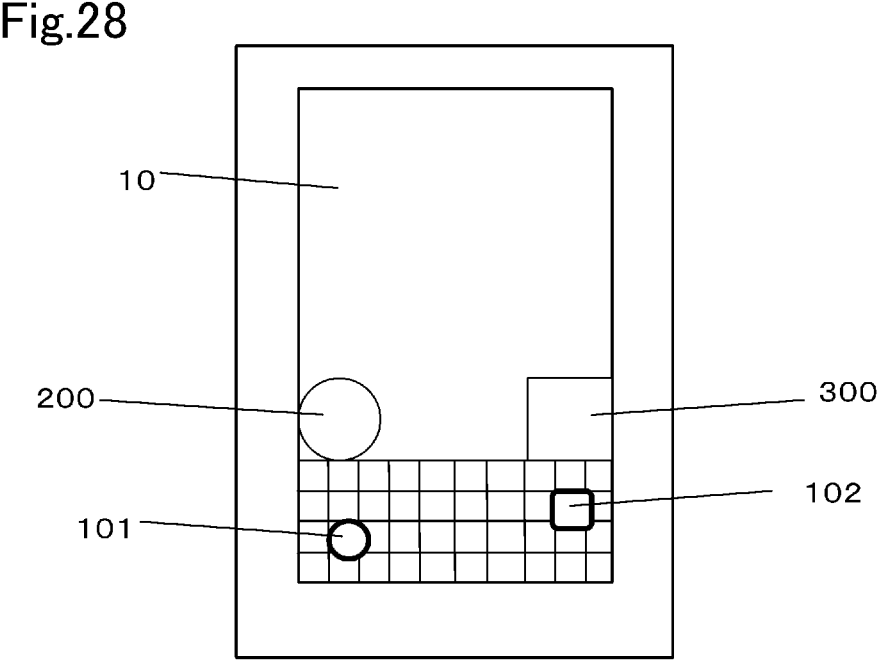
FIG. 28 is a schematic front view showing a portable computing device, which is a second embodiment of the present invention.

Next, a second embodiment of the present invention will be described with reference to the drawings. FIG. 28 is a schematic front view of a portable computing device according to the second embodiment of the present invention. The schematic block diagram of the portable computing device according to the second embodiment is identical to FIG. 2. Here, therefore, FIG. 2 will be used as the schematic block diagram of the portable computing device according to the second embodiment. Note that in the second embodiment, components having identical functions to the first embodiment have been assigned identical reference symbols, and a detailed description thereof has been omitted.

As shown in FIGS. 2 and 28, the portable computing device of the second embodiment includes the display means 10, the plurality of operation buttons (not shown), the storage means 40, the communication means 50, the control means 60, and the touch screen 70. Further, the control means 60 includes the display control means 61, the manipulation determining means 62, and the input control means 63, and the display control means 61 includes the command graphic display control means 61a, the cursor display control means 61b, and the keyboard image display control means 61c.

A main difference between the portable computing device of the second embodiment and that of the first embodiment is that the first command graphic and the second command graphic displayed on the screen of the display means 10 are respectively constituted by simple closed curves. Here, a closed curve is a continuous curve having aligned ends, where the curve includes a line segment. Circles, ellipses, rectangles, etc. are representative examples of closed curves. FIG. 29 is a view illustrating examples of a first command graphic 200 and a second command graphic 300 according to the second embodiment. In the second embodiment, as shown in FIGS. 28 and 29(*a*), the first command graphic 200 is constituted by a closed curve representing a circle, and the second command graphic 300 is constituted by a closed curve representing a square. Likewise in a case where the first command graphic 200 and the second command graphic 300 are respectively constituted by simple closed curves instead of being provided with (a) movement direction specifying portion(s) and a selection specifying portion, the first command graphic 200 is used for specifying the direction of movement of the first cursor 101 and for specifying the selection of the key currently indicated by the first cursor 101 on the keyboard image, while the second command graphic 300 is used for specifying the direction of movement of the second cursor 102 and for specifying the selection of the key currently indicated by the second cursor 102 on the keyboard image.

Note that the shapes of the first command graphic 200 and the second command graphic 300 are not limited to circles, squares, and the like. For example, the first command graphic 200 and the second command graphic 300 may be respectively constituted by a closed curve representing a laterally-oblong ellipse and a closed curve representing a laterally-oblong rectangle, as shown in FIG. 29(*b*), or respectively constituted by a closed curve representing a vertically-oblong ellipse and a closed curve representing a vertically-oblong rectangle, as shown in FIG. 29(*c*).

In the second embodiment, the control means 60 controls the movement of the respective cursors and the character input as follows. The storage means 40 stores first command graphic display region information (including position information, shape information, size information, etc.) for displaying the first command graphic 200 in a predetermined display region on the screen of the display means 10, and second command graphic display region information (including position information, shape information, size information, etc.) for displaying the second command graphic 300 in a predetermined display region on the screen of the display means 10. When the touch position information is transmitted from the position detection means 71 of the touch screen 70, the manipulation determining means 62 determines, based on the touch position information and the command graphic display region information (the first command graphic display region information and second command graphic display region information) stored in the storage means 40, whether or not a manipulation that flicks the first command graphic 200 (a manipulation that strikes the touch screen in a swiping motion using a finger) has been performed on the first command graphic 200 as the first operation, whether or not a manipulation that taps the first command graphic 200 (a manipulation that strikes the screen gently with a finger) has been performed on the first command graphic 200 as the second operation, whether or not a manipulation that flicks the second command graphic 300 has been performed on the second command graphic 300 as the third operation, and whether or not a manipulation that taps the second command graphic 300 has been performed on the second command graphic 300 as the fourth operation. After determining that a flick manipulation has been performed on the first command graphic 200, the manipulation determining means 62 outputs a signal indicating that the first operation has been performed on the first command graphic 200 to the cursor display control means 61b, and after determining that a flick manipulation has been performed on the second command graphic 300, the manipulation determining means 62 outputs a signal indicating that the third operation has been performed on the second command graphic 300 to the cursor display control means 61b. On the other hand, after determining that a tapping manipulation has been performed on the first command graphic 200, the manipulation determining means 62 outputs a signal indicating that the second operation has been performed on the first command graphic 200 to the input control means 63, and after determining that a tapping manipulation has been performed on the second command graphic 300, the manipulation determining means 62 outputs a signal indicating that the fourth operation has been performed on the second command graphic 300 to the input control means 63.

When the signal indicating that the first operation has been performed on the first command graphic 200 is transmitted from the manipulation determining means 62, the cursor display control means 61b controls the movement of the first cursor 101 across the character input screen so that the first cursor 101 moves in the direction specified by the first operation (the flick manipulation); when the signal indicating that the third operation has been performed on the second command graphic 300 is transmitted from the manipulation determining means 62, the cursor display control means 61b controls the movement of the second cursor 102 across the character input screen so that the second cursor 102 moves in the direction specified by the third operation (the flick manipulation). Therefore, when the user flicks the interior of the closed curve representing the command graphic, the cursor corresponding to the flicked command graphic moves in the direction of the flick. Here, the cursor display control means 61b preferably moves the cursor by a distance corresponding to a distance by which the finger moves during the flick manipulation. Hence, when the finger moves by a large distance during the flick manipulation, the cursor also moves by a large distance. The distance moved by the cursor in accordance with the distance moved by the finger during the flick manipulation may be adjusted using a predetermined setup screen.

Note that the cursor display control means 61b may also control the movement of the cursor so that when the user drags the command graphic, the cursor corresponding to the command graphic moves in the dragging direction. In this case, when the touch position information is transmitted from the position detection means 71 of the touch screen 70, the manipulation determining means 62 determines, based on the touch position information and the command graphic display region information stored in the storage means 40, whether or not a drag manipulation has been performed on the first command graphic 200 and whether or not a drag manipulation has been performed on the second command graphic 300. After determining that a drag manipulation has been performed on the first command graphic 200, the manipulation determining means 62 outputs a signal indicating that the first operation has been performed on the first command graphic 200 to the cursor display control means 61b, and after determining that a drag manipulation has been performed on the second command graphic 300, the manipulation determining means 62 outputs a signal indicating that the third operation has been performed on the second command graphic 300 to the cursor display control means 61b. When the signal indicating that the first operation has been performed on the first command graphic 200 is transmitted from the manipulation determining means 62, the cursor display control means 61b controls the movement of the first cursor 101 across the character input screen so that the first cursor 101 moves in the direction specified by the first operation (the drag manipulation); when the signal indicating that the third operation has been performed on the second command graphic 300 is transmitted from the manipulation determining means 62, the cursor display control means 61b controls the movement of the second cursor 102 across the character input screen so that the second cursor 102 moves in the direction specified by the third operation (the drag manipulation). Hence, the cursors can be moved by either a flick manipulation or a drag manipulation. When the cursors are moved by a flick manipulation, the cursors can be moved quickly, and when the cursors are moved by a drag manipulation, the cursors can be moved to desired positions accurately. Note that the cursors may be moved by a drag manipulation alone.

When the signal indicating that the second operation (the tapping manipulation) has been performed on the first command graphic 200 is transmitted from the manipulation determining means 62, in case the first cursor 101 is currently indicating a character key, the input control means 63 performs control to input the character associated with the character key; on the other hand, in case the first cursor 101 is currently indicating a function key, the input control means 63 executes a process for implementing the function assigned to that function key. Further, when the signal indicating that the fourth operation (the tapping manipulation) has been performed on the second command graphic 300 is transmitted from the manipulation determining means 62, in case the second cursor 102 is currently indicating a character key, the input control means 63 performs control to input the character associated with the character key; on the other hand, in case the second cursor 102 is currently indicating a function key, the input control means 63 executes a process for implementing the function assigned to that function key. Hence, when the user taps the interior of the closed curve representing the command graphic, the key currently indicated by the cursor corresponding to the tapped command graphic is selected, whereupon processing such as character input is performed in relation thereto. Note that the number of tapping operations required to select the key may be set at one, two, etc. using a predetermined setup screen.

Furthermore, similarly to the first embodiment, when the first command graphic 200 and the second command graphic 300 are tapped once simultaneously (when the second operation and the fourth operation are performed simultaneously), the input control means 63 converts inputted characters, and when one of the first command graphic 200 and the second command graphic 300 is tapped twice in succession (when the second operation or the fourth operation is performed twice in succession) or the first command graphic 200 and the second command graphic 300 are tapped simultaneously twice in succession (when the second operation and the fourth operation are performed simultaneously twice in succession), the input control means 63 confirms the converted inputted character(s). Note that the operations for converting and confirming the inputted character(s) are not limited to the operations described above. For example, the input control means 63 may convert the inputted character(s) when one of the first command graphic 200 and the second command graphic 300 is tapped twice in succession, and confirm the converted the inputted character(s) when the first command graphic 200 and the second command graphic 300 are tapped once simultaneously. Further, various commands can typically be set in accordance with combinations in which the first command graphic 200 and the second command graphic 300 are tapped, etc.

In the portable computing device according to the second embodiment, the display positions and sizes of the respective command graphics can be modified easily as follows. For example, when the user presses and holds a command graphic for at least a fixed time period and then drags the command graphic, the command graphic moves in the dragging direction. More specifically, when the touch position information is transmitted from the position detection means 71 of the touch screen 70, the manipulation determining means 62 determines, based on the touch position information and the command graphic display region information stored in the storage means 40, whether or not a manipulation has been performed to press and hold the first command graphic 200 or the second command graphic 300 for at least the fixed time period and then to drag the command graphic. After determining that a manipulation has been performed to press and hold the first command graphic 200 or the second command graphic 300 for at least the fixed time period and then to drag the command graphic, the manipulation determining means 62 outputs a signal, which indicates that a manipulation has been performed to drag the command graphic in the dragging direction after pressing and holding the command graphic, to the command graphic display control means 61a. When the signal indicating that a manipulation has been performed to drag the first command graphic 200 or the second command graphic 300 in a predetermined direction after pressing and holding the command graphic is transmitted from the manipulation determining means 62, the command graphic display control means 61a controls the display position of the command graphic on the screen of the display means 10 so that the display position of the command graphic moves in the predetermined direction. Hence, the user can easily modify the display positions of the respective command graphics on the screen of the display means 10 at any time by combining a press and hold manipulation applied for at least the fixed time period with a drag manipulation. Note that the entire screen does not scroll when the display region of the command graphic is dragged or flicked. In other words, the display regions of the command graphics are independent of other display parts on the screen of the display means 10.

Further, for example, when the user performs a pinch-in operation (a manipulation in which the screen is pressed by two fingers and the gap between the two fingers is narrowed) on a command graphic, the overall size of the command graphic is reduced, and when the user performs a pinch-out operation (a manipulation in which the screen is pressed by two fingers and the gap between the two fingers is widened) on a command graphic, the overall size of the command graphic is increased. More specifically, when the touch position information is transmitted from the position detection means 71 of the touch screen 70, the manipulation determining means 62 determines, based on the touch position information and the command graphic display region information stored in the storage means 40, whether or not a pinch-in operation or a pinch-out operation has been performed on the first command graphic 200 or the second command graphic 300. After determining that the pinch-in operation has been performed on the first command graphic 200 or the second command graphic 300, the manipulation determining means 62 outputs a signal, which indicates that the pinch-in operation has been performed on the command graphic, to the command graphic display control means 61a, and after determining that the pinch-out operation has been performed on the first command graphic 200 or the second command graphic 300, the manipulation determining means 62 outputs a signal, which indicates that the pinch-out operation has been performed on the command graphic, to the command graphic display control means 61a. When the signal indicating that the pinch-in operation has been performed on the first command graphic 200 or the second command graphic 300 is transmitted from the manipulation determining means 62, the command graphic display control means 61a reduces the size of the corresponding command graphic on the screen of the display means 10, and when the signal indicating that the pinch-out operation has been performed on the first command graphic 200 or the second command graphic 300 is transmitted from the manipulation determining means 62, the command graphic display control means 61a increases the size of the corresponding command graphic on the screen of the display means 10. As a result, the user can easily modify the sizes of the respective display regions of the first command graphic 200 and the second command graphic 300 at any time.

It is also possible to set the following operation content as an operation for varying the shape and size of the command graphics. For example, when an upper edge and a lower edge of the command graphic are pressed and pinched in by each finger, the shape of the command graphic contracts in the up-down direction, and when the right edge and the left edge of the command graphic are pressed and pinched in by each finger, the shape of the command graphic contracts in the left-right direction. When the upper edge and the lower edge of the command graphic are pressed and pinched out by each finger, the shape of the command graphic expands in the up-down direction, and when the right edge and the left edge of the command graphic are pressed and pinched out by each finger, the shape of the command graphic expands in the left-right direction. Further, when a diagonal line in the interior of the command graphic is pressed and pinched in by two fingers, the command graphic becomes smaller while remaining in the same shape, and when a diagonal line in the interior of the command graphic is pressed and pinched out by two fingers, the command graphic becomes larger while remaining in the same shape.

Furthermore, in the portable computing device of the second embodiment, the display position and the size of the keyboard image can be modified as follows. For example, when the user presses and holds the keyboard image for at least a fixed time period and then drags the keyboard image, the keyboard image moves in the dragging direction. More specifically, when the touch position information is transmitted from the position detection means 71 of the touch screen 70, the manipulation determining means 62 determines, based on the touch position information and the keyboard image display region information stored in the storage means 40, whether or not a manipulation has been performed to press and hold the keyboard image for at least the fixed time period and then to drag the keyboard image. After determining that a manipulation to press and hold the keyboard image for at least the fixed time period and then to drag the keyboard image has been performed, the manipulation determining means 62 outputs a signal, which indicates that a manipulation has been performed to drag the keyboard image in the dragging direction after pressing and holding the keyboard image, to the keyboard image display control means 61c. When the signal indicating that a manipulation has been performed to drag the keyboard image in a predetermined direction after pressing and holding the keyboard image is transmitted from the manipulation determining means 62, the keyboard image display control means 61c controls the display position of the keyboard image on the screen of the display means 10 so that the display position of the keyboard image moves in the predetermined direction. Hence, the user can easily modify the display position of the keyboard image on the screen of the display means 10 at any time by combining a press and hold manipulation applied for at least a fixed time period with a drag manipulation. Note that the entire screen does not scroll when the display region of the keyboard image is dragged or flicked. In other words, the display region of the keyboard image is independent of the other display parts on the screen of the display means 10.

Further, for example, when the user performs a pinch-in operation on the keyboard image, the overall size of the keyboard image is reduced, and when the user performs a pinch-out operation on the keyboard image, the overall size of the keyboard image is increased. More specifically, when the touch position information is transmitted from the position detection means 71 of the touch screen 70, the manipulation determining means 62 determines, based on the touch position information and the keyboard image display region information stored in the storage means 40, whether or not a pinch-in operation or a pinch-out operation has been performed on the keyboard image. After determining that the pinch-in operation has been performed on the keyboard image, the manipulation determining means 62 outputs a signal, which indicates that the pinch-in operation has been performed on the keyboard image, to the keyboard image display control means 61c, and after determining that the pinch-out operation has been performed on the keyboard image, the manipulation determining means 62 outputs a signal, which indicates that the pinch-out operation has been performed on the keyboard image, to the keyboard image display control means 61c. When the signal indicating that the pinch-in operation has been performed on the keyboard image is transmitted from the manipulation determining means 62, the keyboard image display control means 61c reduces the size of the keyboard image on the screen of the display means 10, and when the signal indicating that the pinch-out operation has been performed on the keyboard image is transmitted from the manipulation determining means 62, the keyboard image display control means 61c increases the size of the keyboard image on the screen of the display means 10. As a result, the user can easily modify the size of the display region of the keyboard image at any time.

It is also possible to set the following operation content as an operation for varying the shape and size of the keyboard image. That is, when an upper edge and a lower edge of the keyboard image are pressed and pinched in by each finger, the shape of the keyboard image contracts in the up-down direction, and when the right edge and the left edge of the keyboard image are pressed and pinched in by each finger, the shape of the keyboard image contracts in the left-right direction. When the upper edge and the lower edge of the keyboard image are pressed and pinched out by each finger, the shape of the keyboard image expands in the up-down direction, and when the right edge and the left edge of the keyboard image are pressed and pinched out by each finger, the shape of the keyboard image expands in the left-right direction. Further, when a diagonal line in the interior of the keyboard image is pressed and pinched in by two fingers, the keyboard image becomes smaller while remaining in the same shape, and when a diagonal line in the interior of the keyboard image is pressed and pinched out by two fingers, the keyboard image becomes larger while remaining in the same shape.

The method of holding the portable computing device according to the second embodiment during a character input operation, the processing procedures performed during character input, etc. are similar to those of the first embodiment.

The portable computing device of the second embodiment also achieves similar functions and effects as the portable computing device of the first embodiment. That is, in the portable computing device of the second embodiment, the first cursor and the second cursor are displayed on the character input screen, while the first command graphic for specifying the direction of movement of the first cursor and for specifying the selection of the character key image currently indicated by the first cursor on the keyboard image, and the second command graphic for specifying the direction of movement of the second cursor and for specifying selection of the character key image currently indicated by the second cursor on the keyboard image are respectively displayed on the screen of the display means. The first command graphic and the second command graphic can be displayed anywhere on the screen of the display means, and therefore the first command graphic and the second command graphic can be disposed in positions enabling easy manipulation by the user. As a result, the character input operation can be improved in user-friendliness. Furthermore, mechanical specifying buttons used in conventional mobile phones for operating a cursor need not be provided on the periphery of the display screen, and therefore the portable computing device can be reduced in size.

Moreover, when the first command graphic and the second command graphic are displayed in predetermined regions on the screen of the display means in the vicinity of the respective edge portions of the portable computing device, the user grips the edge portion of the portable computing device near the display region of the first command graphic and the edge portion of the portable computing device near the display region of the second command graphic with each hand during character input, and therefore the portable computing device can be stably held in both hands. Further, the user can manipulate the first command graphic and the second command graphic using each thumb, etc. of his/her hands while holding the portable computing device with both hands in the manner described above, and therefore an input operation can be performed quickly and accurately. The user can also quickly select a desired function key image by manipulating the first command graphic and the second command graphic using each thumb, etc. of his/her hands while holding the portable computing device with both hands.

Incidentally, in the portable computing devices of the first and second embodiments, as described above, the user can perform the character input by, for example, manipulating the first command graphic and the second command graphic in order to move the two cursors, and selecting a key on the keyboard image using the two cursors. As a result, the display region of the keyboard image on the screen of the display means can be reduced in size. The reason for this is that since keys are selected using the two cursors, character input does not become difficult, and input errors do not increase, even when the size of the display region of the keyboard image is reduced. This point applies likewise when keys are selected using a single cursor. By reducing the display region of the keyboard image, the display region of the character input screen used to display screens other than the keyboard image can be increased in size. Furthermore, instead of the reducing the display region of the keyboard image, display regions of the respective keys on the keyboard image can be reduced in size so that a keyboard image including a larger number of keys can be displayed. In other words, with the portable computing device of these embodiments, various images can be used as the keyboard image displayed on the character input screen.

Specific examples of keyboard images that can be used with the portable computing devices of the first and second embodiments are shown in FIGS. 30 to 37. FIGS. 30 to 36 are views showing examples of QWERTY layout keyboard images. FIGS. 30 to 32 show examples of keyboard images displayed when the kanji hiragana input mode is selected, and FIGS. 33 to 36 show examples of keyboard images displayed when the half-width alphanumeric character input mode is selected. Here, the keyboard image displayed when the half-width alphanumeric character input mode is selected differs from the keyboard image displayed when the kanji hiragana input mode is selected in that the character conversion candidate display portion 115 is not displayed. Further, FIG. 37 is a view showing examples of 50-character hiragana layout keyboard images. Hence, the keyboard image is not limited to a simple key configuration, and a full keyboard configuration including function keys, a numeric keypad, etc. may also be used.

Other Embodiments

The present invention is not limited to the embodiments described above, and various modifications are possible within the scope of the spirit thereof.

For example, in the first embodiment (including the modified example; likewise hereafter), although a case was described in which the display positions of the respective command graphics are modified using the predetermined setup screen, in the portable computing device of the first embodiment, the display positions of the respective command graphics may be modified by pressing and holding the command graphic (the movement direction specifying portion or the selection specifying portion) for at least the fixed time period and then dragging the pressed and held command graphic as described in the second embodiment. In this case, the control means performs the following processing. When the touch position information is transmitted from the position detection means of the touch screen, the manipulation determining means determines, based on the touch position information and the command graphic display region information stored in the storage means, whether or not a manipulation has been performed to press and hold a specifying portion of the first command graphic or a specifying portion of the second command graphic for at least a fixed time period and then to drag the specifying portion. After determining that a manipulation has been performed to press and hold a specifying portion of the first command graphic or a specifying portion of the second command graphic for at least the fixed time period and then to drag the specifying portion, the manipulation determining means outputs a signal, which indicates that a manipulation has been performed to drag the command graphic in the dragging direction after pressing and holding the command graphic, to the command graphic display control means. When the signal indicating that a manipulation has been performed to drag the first command graphic or the second command graphic in a predetermined direction after pressing and holding the command graphic is transmitted from the manipulation determining means, the command graphic display control means controls the display position of the command graphic on the screen of the display means so that the display position of the command graphic moves in the predetermined direction. Moreover, in the portable computing device of the second embodiment, the display positions of the respective command graphics may be modified using the predetermined setup screen.

Further, in the first embodiment, although a case was described in which the sizes and shapes of the respective command graphics are modified using the predetermined setup screen, in the portable computing device of the first embodiment, the sizes and shapes of the respective command graphics may be modified by pinching in or pinching out the respective command graphics as described in the second embodiment. Furthermore, in the portable computing device of the second embodiment, the sizes, shapes, etc. of the respective command graphics may be modified using the predetermined setup screen.

Moreover, in the portable computing device of the second embodiment, although a case was described in which the display position, the size, and the shape of the keyboard image are modifiable, in the first embodiment as well, the display position, size, and shape of the keyboard image may be made modifiable in a similar manner to the second embodiment.

Figure 38:
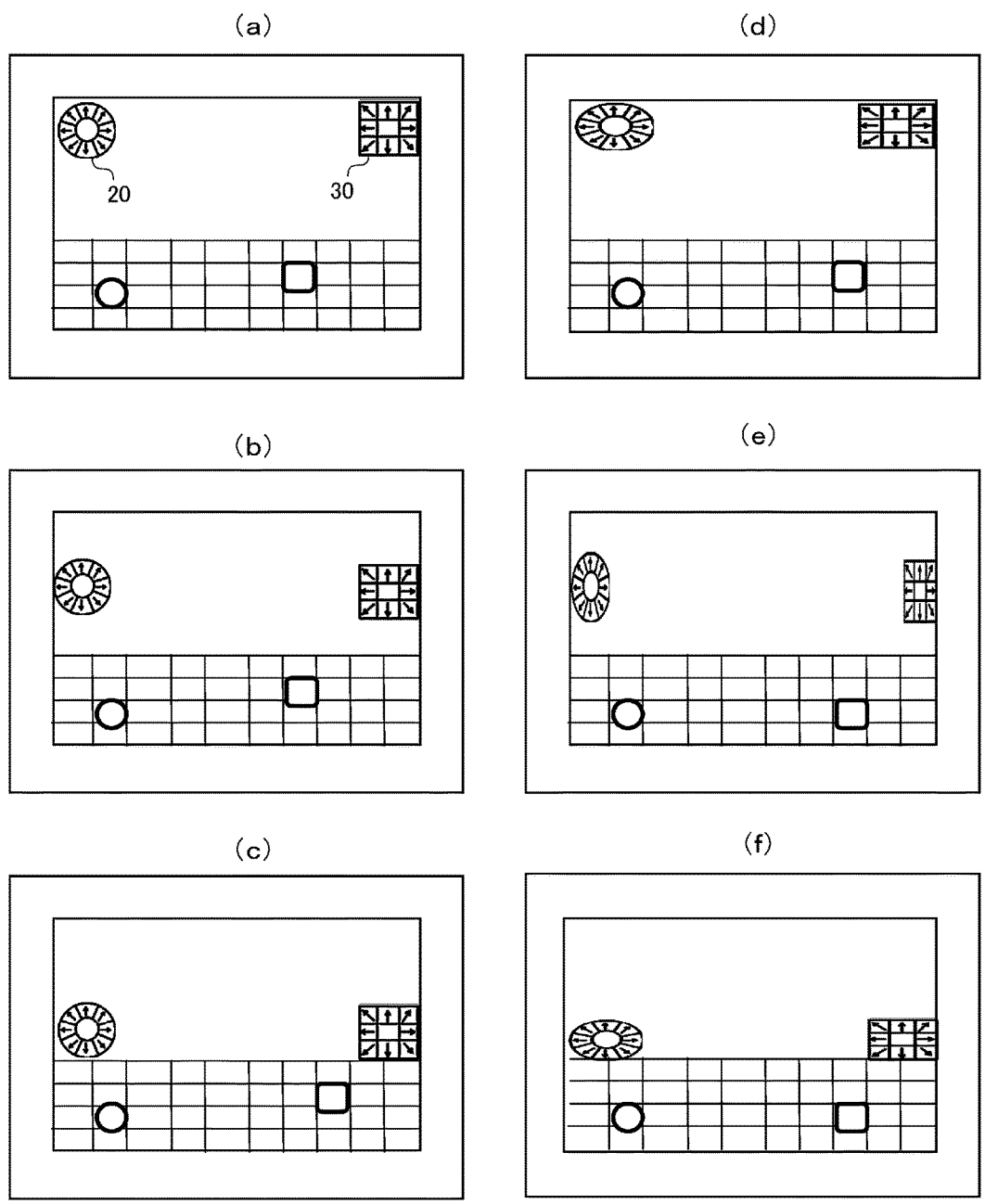
FIGS. 38(a)-(f) are views showing examples of display positions of the first command graphic and the second command graphic when the portable computing device according to the first embodiment is oriented horizontally in order to input characters.
Figure 39:
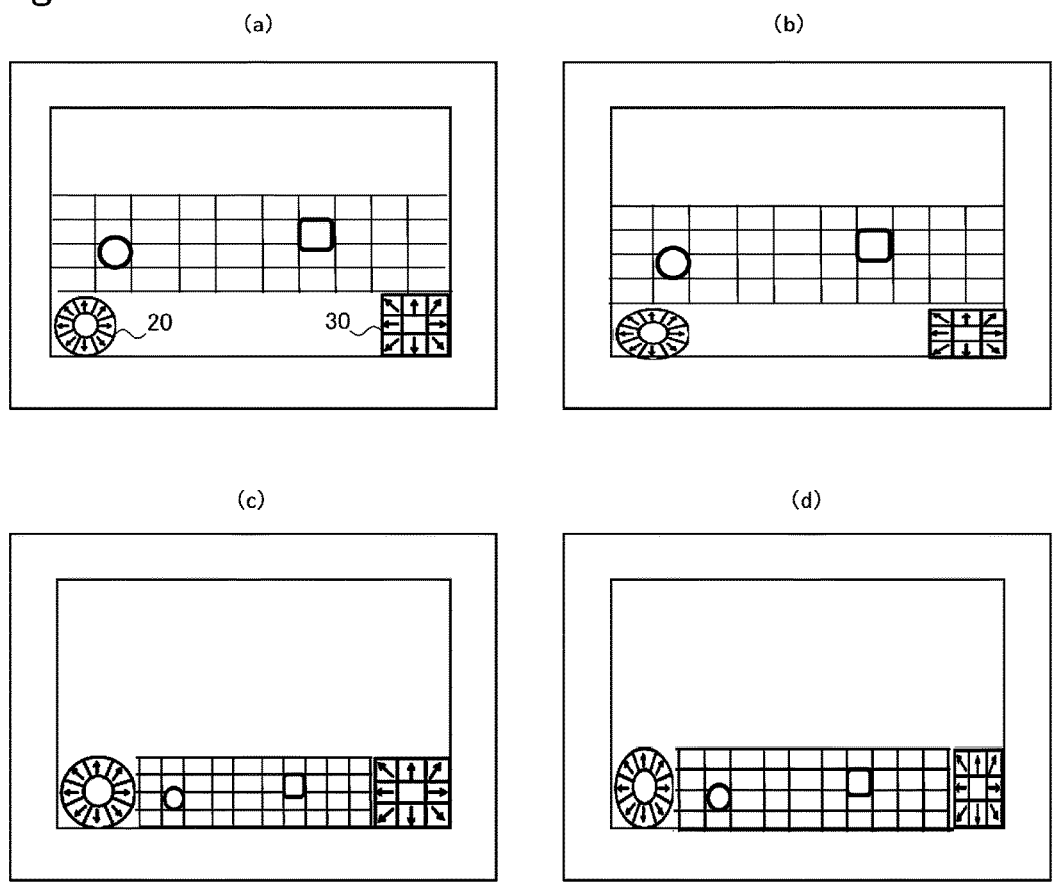
FIGS. 39(a)-(d) are views showing examples of display positions of the first command graphic and the second command graphic when the portable computing device according to the first embodiment is oriented horizontally in order to input characters.
Figure 40:
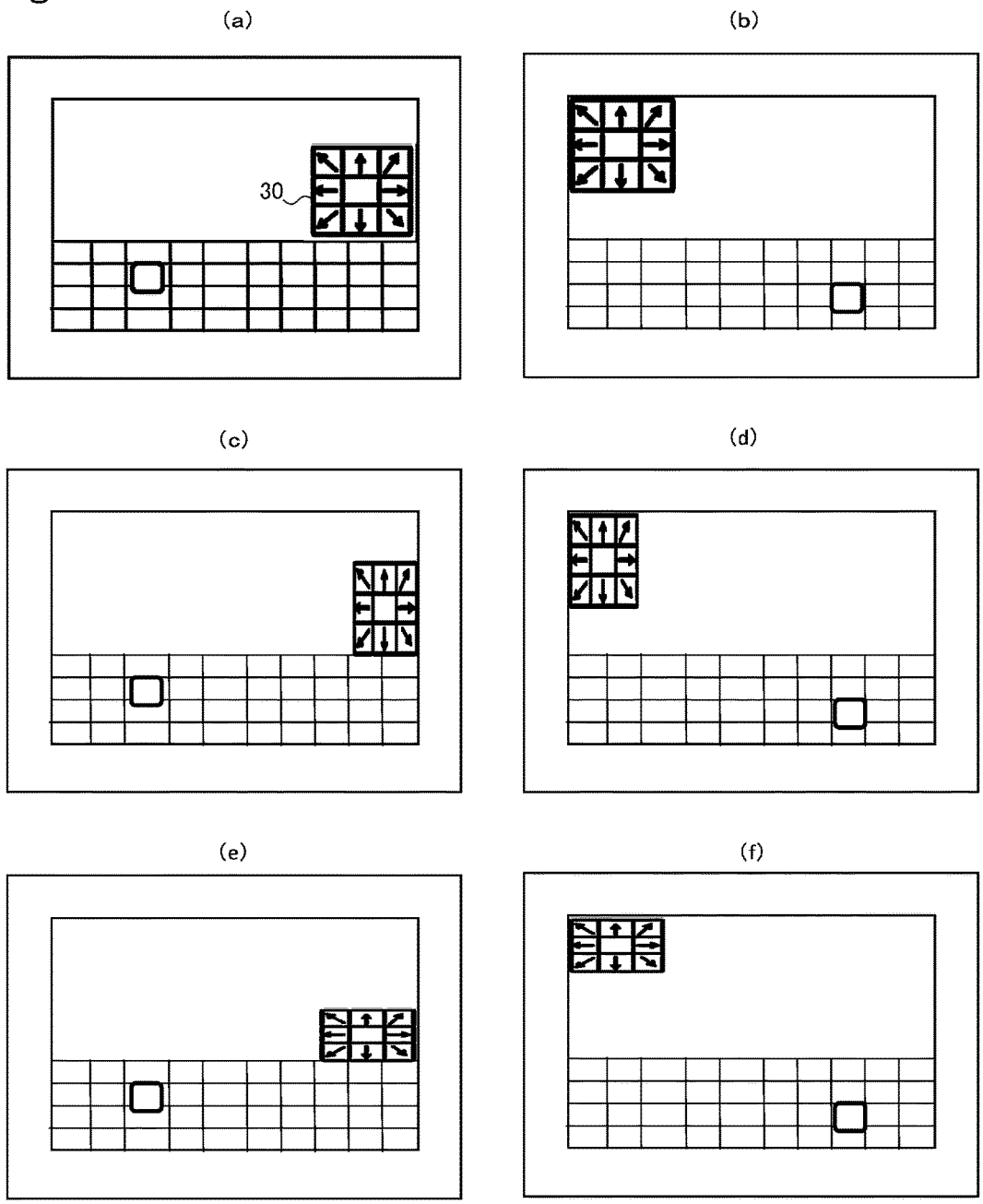
FIGS. 40(a)-(f) are views showing examples of display positions of the second command graphic when the portable computing device according to the first embodiment is oriented horizontally in order to input characters and only the second command graphic is displayed on the screen.
Figure 41:
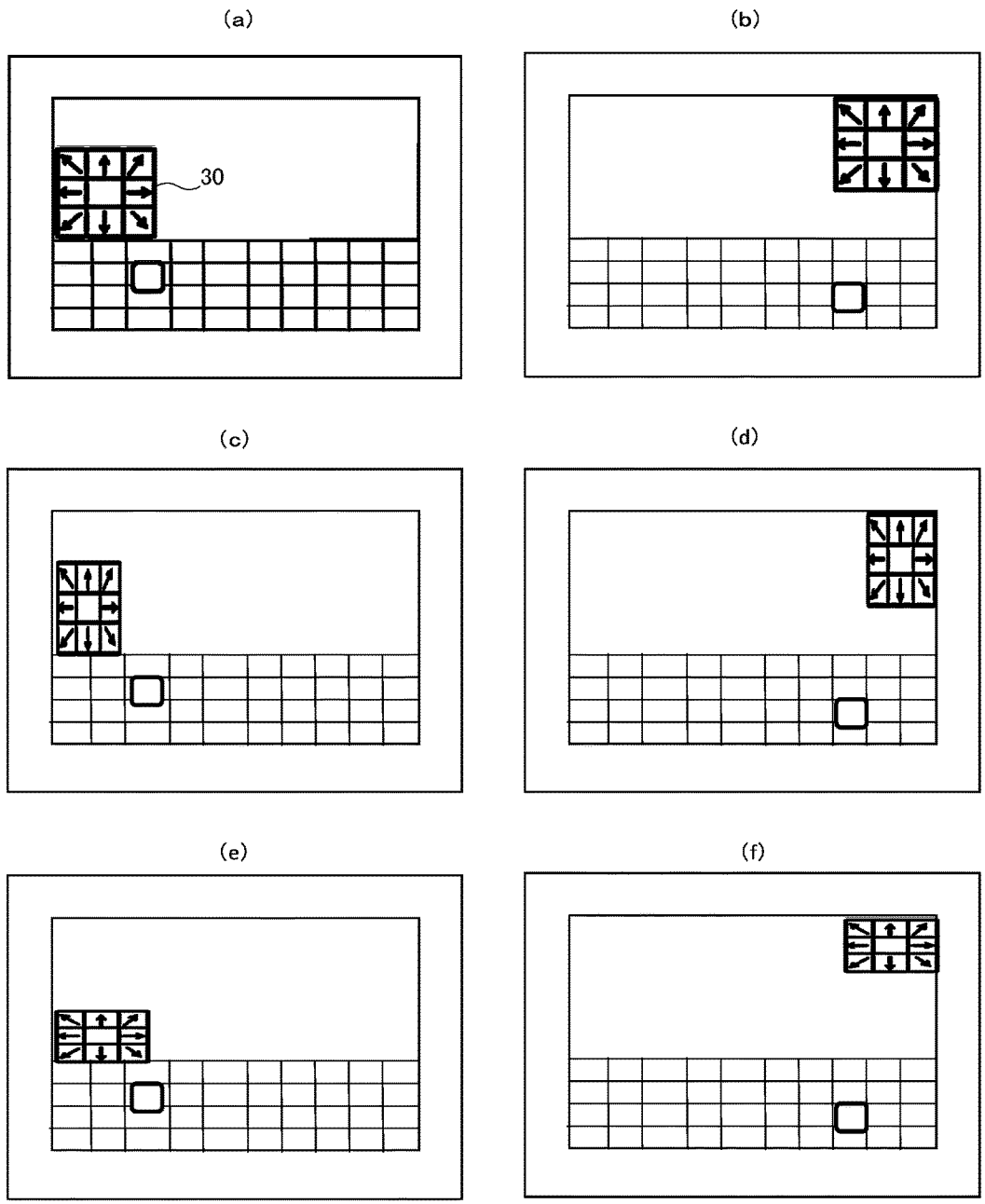
FIGS. 41(a)-(f) are views showing examples of display positions of the second command graphic when the portable computing device according to the first embodiment is oriented horizontally in order to input characters and only the second command graphic is displayed on the screen.
Figure 42:
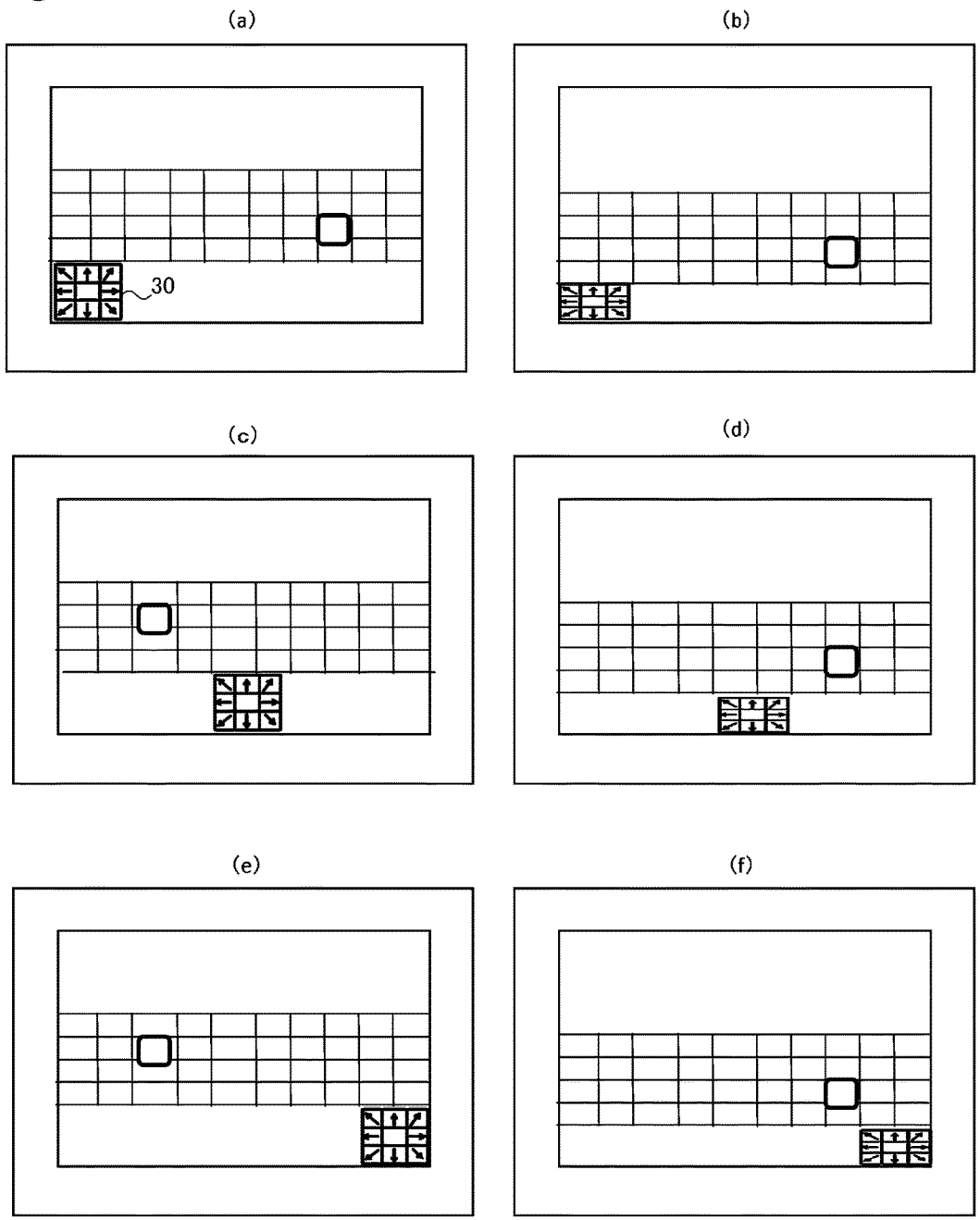
FIGS. 42(a)-(f) are views showing examples of display positions of the second command graphic when the portable computing device according to the first embodiment is oriented horizontally in order to input characters and only the second command graphic is displayed on the screen.
Figure 43:
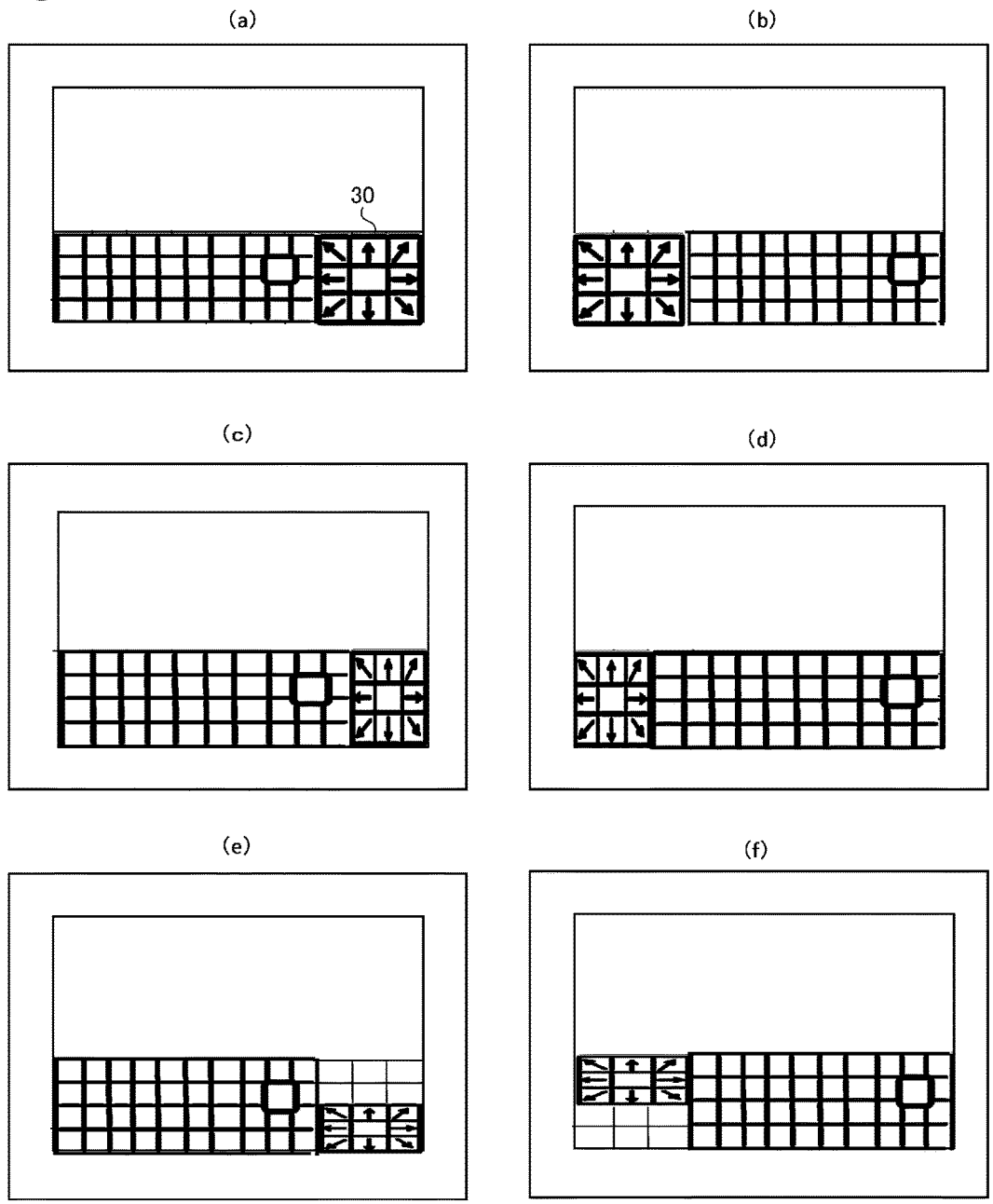
FIGS. 43(a)-(f) are views showing examples of display positions of the second command graphic when the portable computing device according to the first embodiment is oriented horizontally in order to input characters and only the second command graphic is displayed on the screen.

In the respective embodiments, for example, although cases were described in which the character input screen is displayed in a vertical mode on the screen of the display means so that the user performs character input with the portable computing device oriented vertically, the character input screen may instead be displayed in a horizontal mode on the screen of the display means so that the user performs the character input with the portable computing device oriented horizontally. In this case, the first command graphic and the second command graphic may be displayed in positions enabling easy manipulation by the user when inputting characters with the portable computing device oriented horizontally. FIGS. 38 and 39 are views showing examples of the display positions of the first command graphic 20 and the second command graphic 30 in a case where the character input is performed with the portable computing device of the first embodiment oriented horizontally. In the example of FIG. 38(a), the first command graphic 20 and the second command graphic 30 are displayed in the upper left edge portion of the inputted character display screen 120 and the upper right edge portion of the inputted character display screen 120, respectively. In the example of FIG. 38(b), the first command graphic 20 and the second command graphic 30 are displayed in the central portion of the left edge of the inputted character display screen 120 and the central portion of the right edge of the inputted character display screen 120, respectively. In the example of FIG. 38(c), the first command graphic 20 and the second command graphic 30 are displayed in the lower left edge portion of the inputted character display screen 120 and the lower right edge portion of the inputted character display screen 120, respectively. Further, in the example of FIG. 38(d), the first command graphic 20 and the second command graphic 30 are displayed in the upper left edge portion of the inputted character display screen 120 and the upper right edge portion of the inputted character display screen 120, respectively, in a case where laterally-oblong shapes have been selected as the shapes of the first command graphic 20 and the second command graphic 30. In the example of FIG. 38(e), the first command graphic 20 and the second command graphic 30 are displayed in the central portion of the left edge of the inputted character display screen 120 and the central portion of the right edge of the inputted character display screen 120, respectively, in a case where vertically-oblong shapes have been selected as the shapes of the first command graphic 20 and the second command graphic 30. In the example of FIG. 38(f), the first command graphic 20 and the second command graphic 30 are displayed in the lower left edge portion of the inputted character display screen 120 and the lower right edge portion of the inputted character display screen 120, respectively, in a case where horizontally-oblong shapes have been selected as the shapes of the first command graphic 20 and the second command graphic 30. Furthermore, the first command graphic 20 and the second command graphic 30 may be displayed in the region below of the keyboard image, as shown in FIGS. 39(a) and 39(b), or in regions to the left and the right of the keyboard image, as shown in FIGS. 39(c) and 39(d).

Here, by selecting a single display of a command graphic on the predetermined setup screen also in a case where character input is performed with the portable computing device oriented horizontally, one of the first command graphic and the second command graphic can be displayed on the screen of the display means 10. When only one of the first command graphic and the second command graphic is displayed on the screen of the display means 10, only the cursor that corresponds to the displayed command graphic, from among the two cursors 101, 102, is displayed. FIGS. 40 to 43 show examples of display positions of the second command graphic 30 when only the second command graphic 30 is displayed on the screen in a case where character input is performed with the portable computing device of the first embodiment oriented horizontally.

Furthermore, in the above embodiments, a portable computing device having a function according to which, when the character input screen is displayed on the screen of the display means, the character input screen rotates in accordance with rotation of the portable computing device may be used as the portable computing device. In this case, the command graphic display control means preferably modifies the display positions of the first command graphic and the second command graphic in accordance with rotation of the portable computing device. In so doing, the display state of the character input screen and the two command graphics are switched automatically between the state shown in FIG. 9(a) and the state shown in FIG. 38(a), for example, in accordance with the state of rotation of the portable computing device.

Figure 44:
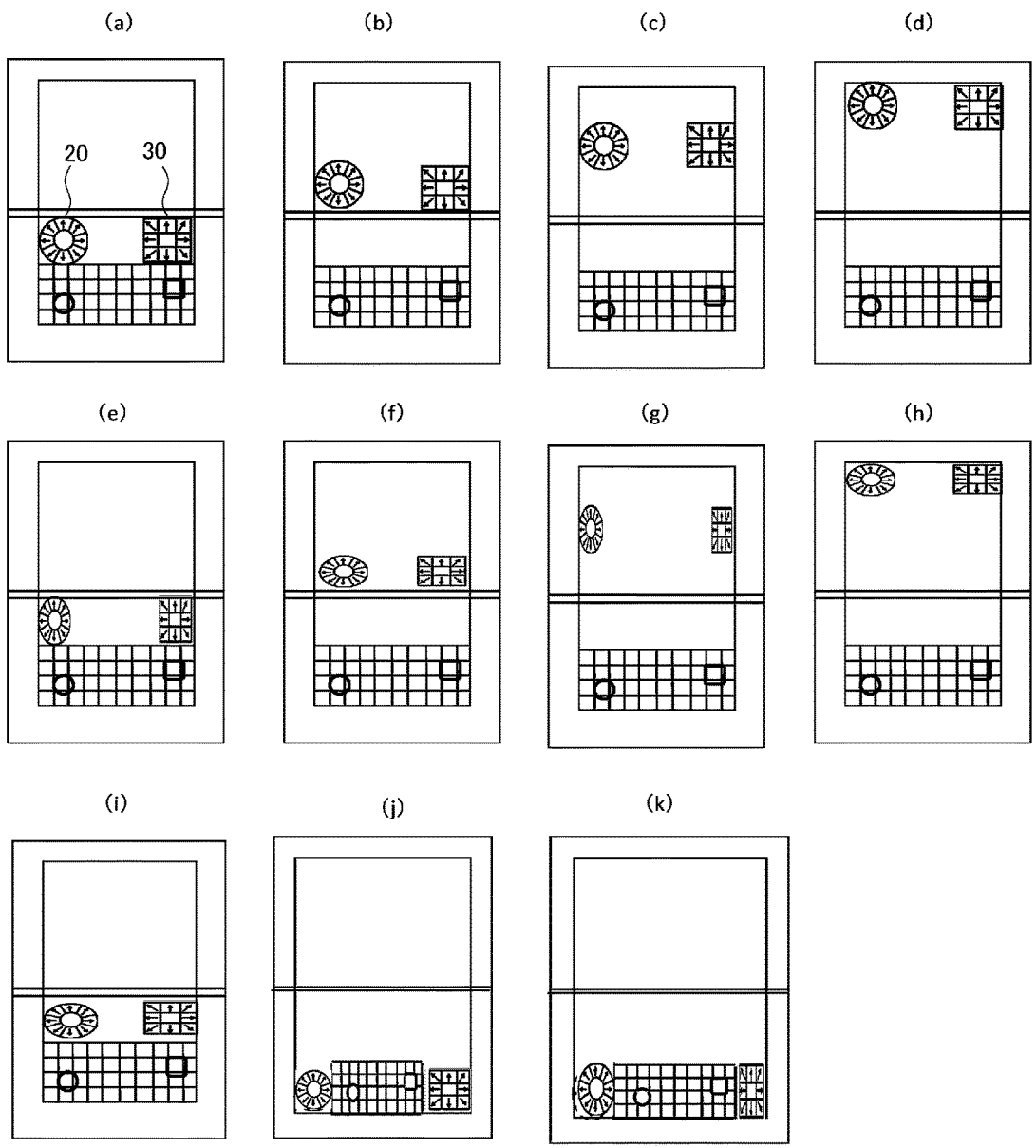
FIGS. 44(a)-(k) are views showing examples of display positions of the first command graphic and the second command graphic in a clamshell type vertical portable computing device.
Figure 45:
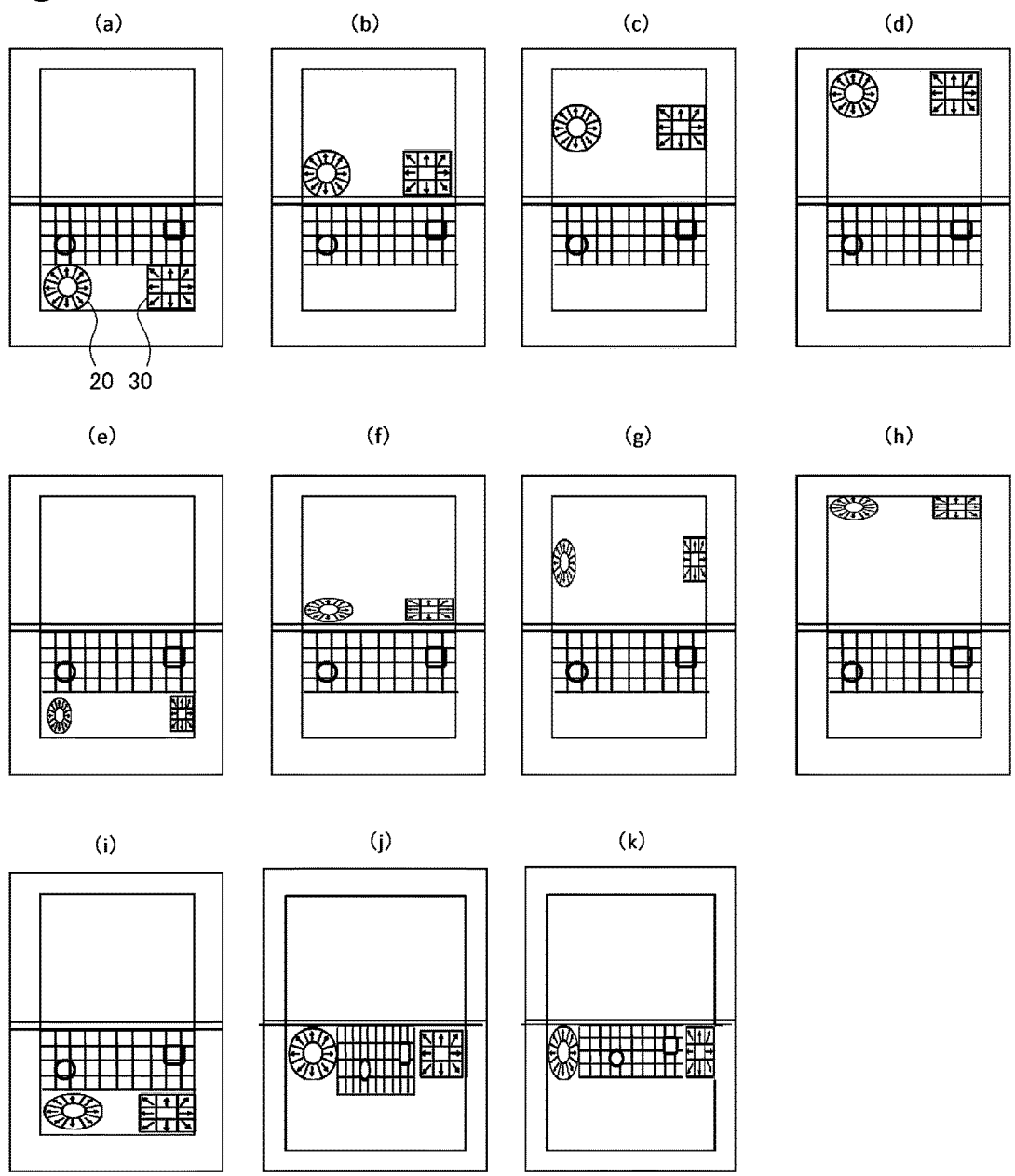
FIGS. 45(a)-(k) are views showing examples of display positions of the first command graphic and the second command graphic in a clamshell type vertical portable computing device.
Figure 46:
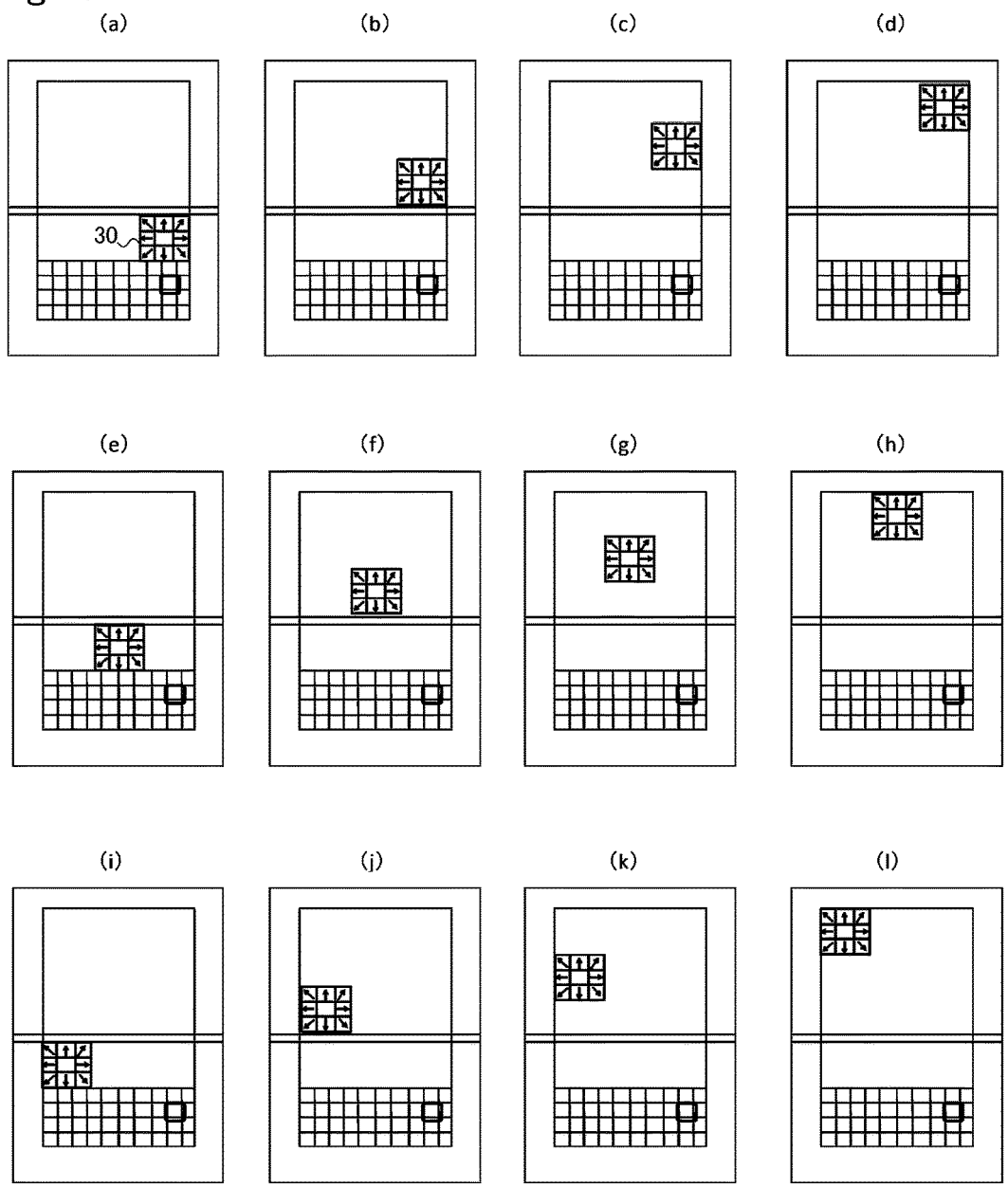
FIGS. 46(a)-(l) are views showing examples of display positions of the second command graphic in a clamshell type vertical portable computing device when only the second command graphic is displayed on the screen.
Figure 47:
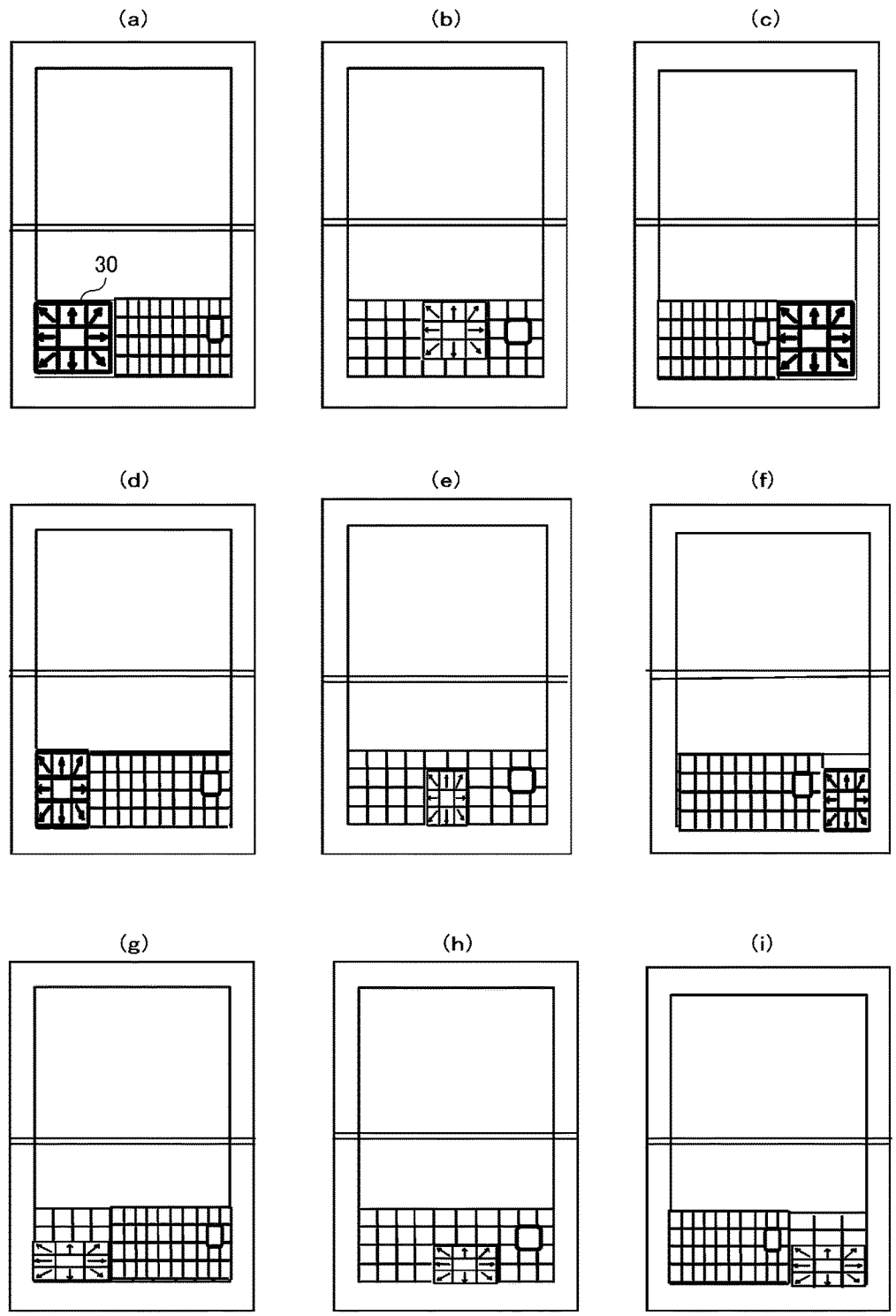
FIGS. 47(a)-(i) are views showing examples of display positions of the second command graphic in a clamshell type vertical portable computing device when only the second command graphic is displayed on the screen.
Figure 48:
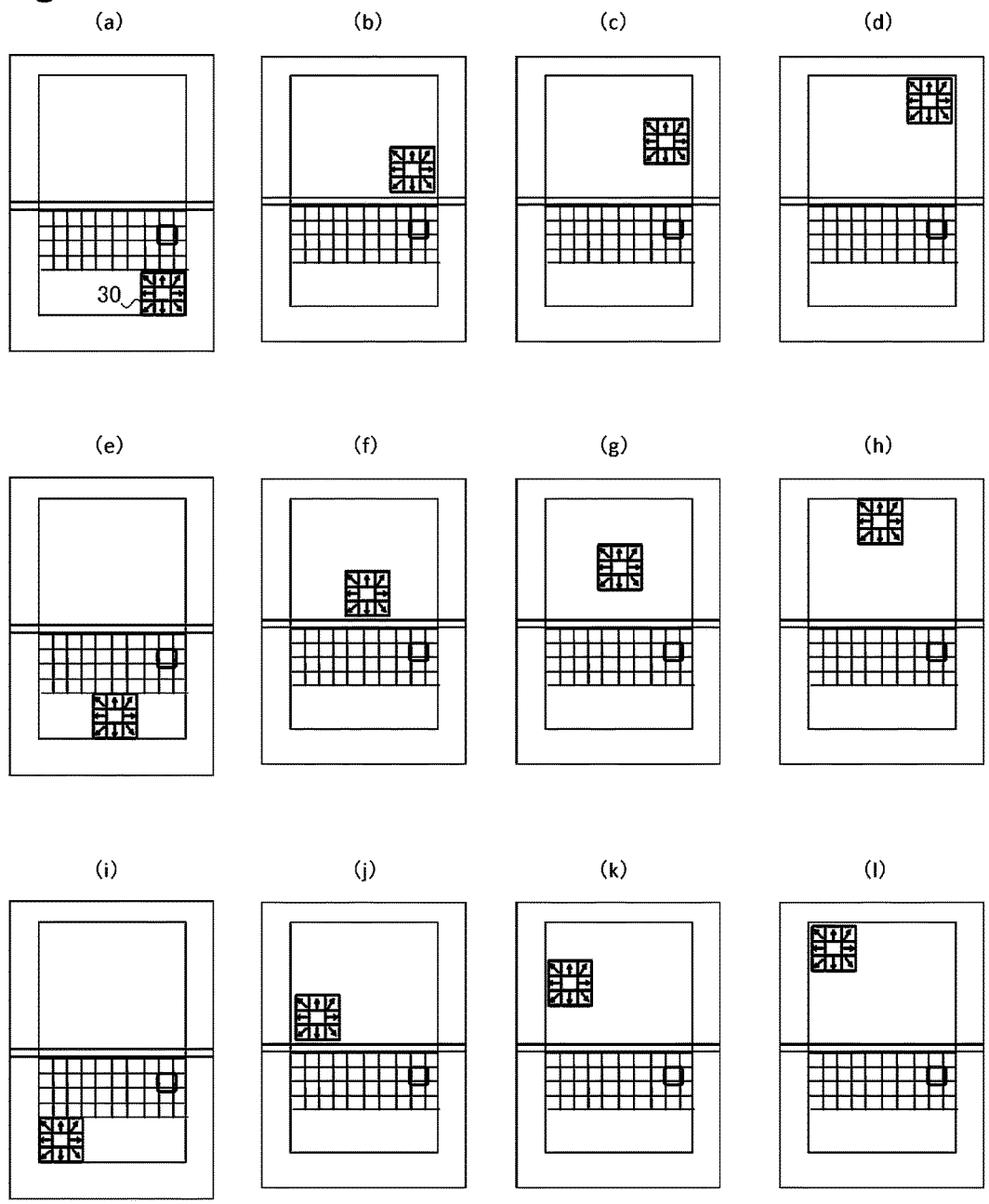
FIGS. 48(a)-(l) are views showing examples of display positions of the second command graphic in a clamshell type vertical portable computing device when only the second command graphic is displayed on the screen.
Figure 49:
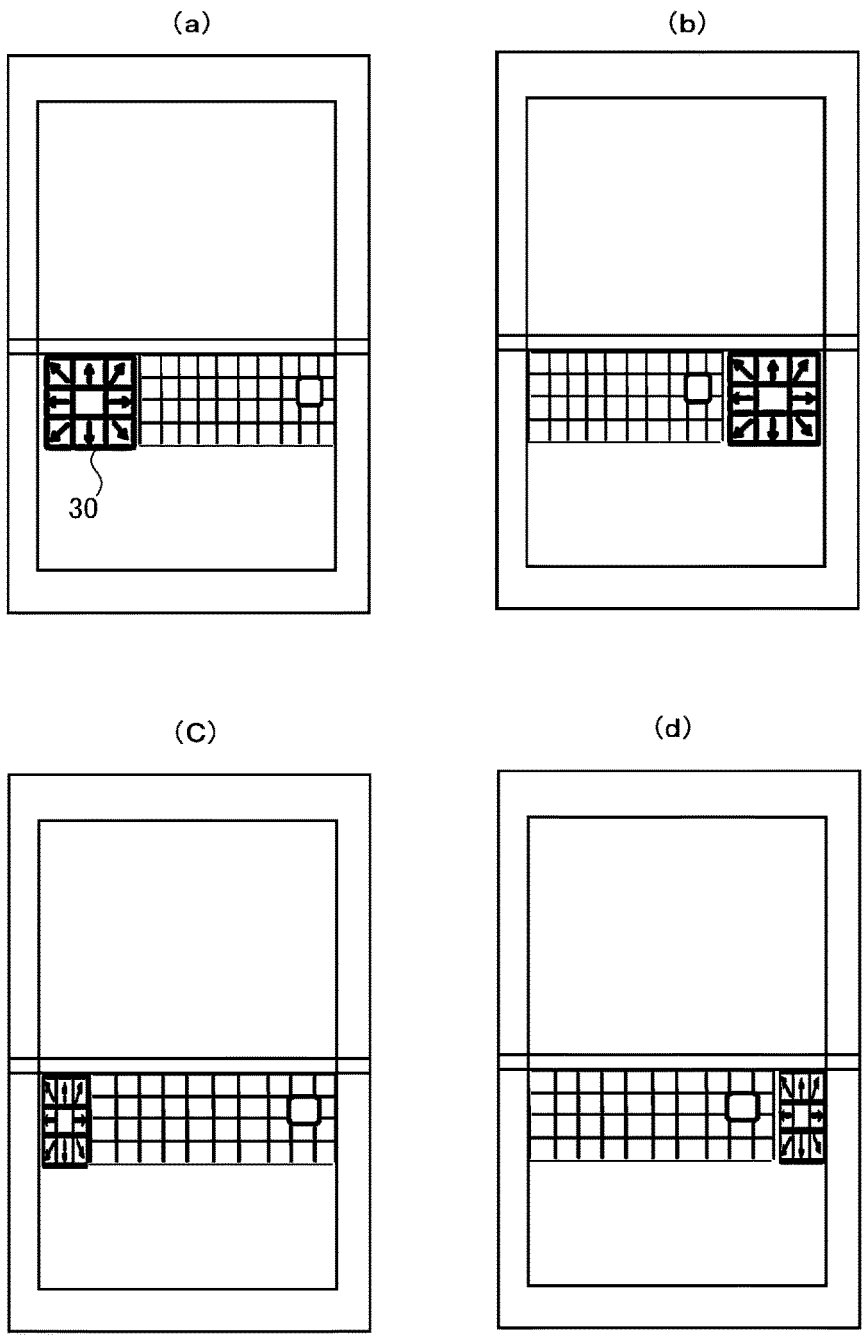
FIGS. 49(a)-(d) are views showing examples of display positions of the second command graphic in a clamshell type vertical portable computing device when only the second command graphic is displayed on the screen.
Figure 50:
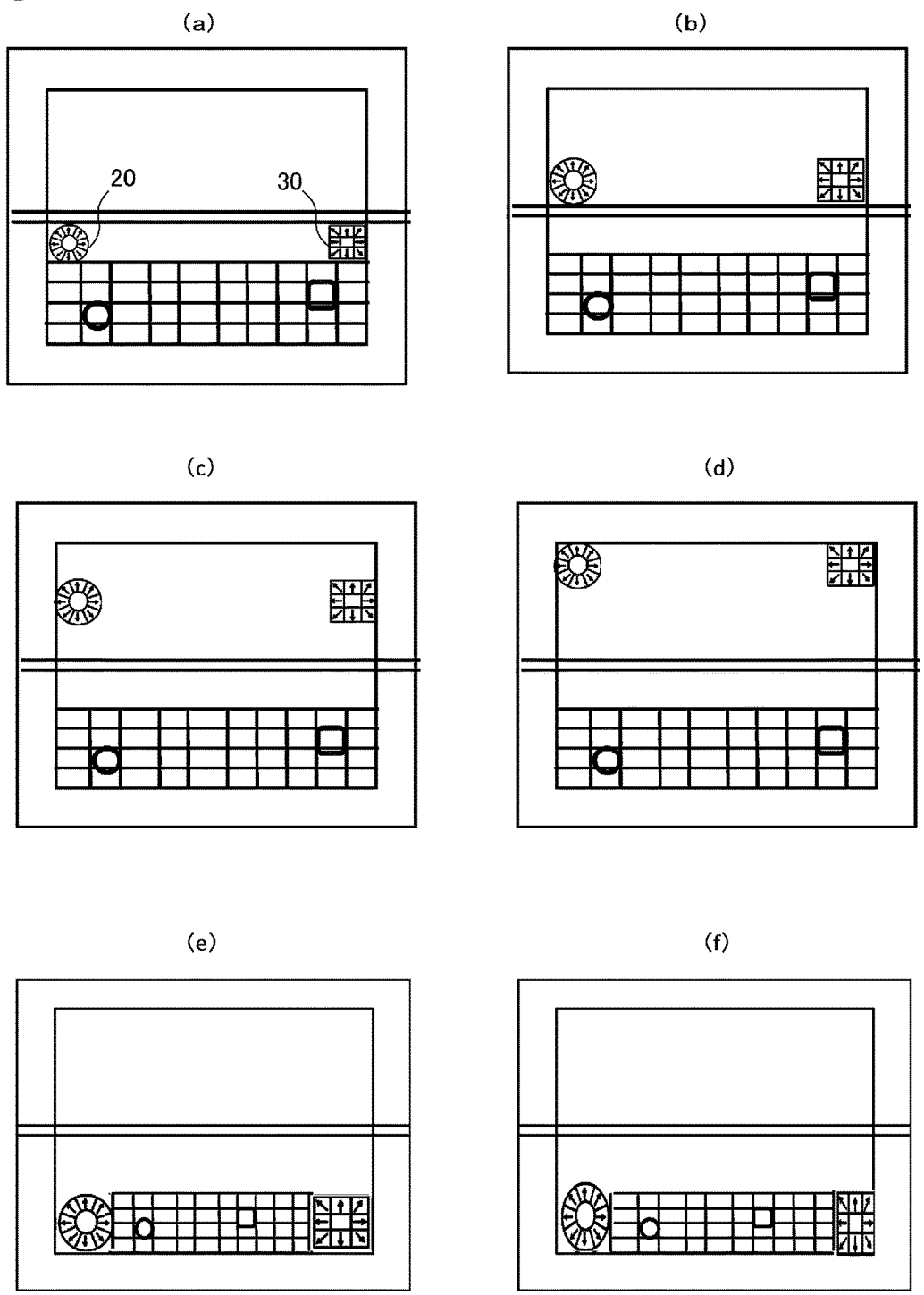
FIGS. 50(a)-(f) are views showing examples of display positions of the first command graphic and the second command graphic in a clamshell type horizontal portable computing device.
Figure 51:
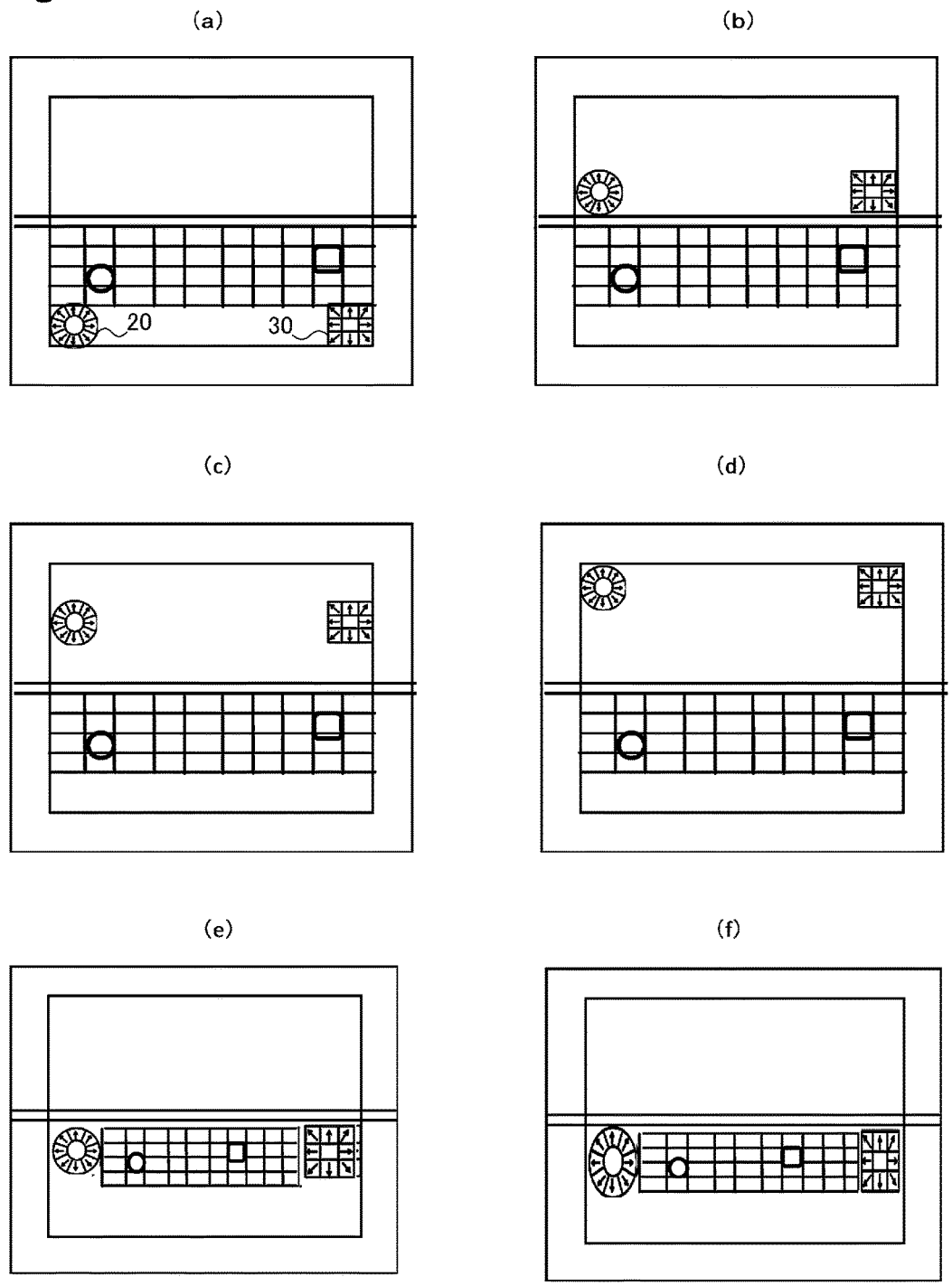
FIGS. 51(a)-(f) are views showing examples of display positions of the first command graphic and the second command graphic in a clamshell type horizontal portable computing device.
Figure 52:
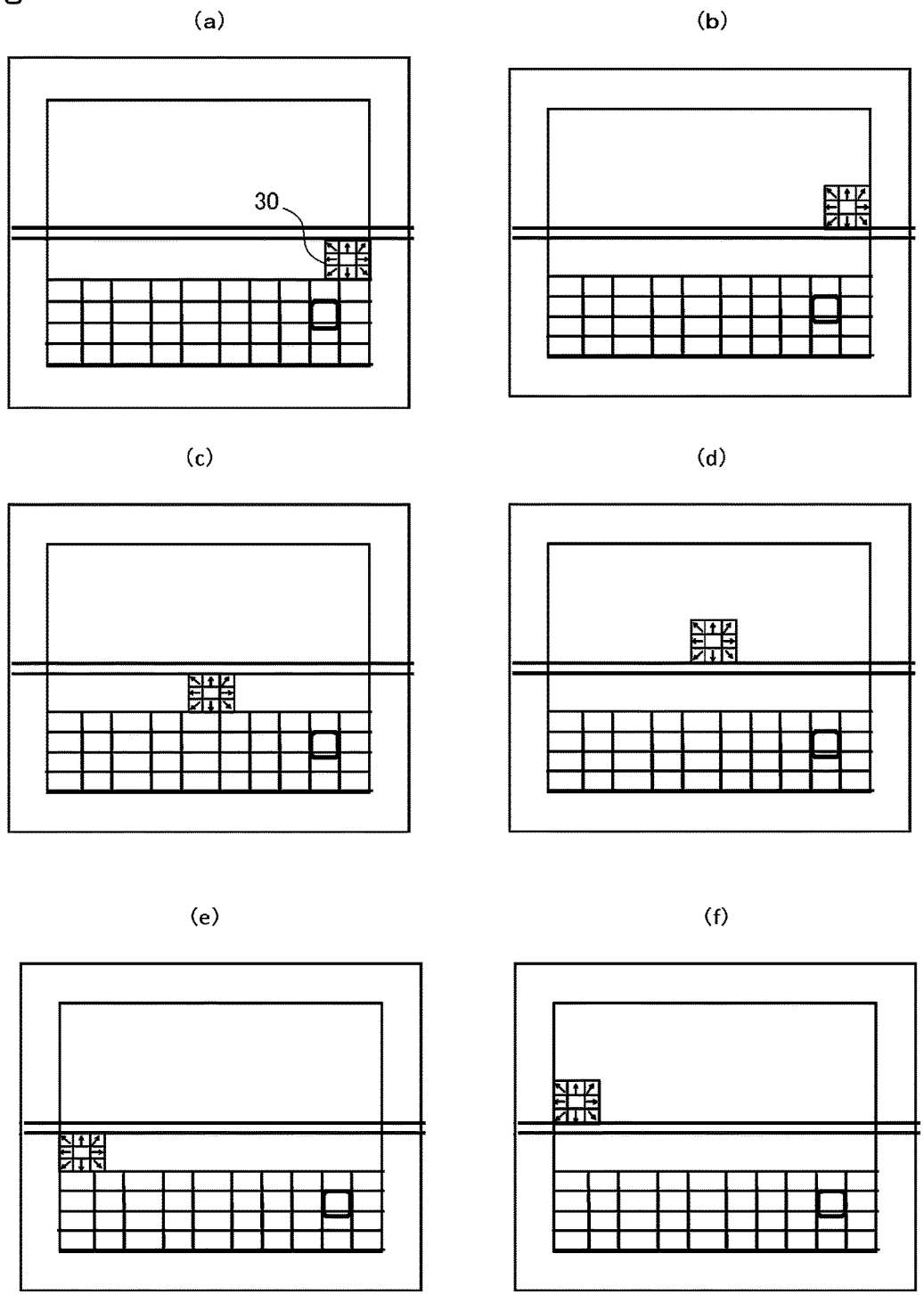
FIGS. 52(a)-(f) are views showing examples of display positions of the second command graphic in a clamshell type horizontal portable computing device when only the second command graphic is displayed on the screen.
Figure 54:
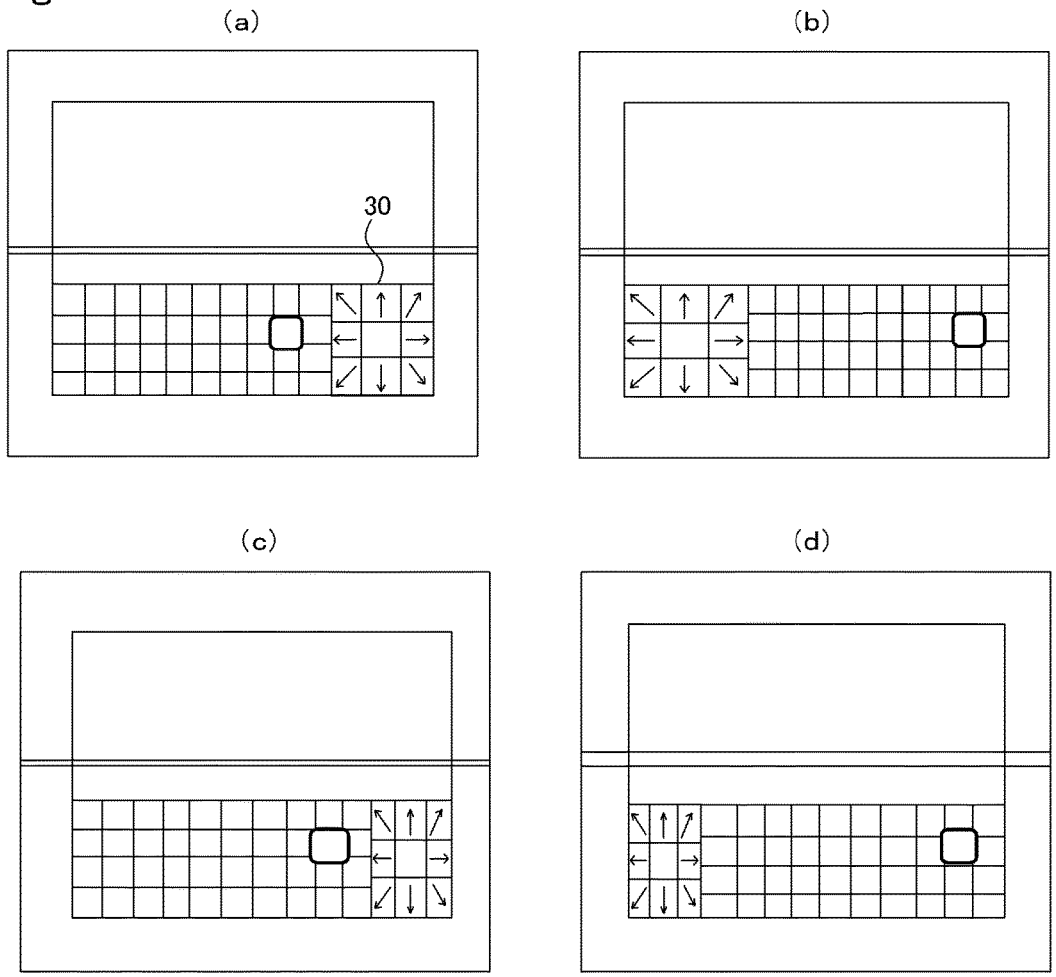
FIGS. 54(a)-(d) are views showing examples of display positions of the second command graphic in a clamshell type horizontal portable computing device when only the second command graphic is displayed on the screen.

Moreover, in the above embodiments, a clamshell-type portable computing device may be used as the portable computing device. More specifically, FIGS. 44 and 45 show examples of the display positions of the first command graphic 20 and the second command graphic 30 in a clamshell-type vertical portable computing device. Further, FIGS. 46 to 49 show examples of the display position of the second command graphic 30 in a case where only the second command graphic 30 is displayed on the screen of a clamshell-type vertical portable computing device. Furthermore, FIGS. 50 and 51 show examples of the display positions of the first command graphic 20 and the second command graphic 30 in a clamshell-type horizontal portable computing device, while FIGS. 52 to 57 show examples of the display position of the second command graphic 30 in a case where only the second command graphic 30 is displayed on the screen of a clamshell-type horizontal portable computing device.

Moreover, in the embodiments described above, one of the first command graphic and the second command graphic may be configured to function as a cursor operating button at all times, regardless of whether or not the character input screen is displayed on the screen of the display means. Further, both of the first command graphic and the second command graphic may be configured to function as cursor operating buttons at all times, regardless of whether or not the character input screen is displayed on the screen of the display means. In the portable computing device of the first embodiment in particular, when the selection specifying portion of the first command graphic 20 and the selection specifying portion of the second command graphic 30, for example, are simultaneously tapped twice in succession while a screen other than the character input screen is displayed on the screen of the display means such that a signal corresponding to this operation is transmitted from the manipulation determining means, the control means may display the home screen on the screen of the display means. As a result, the user can easily return to the home screen using the first command graphic and the second command graphic. Note that FIGS. 58 and 59 are views showing examples of manipulations performed on the two command graphics functioning as cursor operating buttons when the character input screen is not displayed on the screen of the display means. Here, FIG. 58(*a*) shows an example of a manipulation performed on the first command graphic 20 when only the first command graphic 20 is displayed on the screen of the display means, and FIG. 58(*b*) shows an example of a manipulation performed on the second command graphic 30 when only the second command graphic 30 is displayed on the screen of the display means. Further, FIGS. 59(*a*) and 59(*b*) show examples of manipulations performed on both the first command graphic 20 and the second command graphic 30.

Note that in a case where the first command graphic or the second command graphic is configured to function as a cursor operating button at all times, the display mode of the corresponding cursor may be modified in accordance with the currently displayed screen. Further, in a case where both the first command graphic and the second command graphic are configured to function as cursor operating buttons at all times, the display modes of the respective cursors may be modified in accordance with the currently displayed screen. For example, when the home screen is displayed on the screen of the display means, the cursor display control means may display the respective cursors in modes surrounding linked images and character strings, and the linked images and character strings may be moved as single units.

Figure 60:
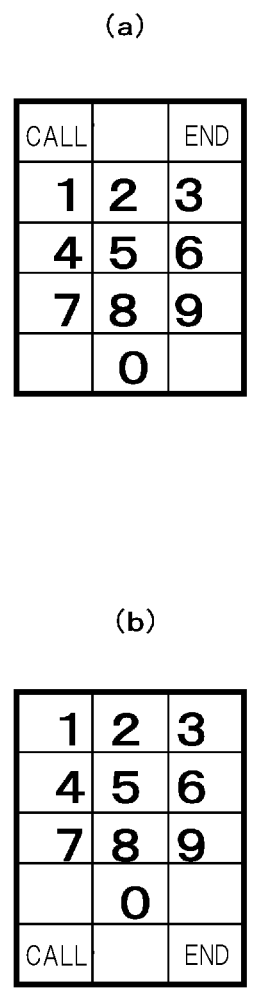

Further, when the portable computing device according to the embodiments described above includes a call-making function, the character input screen may be a telephone number input screen on which to input a telephone number. In this case, as shown in FIG. 60(*a*) or 60(*b*), an image including numeric keys "0" to "9", a call key, an end key, etc. is displayed as the keyboard image on the telephone number input screen. The user can then input a telephone number by operating the first command graphic and the second command graphic to select the numeric keys on the keyboard image.

Figure 61:
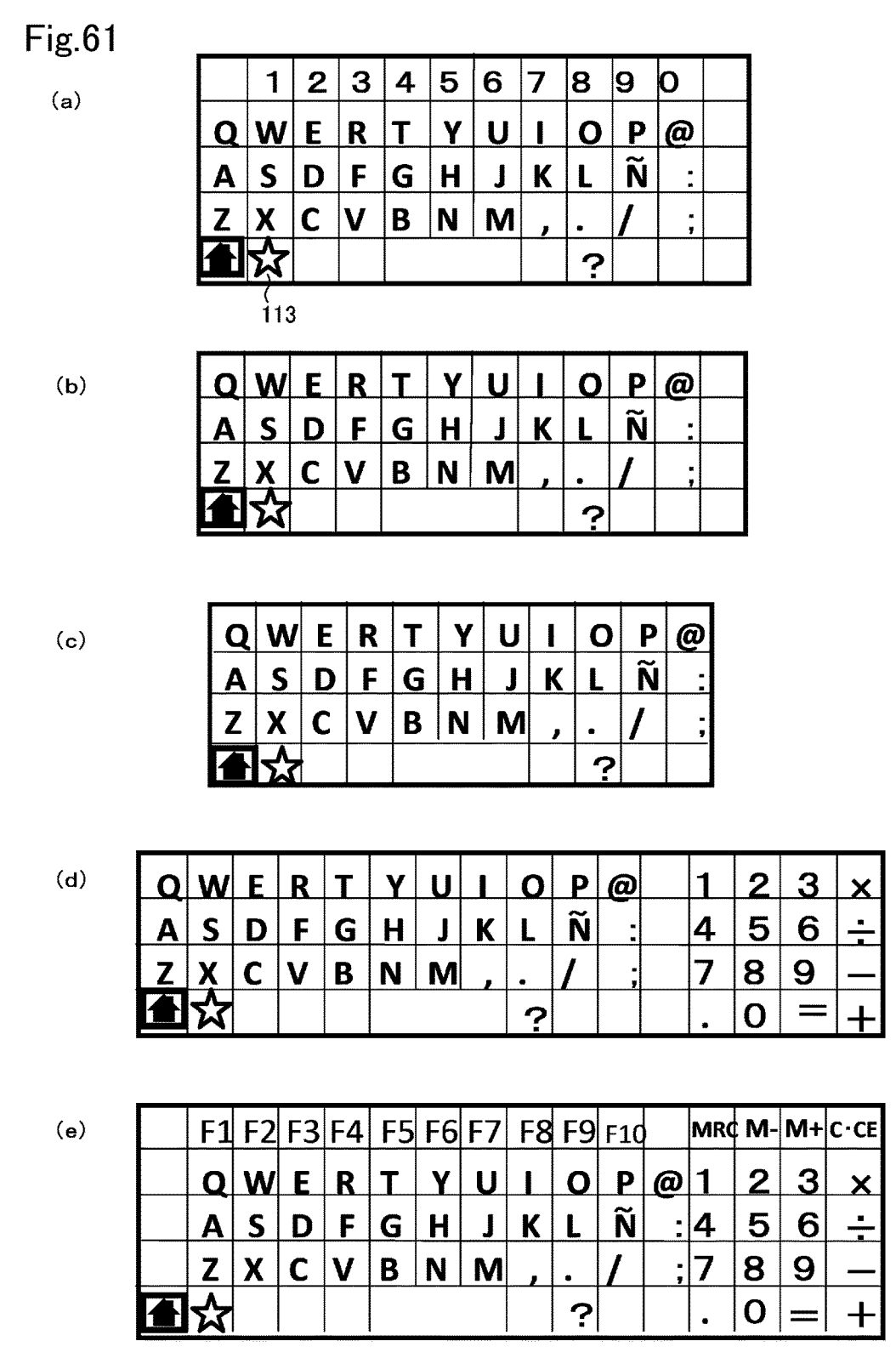
Figure 62:
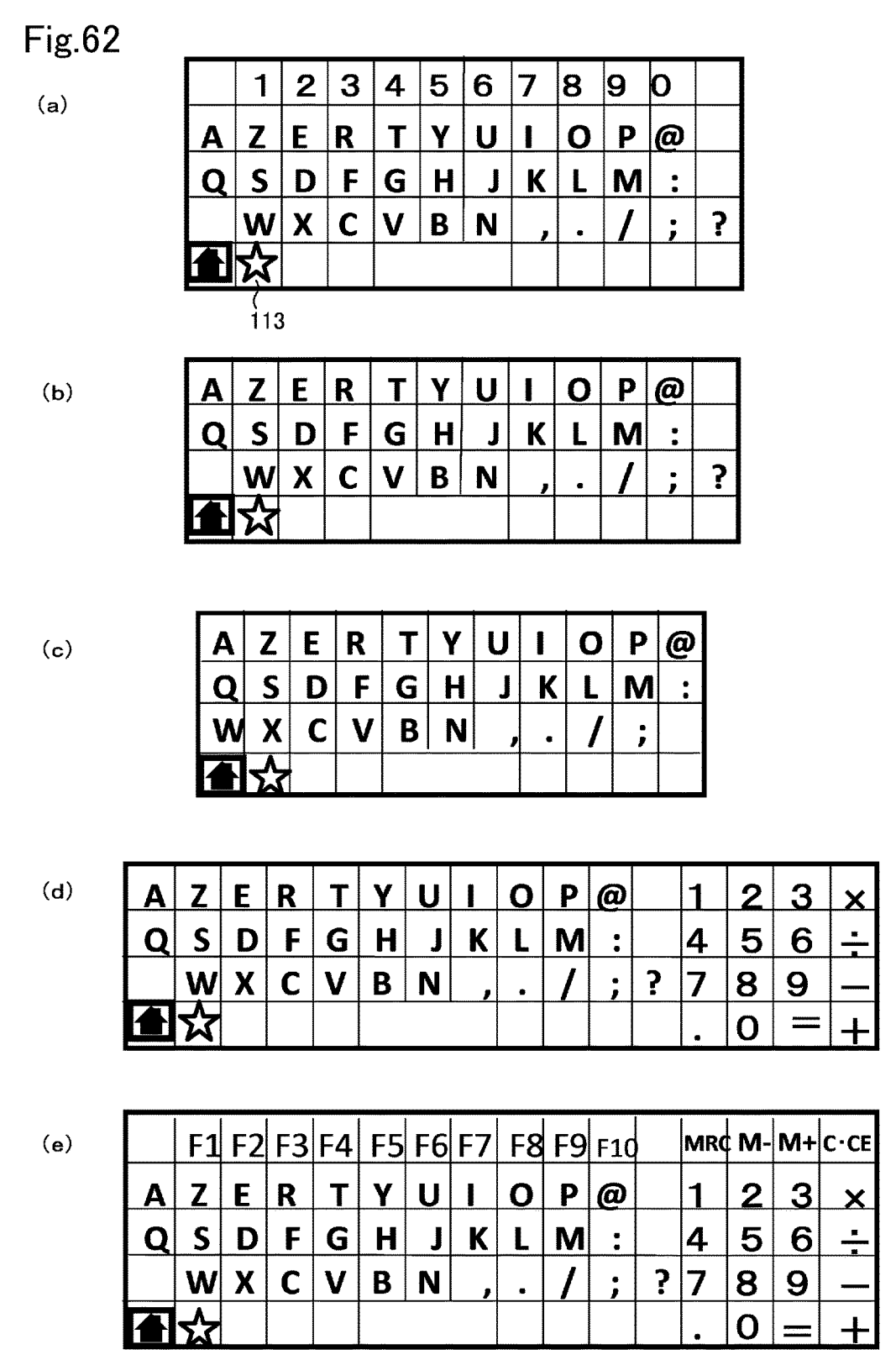
Figure 63:
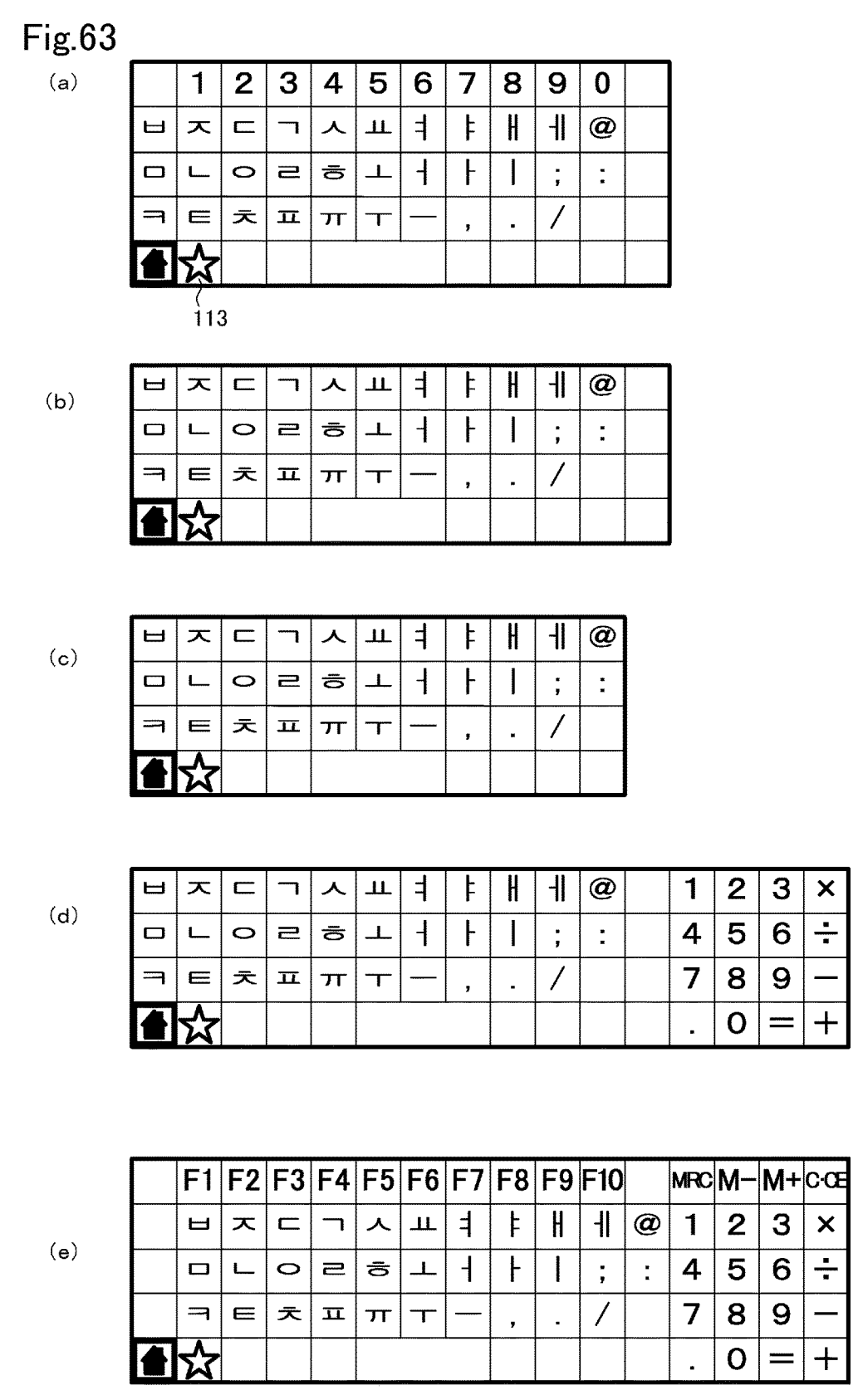

Moreover, in the above embodiments, although a case was described in which the keyboard image is switched between the QWERTY layout keyboard image and the 50-character hiragana layout keyboard image using the keyboard switch key, in a case where the portable computing device of the present invention is used in other countries, a keyboard image having a layout corresponding to the language of the country of use may be employed instead of the 50-character hiragana layout keyboard image. FIGS. 61 to 63 show specific examples of keyboard image layouts corresponding to languages of respective countries. FIG. 61 is a view showing examples of Spanish language layout keyboard images, FIG. 62 is a view showing examples of French language layout keyboard images, and FIG. 63 is a view showing examples of Korean language layout keyboard images. In these drawings, the keyboard switch key 113 is used to switch between the QWERTY layout keyboard image and the keyboard image layout of the corresponding language. Keyboard image layouts of other languages, such as German, may also be used. Note that when characters having associated diacritics and the like are input using keyboard image layouts corresponding to languages of various countries, such as German, Spanish, and French, a window showing characters having the associated diacritics and the like may be opened by pressing and holding the character key representing the vowel, for example, whereupon the desired display character may be selected from the characters displayed in the window. Alternatively, keys representing the diacritics and the like may be disposed on the keyboard image from the start such that the characters having the associated diacritics and the like can be input directly using these keys. Furthermore, when inputting Chinese, both the simplified Chinese characters used on the mainland and the traditional Chinese characters used in Taiwan are typically converted into Chinese by inputting Roman letters (English letters), and therefore, similarly to a case in which Japanese is converted by inputting Roman letters (English letters), the keyboard images shown in FIGS. 30, 31, 32, etc. are used as a keyboard image on which to input Chinese. Alternatively, a Chinese language layout keyboard image may be used.

Figure 64:
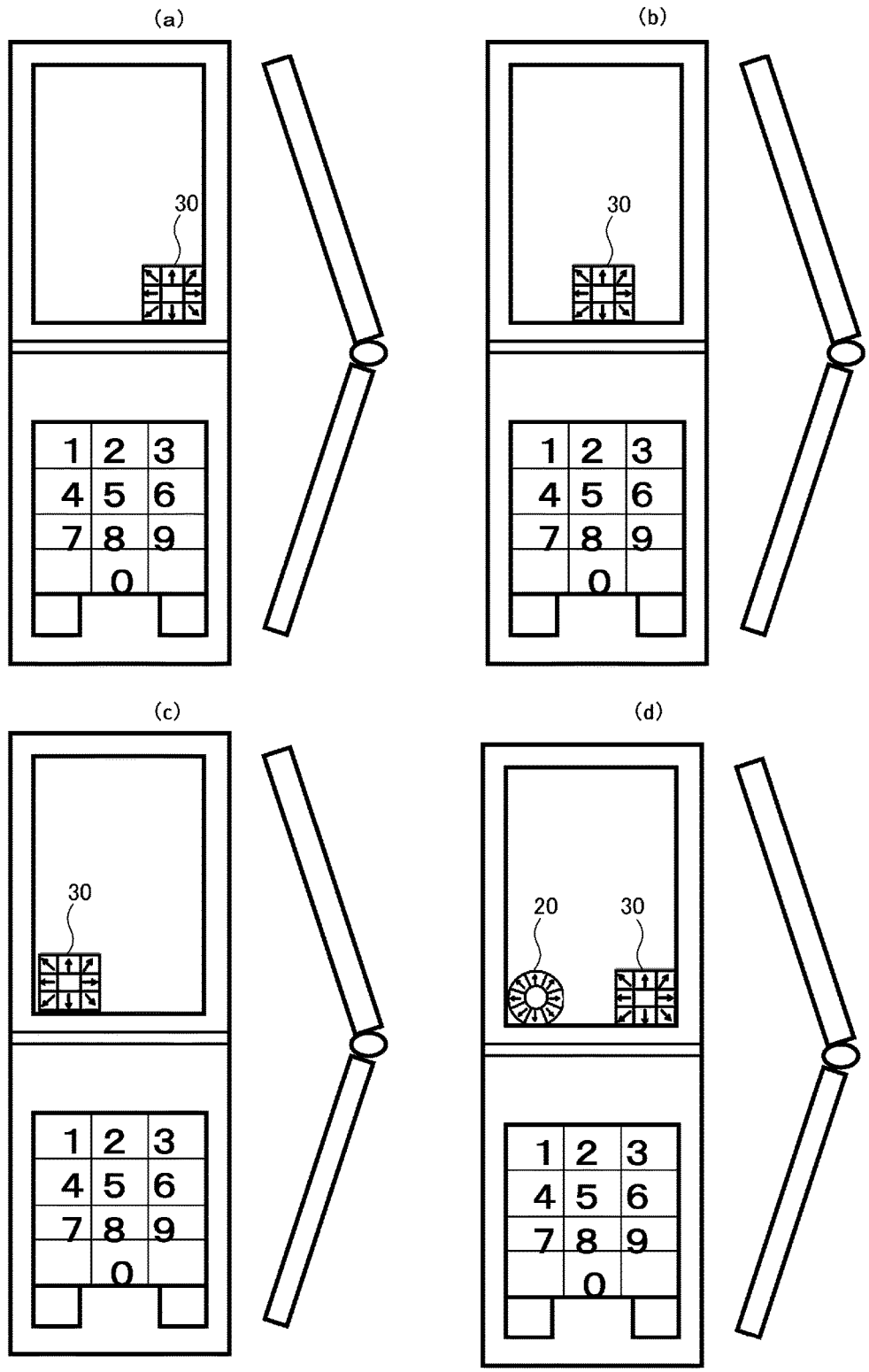
FIGS. 64 (a)-(d) are views showing examples of display positions of a command graphic when the portable computing device of the present invention is a clamshell mobile phone.

Moreover, in the above embodiments, although a case was described in which the portable computing device of the present invention is a tablet computer, portable computing devices of the present invention are not limited to tablet computers, and may, for example, be a mobile phone, a smartphone, a personal digital assistant, a laptop personal computer having a touch screen, a slate personal computer (a Slate PC) on which an entire front surface of a plate-shaped main body is constituted by a touch screen type display, etc. Here, FIG. 64 shows examples of the display positions of the command graphics in a case where the portable computing device of the present invention is a clamshell mobile phone. FIGS. 64(*a*), 64(*b*), and 64(*c*) show examples of a case in which only the second command graphic 30 is displayed on the screen of the display means of the portable computing device. FIG. 64(*d*) shows an example of a case in which both the first command graphic 20 and the second command graphic 30 are displayed on the screen of the display means of the mobile phone.

Furthermore, in the above embodiments, although a case was described in which the first cursor, the second cursor, the first command graphic for specifying the movement direction, etc. of the first cursor, and the second command graphic for specifying the movement direction, etc. of the second cursor are displayed on the screen of the display means, or in other words a case in which two sets of cursors and command graphics are displayed on the screen of the display means, the portable computing device of the present invention may display a single set of the cursor and the command graphic on the screen of the display means. More specifically, in the portable computing device of the first embodiment, a single set of the cursor and the command graphic may be displayed on the screen of the display means. Here, a schematic front view of the portable computing device of the first embodiment in which a single set of the cursor and the command graphic is displayed on the screen is similar to FIG. 11, for example. A single set of the cursor and the command graphic may also be displayed on the screen of the display means in the portable computing device of the second embodiment. Likewise in these cases, the single command graphic can be displayed anywhere on the screen of the display means, and therefore the command graphic can be disposed in a position enabling easy manipulation by the user. As a result, an improvement in user-friendliness during the character input operation can be achieved. Further, since there is no need to provide mechanical specifying buttons, which are used to operate a cursor, on the periphery of the display screen, the portable computing device can be reduced in size.

Furthermore, in a case where a single set of the cursor and the command graphic is displayed on the screen of the display means, a substantially central position of the keyboard image may be set as the reference position of the cursor, and the cursor display control means may return the cursor to the reference position when determining that, during character input, either the command graphic has not been manipulated for a predetermined fixed time period (the inoperative time period) or a predetermined manipulation has been performed on the command graphic. More specifically, an operation such as tapping a movement direction specifying portion and the selection specifying portion simultaneously three times in succession may be set as the operation for returning the cursor to the reference position. As a result, the user can easily and quickly locate the position of the cursor by returning the cursor to its reference position. Moreover, the distance of movement of the cursor from the reference position to a desired key image can be shortened, and therefore character input can be performed efficiently. Note that the operation performed in this case to return the cursor to the reference position is not limited to the operation described above, and any operation performed using the command graphic may be employed. Further, the operation to return the cursor to the reference position, the reference position, the inoperative time period, and the ON/OFF condition of the function for returning the cursor to its reference position may be set using the predetermined setup screen.

(Command Graphic Having a Mouse Button Function)

Figure 65:
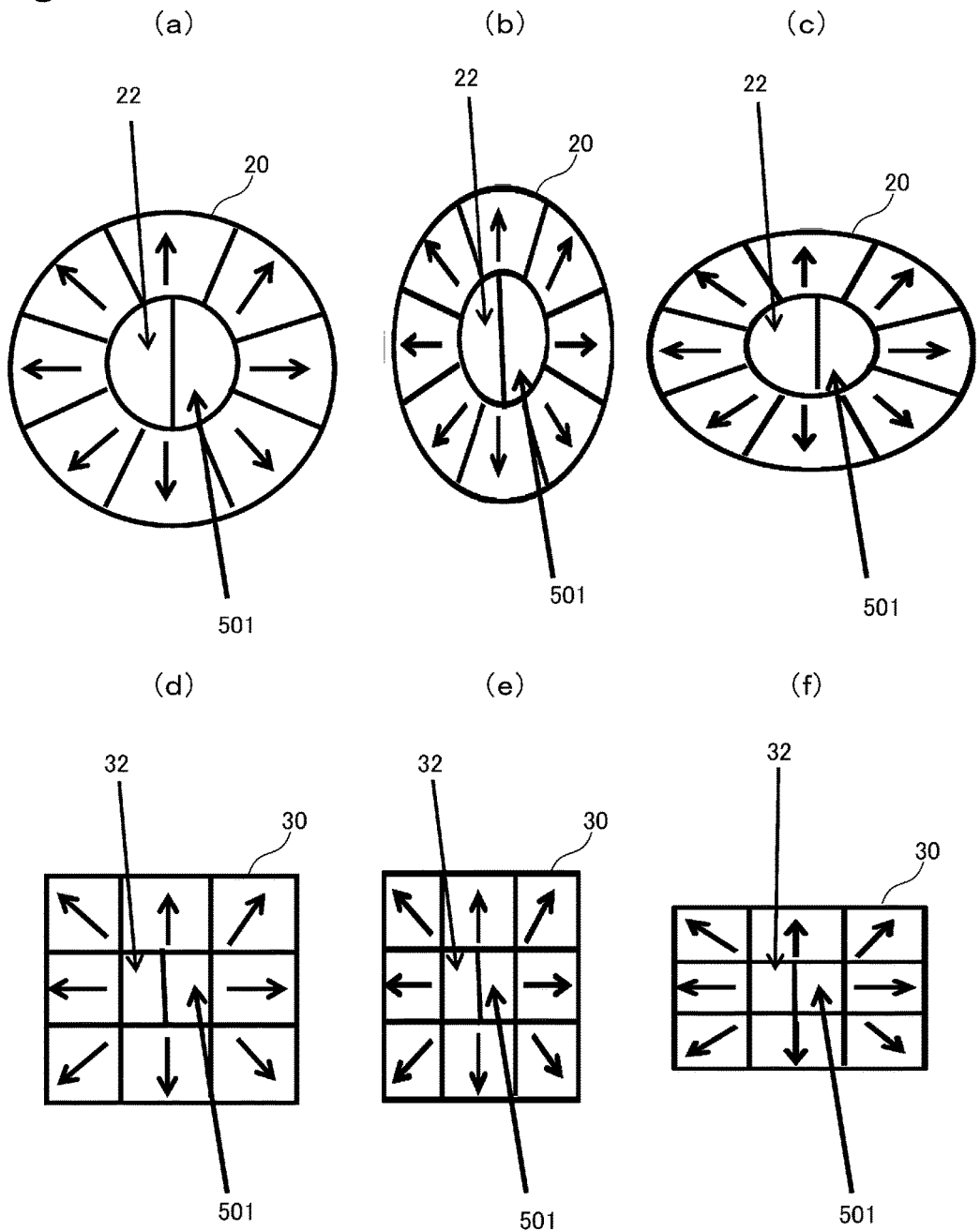
FIGS. 65(a) to 65(c) are views showing a first modified example of the first command graphic according to the first embodiment.
FIGS. 65(d) to 65(f) are views showing a first modified example of the second command graphic according to the first embodiment.
Figure 66:
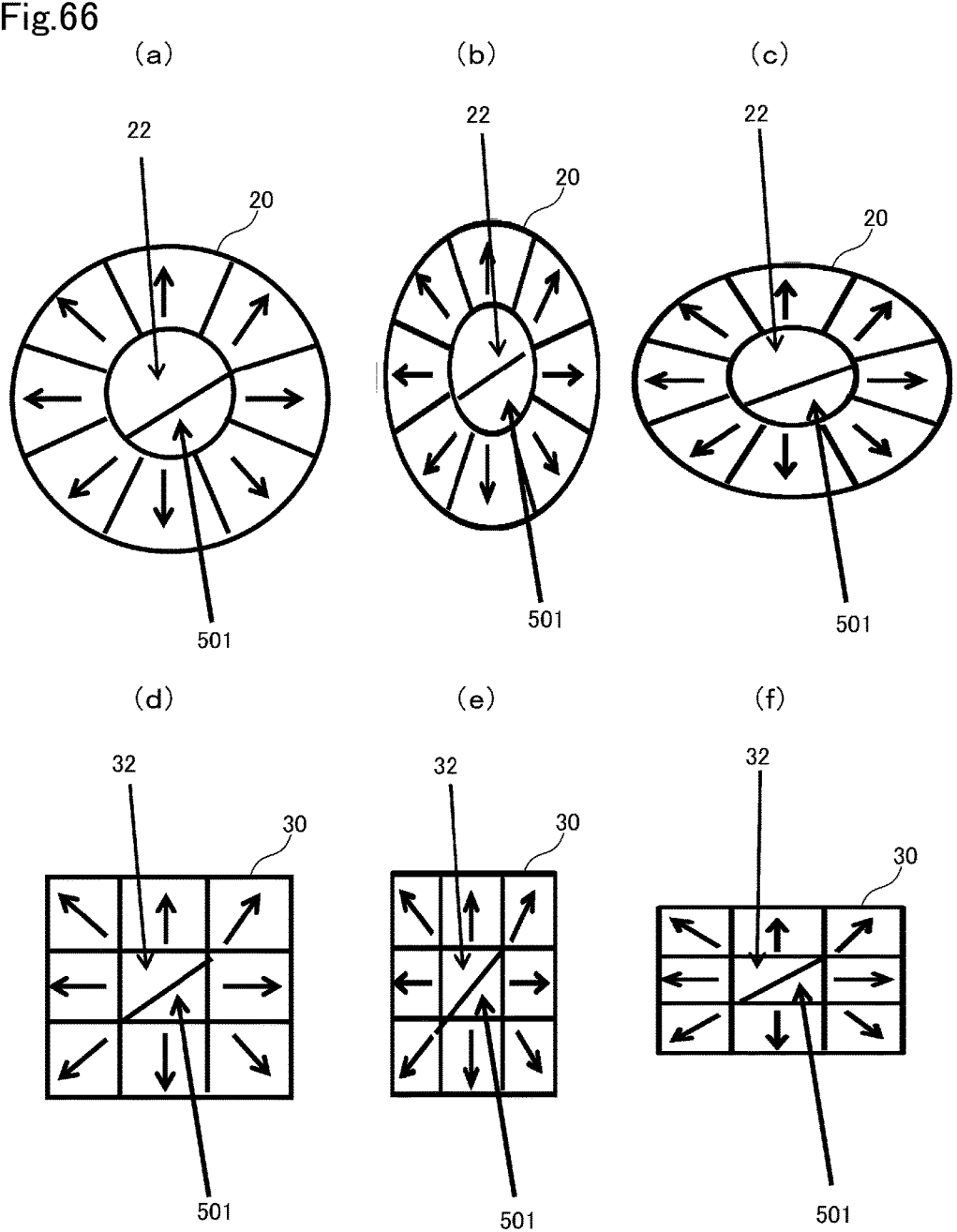
FIGS. 66(a) to 66(c) are views showing a second modified example of the first command graphic according to the first embodiment.
FIGS. 66(d) to 66(f) are views showing a second modified example of the second command graphic according to the first embodiment.
Figure 67:
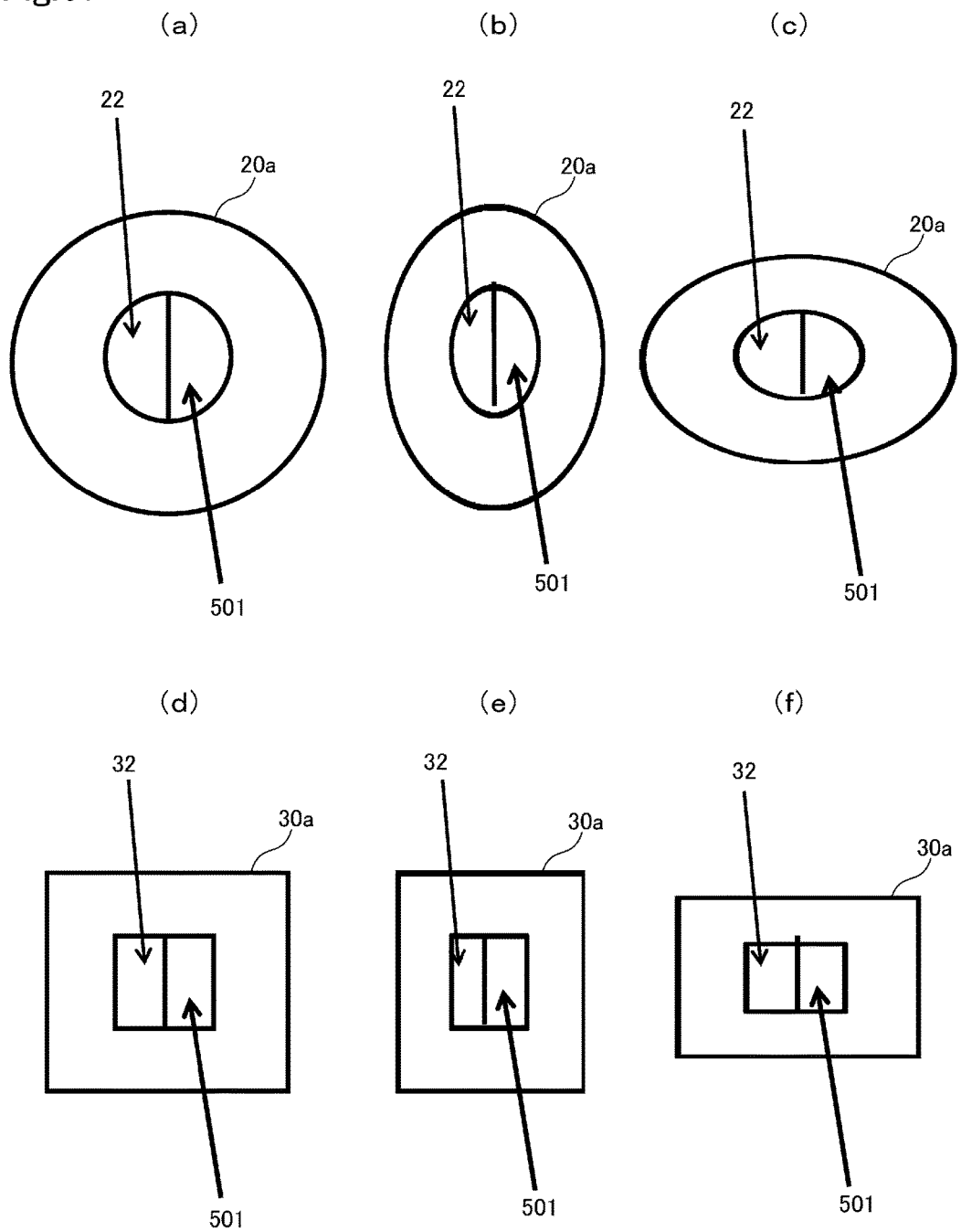
FIGS. 67(a) to 67(c) are views showing a first modified example of the first command graphic according to the modified example of the first embodiment.
FIGS. 67(d) to 67(f) are views showing a first modified example of the second command graphic according to the modified example of the first embodiment.
Figure 68:
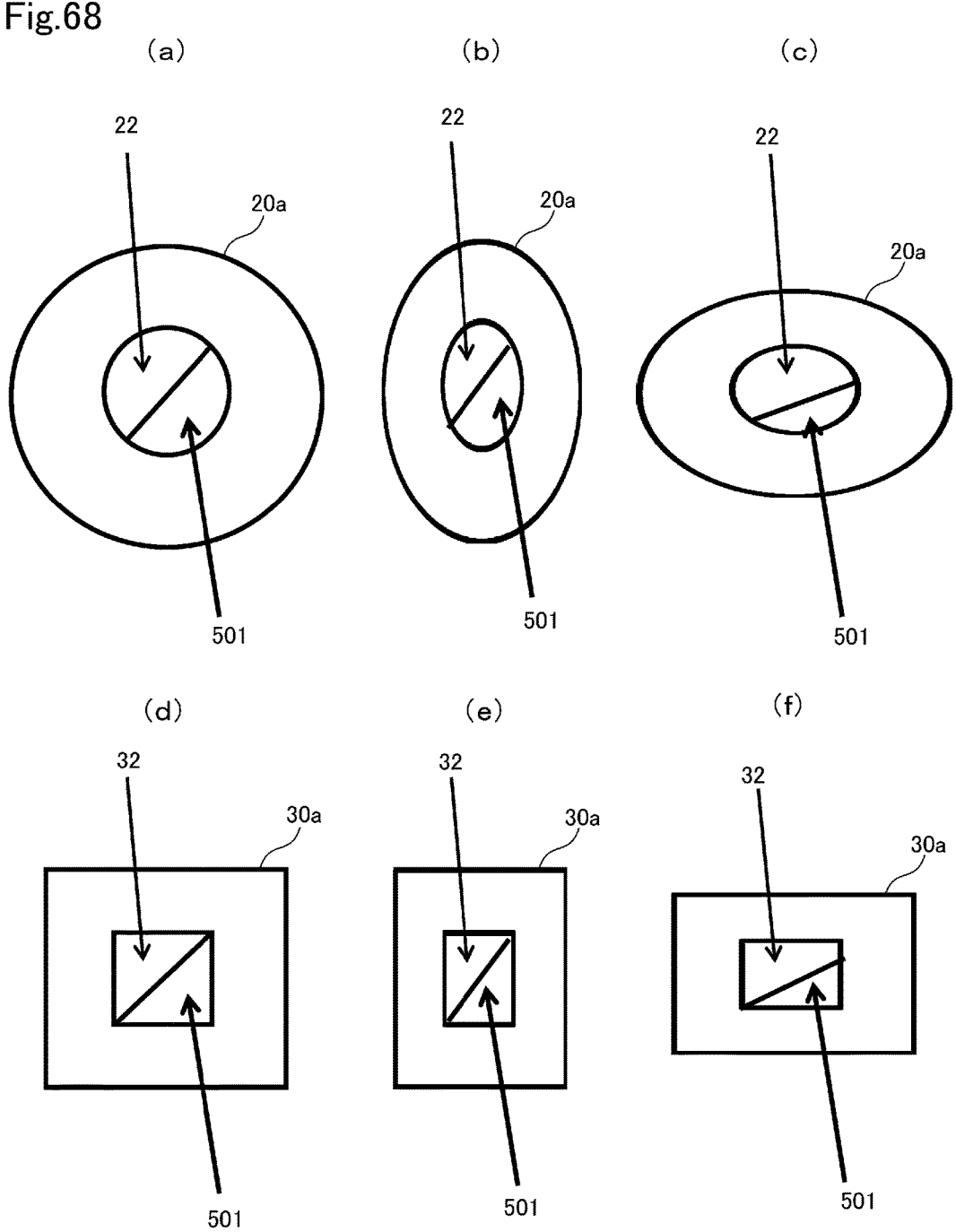
FIGS. 68(a) to 68(c) are views showing a second modified example of the first command graphic according to the modified example of the first embodiment.
FIGS. 68(d) to 68(f) are views showing a second modified example of the second command graphic according to the modified example of the first embodiment.

The first command graphic and second command graphic are not limited to those of the first and second embodiments described above, and command graphics shown in FIGS. 65 to 68, for example, may be used instead. FIGS. 65(a) to 65(c) are views showing a first modified example of the first command graphic according to the first embodiment, and FIGS. 65(d) to 65(f) are views showing a first modified example of the second command graphic according to the first embodiment. FIGS. 66(a) to 66(c) are views showing a second modified example of the first command graphic according to the first embodiment, and FIGS. 66(d) to 66(f) are views showing a second modified example of the second command graphic according to the first embodiment. FIGS. 67(a) to 67(c) are views showing a first modified example of the first command graphic according to the modified example of the first embodiment, and FIGS. 67(d) to 67(f) are views showing a first modified example of the second command graphic according to the modified example of the first embodiment. FIGS. 68(a) to 68(c) are views showing a second modified example of the first command graphic according to the modified example of the first embodiment, and FIGS. 68(d) to 68(f) are views showing a second modified example of the second command graphic according to the modified example of the first embodiment. In the modified examples of the first command graphic and the modified examples of the second command graphic shown in FIGS. 65 to 68, the region of the selection specifying portion described in the first embodiment is divided into two, whereby one of the regions is set as a selection specifying portion having a similar function to the selection specifying portion according to the first embodiment and the other region is set as a right-hand button portion 501 having a similar function to a right-hand button of a mouse. Accordingly, when the right-hand button portion 501 is tapped, for example, a menu of operations that can be performed at that time, similar to that obtained by clicking the right-hand button of a mouse, is displayed on the screen.

Figure 69:
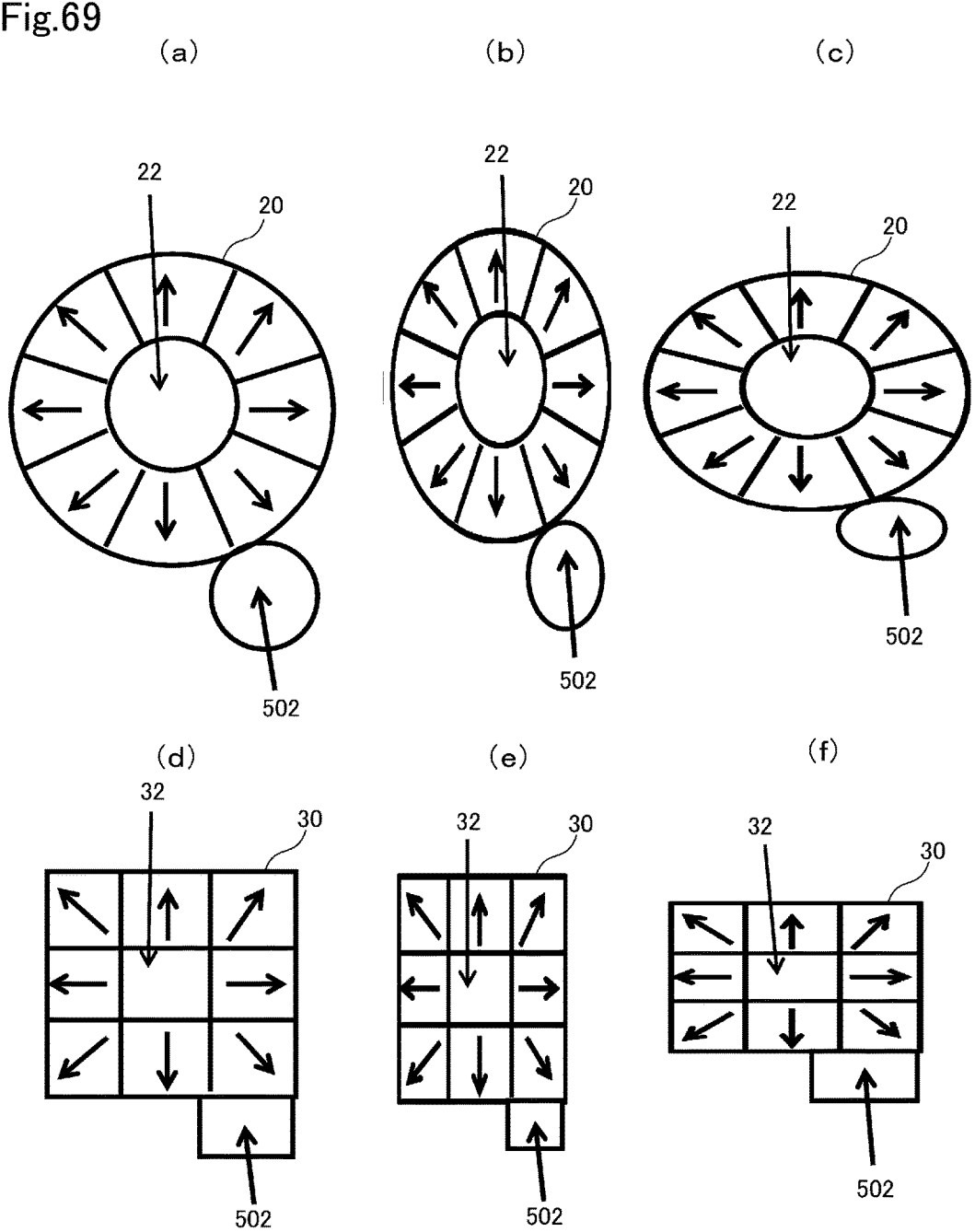
FIGS. 69(a) to 69(c) are views showing a modified example of the first command graphic according to the first embodiment.
FIGS. 69(d) to 69(f) are views showing a modified example of the second command graphic according to the first embodiment.
Figure 70:
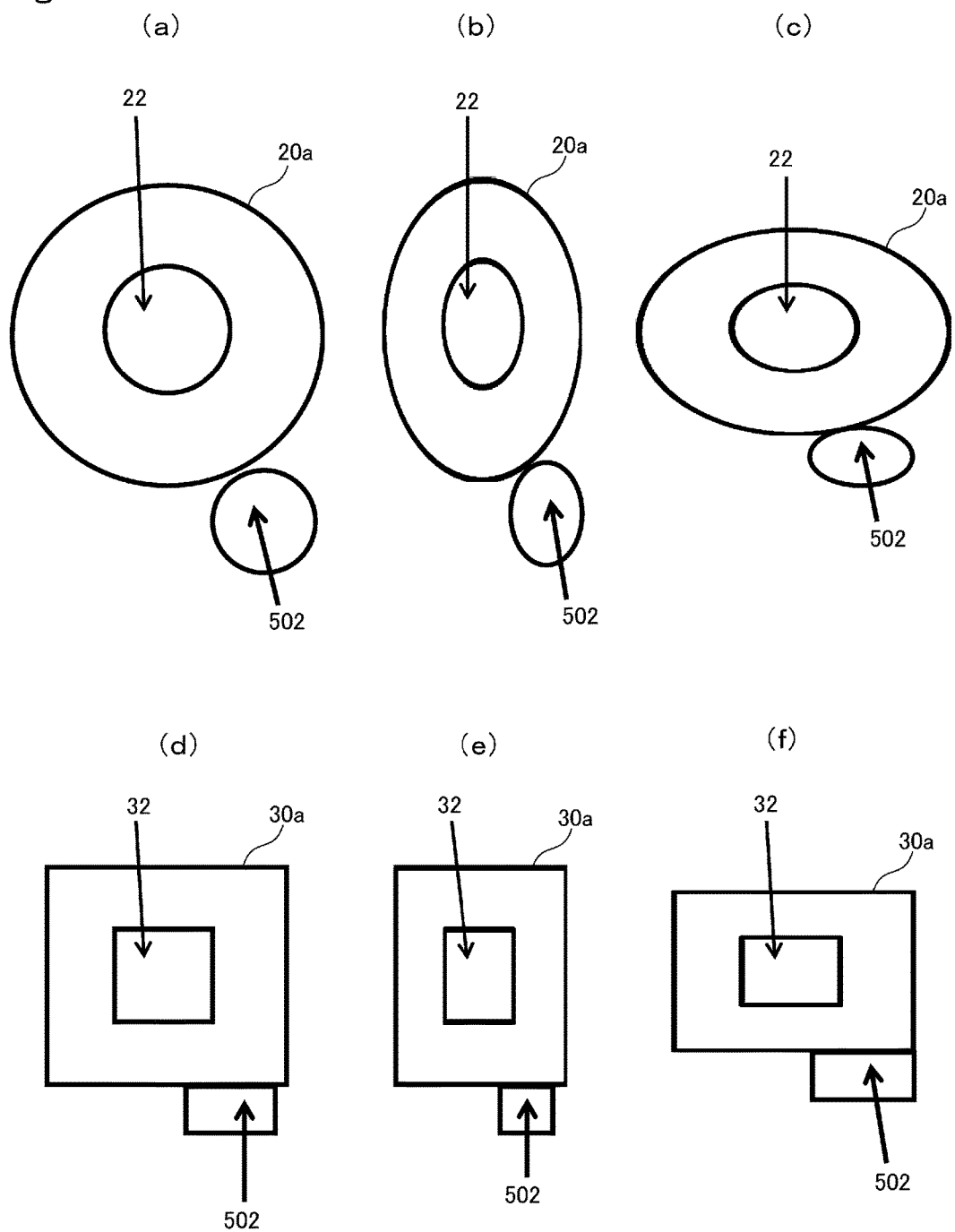
FIGS. 70(a) to 70(c) are views showing a modified example of the first command graphic according to the modified example of the first embodiment.
FIGS. 70(d) to 70(f) are views showing a modified example of the second command graphic according to the modified example of the first embodiment.
Figure 71:
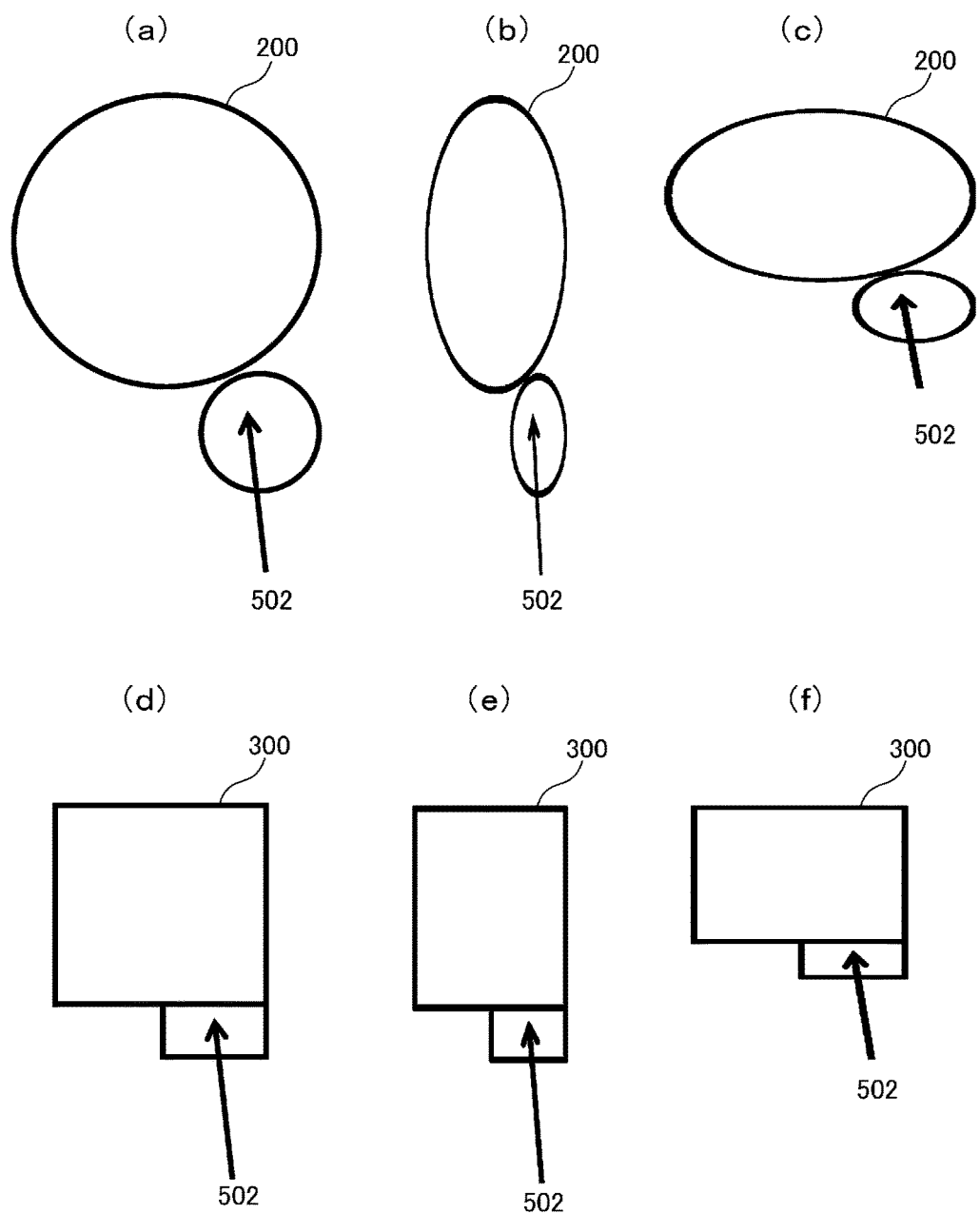
FIGS. 71(a) to 71(c) are views showing a modified example of the first command graphic according to the second embodiment.
FIGS. 71(d) to 71(f) are views showing a modified example of the second command graphic according to the second embodiment.

Command graphics shown in FIGS. 69 to 71, for example, may also be used as the first command graphic and the second command graphic. FIGS. 69(a) to 69(c) are views showing a modified example of the first command graphic according to the first embodiment, and FIGS. 69(d) to 69(f) are views showing a modified example of the second command graphic according to the first embodiment. FIGS. 70(a) to 70(c) are views showing a modified example of the first command graphic according to the modified example of the first embodiment, and FIGS. 70(d) to 70(f) are views showing a modified example of the second command graphic according to the modified example of the first embodiment. FIGS. 71(a) to 71(c) are views showing a modified example of the first command graphic according to the second embodiment, and FIGS. 71(d) to 71(f) are views showing a modified example of the second command graphic according to the second embodiment. In the modified examples of the first command graphic and the modified examples of the second command graphic shown in FIGS. 69 to 71, a region of a right-hand button portion 502 having a similar function to a right-hand button of a mouse is provided below the regions of the command graphics according to the respective embodiments. The right-hand button portion 502 functions similarly to the right-hand button portion 501 described above.

Figure 72:
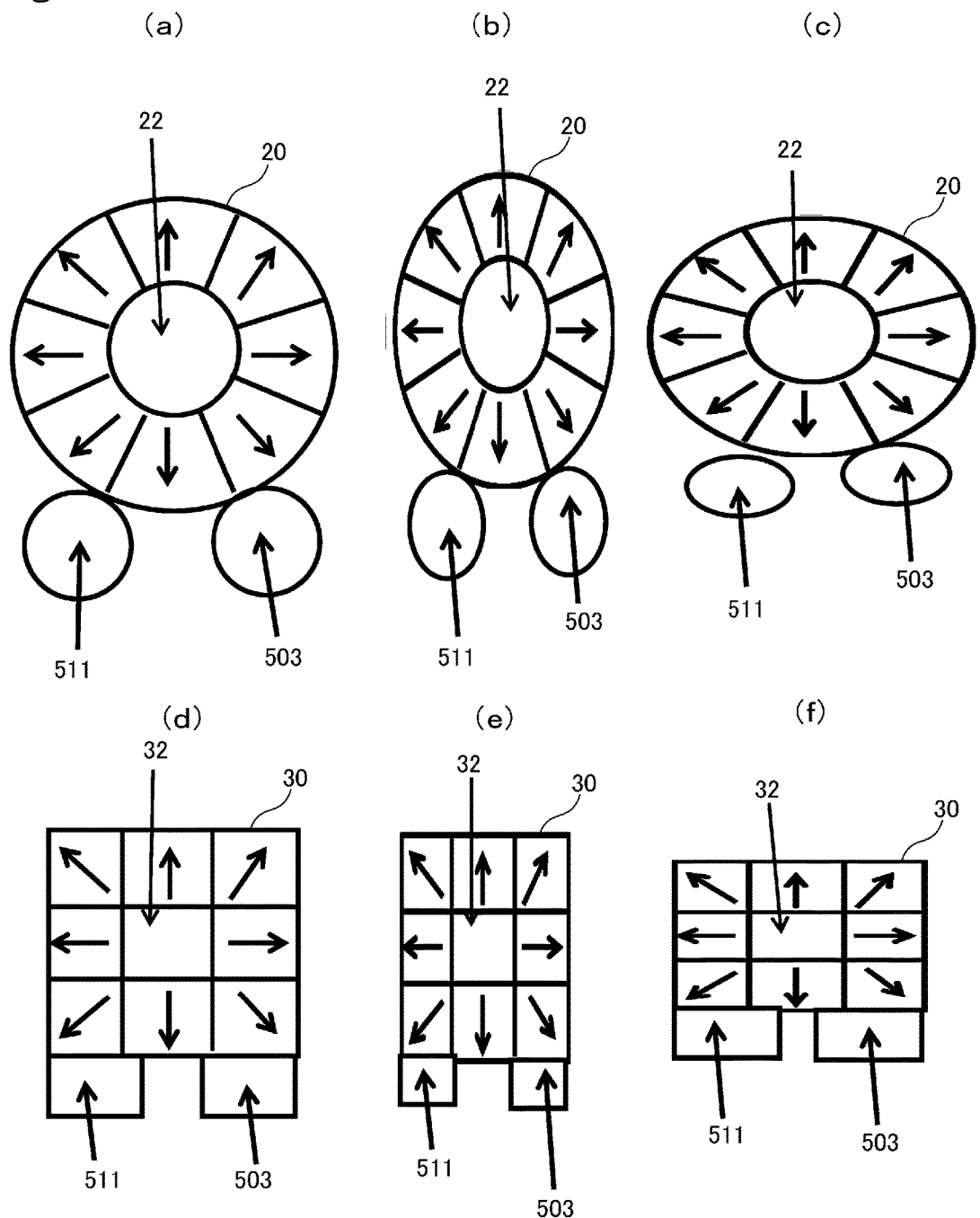
FIGS. 72(a) to 72(c) are views showing a modified example of the first command graphic according to the first embodiment.
FIGS. 72(d) to 72(f) are views showing a modified example of the second command graphic according to the first embodiment.
Figure 73:
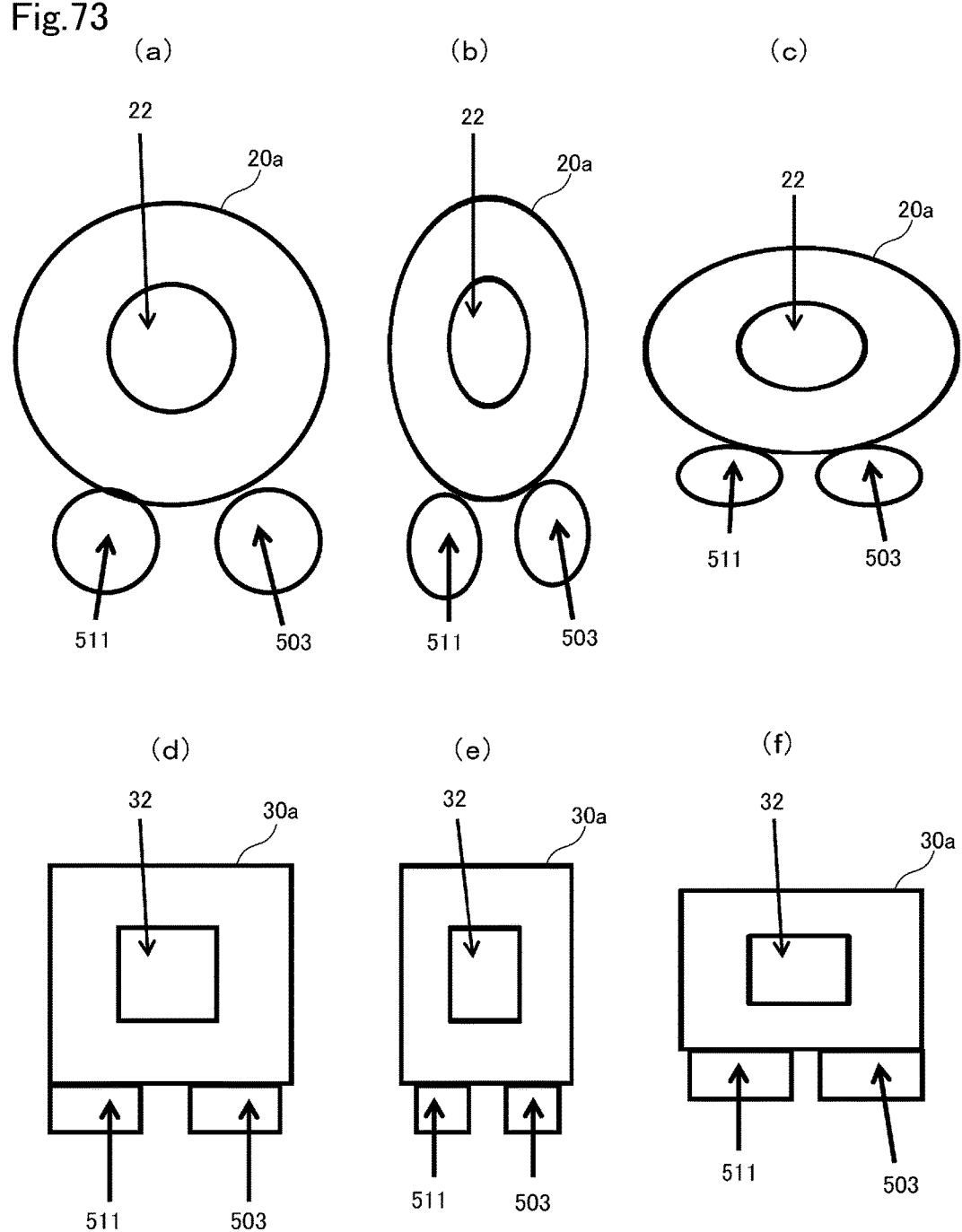
FIGS. 73(a) to 73(c) are views showing a modified example of the first command graphic according to the modified example of the first embodiment.
FIGS. 73(d) to 73(f) are views showing a modified example of the second command graphic according to the modified example of the first embodiment.
Figure 74:
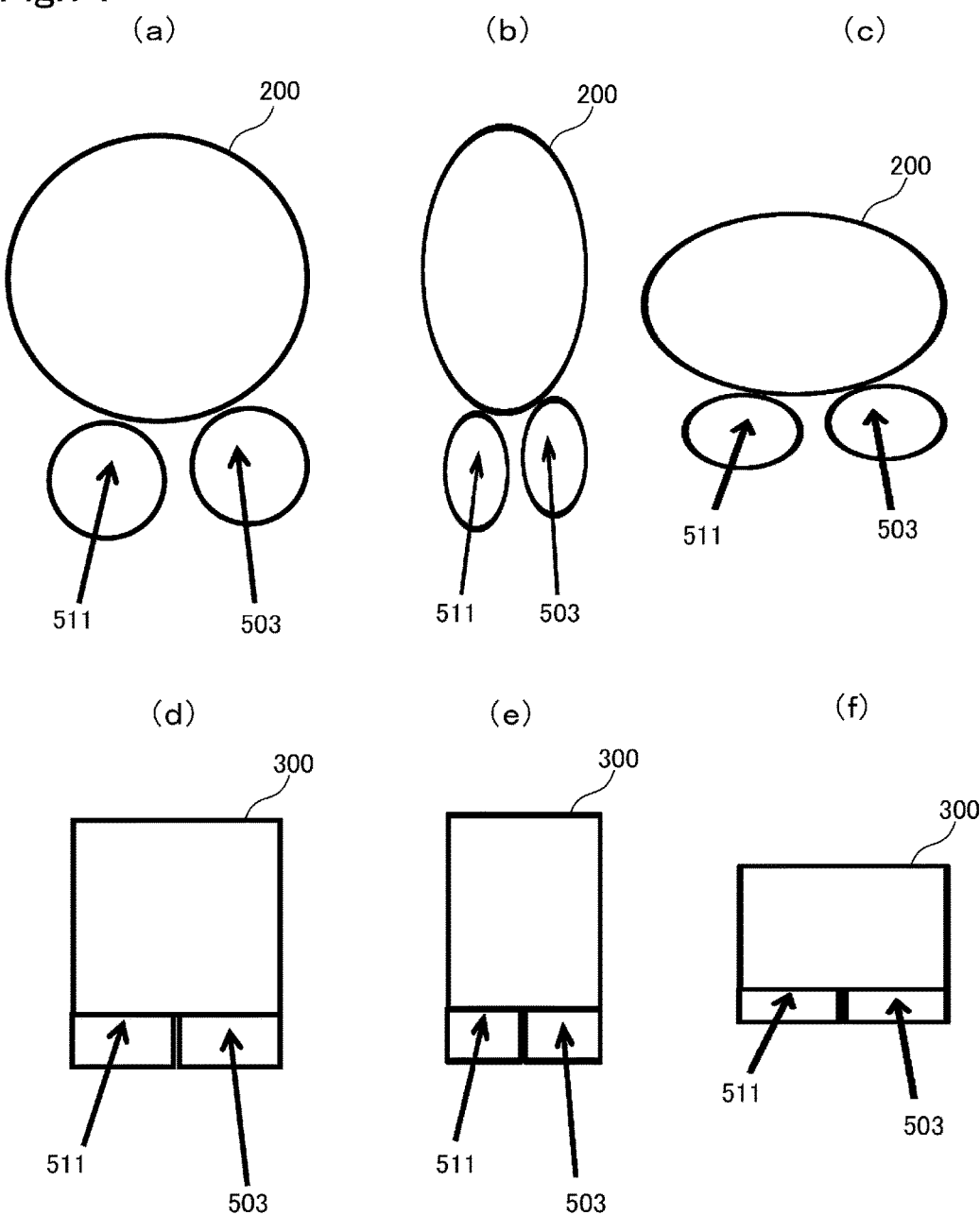
FIGS. 74(a) to 74(c) are views showing a modified example of the first command graphic according to the second embodiment.
FIGS. 74(d) to 74(f) are views showing a modified example of the second command graphic according to the second embodiment.

Command graphics shown in FIGS. 72 to 74, for example, may also be used as the first command graphic and the second command graphic. FIGS. 72(a) to 72(c) are views showing a modified example of the first command graphic according to the first embodiment, and FIGS. 72(d) to 72(f) are views showing a modified example of the second command graphic according to the first embodiment. FIGS. 73(a) to 73(c) are views showing a modified example of the first command graphic according to the modified example of the first embodiment, and FIGS. 73(d) to 73(f) are views showing a modified example of the second command graphic according to the modified example of the first embodiment. FIGS. 74(a) to 74(c) are views showing a modified example of the first command graphic according to the second embodiment, and FIGS. 74(d) to 74(f) are views showing a modified example of the second command graphic according to the second embodiment. In the modified examples of the first command graphic and the modified examples of the second command graphic shown in FIGS. 72 to 74, a region of a right-hand button portion 503 having a similar function to a right-hand button of a mouse and a region of a left-hand button portion 511 having a similar function to a left-hand button of a mouse are provided below the regions of the command graphics according to the respective embodiments. Accordingly, when the left-hand button portion 511 is tapped, for example, a file or a folder can be selected or a button indicated by the cursor, such as "Send", can be pressed in a similar manner to that obtained by clicking the left-hand button of a mouse. Note that the right-hand button portion 503 functions similarly to the right-hand button portion 501 described above.

(Portable Computing Device Displaying (a) Command Graphic(s) on a Rear Side)

Figure 75:
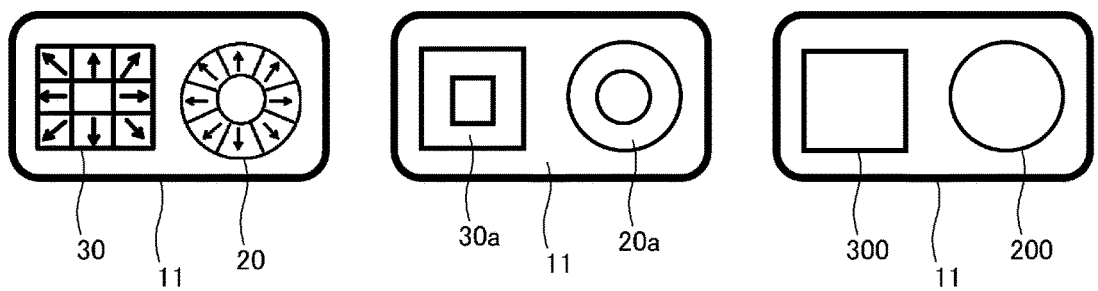
FIG. 75(a) is a view showing modified examples of the first command graphic and the second command graphic according to the first embodiment.
FIG. 75(b) is a view showing modified examples of the first command graphic and the second command graphic according to the modified example of the first embodiment.
FIG. 75(c) is a view showing modified examples of the first command graphic and the second command graphic according to the second embodiment.
Figure 76:
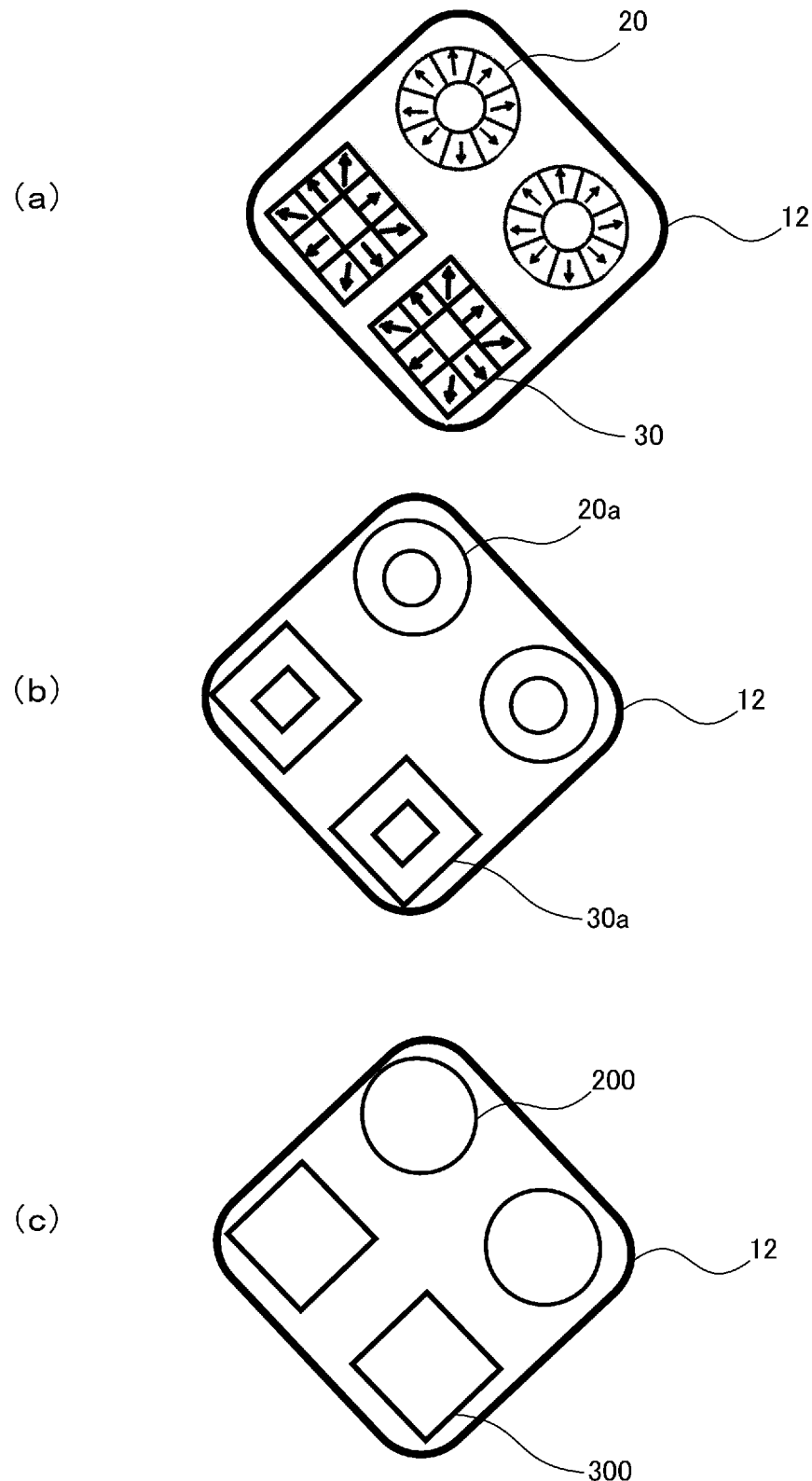
FIG. 76(a) is a view showing modified examples of the first command graphic and the second command graphic according to the first embodiment.
FIG. 76(b) is a view showing modified examples of the first command graphic and the second command graphic according to the modified example of the first embodiment.
FIG. 76(c) is a view showing modified examples of the first command graphic and the second command graphic according to the second embodiment.

In the above embodiments, although a case was described in which the regions of the command graphics are provided in a part of the display means provided on the front side of the portable computing device, the present invention is not limited thereto, and in addition to the command graphic region provided on the display means on the front side of the portable computing device, a region for displaying the first command graphic and the second command graphic may be provided on touch screen-equipped small display means 11 provided on the rear side of the portable computing device, as shown in FIGS. 75 and 76, for example. FIG. 75(*a*) is a view showing modified examples of the first command graphic and the second command graphic according to the first embodiment, FIG. 75(*b*) is a view showing modified examples of the first command graphic and the second command graphic according to the modified example of the first embodiment, and FIG. 75(*c*) is a view showing modified examples of the first command graphic and the second command graphic according to the second embodiment. By providing a region for displaying the command graphics shown in FIG. 75 on the small display means 11 provided on the rear side of the portable computing device in addition to the command graphic region provided on the display means on the front side of the portable computing device, the cursors can be operated using the command graphics displayed by the small display means 11 on the rear side in addition to the command graphics displayed by the display means on the front side of the portable computing device, enabling an improvement in user-friendliness. More specifically, in this case, the storage means stores first command graphic display region information used to display the first command graphic in a predetermined display region on a screen of the small display means, and second command graphic display region information used to display the second command graphic in a predetermined display region on the screen of the small display means; the command graphic control means controls the display of the first command graphic and the second command graphic in the respective predetermined display regions of the screen of the small display means on the basis of the first command graphic display region information and second command graphic display region information stored in the storage means. Further, when a touch operation is performed on the screen of the small display means, the position detection means detects the touch position, and outputs touch position information indicating the detected touch position. As regards the first command graphic and the second command graphic shown in FIG. 75, two small display means may be provided on the rear side of the portable computing device such that the first command graphic is displayed alone by one of the small display means and the second command graphic is displayed alone by the other small display means. Alternatively, a single small display means may be provided on the rear surface of the portable computing device, and a region for displaying either the first command graphic or the second command graphic may be provided on the small display means. In this case, the small display means need only be substantially half the size of small display means having a region for displaying two command graphics.

Furthermore, when the command graphics are provided on the rear side of the portable computing device, two sets of the first command graphic and the second command graphic may be displayed by rear side small display means 12, as shown in FIG. 76. FIG. 76(*a*) shows modified examples of the first command graphic and the second command graphic according to the first embodiment, FIG. 76(*b*) shows modified examples of the first command graphic and the second command graphic according to the modified example of the first embodiment, and FIG. 76(*c*) shows modified examples of the first command graphic and the second command graphic according to the second embodiment. The two sets of command graphics displayed by the rear side small display means 12 shown in FIG. 76 are displayed at 90 degree intervals, and therefore the first command graphic and second command graphic displayed on the rear side can be easily manipulated even when manipulated after rotating the portable computing device by 90 degrees. Further, in a case where two sets of the first command graphic and the second command graphic are displayed on the rear surface of the portable computing device, as shown in FIG. 76, a portable computing device having the function according to which the character input screen displayed on the screen of the display means rotates in accordance with rotation of the portable computing device may be provided with detection means for detecting whether the portable computing device is being used while oriented vertically or while oriented horizontally, for example. On the basis of a signal detected by the detection means, the control means 60 may then perform control to make the substantially horizontally positioned set of the first command graphic and the second command graphic operable and control to make the substantially vertically positioned set of the first command graphic and the second command graphic inoperable, for example control to prevent display of the substantially vertically positioned set of the first command graphic and the second command graphic. Furthermore, as regards the four command graphics shown in FIG. 76, two small display means may be provided on the rear surface of the portable computing device such that one set of the first command graphic and the second command graphic is displayed on each small display means, or four small display means may be provided on the rear surface of the portable computing device such that one command graphic is displayed on each small display means.

Note that likewise when the regions of the command graphics are provided on the rear surface of the portable computing device, the region of the selection specifying portion may be divided into two, as shown in the modified examples of FIGS. 65 to 68, such that one region is set as a selection specifying portion having a similar function to the selection specifying portion of the first embodiment and the other region is set as a right-hand button portion having a similar function to a right-hand button of a mouse. Alternatively, a region for a right-hand button portion having a similar function to a right-hand button of a mouse may be provided below the region of each command graphic, as shown in the modified examples of FIGS. 69 to 71, or a region for a right-hand button portion having a similar function to a right-hand button of a mouse and a region for a left-hand button portion having a similar function to a left-hand button of a mouse may be provided below the region of each command graphic, as shown in the modified examples of FIGS. 72 to 74. Furthermore, when the first command graphic and the second command graphic are displayed by the small display means on the rear side of the portable computing device, as in the portable computing device described above, the first command graphic and the second command graphic need not be displayed by the display means on the front side of the portable computing device.

Moreover, when the first command graphic and the second command graphic shown in FIG. 75(a) are disposed on the rear surface of the portable computing device and a tapping operation is performed on one of the eight movement direction specifying portions of the first command graphic, which specify up, down, left, right, and other directions as viewed from the front surface side (the display side) of the portable computing device, the first cursor corresponding to the command graphic moves across the character input screen 100 in the direction specified by the tapped movement direction specifying portion. This applies likewise to the second command graphic. Here, when the right-hand button portion and the left-hand button portion are disposed on the rear surface of the portable computing device, the right-hand button portion and the left-hand button portion may be respectively disposed on the right side and the left side as viewed from the front surface side (the display side) of the portable computing device. Therefore, when the first command graphic and the second command graphic shown in FIG. 75(a) are disposed on the rear surface of the portable computing device, the user normally manipulates the respective command graphics using the index finger or the like rather than the thumb. Further, when the first command graphic and the second command graphic shown in FIG. 75(b) are disposed on the rear surface of the portable computing device, and a desired position on the movement direction specifying portion of the first command graphic is tapped, the first cursor moves across the character input screen 100 in parallel with a direction heading from the center position of the first command graphic toward the tapped position as viewed from the front surface side (the display side) of the portable computing device. This applies likewise to the second command graphic. Here, when the right-hand button portion and the left-hand button portion are disposed on the rear surface of the portable computing device, the right-hand button portion and the left-hand button portion may be disposed respectively on the right side and the left side as viewed from the front surface side (the display side) of the portable computing device. Therefore, when the first command graphic and the second command graphic shown in FIG. 75(b) are disposed on the rear surface of the portable computing device, the user normally manipulates the respective command graphics using the index finger or the like rather than the thumb. Furthermore, when the first command graphic and the second command graphic shown in FIG. 75(c) are disposed on the rear surface of the portable computing device and the up, down, left, right, or other direction, as viewed from the front surface side (the display side) of the portable computing device, is specified by flicking or dragging the first command graphic, the first cursor corresponding to the command graphic moves across the character input screen 100 in the specified direction. This applies likewise to the second command graphic. Here, when the right-hand button portion and the left-hand button portion are disposed on the rear surface of the portable computing device, the right-hand button portion and the left-hand button portion may be disposed respectively on the right side and the left side as seen from the front surface side (the display side) of the portable computing device. Therefore, when the first command graphic and the second command graphic shown in FIG. 75(c) are disposed on the rear surface of the portable computing device, the user normally manipulates the respective command graphics using the index finger or the like rather than the thumb.

(Sliding-Type Portable Computing Device)

Figure 77:
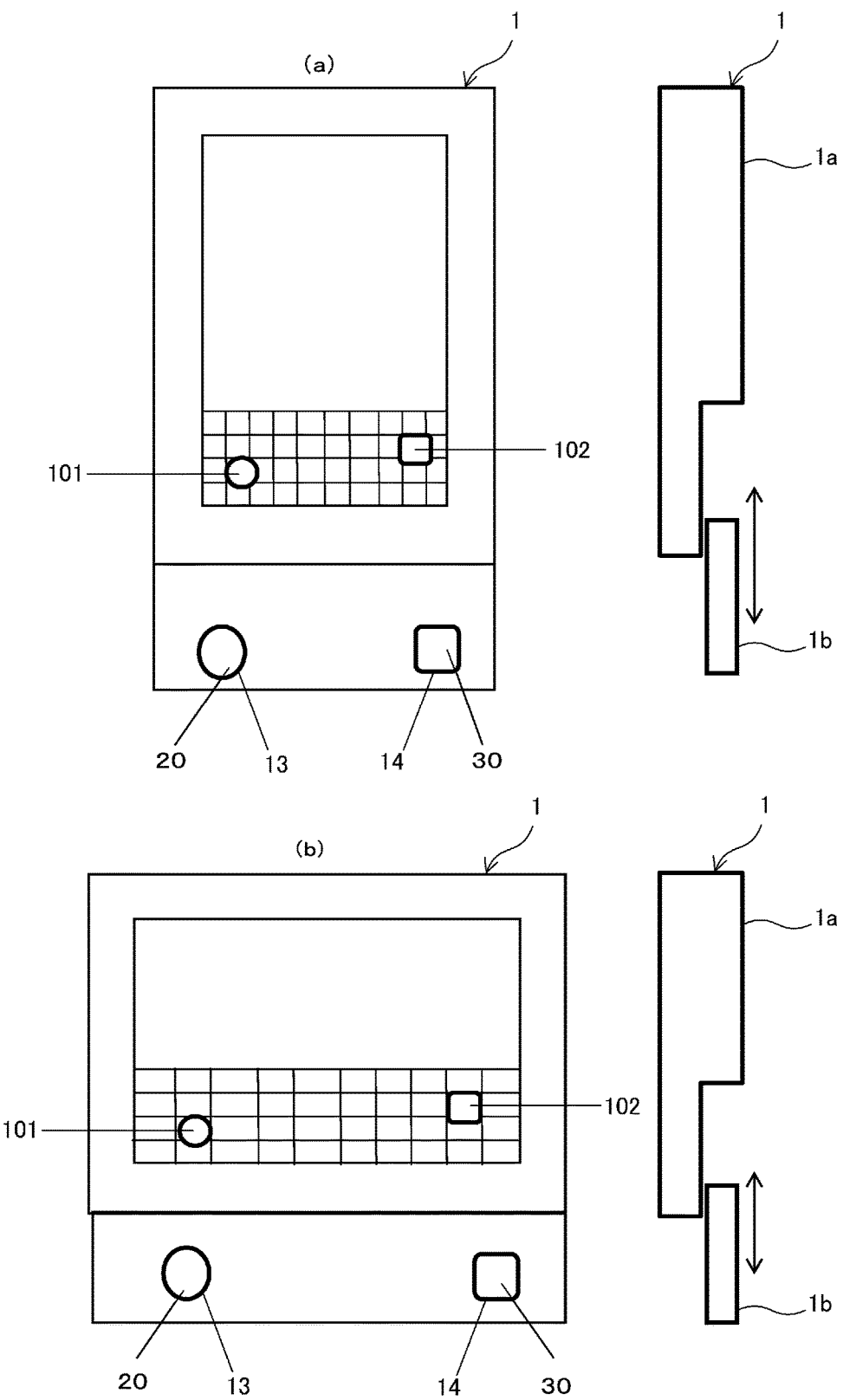
FIGS. 77(a) and (b) are views showing an example of a portable computing device in which a part of a rear portion of the portable computing device slides in an up-down direction.
Figure 78:
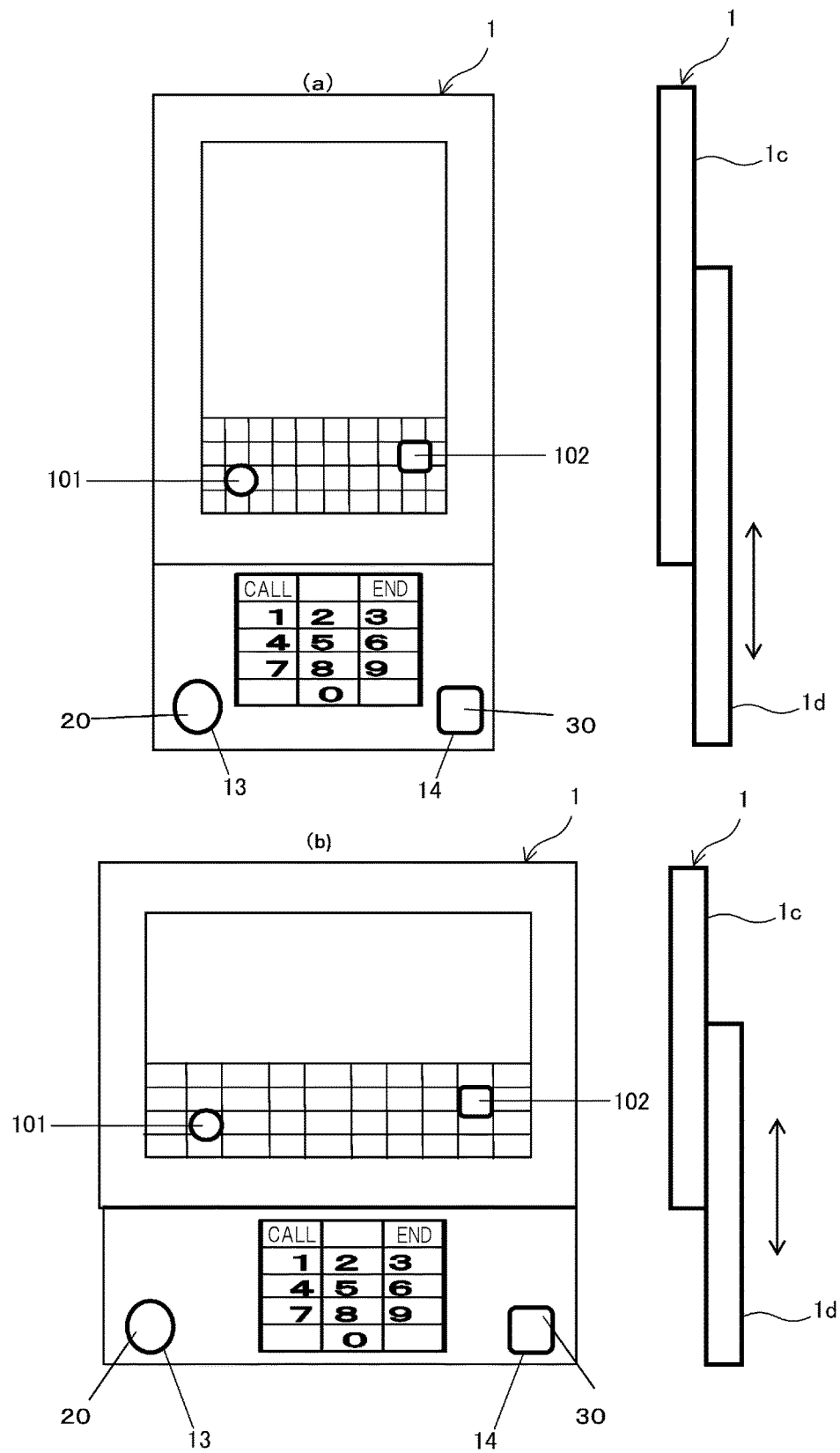
FIGS. 78(a) and (b) are views showing an example of a portable computing device in which the entire rear portion of the portable computing device slides in the up-down direction.
Figure 80:
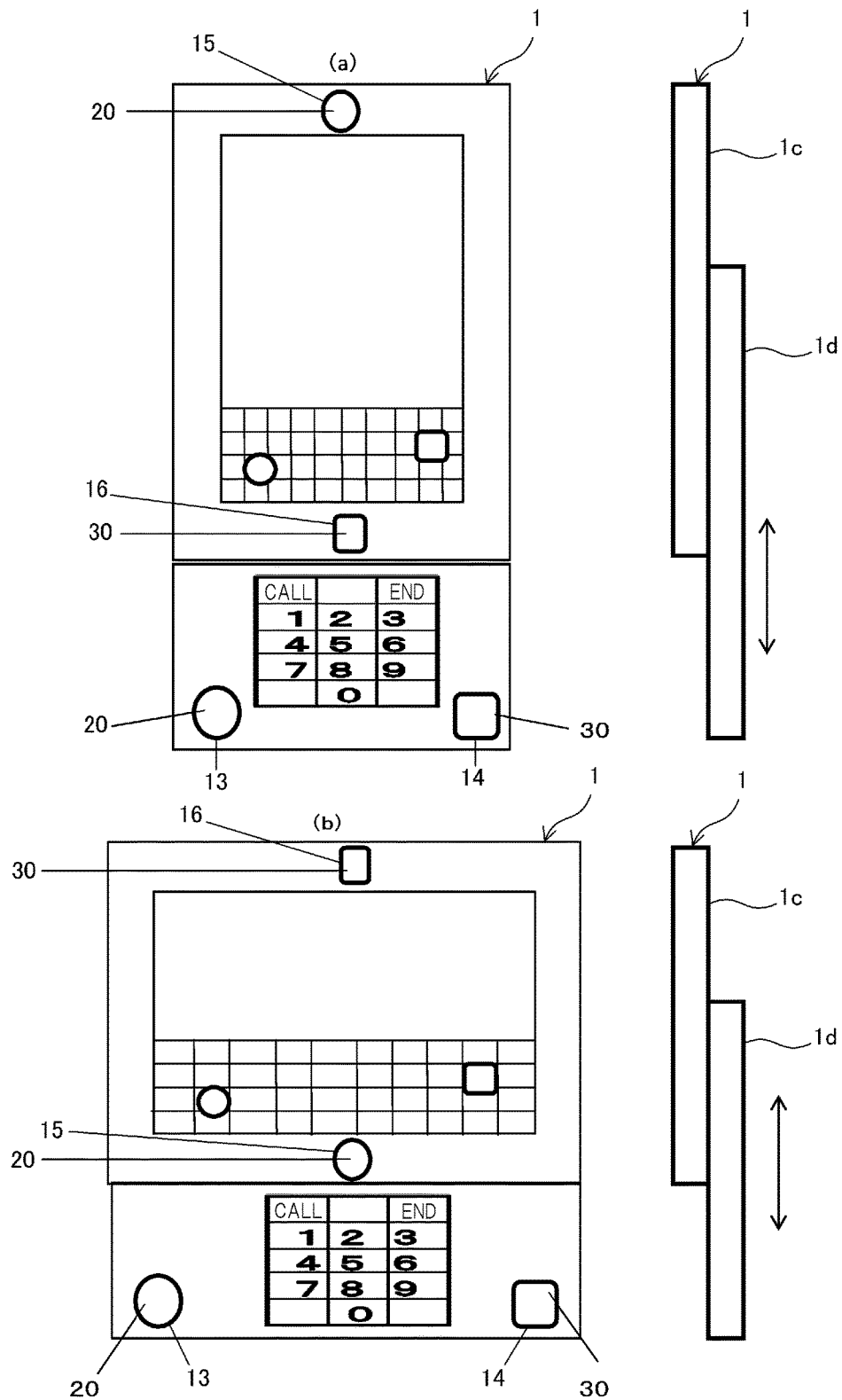
FIGS. 80(a) and (b) are views showing another example of a portable computing device in which the entire rear portion of the portable computing device slides in the up-down direction.

In the embodiments described above, the portable computing device may be configured as a sliding-type portable computing device, and the first command graphic and second command graphic may be displayed on touch screen-equipped small display means that appears when the portable computing device slides open. FIGS. 77 and 78 are views showing examples of the display positions of the first command graphic and the second command graphic in a case where the portable computing device of the present invention is a sliding-type portable computing device. More specifically, FIG. 77 shows an example of a portable computing device 1 having a main body portion 1a and a sliding portion 1b that constitutes a part of a rear portion of the portable computing device 1 and slides in the up-down direction, while FIG. 78 shows an example of a portable computing device 1 having a main body portion 1c and a sliding portion 1d that constitutes the entire rear portion of the portable computing device 1 and slides in the up-down direction. In FIGS. 77 and 78, when the user slides the sliding portion of the portable computing device, the first command graphic 20 is displayed by a small display means 13 provided on the left side of the sliding portion of the portable computing device, and the second command graphic 30 is displayed by a small display means 14 provided on the right side of the sliding portion of the portable computing device. Further, FIG. 79 shows another example of the portable computing device 1 having the main body portion 1a and the sliding portion 1b that constitutes a part of the rear portion of the portable computing device and slides in the up-down direction, while FIG. 80 shows another example of the portable computing device 1 having the main body portion 1c and the sliding portion 1d that constitutes the entire rear portion of the portable computing device 1 and slides in the up-down direction. As shown in FIGS. 79 and 80, when the portable computing device is configured as a sliding-type portable computing device, touch screen-equipped small display means 15, 16 may be provided in predetermined positions in a frame portion of the main body portion of the portable computing device, and the first command graphic and the second command graphic may be displayed by the small display means 15 and the small display means 16, respectively. In so doing, the first command graphic and the second command graphic can be manipulated even when the rear sliding portion slides closed so as to be housed in the rear side of the main body portion of the portable computing device 1.

Note that in FIGS. 77 to 80, the first command graphic 20 and the second command graphic 30 are displayed, but the first command graphic 20a shown in FIG. 27 or the first command graphic 200 shown in FIG. 29 may be displayed instead of the first command graphic 20, and the second command graphic 30a shown in FIG. 27 or the second command graphic 300 shown in FIG. 29 may be displayed instead of the second command graphic 30. Moreover, likewise with regard to the sliding-type portable computing device shown in FIGS. 77 to 80, the region of the selection specifying portion may be divided into two, as shown in the modified examples of FIGS. 65 to 68, such that one region is set as a selection specifying portion having a similar function to the selection specifying portion of the first embodiment and the other region is set as a right-hand button portion having a similar function to a right-hand button of a mouse. Alternatively, a region for a right-hand button portion having a similar function to a right-hand button of a mouse may be provided below the region of each command graphic, as shown in the modified examples of FIGS. 69 to 71, or a region for a right-hand button portion having a similar function to a right-hand button of a mouse and a region for a left-hand button portion having a similar function to a left-hand button of a mouse may be provided below the region of each command graphic, as shown in the modified examples of FIGS. 72 to 74. Furthermore, likewise with regard to the sliding-type portable computing device shown in FIGS. 77 to 80, touch screen-equipped small display means may be provided on a rear surface of the main body portion or the sliding portion, and the small display means may be provided with a region for displaying the command graphics such as that shown in FIG. 75 or a region for displaying the command graphics such as that shown in FIG. 76, for example.

(Clamshell Mobile Phone)

When the portable computing device of the present invention is a clamshell mobile phone, as shown in FIG. 81, touch screen-equipped small display means may be provided in a part positioned on the lower side in the state where the mobile phone is opened, and the command graphics may be displayed by the small display means. FIG. 81(*a*) shows a case in which the first command graphic 20 is displayed by a small display means 17 provided on the front side of the part positioned on the lower side in the state in which the mobile phone is opened, and FIG. 81(*b*) shows a case in which the first command graphic 20 is displayed by a small display means 17 provided on the rear side of the part positioned on the lower side in the state in which the mobile phone is opened. FIG. 81(*c*) shows a case in which the first command graphic 20 and the second command graphic 30 are respectively displayed by a small display means 18 and a small display means 19 provided on the front side of the part positioned on the lower side in the state in which the mobile phone is opened, and FIG. 81(*d*) shows a case in which the first command graphic 20 and the second command graphic 30 are respectively displayed by a small display means 18 and a small display means 19 provided on the rear side of the part positioned on the lower side in the state in which the mobile phone is opened.

Note that likewise with regard to the clamshell mobile phone shown in FIG. 81, the region of the selection specifying portion may be divided into two, as shown in the modified examples of FIGS. 65 to 68, such that one region is set as a selection specifying portion having a similar function to the selection specifying portion of the first embodiment and the other region is set as a right-hand button portion having a similar function to a right-hand button of a mouse. Alternatively, a region for a right-hand button portion having a similar function to a right-hand button of a mouse may be provided below the region of each command graphic, as shown in the modified examples of FIGS. 69 to 71, or a region for a right-hand button portion having a similar function to a right-hand button of a mouse and a region for a left-hand button portion having a similar function to a left-hand button of a mouse may be provided below the region of each command graphic, as shown in the modified examples of FIGS. 72 to 74. Furthermore, when the small display means is provided on the rear side, as shown in FIGS. 81(*b*) and 81(*d*), the small display means on the front side may be omitted.

(Miscellaneous)

When, in the portable computing device of the present invention, the touch screen-equipped small display means provided on the rear surface of the portable computing device includes a region for displaying the command graphics, the shape of the small display means is not limited to the round or angular shapes described above, and any shape may be employed.

Figure 82:
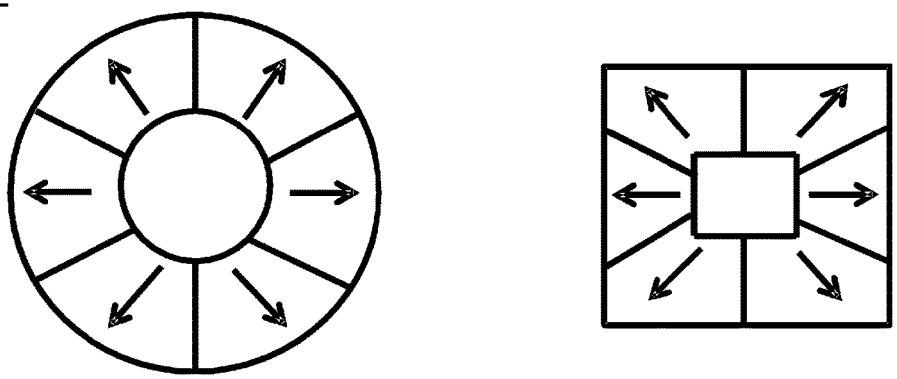
FIG. 82 is a view showing examples of a first command graphic and a second command graphic having six movement direction specifying portions.
Figure 83:
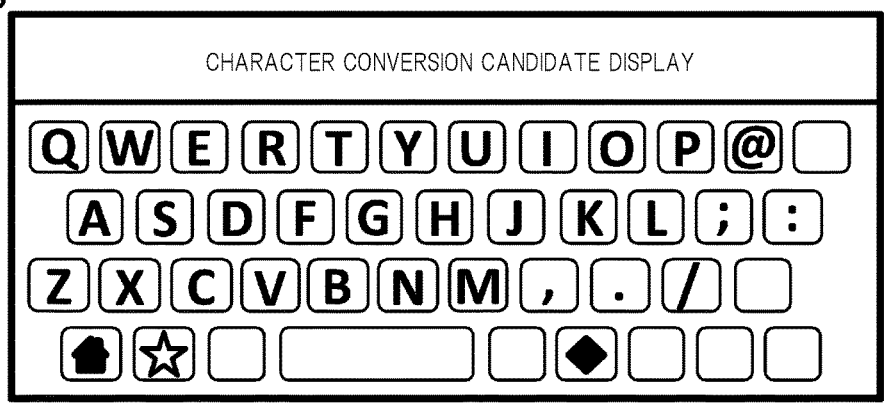
FIG. 83 is a view showing an example of a keyboard image on which key images are arranged diagonally.

Further, in the first embodiment and other embodiments relating to the first embodiment, although a case was described in which command graphics having eight movement direction specifying portions are respectively used as the first command graphic and the second command graphic, any command graphics having a plurality of movement direction specifying portions, such as four or six movement direction specifying portions, may be used as the first command graphic and the second command graphic. Here, FIG. 82 shows an example of the first command graphic and the second command graphic including six movement direction specifying portions. When first and second command graphics respectively having six movement direction specifying portions are used, the keyboard image is preferably an image such as that shown in FIG. 83, i.e. an image on which the respective character key images on a row including "A" are disposed so as to be diagonally offset relative to the respective character key images on a row including "Z", for example, similarly to a key layout of an actual keyboard. In so doing, the directions of movement indicated by the respective movement direction specifying portions correspond to the arranged directions of the key images. Note that FIG. 83 shows an example of a QWERTY layout keyboard image, but a keyboard image on which the key images are disposed so as to be diagonally offset may be used likewise in another input mode or an input mode of another language. Moreover, in the first embodiment and other embodiments relating to the first embodiment, likewise in a case where only one set of the cursor and the command graphic is displayed on the screen of the display means, any image having a plurality of movement direction specifying portions, such as four or six movement direction specifying portions, may be used as the command graphic.

In portable computing devices of the present invention, as described above, the cursor(s) is (are) displayed on the character input screen, and the command graphic(s) for specifying the direction(s) of movement of the cursor(s) and for specifying the selection of the character key image(s) currently indicated by the cursor(s) on the keyboard image is (are) displayed on the screen of the display means. Hence, the command graphic(s) can be displayed anywhere on the screen of the display means, and therefore, the command graphic(s) can be disposed in (a) position(s) enabling easy manipulation by a user. As a result, an improvement in user-friendliness during a character input operation can be achieved. Further, mechanical specifying buttons used in conventional mobile phones to operate a cursor need not be provided on the periphery of the display screen, and therefore the portable computing device can be reduced in size. Accordingly, the present invention can be applied to any portable computing device having a character input function, such as a mobile phone, a smartphone, a personal digital assistant, or a tablet computer.

EXPLANATION OF THE REFERENCE NUMERALS

10 display means
11, 12, 13, . . . , 19 touch screen-equipped small display means
20, 20*a*, 200 first command graphic 21, 21a, 21b, . . . , 21h movement direction specifying portion
22 selection specifying portion
30, 30a, 300 second command graphic
31, 31a, 31b, . . . , 31h movement direction specifying portion
32 selection specifying portion
40 storage means
50 communication means
60 control means
61 display control means
61a command graphic display control means
61b cursor display control means
61c keyboard image display control means
62 manipulation determining means
63 input control means
70 touch screen
71 position detection means
100 character input screen
100a mail send/create screen
101 first cursor
102 second cursor
110 keyboard image
111 character input mode switch key
112 home key
113 keyboard switch key
115 character conversion candidate display portion
120 inputted character display screen
120a message creation display screen
121 address input field
122 address input completion button
123 title input field
124 title input completion button
125 body input section
126 send button
400 setup screen
410 size selection portion
420 shape selection portion
430 position selection portion

The invention claimed is:

1. A method for operating a portable computing device having a touch screen associated with a display, the method comprising:
displaying on a first predetermined display region of the display a keyboard image that includes a plurality of character key images respectively representing a plurality of characters to be input into a character display field of the display,
displaying on a second predetermined display region of the display at least one command graphic that contains (i) a direction-specifying area for selecting a direction of movement of a displayed cursor that is movable within the keyboard image and (ii) a selection input area, wherein the direction-specifying area is located at a periphery of the command graphic and the selection input area is located at a center of the command graphic such that the direction-specifying area surrounds the selection input area,
storing information concerning the second predetermined display region of the display,
detecting a position on the touch screen that was touched by a user and generating touch position information,
determining from the touch position information and from the stored information concerning the second predetermined display region whether the direction-specifying area or the selection input area has been touched,
in response to a determination that the direction-specifying area has been touched, moving the displayed cursor shown within the keyboard image in one or more discrete key image units in a direction of movement indicated by a portion of direction-specifying area that was touched, and
in response to a determination that the selection input area has been touched, displaying on the character display field the character of the character key image that the displayed cursor is currently superimposed upon.

2. The method according to claim 1, wherein the direction-specifying area of the command graphic includes a plurality of discrete movement direction specifying portions that specify the direction of movement of the cursor, and the method further comprises:
defining touching one of the movement direction specifying portions of the command graphic as a first operation, and
defining touching the selection input area of the command graphic as a second operation.

3. The method according to claim 1, wherein the direction-specifying area of the command graphic includes a plurality of movement direction specifying portions that each include at least one of a left-right direction and a diagonal direction.

4. The method according to claim 1, further comprising:
moving the cursor to an adjacent key image in the direction of movement in response to a determination that the direction-specifying area of the command graphic was tapped as a first operation, and
continuously moving the cursor in a plurality of key image units in the direction of movement in response to a determination that the direction-specifying area of the command graphic was pressed and held as the first operation until said direction-specifying area is no longer being pressed and held.

5. The method according to claim 4, wherein the command graphic includes a plurality of the direction-specifying areas that each include at least one of a left-right direction and a diagonal direction.

6. The method according to claim 5, further comprising:
determining whether or not a pinch-in operation or a pinch-out operation has been performed on the at least one command graphic based on the touch position information and the stored information,
in response to a determination that the pinch-in operation has been performed on the command graphic, outputting a signal indicating that the pinch-in operation has been performed on the command graphic,
in response to the signal indicating that the pinch-in operation has been performed on the command graphic, reducing a size of the command graphic on the display,
in response to a determination that the pinch-out operation has been performed on the command graphic, outputting a signal indicating that the pinch-out operation has been performed on the command graphic, and
in response to the signal indicating that the pinch-out operation has been performed on the command graphic, increasing the size of the command graphic on the display.

7. The method according to claim 6, further comprising:
in response to a determination that the at least one command graphic has been flicked, moving the cursor displayed within the keyboard image in one or more discrete key image units in a direction of movement specified by the flicking of the at least one command graphic and by a distance corresponding to a distance of the flicking of the at least one command graphic, and in response to a determination that the at least one command graphic has been touched in a manner different from flicking, displaying on the character display field the character of the character key image that the displayed cursor is currently superimposed upon.

8. The method according to claim 1, wherein:

in response to a determination that the direction-specifying area has been tapped, the displayed cursor shown within the keyboard image is moved in one discrete key image unit to an adjacent key image in a direction of movement indicated by a portion of the direction-specifying area that was tapped, and in response to a determination that the direction-specifying area has been pressed and held, the displayed cursor shown within the keyboard image is continuously moved in discrete key image units for a plurality of key image units in a direction of movement indicated by a portion of the direction-specifying area that was pressed and held until said direction-specifying area is no longer being pressed and held.

9. A method for operating a portable computing device having a touch screen associated with a display, the method comprising:

displaying on a first predetermined display region of the display a keyboard image that includes a plurality of character key images respectively representing a plurality of characters to be input into a character display field of the display, displaying on a second predetermined display region of the display at least one command graphic, storing information concerning the second predetermined display region of the display, detecting a position on the touch screen that was touched by a user and generating touch position information, determining from the touch position information and from the stored information concerning the second predetermined display region whether the at least one command graphic has been touched, in response to a determination that the at least one command graphic has been flicked, moving a cursor displayed within the keyboard image in one or more discrete key image units in a direction of movement specified by the flicking of the at least one command graphic and by a distance corresponding to a distance of the flicking of the at least one command graphic, and in response to a determination that the at least one command graphic has been touched in a manner different from flicking, displaying on the character display field the character of the character key image that the displayed cursor is currently superimposed upon.

10. The method according to claim 9, further comprising:

moving the cursor to an adjacent key image in the direction of movement in response to a determination that the portion of the command graphic was tapped as a first operation, and continuously moving the cursor in a plurality of key image units in the direction of movement in response to a determination that the portion of the command graphic was pressed and held as the first operation until said portion is no longer being pressed and held.

11. The method according to claim 9, further comprising:

in response to a request to modify a display position, a size of the command graphic, or a shape of the command graphic that was inputted using a predetermined setup screen, modifying an appearance of the command graphic on the display in accordance with the inputted request.

12. The method according to claim 9, further comprising:

based on the touch position information and the stored information, determining whether or not the command graphic has been dragged after the command graphic has been pressed and held for at least a predetermined time period, in response to a determination that the command graphic has been dragged after the command graphic has been pressed and held for at least the predetermined time period, outputting a signal indicating that the command graphic has been dragged in a predetermined direction after the pressing and holding manipulation of the command graphic, and in response to the signal indicating that the drag manipulation has been performed in the predetermined direction with regard to the command graphic, changing a display position of the command graphic on the display such that the display position of the command graphic moves in the predetermined direction.

13. The method according to claim 9, further comprising:

determining whether or not a pinch-in operation or a pinch-out operation has been performed on the command graphic based on the touch position information and the stored information, in response to a determination that the pinch-in operation has been performed on the command graphic, outputting a signal indicating that the pinch-in operation has been performed on the command graphic, in response to the signal indicating that the pinch-in operation has been performed on the command graphic, reducing a size of the command graphic on the display, in response to a determination that the pinch-out operation has been performed on the command graphic, outputting a signal indicating that the pinch-out operation has been performed on the command graphic, and in response to the signal indicating that the pinch-out operation has been performed on the command graphic, increasing the size of the command graphic on the display.

14. The method according to claim 9, wherein the keyboard image further includes a plurality of function key images, and the method further comprises:

in response to a signal indicating that an operation selecting one of the function key images has been performed on the command graphic, executing a process for implementing the function assigned to the function key image that the cursor is currently indicating.

15. The method according to claim 9, wherein the command graphic includes a plurality of movement direction specifying portions that each include at least one of a left-right direction and a diagonal direction.

16. A portable computing device comprising:

a display, a touch screen associated with the display, a memory and a controller configured to:

display on a first predetermined display region of the display a keyboard image that includes a plurality of character key images respectively representing a plurality of characters to be input into a character display field of the display, display on a second predetermined display region of the display a command graphic that contains (i) a direction-specifying area for selecting a direction of movement of a displayed cursor that is movable within the keyboard image and (ii) a selection input area, wherein the direction-specifying area is located at a periphery of the command graphic and the selection input area is located at a center of the command graphic such that the direction-specifying area surrounds the selection input area, store in the memory information concerning the second predetermined display region of the display, detect a position on the touch screen that was touched by a user and generate touch position information, determine from the touch position information and from the stored information concerning the second predetermined display region whether the direction-specifying area or the selection input area has been touched, in response to a determination that the direction-specifying area has been touched, move the displayed cursor shown within the keyboard image in one or more discrete key image units in a direction of movement indicated by a portion of the direction-specifying area that was touched, and in response to a determination that the selection input area has been touched, display on the character display field a character of the character key image that the displayed cursor is currently superimposed upon.

17. The portable computing device according to claim 16, wherein the controller includes:

a non-transitory computer readable memory medium that stores instructions; and a microprocessor configured to read the instructions stored in the non-transitory computer readable memory medium and to execute the instructions in order to control operation of the portable computing device, wherein the instructions, when executed, cause the microprocessor to:

display on a first predetermined display region of the display a keyboard image that includes a plurality of character key images respectively representing a plurality of characters to be input into a character display field of the keyboard image, display on a second predetermined display region of the display a command graphic that contains (i) a direction-specifying area for selecting a direction of movement of a displayed cursor that is movable within the keyboard image and (ii) a selection input area, store information concerning the second predetermined display region of the display in the memory, detect a position on the touch screen that was touched by a user and generate touch position information, determine from the touch position information and from the stored information concerning the second predetermined display region whether the direction-specifying area or the selection input area has been touched, in response to a determination that the direction-specifying area has been touched, move the displayed cursor shown within the keyboard image in one or more discrete key image units in a direction of movement indicated by a portion of the direction-specifying area that was touched, and in response to a determination that the selection input area has been touched, display on the character display field a character of the character key image that the displayed cursor is currently superimposed upon.

18. The portable computing device according to claim 16, wherein the controller is further configured to:

in response to a determination that the direction-specifying area has been tapped, move the displayed cursor shown within the keyboard image in one discrete key image unit to an adjacent key image in a direction of movement indicated by a portion of the direction-specifying area that was tapped, and in response to a determination that the direction-specifying area has been pressed and held, continuously move the displayed cursor shown within the keyboard image in discrete key image units for a plurality of key image units in a direction of movement indicated by a portion of the direction-specifying area that was pressed and held until said direction-specifying area is no longer being pressed and held.

19. A portable computing device comprising:

a display, a touch screen associated with the display, a memory and a controller configured to:

display on a first predetermined display region of the display a keyboard image that includes a plurality of character key images respectively representing a plurality of characters to be input into a character display field of the display, display on a second predetermined display region of the display a command graphic, store in the memory information concerning the second predetermined display region of the display, detect a position on the touch screen that was touched by a user and generate touch position information, determine from the touch position information and from the stored information concerning the second predetermined display region whether the command graphic has been touched, in response to a determination that the command graphic has been flicked, move a cursor displayed within the keyboard image in one or more discrete key image units in a direction of movement specified by the flicking of the command graphic and by a distance corresponding to a distance of the flicking of the command graphic, and in response to a determination that the command graphic has been touched in a manner different from flicking, display on the character display field the character of the character key image that the displayed cursor is currently superimposed upon.

20. The portable computing device according to claim 19, wherein the controller includes:

a non-transitory computer readable memory medium that stores instructions; and a microprocessor configured to read the instructions stored in the non-transitory computer readable memory medium and to execute the instructions in order to control operation of the portable computing device, wherein the instructions, when executed, cause the microprocessor to:

display on a first predetermined display region of the display a keyboard image that includes a plurality of character key images respectively representing a plurality of characters to be input into a character display field of the display, display a command graphic on a second predetermined display region of the display, store information concerning the second predetermined display region of the display in the memory, detect a position on the touch screen that was touched by a user and generate touch position information, determine from the touch position information and from the stored information concerning the second predetermined display region whether the command graphic has been touched, in response to a determination that a portion of the command graphic has been touched or that the command graphic has been touched in any manner, move a cursor displayed within the keyboard image in one or more discrete key image units in a direction of movement indicated by the portion of the command graphic that was touched or in a direction of movement specified by the touching of the command graphic, and in response to a determination that another portion of the command graphic has been touched or that the command graphic has been touched in another manner, display on the character display field a character of the character key image that the displayed cursor is currently superimposed upon.

21. The portable computing device according to claim 19, wherein the keyboard image further includes a plurality of function key images, and wherein the controller is configured to:

in response to a signal indicating that an operation selecting one of the function key images has been performed on the command graphic, execute a process for implementing the function assigned to the function key image that the cursor is currently indicating.

22. A method of operating a portable computing device comprising:

a display, a touch screen associated with the display, a memory and a controller the method comprising:

displaying on a first predetermined display region of the display a keyboard image that includes a plurality of character key images respectively representing a plurality of characters to be input into a character display field of the display, displaying first and second command graphics on a second predetermined display region of the display, the first command graphic containing (i) a direction-specifying area for selecting a direction of movement of a first displayed cursor that is movable within the keyboard image and (ii) a selection input area and the second command graphic containing (i) a direction-specifying area for selecting a direction of movement of a second displayed cursor that is movable within the keyboard image and (ii) a selection input area, wherein the direction-specifying area of the first command graphic is located at a periphery of the first command graphic and the selection input area of the first command graphic is located at a center of the first command graphic such that the direction-specifying of the first command graphic area surrounds the selection input area of the first command graphic, and wherein the direction-specifying area of the second command graphic is located at a periphery of the second command graphic and the selection input area of the second command graphic is located at a center of the second command graphic such that the direction-specifying of the second command graphic area surrounds the selection input area of the second command graphic, storing information concerning the second predetermined display region of the display in the memory, detecting a position on the touch screen that was touched by a user and generate touch position information, determining from the touch position information and from the stored information concerning the second predetermined display region whether the direction-specifying area or the selection input area of the first or the second command graphic has been touched, in response to a determination that the direction-specifying area of the first command graphic has been touched, moving the first displayed cursor shown within the keyboard image in one or more discrete key image units in a direction of movement indicated by the direction-specifying area of the first command graphic that was touched, in response to a determination that the direction-specifying area of the second command graphic has been touched, moving the second displayed cursor shown within the keyboard image in one or more discrete key image units in a direction of movement indicated by the direction-specifying area of the second command graphic that was touched, in response to a determination that the selection input area of the first command graphic has been touched, displaying on the character display field the character of the character key image that the first displayed cursor is currently superimposed upon, and in response to a determination that the selection input area of the second command graphic has been touched, displaying on the character display field the character of the character key image that the second displayed cursor is currently superimposed upon.

23. The method according to claim 22, wherein:

the direction-specifying area of the first command graphic includes a plurality of movement direction specifying portions that specify the direction of movement of the first cursor, the direction-specifying area of the second command graphic includes a plurality of movement direction specifying portions that specify the direction of movement of the second cursor, and the method further comprises:

defining touching one of the movement direction specifying portions of the first command graphic as a first operation, defining touching one of the movement direction specifying portions of the second command graphic as a second operation, defining touching the selection specifying portion of the first command graphic as a third operation, and defining touching the selection specifying portion of the second command graphic as a fourth operation.

24. The method according to claim 22, wherein each of the first and second command graphics includes a plurality of movement direction specifying portions that include at least one of a left-right direction and a diagonal direction.

25. The method according to claim 22, the method further comprises:

moving the first cursor to an adjacent key image in the direction of movement in response to a determination that the direction-specifying area of the first command graphic was tapped as a first operation, continuously moving the first cursor in a plurality of key image units in the direction of movement in response to a determination that the direction-specifying area of the first command graphic was pressed and held as the first operation until said direction-specifying area is no longer being pressed and held, moving the second cursor to an adjacent key image in the direction of movement in response to a determination that the direction-specifying area of the second command graphic was tapped as a second operation, continuously moving the second cursor in a plurality of key image units in the direction of movement in response to a determination that the direction-specifying area of the second command graphic was pressed and held as the second operation until said direction-specifying area is no longer being pressed and held.

26. The method according to claim 25, wherein each of the first and second command graphics includes a plurality of the direction-specifying areas that each include at least one of a left-right direction and a diagonal direction.

27. The method according to claim 22, further comprising:

in response to a determination that the direction-specifying area of the first command graphic has been tapped, moving the first displayed cursor shown within the keyboard image in one discrete key image unit to an adjacent key image in a direction of movement indicated by a portion of the direction-specifying area of the first command graphic that was tapped;

in response to a determination that the direction-specifying area of the first command graphic has been pressed and held, continuously moving the first displayed cursor shown within the keyboard image in discrete key image units for a plurality of key image units in a direction of movement indicated by a portion of the direction-specifying area that was pressed and held until said direction-specifying area of the first command graphic is no longer being pressed and held, and, in response to a determination that the direction-specifying area of the second command graphic has been tapped, moving the second displayed cursor shown within the keyboard image in one discrete key image unit to an adjacent key image in a direction of movement indicated by a portion of the direction-specifying area of the second command graphic that was tapped;

in response to a determination that the direction-specifying area of the second command graphic has been pressed and held, continuously moving the second displayed cursor shown within the keyboard image in discrete key image units for a plurality of key image units in a direction of movement indicated by a portion of the direction-specifying area that was pressed and held until said direction-specifying area of the second command graphic is no longer being pressed and held.

28. A method of operating a portable computing device comprising:
a display,
a touch screen associated with the display,
a memory and
a controller
the method comprising:

displaying, on a first predetermined display region of the display, a keyboard image that includes a plurality of character key images respectively representing a plurality of characters to be input into a character display field of the display, displaying first and second command graphics on a second predetermined display region of the display, storing information concerning the second predetermined display region of the display in the memory, detecting a position on the touch screen that was touched by a user and generate touch position information, determining from the touch position information and from the stored information concerning the second predetermined display region whether the first or the second command graphic has been touched, in response to a determination that the first command graphic has been flicked, moving a first cursor displayed within the keyboard image in one or more discrete key image units in a direction of movement specified by the flicking of the first command graphic and by a distance corresponding to a distance of the flicking of the first command graphic, in response to a determination that the second command graphic has been flicked, moving a second cursor displayed within the keyboard image in one or more discrete key image units in a direction of movement specified by the flicking of the second command graphic and by a distance corresponding to a distance of the flicking of the second command graphic, and in response to a determination that the first command graphic has been touched in a manner different from flicking, displaying on the character display field the character of the character key image that the first displayed cursor is currently superimposed upon;

in response to a determination that the second command graphic has been touched in a manner different from flicking, displaying on the character display field the character of the character key image that the second displayed cursor is currently superimposed upon.

29. The method according to claim 28, further comprising:

moving the first cursor to an adjacent key image in the direction of movement in response to a determination that a portion of the first command graphic was tapped as a first operation, continuously moving the first cursor in a plurality of key image units in the direction of movement in response to a determination that a portion of the first command graphic was pressed and held as the first operation until said portion is no longer being pressed and held, moving the second cursor to an adjacent key image in the direction of movement in response to a determination that a portion of the second command graphic was tapped as a second operation, continuously moving the second cursor in a plurality of key image units in the direction of movement in response to a determination that a portion of the second command graphic was pressed and held as the second operation until said portion is no longer being pressed and held.

30. The method according to claim 28, further comprising:

in response to a request to modify a display position, a size of the first or the second command graphic, or a shape of the first or second command graphic that was inputted using a predetermined setup screen, modifying the display region of the corresponding command graphic on the display in accordance with the inputted request.

31. The method according to claim 28, further comprising:

based on the touch position information and the stored information, determining whether or not the first command graphic or the second command graphic has been dragged after the first or second command graphic has been pressed and held for at least a predetermined time period, in response to a determination that the first command graphic or the second command graphic has been dragged after the first or second command graphic has been pressed and held for at least the predetermined time period, outputting a signal indicating that the first command graphic or the second command graphic has been dragged in a predetermined direction after the pressing and holding manipulation with regard to the first command graphic or the second command graphic, and in response to the signal indicating that the drag manipulation has been performed in the predetermined direction with regard to the first command graphic or the second command graphic, changing a display position of the first command graphic or the second command graphic on the display such that the display position of the first command graphic or the second command graphic moves in the predetermined direction.

32. The method according to claim 28, further comprising:

determining whether or not a pinch-in operation or a pinch-out operation has been performed on the first command graphic or the second command graphic based on the touch position information and the stored information, in response to a determination that the pinch-in operation has been performed on the first command graphic or the second command graphic, outputting a signal indicating that the pinch-in operation has been performed on the first command graphic or the second command graphic, in response to the signal indicating that the pinch-in operation has been performed on the first command graphic or the second command graphic, reducing a size of the first command graphic or the second command graphic on the display, in response to a determination that the pinch-out operation has been performed on the first command graphic or the second command graphic, outputting a signal indicating that the pinch-out operation has been performed on the first command graphic or the second command graphic, and in response to the signal indicating that the pinch-out operation has been performed on the first command graphic or the second command graphic, increasing the size of the first command graphic or the second command graphic on the display.

33. The method according to claim 28, wherein the keyboard image further includes a plurality of function key images, and the method further comprises:

in response to a determination that an operation selecting one of the function key images on the keyboard image has been performed using the first command graphic, executing a process for implementing the function assigned to the function key image that the first cursor is currently indicating, and in response to a determination that an operation selecting one of the function key images on the keyboard image has been performed using the second command graphic, executing a process for implementing the function assigned to the function key image that the second cursor is currently indicating.

34. The method according to claim 28, wherein the first cursor and the second cursor differ from each other in terms of at least one element selected from shape, color, lines drawn inside the first or second cursors and design.

* * * * *